US008629913B2

(12) United States Patent
Côté et al.

(10) Patent No.: US 8,629,913 B2

(45) Date of Patent: Jan. 14, 2014

(54) OVERFLOW CONTROL TECHNIQUES FOR IMAGE SIGNAL PROCESSING

(75) Inventors: Guy Côté, San Jose, CA (US); Jeffrey E. Frederiksen, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 755 days.

(21) Appl. No.: 12/895,674

(22) Filed: Sep. 30, 2010

(65) Prior Publication Data

US 2012/0081580 A1 Apr. 5, 2012

(51) Int. Cl.

| | |
|---|---|
| ***H04N 5/228*** | (2006.01) |
| ***H04N 5/76*** | (2006.01) |
| ***H04N 7/12*** | (2006.01) |
| ***H04N 5/00*** | (2011.01) |
| ***G06F 11/00*** | (2006.01) |
| ***H04B 1/66*** | (2006.01) |

(52) U.S. Cl.

USPC .................. 348/222.1; 348/231.1; 348/419.1; 348/616; 370/229; 375/240

(58) Field of Classification Search

USPC .......... 348/222.1, 231.1, 231.2, 231.9, 419.1, 348/616; 375/240, 240.27; 370/229, 231

See application file for complete search history.

(56) References Cited

U.S. PATENT DOCUMENTS

| | | | | |
|---|---|---|---|---|
| 4,475,172 | A | | 10/1984 | Frederiksen |
| 4,589,089 | A | | 5/1986 | Frederiksen |
| 4,605,961 | A | | 8/1986 | Frederiksen |
| 4,682,360 | A | | 7/1987 | Frederiksen |
| 4,694,489 | A | | 9/1987 | Frederiksen |
| 4,742,543 | A | | 5/1988 | Frederiksen |
| 4,743,959 | A | | 5/1988 | Frederiksen |
| 4,799,677 | A | | 1/1989 | Frederiksen |
| 4,979,738 | A | | 12/1990 | Frederiksen |
| 5,227,863 | A | | 7/1993 | Bilbrey et al. |
| 5,247,355 | A | | 9/1993 | Frederiksen |
| 5,272,529 | A | | 12/1993 | Frederiksen |
| 5,496,106 | A | | 3/1996 | Anderson |
| 5,629,936 | A | * | 5/1997 | Lee et al. ...................... 370/230 |
| 5,640,613 | A | | 6/1997 | Yuyama et al. |

(Continued)

FOREIGN PATENT DOCUMENTS

| | | |
|---|---|---|
| DE | 198 26 584 A1 | 12/1999 |
| EP | 0437629 | 7/1991 |

(Continued)

OTHER PUBLICATIONS

U.S. Appl. No. 12/895,299, filed Sep. 30, 2010, Guy Cote et al.

(Continued)

*Primary Examiner* — Nhan T Tran

(74) *Attorney, Agent, or Firm* — Fletcher Yoder PC

(57) ABSTRACT

Certain embodiments disclosed herein relate to an image signal processing system includes overflow control logic that detects an overflow condition when a destination unit when a sensor input queue and/or front-end processing unit receives back pressure from a downstream destination unit. In one embodiment, pixels of a current frame are dropped when an overflow condition occurs. The number of dropped pixels may be tracked using a counter. Upon recovery of the overflow condition, the remaining pixels of the frame are received and each dropped pixel may be replaced using a replacement pixel value.

29 Claims, 111 Drawing Sheets
(4 of 111 Drawing Sheet(s) Filed in Color)

(56) References Cited

U.S. PATENT DOCUMENTS

| | | | | |
|---|---|---|---|---|
| 5,694,227 | A | 12/1997 | Starkweather | |
| 5,764,291 | A | 6/1998 | Fullam | |
| 5,790,705 | A | 8/1998 | Anderson et al. | |
| 5,809,178 | A | 9/1998 | Anderson et al. | |
| 5,822,465 | A | 10/1998 | Normile et al. | |
| 5,867,214 | A | 2/1999 | Anderson et al. | |
| 5,986,714 | A * | 11/1999 | Marino | 375/240.05 |
| 5,991,465 | A | 11/1999 | Anderson et al. | |
| 6,011,585 | A | 1/2000 | Anderson | |
| 6,028,611 | A | 2/2000 | Anderson et al. | |
| 6,031,964 | A | 2/2000 | Anderson | |
| 6,122,411 | A | 9/2000 | Shen et al. | |
| 6,141,044 | A | 10/2000 | Anderson et al. | |
| 6,157,394 | A | 12/2000 | Anderson et al. | |
| 6,198,514 | B1 | 3/2001 | Lee et al. | |
| 6,654,500 | B1 * | 11/2003 | Lyu | 348/419.1 |
| 6,745,012 | B1 | 6/2004 | Ton et al. | |
| 6,954,193 | B1 | 10/2005 | Andrade et al. | |
| 6,959,044 | B1 | 10/2005 | Jin et al. | |
| RE38,896 | E | 11/2005 | Anderson | |
| RE38,911 | E | 12/2005 | Anderson et al. | |
| 7,068,718 | B2 * | 6/2006 | Kim et al. | 375/240.02 |
| RE39,213 | E | 8/2006 | Anderson et al. | |
| 7,170,938 | B1 | 1/2007 | Cote et al. | |
| 7,231,587 | B2 | 6/2007 | Novotny et al. | |
| 7,277,595 | B1 | 10/2007 | Reid | |
| 7,310,371 | B2 | 12/2007 | Cote et al. | |
| 7,324,595 | B2 | 1/2008 | Cote et al. | |
| 7,327,786 | B2 | 2/2008 | Winger et al. | |
| 7,345,708 | B2 | 3/2008 | Winger et al. | |
| 7,362,376 | B2 | 4/2008 | Winger et al. | |
| 7,362,804 | B2 | 4/2008 | Novotny et al. | |
| 7,515,765 | B1 | 4/2009 | MacDonald et al. | |
| 7,545,994 | B2 | 6/2009 | Reid | |
| 7,596,280 | B2 | 9/2009 | Bilbrey et al. | |
| 7,602,849 | B2 | 10/2009 | Booth et al. | |
| 7,612,804 | B1 | 11/2009 | Marcu et al. | |
| 7,620,103 | B2 | 11/2009 | Cote et al. | |
| 2001/0035910 | A1 | 11/2001 | Yukawa et al. | |
| 2002/0012395 | A1 * | 1/2002 | Song et al. | 375/240.24 |
| 2004/0165530 | A1 * | 8/2004 | Bedekar et al. | 370/235 |
| 2004/0240549 | A1 | 12/2004 | Cote et al. | |
| 2004/0240556 | A1 | 12/2004 | Winger et al. | |
| 2004/0257461 | A1 | 12/2004 | Toyomura | |
| 2005/0063465 | A1 | 3/2005 | Cote et al. | |
| 2005/0105618 | A1 | 5/2005 | Booth et al. | |
| 2005/0123282 | A1 | 6/2005 | Novotny et al. | |
| 2005/0134602 | A1 | 6/2005 | Winger et al. | |
| 2005/0134730 | A1 | 6/2005 | Winger et al. | |
| 2005/0216815 | A1 | 9/2005 | Novotny et al. | |
| 2006/0126724 | A1 | 6/2006 | Cote et al. | |
| 2006/0227867 | A1 | 10/2006 | Winger et al. | |
| 2007/0030898 | A1 | 2/2007 | Cote | |
| 2007/0030902 | A1 | 2/2007 | Winger et al. | |
| 2007/0030903 | A1 | 2/2007 | Cote et al. | |
| 2007/0030904 | A1 | 2/2007 | Winger et al. | |
| 2007/0030905 | A1 | 2/2007 | Cote | |
| 2007/0030906 | A1 | 2/2007 | Cote et al. | |
| 2007/0110425 | A1 | 5/2007 | Lin et al. | |
| 2007/0263724 | A1 | 11/2007 | Cote et al. | |
| 2008/0031327 | A1 | 2/2008 | Wang et al. | |
| 2008/0088857 | A1 | 4/2008 | Zimmer et al. | |
| 2008/0088858 | A1 | 4/2008 | Marcu et al. | |
| 2008/0094485 | A1 | 4/2008 | Huang | |
| 2008/0117330 | A1 | 5/2008 | Winger et al. | |
| 2008/0122975 | A1 | 5/2008 | Winger et al. | |
| 2009/0207728 | A1 | 8/2009 | Bryant et al. | |
| 2009/0273679 | A1 | 11/2009 | Gere et al. | |

FOREIGN PATENT DOCUMENTS

| | | | |
|---|---|---|---|
| EP | 0 685 797 | A1 | 12/1995 |
| GB | 2 275 851 | A | 9/1994 |
| GB | 2 449 738 | A | 12/2008 |
| JP | 4 307831 | A | 10/1992 |
| WO | 2006/128478 | A1 | 12/2006 |

OTHER PUBLICATIONS

International Search Report for PCT Application No. PCT/US2011/049986, dated Feb. 28, 2012, 15 pgs.
International Search Report for PCT Application No. PCT/US2011/049121, dated Jan. 20, 2012, 18 pgs.
U.S. Appl. No. 12/582,414, filed Oct. 20, 2009, Cote et al.
U.S. Appl. No. 12/582,400, filed Oct. 20, 2009, Cote et al.
U.S. Appl. No. 12/582,390, filed Oct. 20, 2009, Cote et al.
U.S. Appl. No. 12/582,377, filed Oct. 20, 2009, Cote et al.
U.S. Appl. No. 12/789,815, filed May 28, 2010, Cote et al.
U.S. Appl. No. 12/789,810, filed May 28, 2010, Cote et al.
U.S. Appl. No. 12/846,008, filed Jul. 29, 2010, Cote et al.
U.S. Appl. No. 12/858,922, filed Aug. 18, 2010, Cote et al.
U.S. Appl. No. 12/873,999, filed Sep. 1, 2010, Cote et al.
U.S. Appl. No. 12/873,989, filed Sep. 1, 2010, Cote et al.
U.S. Appl. No. 12/873,978, filed Sep. 1, 2010, Cote et al.
U.S. Appl. No. 12/873,973, filed Sep. 1, 2010, Cote et al.
International Search Report & Written Opinion for PCT Application No. PCT/US2011/050052 dated Dec. 12, 2011, 11 pgs.

* cited by examiner

<table>
<tr><th>FORMAT</th><th>31</th><th>30</th><th>29</th><th>28</th><th>27</th><th>26</th><th>25</th><th>24</th><th>23</th><th>22</th><th>21</th><th>20</th><th>19</th><th>18</th><th>17</th><th>16</th><th>15</th><th>14</th><th>13</th><th>12</th><th>11</th><th>10</th><th>09</th><th>08</th><th>07</th><th>06</th><th>05</th><th>04</th><th>03</th><th>02</th><th>01</th><th>00</th></tr>
<tr><td>RAW8</td><td colspan="8">P3[7:0]</td><td colspan="8">P2[7:0]</td><td colspan="8">P1[7:0]</td><td colspan="8">P0[7:0]</td></tr>
<tr><td>RAW10</td><td colspan="6"></td><td colspan="10">P1[9:0]</td><td colspan="6"></td><td colspan="10">P0[9:0]</td></tr>
<tr><td>RAW12</td><td colspan="4"></td><td colspan="12">P1[11:0]</td><td colspan="4"></td><td colspan="12">P0[11:0]</td></tr>
<tr><td>RAW14</td><td colspan="2"></td><td colspan="14">P1[13:0]</td><td colspan="2"></td><td colspan="14">P0[13:0]</td></tr>
<tr><td>RAW16</td><td colspan="16">P1[15:0]</td><td colspan="16">P0[15:0]</td></tr>
</table>

FIG. 26

<table>
<tr><th></th><th>31</th><th>30</th><th>29</th><th>28</th><th>27</th><th>26</th><th>25</th><th>24</th><th>23</th><th>22</th><th>21</th><th>20</th><th>19</th><th>18</th><th>17</th><th>16</th><th>15</th><th>14</th><th>13</th><th>12</th><th>11</th><th>10</th><th>09</th><th>08</th><th>07</th><th>06</th><th>05</th><th>04</th><th>03</th><th>02</th><th>01</th><th>00</th></tr>
<tr><td>00h</td><td colspan="8">P3[9:2]</td><td colspan="8">P2[9:2]</td><td colspan="8">P1[9.2]</td><td colspan="8">P0[9:2]</td></tr>
<tr><td>01h</td><td colspan="8">P6[9:2]</td><td colspan="8">P5[9:2]</td><td colspan="8">P4[9.2]</td><td colspan="2">P3[1:0]</td><td colspan="2">P2[1:0]</td><td colspan="2">P1[1:0]</td><td colspan="2">P0[1:0]</td></tr>
<tr><td>02h</td><td colspan="8">P9[9:2]</td><td colspan="8">P8[9:2]</td><td colspan="2">P7[1:0]</td><td colspan="2">P6[1:0]</td><td colspan="2">P5[1:0]</td><td colspan="2">P4[1:0]</td><td colspan="8">P7[9:2]</td></tr>
<tr><td>03h</td><td colspan="8">P12[9:2]</td><td colspan="2">P11[1:0]</td><td colspan="2">P10[1:0]</td><td colspan="2">P9[1:0]</td><td colspan="2">P8[1:0]</td><td colspan="8">P11[9:2]</td><td colspan="8">P10[9:2]</td></tr>
<tr><td>04h</td><td colspan="2">P15[1:0]</td><td colspan="2">P14[1:0]</td><td colspan="2">P13[1:0]</td><td colspan="2">P12[1:0]</td><td colspan="8">P15[9:2]</td><td colspan="8">P14[9:2]</td><td colspan="8">P13[9:2]</td></tr>
</table>

FIG. 27

| | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|---|
| 00h | P2[11:4] | | | | | | | | P1[3:0] | | | | P0[3:0] | | | | P1[11:4] | | | | | | | | P0[11:4] | | | | | | | |
| 01h | P5[11:4] | | | | | | | | P4[11:4] | | | | | | | | P3[3:0] | | | | P2[3:0] | | | | P3[11:4] | | | | | | | |
| 02h | P7[3:0] | | | | P6[3:0] | | | | P7[11:4] | | | | | | | | P6[11:4] | | | | | | | | P5[3:0] | | | | P4[3:0] | | | |

FIG. 28

| | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|---|
| 00h | P3[13:6] | | | | | | | | P2[13:6] | | | | | | | | P1[13:6] | | | | | | | | P0[13:6] | | | | | | | |
| 01h | P4[13:6] | | | | | | | | P3[5:0] | | | | | | P2[5:0] | | | | | | P1[5:0] | | | | | | P0[5:0] | | | | | |
| 02h | P15[1:0] | | P4[5:0] | | | | | | P7[13:6] | | | | | | | | P6[13:6] | | | | | | | | P5[13:6] | | | | | | | |
| 03h | P9[13:6] | | | | | | | | P8[13:6] | | | | | | | | P7[5:0] | | | | | | P6[5:0] | | | | | | P5[5:2] | | | |
| 04h | P10[3:0] | | | | P9[5:0] | | | | | | P8[5:0] | | | | | | P11[13:6] | | | | | | | | P10[13:6] | | | | | | | |
| 05h | P14[13:6] | | | | | | | | P13[13:6] | | | | | | | | P12[13:6] | | | | | | | | P11[5:0] | | | | | | P10[5:4] | |
| 06h | P15[5:0] | | | | | | P14[5:0] | | | | | | P13[5:0] | | | | | | P12[5:0] | | | | | | P15[13:6] | | | | | | | |

FIG. 29

| | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|---|
| 00h | E0 [7:0] | | | | | | | | R0 [7:0] | | | | | | | | G0 [7:0] | | | | | | | | B0 [7:0] | | | | | | | |
| 01h | E1 [7:0] | | | | | | | | R1 [7:0] | | | | | | | | G1 [7:0] | | | | | | | | B1 [7:0] | | | | | | | |

FIG. 32

| | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|---|
| 00h | R0 [0] | G0 [0] | B0 [0] | E0 [4:0] | | | | | R0 [8:1] | | | | | | | | G0 [8:1] | | | | | | | | B0 [8:1] | | | | | | | |
| 01h | R1 [0] | G1 [0] | B1 [0] | E1 [4:0] | | | | | R1 [8:1] | | | | | | | | G1 [8:1] | | | | | | | | B1 [8:1] | | | | | | | |

FIG. 33

| | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|---|
| 00h | R0 [1:0] | | G0 [1:0] | | B0 [1:0] | | E0 [1:0] | | R0 [9:2] | | | | | | | | G0 [9:2] | | | | | | | | B0 [9:2] | | | | | | | |
| 01h | R1 [1:0] | | G1 [1:0] | | B1 [1:0] | | E1 [1:0] | | R1 [9:2] | | | | | | | | G1 [9:2] | | | | | | | | B1 [9:2] | | | | | | | |

FIG. 34

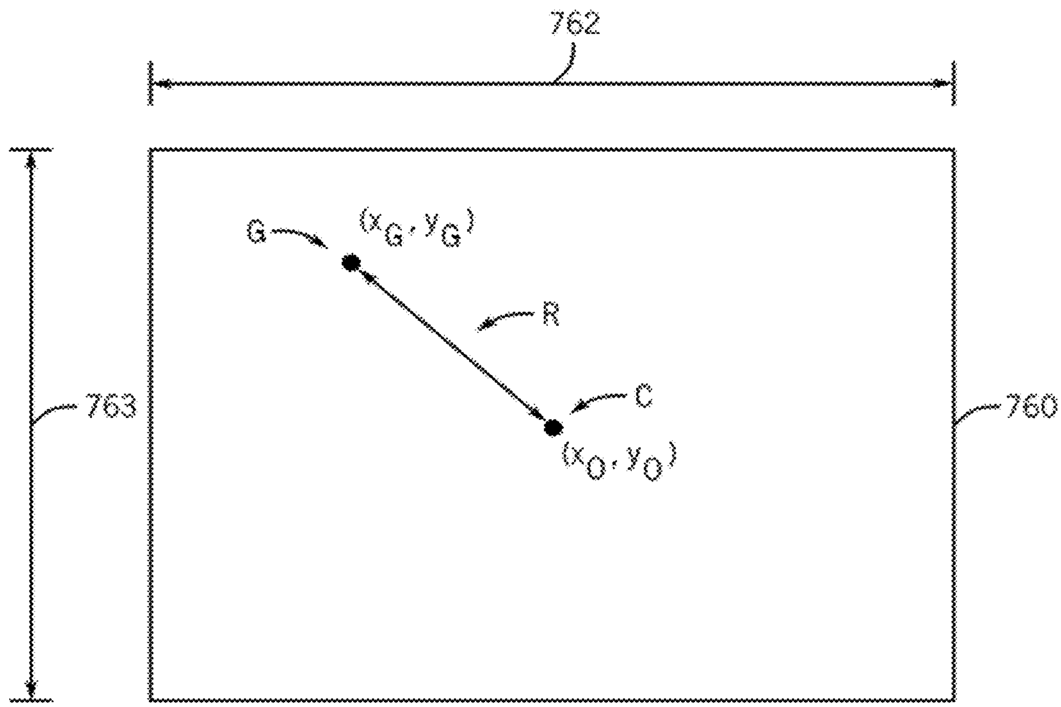
FIG. 78
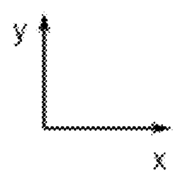

1140

1142

OVERFLOW CONTROL TECHNIQUES FOR IMAGE SIGNAL PROCESSING

BACKGROUND

The present disclosure relates generally to digital imaging devices and, more particularly, to systems and method for processing image data obtained using an image sensor of a digital imaging device.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In recent years, digital imaging devices have become increasing popular due, at least in part, to such devices becoming more and more affordable for the average consumer. Further, in addition to a number of stand-alone digital cameras currently available on the market, it is not uncommon for digital imaging devices to be integrated as part of another electronic device, such as a desktop or notebook computer, a cellular phone, or a portable media player.

To acquire image data, most digital imaging devices include an image sensor that provides a number of light-detecting elements (e.g., photodetectors) configured to convert light detected by the image sensor into an electrical signal. An image sensor may also include a color filter array that filters light captured by the image sensor to capture color information. The image data captured by the image sensor may then be processed by an image processing pipeline, which may apply a number of various image processing operations to the image data to generate a full color image that may be displayed for viewing on a display device, such as a monitor.

While conventional image processing techniques generally aim to produce a viewable image that is both objectively and subjectively pleasing to a viewer, such conventional techniques may not adequately address errors and/or distortions in the image data introduced by the imaging device and/or the image sensor. For instance, defective pixels on the image sensor, which may be due to manufacturing defects or operational failure, may fail to sense light levels accurately and, if not corrected, may manifest as artifacts appearing in the resulting processed image. Additionally, light intensity fall-off at the edges of the image sensor, which may be due to imperfections in the manufacture of the lens, may adversely affect characterization measurements and may result in an image in which the overall light intensity is non-uniform. The image processing pipeline may also perform one or more processes to sharpen the image. Conventional sharpening techniques, however, may not adequately account for existing noise in the image signal, or may be unable to distinguish the noise from edges and textured areas in the image. In such instances, conventional sharpening techniques may actually increase the appearance of noise in the image, which is generally undesirable. Further, various additional image processing steps, some of which may rely on image statistics collected by a statistics collection engine, may also be performed.

Another image processing operation that may be applied to the image data captured by the image sensor is a demosaicing operation. Because the color filter array generally provides color data at one wavelength per sensor pixel, a full set of color data is generally interpolated for each color channel in order to reproduce a full color image (e.g., RGB image). Conventional demosaicing techniques generally interpolate values for the missing color data in a horizontal or a vertical direction, generally depending on some type of fixed threshold. However, such conventional demosaicing techniques may not adequately account for the locations and direction of edges within the image, which may result in edge artifacts, such as aliasing, checkerboard artifacts, or rainbow artifacts, being introduced into the full color image, particularly along diagonal edges within the image.

Accordingly, various considerations should be addressed when processing a digital image obtained with a digital camera or other imaging device in order to improve the appearance of the resulting image. In particular, certain aspects of the disclosure below may address one or more of the drawbacks briefly mentioned above.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure provides and illustrates various embodiments of image signal processing techniques. Particularly, disclosed embodiments of this disclosure may relate to the processing of image data using a back-end image processing unit, the arrangement and configuration of line buffers for implementing raw pixel processing logic, a technique for managing the movement of pixel data in the presence of overflow (also called overrun) conditions, techniques for synchronizing video and audio data, as well as techniques relating to the use of various pixel memory formats that may be used to store pixel data to memory and to read pixel data from memory.

With regard to back-end processing, disclosed embodiments provide for a an image signal processing system that includes back-end pixel processing unit that receives pixel data after being processed by at least one of a front-end pixel processing unit and a pixel processing pipeline. In certain embodiments, the back-end processing unit receives luma/chroma image data and may be configured to apply face detection operations, local tone mapping, bright, contrast, color adjustments, as well as scaling. Further, the back-end processing unit may also include a back-end statistics unit that may collect frequency statistics. The frequency statistics may be provided to an encoder and may be used to determine quantization parameters that are to be applied to an image frame.

A further aspect of the disclosure relates to the implementation of a raw pixel processing unit using a set of line buffers. In one embodiment, the set of line buffers may include a first subset and second subset. Various logical units of the raw pixel processing unit may be implemented using the first and second subsets of line buffers in a shared manner. For instance, in one embodiment, defective pixel correction and detection logic may be implemented using the first subset of line buffers. The second subset of line buffers may be used to implement lens shading correction logic, gain, offset, and clamping logic, and demosaicing logic. Further, noise reduction may also be implemented using at least a portion of each of the first and second subsets of line buffers.

Another aspect of the disclosure may relate to an image signal processing system includes overflow control logic that detects an overflow condition when a destination unit when a sensor input queue and/or front-end processing unit receives back pressure from a downstream destination unit. The image signal processing system may also include a flash controller that is configured to activate a flash device prior to the start of a target image frame by using a sensor timing signal. In one embodiment, the flash controller receives a delayed sensor timing signal and determines a flash activation start time by using the delayed sensor timing signal to identify a time corresponding to the end of the previous frame, increasing that time by a vertical blanking time, and then subtracting a first offset to compensate for delay between the sensor timing signal and the delayed sensor timing signal. Then, the flash controller subtracts a second offset to determine the flash activation time, thus ensuring that the flash is activated prior to receiving the first pixel of the target frame. Further aspects of the disclosure provide techniques related to audio-video synchronization. In one embodiment, a time code register provides a current time stamp when sampled. The value of the time code register may be incremented at regular intervals based on a clock of the image signal processing system. At the start of a current frame acquired by an image sensor, the time code register is sampled, and a timestamp is stored into a timestamp register associated with the image sensor. The timestamp is then read from the time stamp register and written to a set of metadata associated with the current frame. The timestamp stored in the frame metadata may then be used to synchronize the current frame with a corresponding set of audio data.

An additional aspect of the present disclosure provides a flexible memory input/output controller that is configured to the storing and reading of multiple types of pixels and pixel memory formats. For instance, the memory I/O controller may support the storing and reading of raw image pixels at various bits of precision, such as 8-bit, 10-bit, 12-bit, 14-bit, and 16-bit. Pixel formats that are unaligned with memory bytes (e.g., not being a multiple of 8-bits) may be stored in a packed manner. The memory I/O controller may also support various formats of RGB pixel sets and YCC pixel sets.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of embodiments of the present disclosure without limitation to the claimed subject matter.

BRIEF DESCRIPTION OF THE DRAWINGS

The patent or application file contains at least one drawing executed in color. Copies of this patent or patent application publication with color drawings will be provided by the Office upon request and payment of the necessary fee.

Various aspects of this disclosure may be better understood upon reading the following detailed description and upon reference to the drawings in which:

FIGS. 26-29 show examples of memory formats for raw image data that may be supported by the image processing circuitry of FIG. 7 or FIG. 8, in accordance with embodiments of the present disclosure;

FIGS. 30-34 show examples of memory formats for full-color RGB image data that may be supported by the image processing circuitry of FIG. 7 or FIG. 8, in accordance with embodiments of the present disclosure;

FIG. 78 graphically illustrates how a radial distance between a current pixel and the center of an image may be calculated and used to determine a radial gain component for lens shading correction, in accordance with one embodiment;

Figure 134:
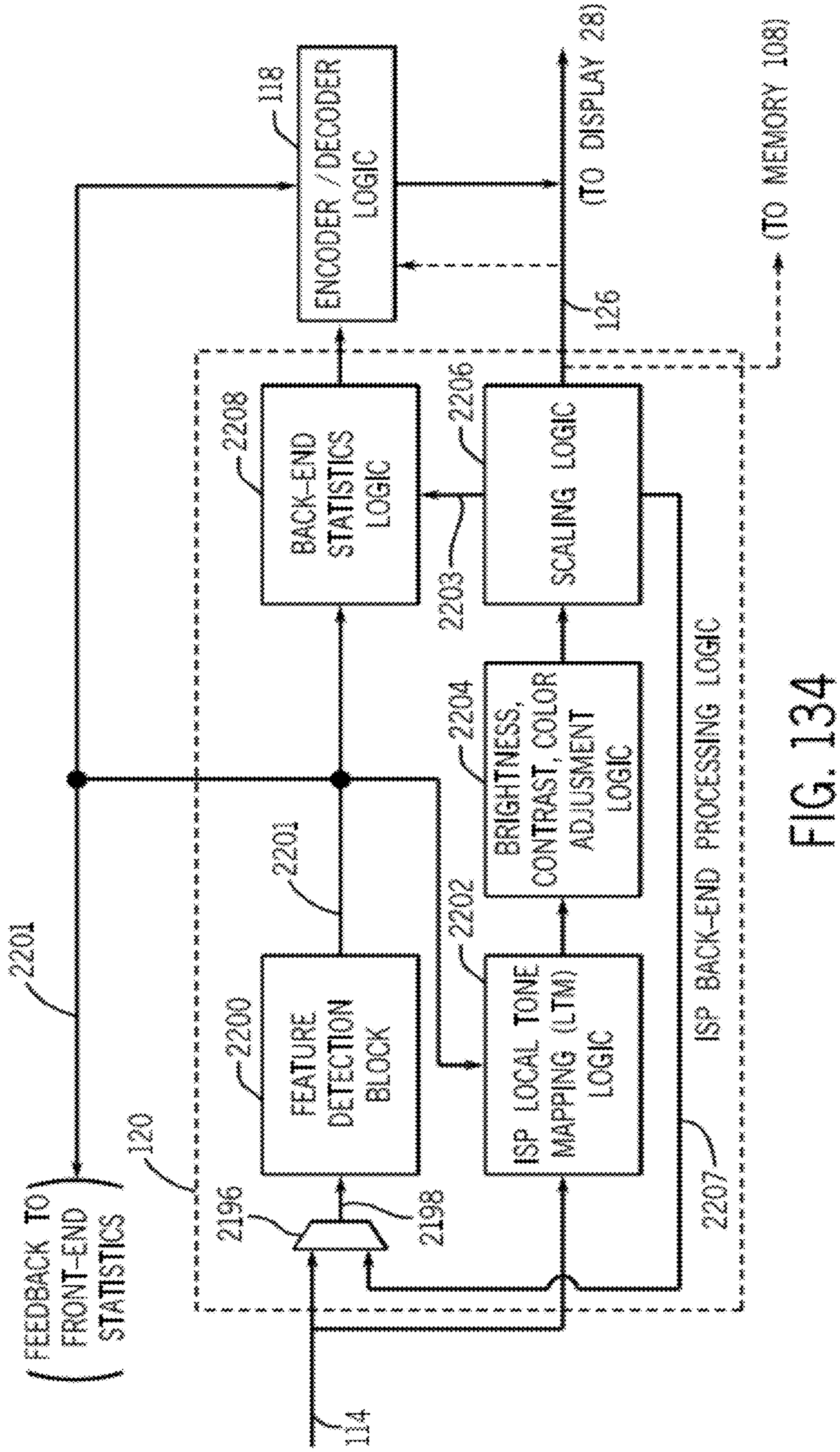
FIG. 134 is a block diagram showing an embodiment of the ISP back-end processing logic of FIG. 8 that may be configured to perform various post-processing steps downstream of the ISP pipeline, in accordance with aspects of the present disclosure.
Figure 139:
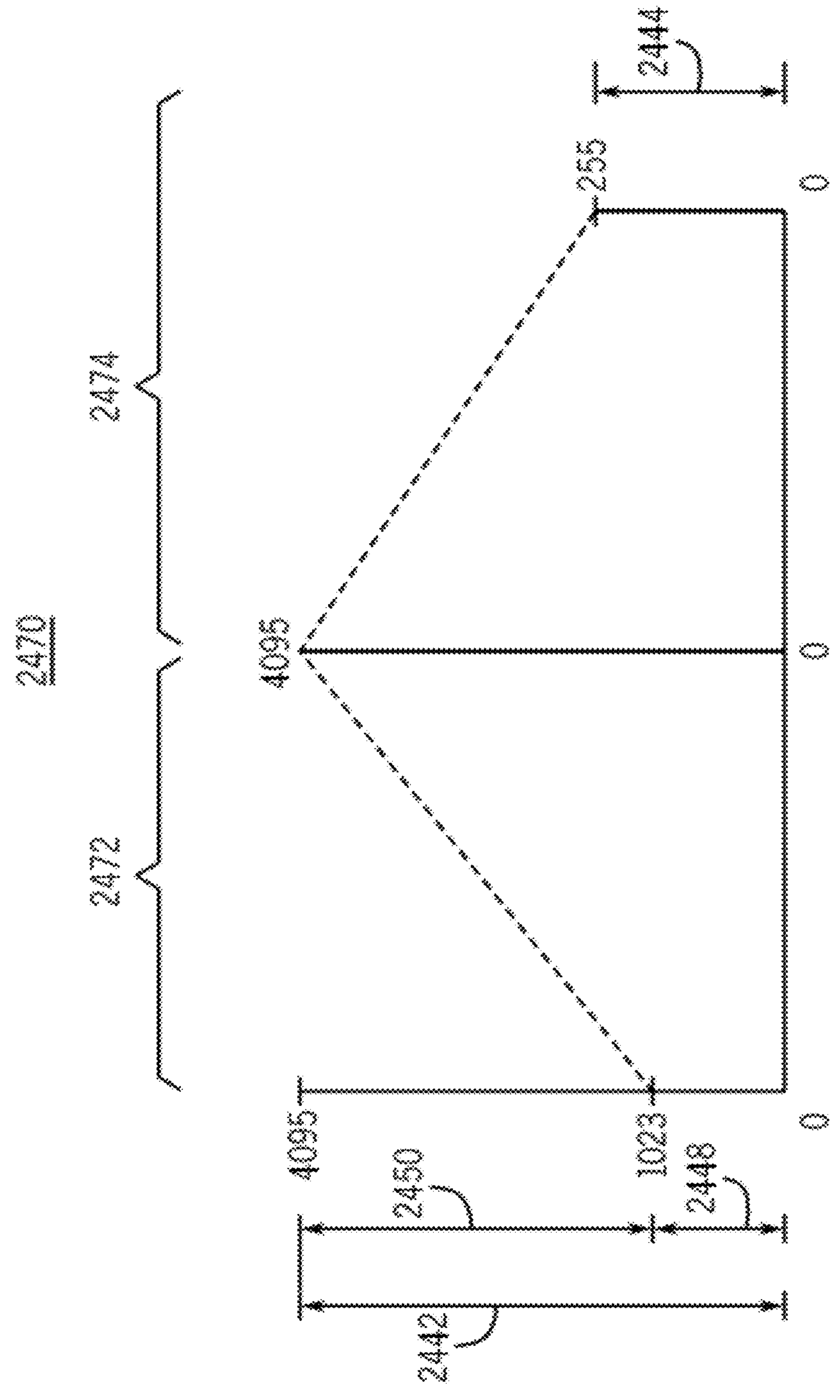
Figure 140:
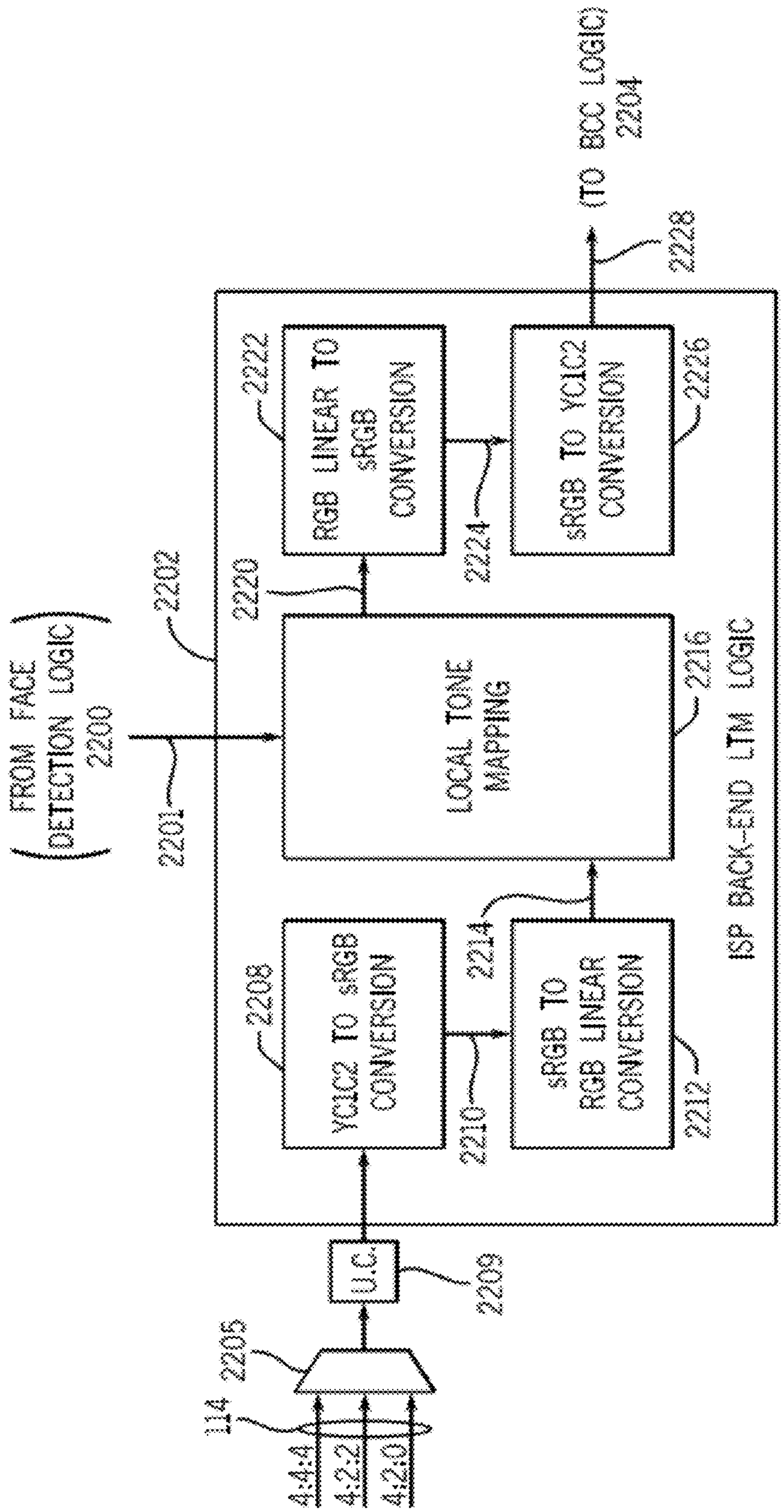
Figure 141:
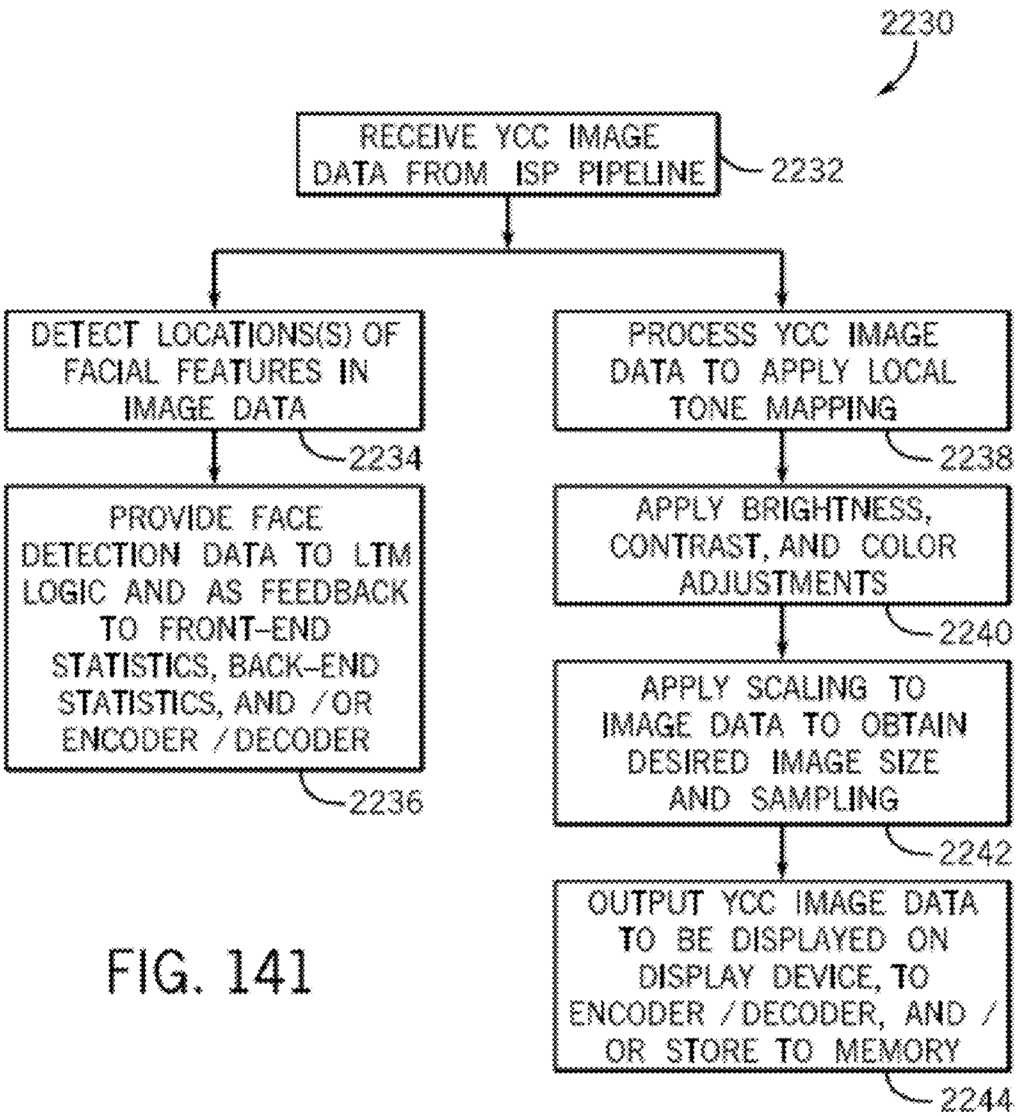
Figure 142:
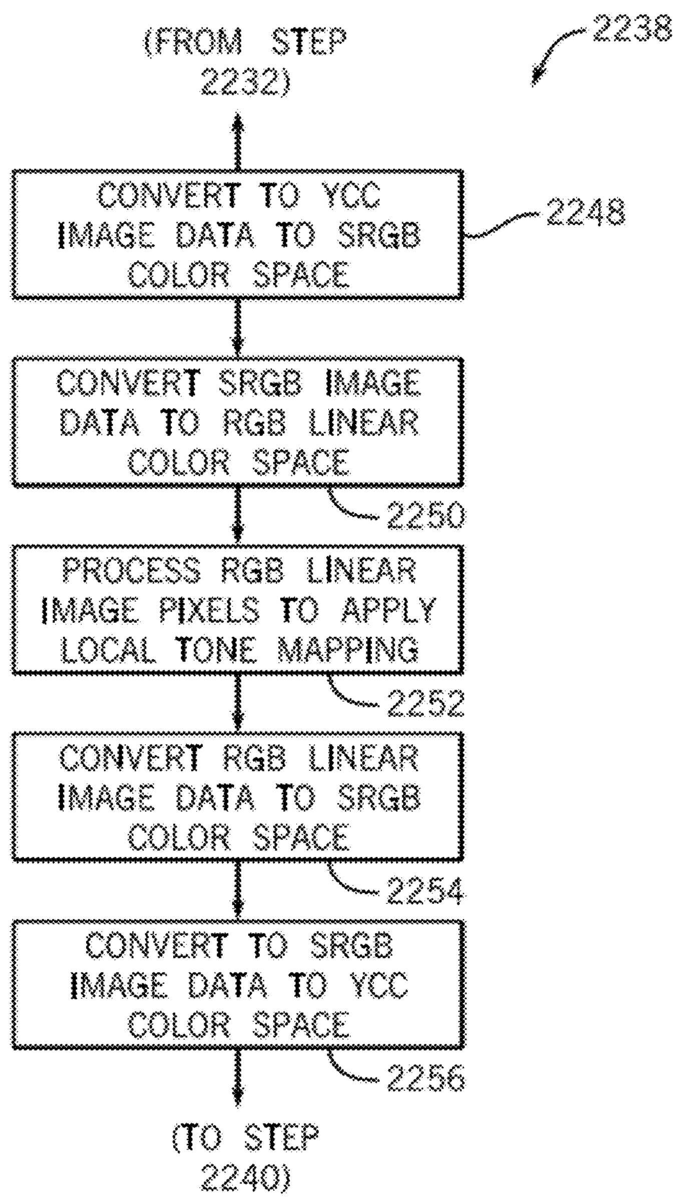

FIG. 139 graphically illustrates a technique for local tone mapping, in accordance with embodiments of the present disclosure;

FIG. 140 is a more detailed block diagram showing an embodiment of local tone mapping LTM logic that may be configured to implement tone mapping processes in the ISP back-end logic of FIG. 134, in accordance aspects of the present disclosure;

FIG. 141 is a flow chart showing a method for processing image data using the ISP back-end processing logic of FIG. 134, in accordance with one embodiment; and FIG. 142 is a flow chart showing a method for applying tone-mapping using the LTM logic shown in FIG. 140, in accordance with one embodiment.

DETAILED DESCRIPTION OF SPECIFIC EMBODIMENTS

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As will be discussed below, the present disclosure relates generally to techniques for processing image data acquired via one or more image sensing devices. In particular, certain aspects of the present disclosure may relate to techniques for detecting and correcting defective pixels, techniques for demosaicing a raw image pattern, techniques for sharpening a luminance image using a multi-scale unsharp mask, and techniques for applying lens shading gains to correct for lens shading irregularities. Further, it should be understood that the presently disclosed techniques may be applied to both still images and moving images (e.g., video), and may be utilized in any suitable type of imaging application, such as a digital camera, an electronic device having an integrated digital camera, a security or video surveillance system, a medical imaging system, and so forth.

Figure 1:
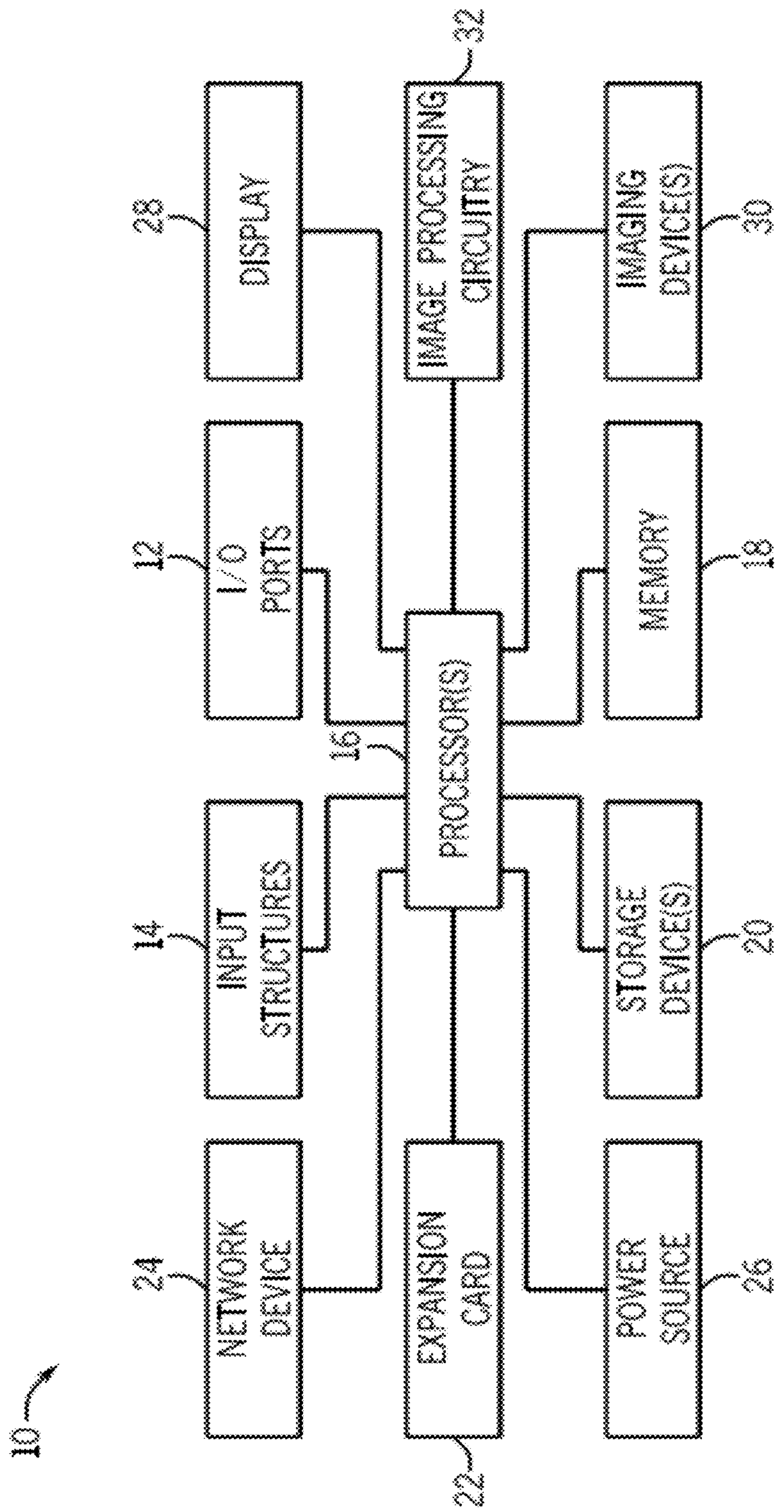
FIG. 1 is a simplified block diagram depicting components of an example of an electronic device that includes an imaging device and image processing circuitry configured to implement one or more of the image processing technique set forth in the present disclosure.

Keeping the above points in mind, FIG. 1 is a block diagram illustrating an example of an electronic device 10 that may provide for the processing of image data using one or more of the image processing techniques briefly mentioned above. The electronic device 10 may be any type of electronic device, such as a laptop or desktop computer, a mobile phone, a digital media player, or the like, that is configured to receive and process image data, such as data acquired using one or more image sensing components. By way of example only, the electronic device 10 may be a portable electronic device, such as a model of an iPod® or iPhone®, available from Apple Inc. of Cupertino, Calif. Additionally, the electronic device 10 may be a desktop or laptop computer, such as a model of a MacBook®, MacBook® Pro, MacBook Air®, iMac®, Mac® Mini, or Mac Pro®, available from Apple Inc. In other embodiments, electronic device 10 may also be a model of an electronic device from another manufacturer that is capable of acquiring and processing image data.

Regardless of its form (e.g., portable or non-portable), it should be understood that the electronic device 10 may provide for the processing of image data using one or more of the image processing techniques briefly discussed above, which may include defective pixel correction and/or detection techniques, lens shading correction techniques, demosaicing techniques, or image sharpening techniques, among others. In some embodiments, the electronic device 10 may apply such image processing techniques to image data stored in a memory of the electronic device 10. In further embodiments, the electronic device 10 may include one or more imaging devices, such as an integrated or external digital camera, configured to acquire image data, which may then be processed by the electronic device 10 using one or more of the above-mentioned image processing techniques. Embodiments showing both portable and non-portable embodiments of electronic device 10 will be further discussed below in FIGS. 3-6.

As shown in FIG. 1, the electronic device 10 may include various internal and/or external components which contribute to the function of the device 10. Those of ordinary skill in the art will appreciate that the various functional blocks shown in FIG. 1 may comprise hardware elements (including circuitry), software elements (including computer code stored on a computer-readable medium) or a combination of both hardware and software elements. For example, in the presently illustrated embodiment, the electronic device 10 may include input/output (I/O) ports 12, input structures 14, one or more processors 16, memory device 18, non-volatile storage 20, expansion card(s) 22, networking device 24, power source 26, and display 28. Additionally, the electronic device 10 may include one or more imaging devices 30, such as a digital camera, and image processing circuitry 32. As will be discussed further below, the image processing circuitry 32 may be configured implement one or more of the above-discussed image processing techniques when processing image data. As can be appreciated, image data processed by image processing circuitry 32 may be retrieved from the memory 18 and/or the non-volatile storage device(s) 20, or may be acquired using the imaging device 30.

Before continuing, it should be understood that the system block diagram of the device 10 shown in FIG. 1 is intended to be a high-level control diagram depicting various components that may be included in such a device 10. That is, the connection lines between each individual component shown in FIG. 1 may not necessarily represent paths or directions through which data flows or is transmitted between various components of the device 10. Indeed, as discussed below, the depicted processor(s) 16 may, in some embodiments, include multiple processors, such as a main processor (e.g., CPU), and dedicated image and/or video processors. In such embodiments, the processing of image data may be primarily handled by these dedicated processors, thus effectively offloading such tasks from a main processor (CPU).

With regard to each of the illustrated components in FIG. 1, the I/O ports 12 may include ports configured to connect to a variety of external devices, such as a power source, an audio output device (e.g., headset or headphones), or other electronic devices (such as handheld devices and/or computers, printers, projectors, external displays, modems, docking stations, and so forth). In one embodiment, the I/O ports 12 may be configured to connect to an external imaging device, such as a digital camera, for the acquisition of image data that may be processed using the image processing circuitry 32. The I/O ports 12 may support any suitable interface type, such as a universal serial bus (USB) port, a serial connection port, an IEEE-1394 (FireWire) port, an Ethernet or modem port, and/or an AC/DC power connection port.

In some embodiments, certain I/O ports 12 may be configured to provide for more than one function. For instance, in one embodiment, the I/O ports 12 may include a proprietary port from Apple Inc. that may function not only to facilitate the transfer of data between the electronic device 10 and an external source, but also to couple the device 10 to a power charging interface such as an power adapter designed to provide power from a electrical wall outlet, or an interface cable configured to draw power from another electrical device, such as a desktop or laptop computer, for charging the power source 26 (which may include one or more rechargeable batteries). Thus, the I/O port 12 may be configured to function dually as both a data transfer port and an AC/DC power connection port depending, for example, on the external component being coupled to the device 10 via the I/O port 12.

The input structures 14 may provide user input or feedback to the processor(s) 16. For instance, input structures 14 may be configured to control one or more functions of electronic device 10, such as applications running on electronic device 10. By way of example only, input structures 14 may include buttons, sliders, switches, control pads, keys, knobs, scroll wheels, keyboards, mice, touchpads, and so forth, or some combination thereof. In one embodiment, input structures 14 may allow a user to navigate a graphical user interface (GUI) displayed on device 10. Additionally, input structures 14 may include a touch sensitive mechanism provided in conjunction with display 28. In such embodiments, a user may select or interact with displayed interface elements via the touch sensitive mechanism.

The input structures 14 may include the various devices, circuitry, and pathways by which user input or feedback is provided to one or more processors 16. Such input structures 14 may be configured to control a function of the device 10, applications running on the device 10, and/or any interfaces or devices connected to or used by the electronic device 10. For example, the input structures 14 may allow a user to navigate a displayed user interface or application interface. Examples of the input structures 14 may include buttons, sliders, switches, control pads, keys, knobs, scroll wheels, keyboards, mice, touchpads, and so forth.

In certain embodiments, an input structure 14 and the display device 28 may be provided together, such as in the case of a "touchscreen," whereby a touch-sensitive mechanism is provided in conjunction with the display 28. In such embodiments, the user may select or interact with displayed interface elements via the touch-sensitive mechanism. In this way, the displayed interface may provide interactive functionality, allowing a user to navigate the displayed interface by touching the display 28. For example, user interaction with the input structures 14, such as to interact with a user or application interface displayed on the display 26, may generate electrical signals indicative of the user input. These input signals may be routed via suitable pathways, such as an input hub or data bus, to the one or more processors 16 for further processing.

In one embodiment, the input structures 14 may include an audio input device. For instance, one or more audio captures devices, such as one or more microphones, may be provided with the electronic device 10. The audio capture devices may be integrated with the electronic device 10 or may be an external device coupled to the electronic device 10, such as by way of the I/O ports 12. As discussed further below, the electronic device 10 may both an audio input device and imaging device 30 to capture sound and image data (e.g., video data), and may include logic configured to provide for synchronization of the captured video and audio data.

In addition to processing various input signals received via the input structure(s) 14, the processor(s) 16 may control the general operation of the device 10. For instance, the processor(s) 16 may provide the processing capability to execute an operating system, programs, user and application interfaces, and any other functions of the electronic device 10. The processor(s) 16 may include one or more microprocessors, such as one or more "general-purpose" microprocessors, one or more special-purpose microprocessors and/or application-specific microprocessors (ASICs), or a combination of such processing components. For example, the processor(s) 16 may include one or more instruction set (e.g., RISC) processors, as well as graphics processors (GPU), video processors, audio processors and/or related chip sets. As will be appreciated, the processor(s) 16 may be coupled to one or more data buses for transferring data and instructions between various components of the device 10. In certain embodiments, the processor(s) 16 may provide the processing capability to execute an imaging applications on the electronic device 10, such as Photo Booth®, Aperture®, iPhoto®, or Preview®, available from Apple Inc., or the "Camera" and/or "Photo" applications provided by Apple Inc. and available on models of the iPhone®.

The instructions or data to be processed by the processor(s) 16 may be stored in a computer-readable medium, such as a memory device 18. The memory device 18 may be provided as a volatile memory, such as random access memory (RAM) or as a non-volatile memory, such as read-only memory (ROM), or as a combination of one or more RAM and ROM devices. The memory 18 may store a variety of information and may be used for various purposes. For example, the memory 18 may store firmware for the electronic device 10, such as a basic input/output system (BIOS), an operating system, various programs, applications, or any other routines that may be executed on the electronic device 10, including user interface functions, processor functions, and so forth. In addition, the memory 18 may be used for buffering or caching during operation of the electronic device 10. For instance, in one embodiment, the memory 18 include one or more frame buffers for buffering video data as it is being output to the display 28.

In addition to the memory device 18, the electronic device 10 may further include a non-volatile storage 20 for persistent storage of data and/or instructions. The non-volatile storage 20 may include flash memory, a hard drive, or any other optical, magnetic, and/or solid-state storage media, or some combination thereof. Thus, although depicted as a single device in FIG. 1 for purposes of clarity, it should understood that the non-volatile storage device(s) 20 may include a combination of one or more of the above-listed storage devices operating in conjunction with the processor(s) 16. The non-volatile storage 20 may be used to store firmware, data files, image data, software programs and applications, wireless connection information, personal information, user preferences, and any other suitable data. In accordance with aspects of the present disclosure, image data stored in the non-volatile storage 20 and/or the memory device 18 may be processed by the image processing circuitry 32 prior to being output on a display.

The embodiment illustrated in FIG. 1 may also include one or more card or expansion slots. The card slots may be configured to receive an expansion card 22 that may be used to add functionality, such as additional memory, I/O functionality, or networking capability, to the electronic device 10. Such an expansion card 22 may connect to the device through any type of suitable connector, and may be accessed internally or external with respect to a housing of the electronic device 10. For example, in one embodiment, the expansion card 24 may be flash memory card, such as a SecureDigital (SD) card, mini- or microSD, CompactFlash card, or the like, or may be a PCMCIA device. Additionally, the expansion card 24 may be a Subscriber Identity Module (SIM) card, for use with an embodiment of the electronic device 10 that provides mobile phone capability.

The electronic device 10 also includes the network device 24, which may be a network controller or a network interface card (NIC) that may provide for network connectivity over a wireless 802.11 standard or any other suitable networking standard, such as a local area network (LAN), a wide area network (WAN), such as an Enhanced Data Rates for GSM Evolution (EDGE) network, a 3G data network, or the Internet. In certain embodiments, the network device 24 may provide for a connection to an online digital media content provider, such as the iTunes® music service, available from Apple Inc.

The power source 26 of the device 10 may include the capability to power the device 10 in both non-portable and portable settings. For example, in a portable setting, the device 10 may include one or more batteries, such as a Li-Ion battery, for powering the device 10. The battery may be re-charged by connecting the device 10 to an external power source, such as to an electrical wall outlet. In a non-portable setting, the power source 26 may include a power supply unit (PSU) configured to draw power from an electrical wall outlet, and to distribute the power to various components of a non-portable electronic device, such as a desktop computing system.

The display 28 may be used to display various images generated by device 10, such as a GUI for an operating system, or image data (including still images and video data) processed by the image processing circuitry 32, as will be discussed further below. As mentioned above, the image data may include image data acquired using the imaging device 30 or image data retrieved from the memory 18 and/or non-volatile storage 20. The display 28 may be any suitable type of display, such as a liquid crystal display (LCD), plasma display, or an organic light emitting diode (OLED) display, for example. Additionally, as discussed above, the display 28 may be provided in conjunction with the above-discussed touch-sensitive mechanism (e.g., a touch screen) that may function as part of a control interface for the electronic device 10.

The illustrated imaging device(s) 30 may be provided as a digital camera configured to acquire both still images and moving images (e.g., video). The camera 30 may include a lens and one or more image sensors configured to capturing and converting light into electrical signals. By way of example only, the image sensor may include a CMOS image sensor (e.g., a CMOS active-pixel sensor (APS)) or a CCD (charge-coupled device) sensor. Generally, the image sensor in the camera 30 includes an integrated circuit having an array of pixels, wherein each pixel includes a photodetector for sensing light. As those skilled in the art will appreciate, the photodetectors in the imaging pixels generally detect the intensity of light captured via the camera lenses. However, photodetectors, by themselves, are generally unable to detect the wavelength of the captured light and, thus, are unable to determine color information.

Accordingly, the image sensor may further include a color filter array (CFA) that may overlay or be disposed over the pixel array of the image sensor to capture color information. The color filter array may include an array of small color filters, each of which may overlap a respective pixel of the image sensor and filter the captured light by wavelength. Thus, when used in conjunction, the color filter array and the photodetectors may provide both wavelength and intensity information with regard to light captured through the camera, which may be representative of a captured image.

Figure 2:
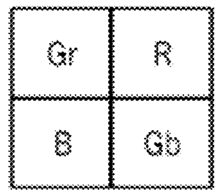
FIG. 2 shows a graphical representation of a 2×2 pixel block of a Bayer color filter array that may be implemented in the imaging device of FIG. 1.

In one embodiment, the color filter array may include a Bayer color filter array, which provides a filter pattern that is 50% green elements, 25% red elements, and 25% blue elements. For instance, FIG. 2 shows a 2×2 pixel block of a Bayer CFA includes 2 green elements (Gr and Gb), 1 red element (R), and 1 blue element (B). Thus, an image sensor that utilizes a Bayer color filter array may provide information regarding the intensity of the light received by the camera 30 at the green, red, and blue wavelengths, whereby each image pixel records only one of the three colors (RGB). This information, which may be referred to as "raw image data" or data in the "raw domain," may then be processed using one or more demosaicing techniques to convert the raw image data into a full color image, generally by interpolating a set of red, green, and blue values for each pixel. As will be discussed further below, such demosaicing techniques may be performed by the image processing circuitry 32.

As mentioned above, the image processing circuitry 32 may provide for various image processing steps, such as defective pixel detection/correction, lens shading correction, demosaicing, and image sharpening, noise reduction, gamma correction, image enhancement, color-space conversion, image compression, chroma sub-sampling, and image scaling operations, and so forth. In some embodiments, the image processing circuitry 32 may include various subcomponents and/or discrete units of logic that collectively form an image processing "pipeline" for performing each of the various image processing steps. These subcomponents may be implemented using hardware (e.g., digital signal processors or ASICs) or software, or via a combination of hardware and software components. The various image processing operations that may be provided by the image processing circuitry 32 and, particularly those processing operations relating to defective pixel detection/correction, lens shading correction, demosaicing, and image sharpening, will be discussed in greater detail below.

Before continuing, it should be noted that while various embodiments of the various image processing techniques discussed below may utilize a Bayer CFA, the presently disclosed techniques are not intended to be limited in this regard. Indeed, those skilled in the art will appreciate that the image processing techniques provided herein may be applicable to any suitable type of color filter array, including RGBW filters, CYGM filters, and so forth.

Figure 3:
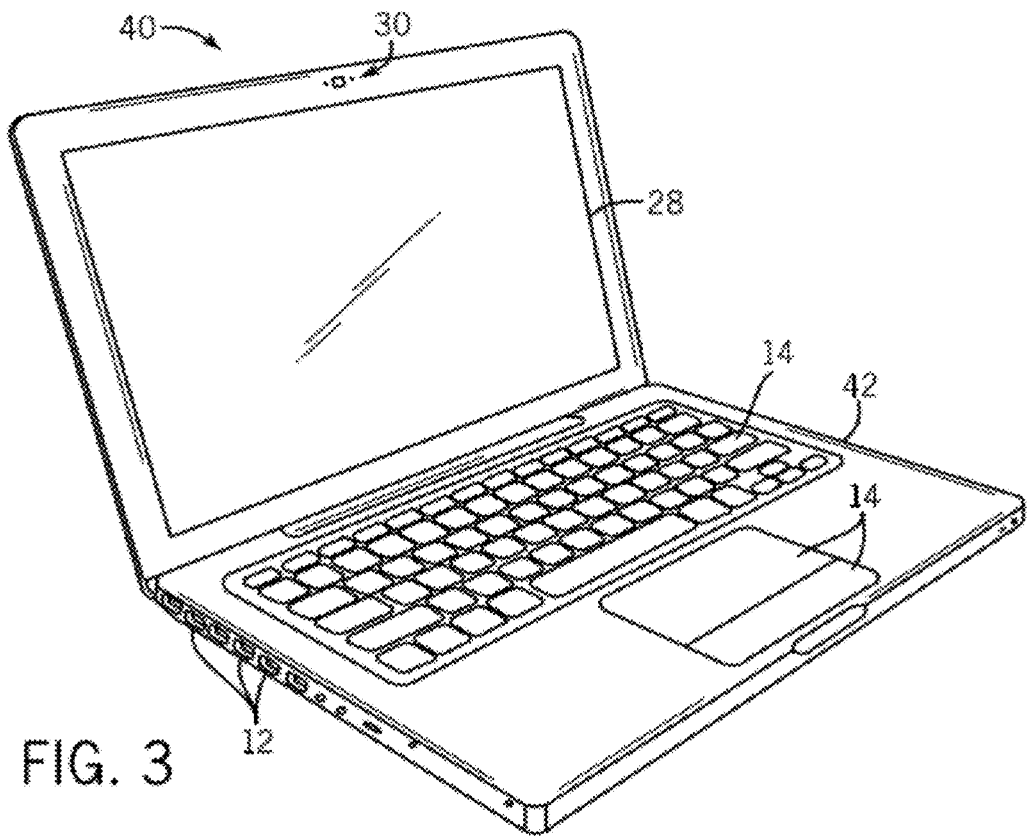
FIG. 3 is a perspective view of the electronic device of FIG. 1 in the form of a laptop computing device, in accordance with aspects of the present disclosure.
Figure 4:
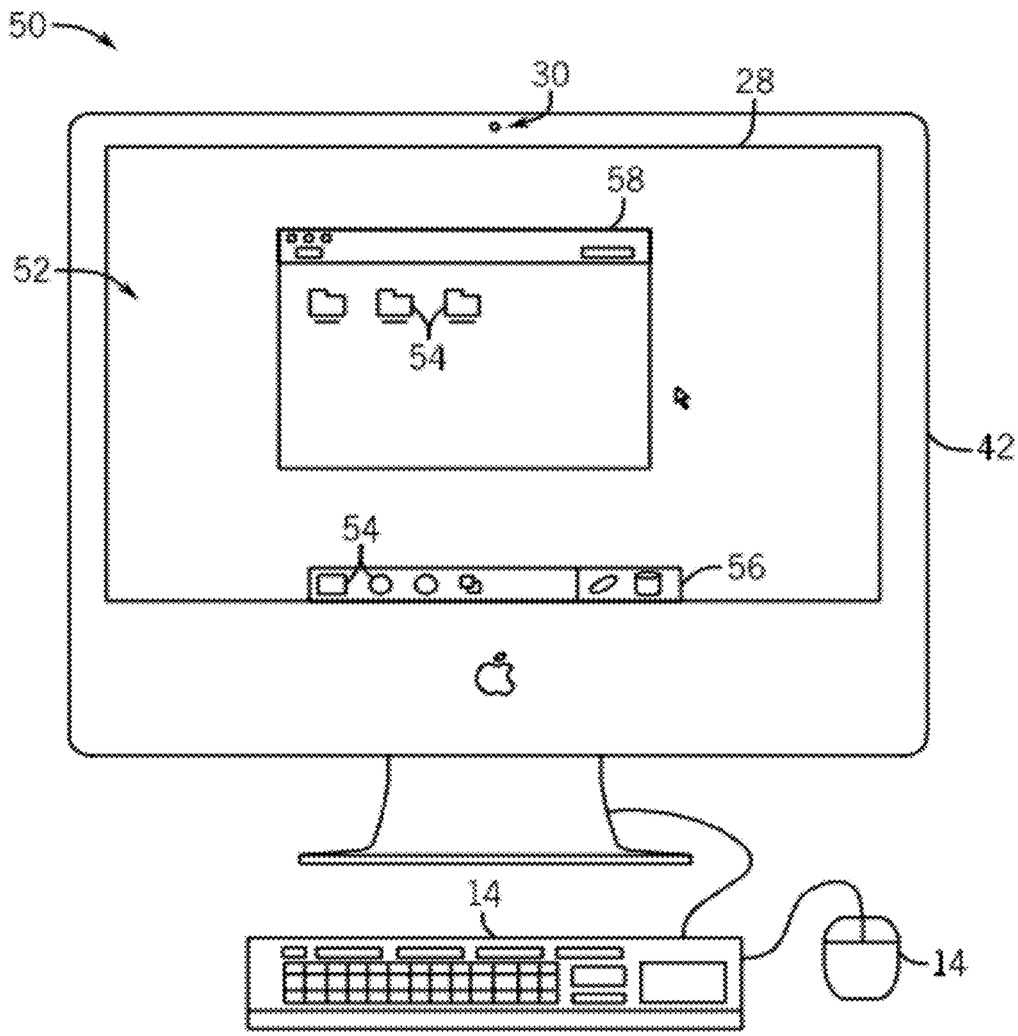
FIG. 4 is a front view of the electronic device of FIG. 1 in the form of a desktop computing device, in accordance with aspects of the present disclosure.
Figure 5:
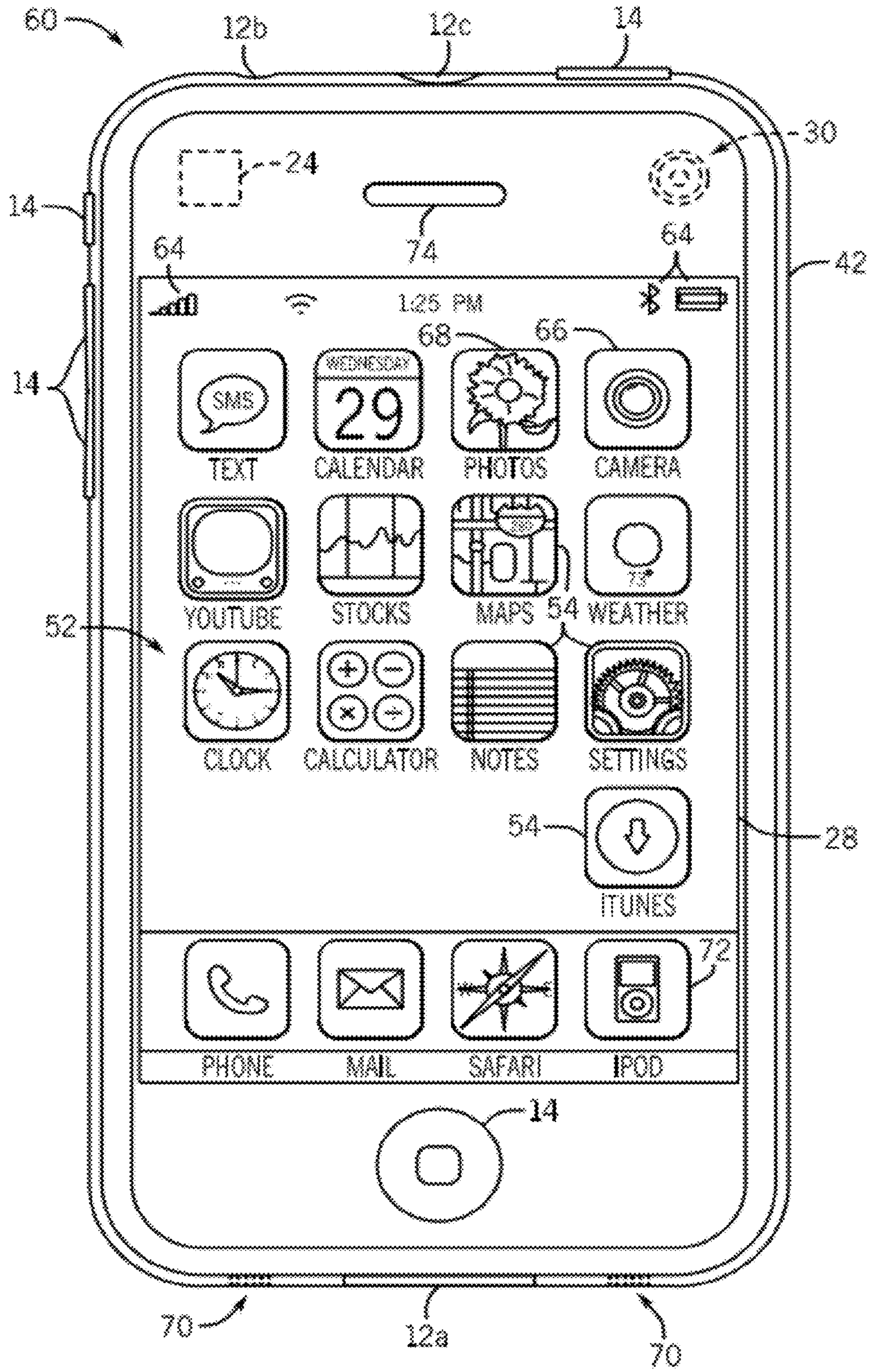
FIG. 5 is a front view of the electronic device of FIG. 1 in the form of a handheld portable electronic device, in accordance with aspects of the present disclosure.
Figure 6:
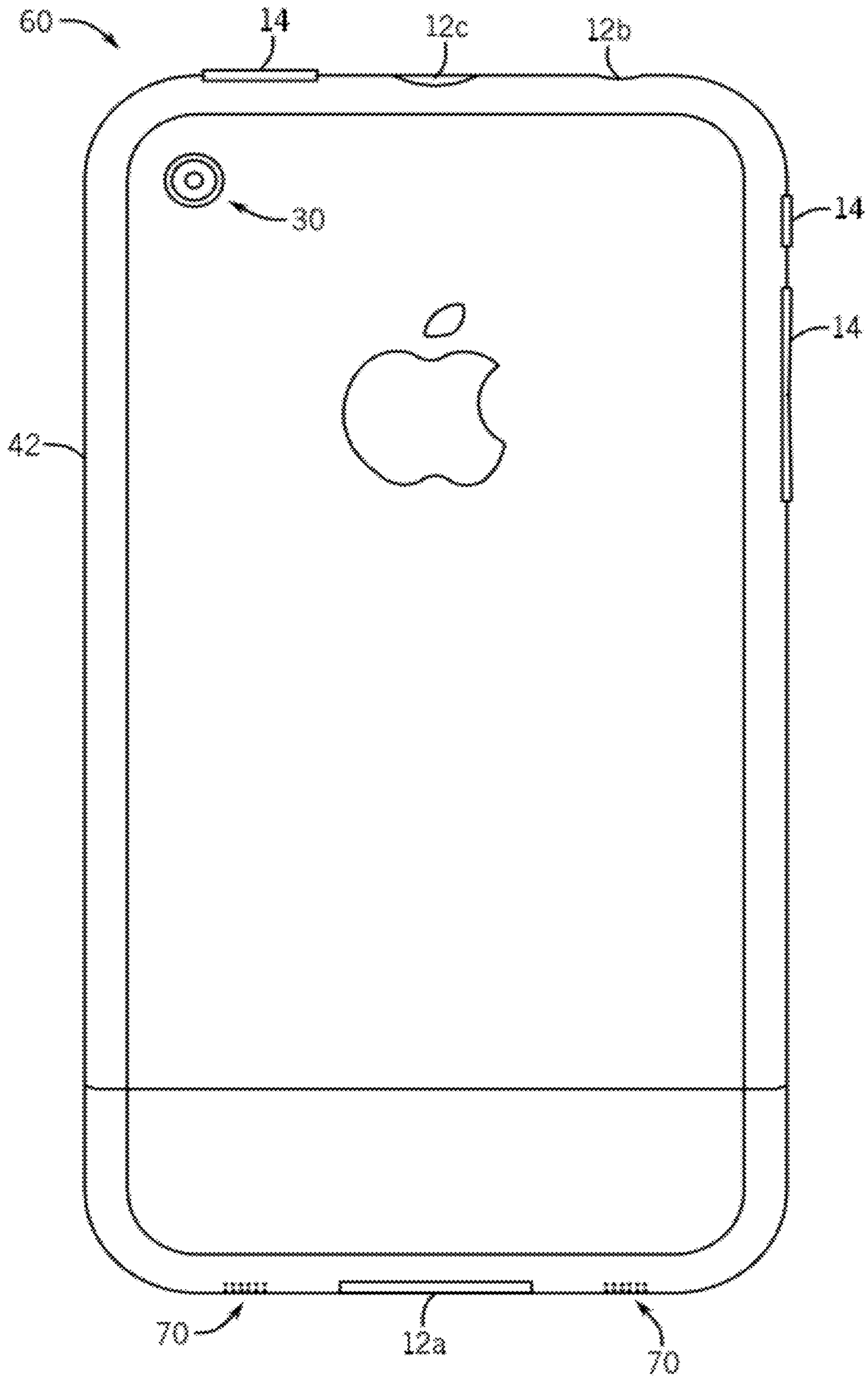
FIG. 6 is a rear view of the electronic device shown in FIG. 5.

Referring again to the electronic device 10, FIGS. 3-6 illustrate various forms that the electronic device 10 may take. As mentioned above, the electronic device 10 may take the form of a computer, including computers that are generally portable (such as laptop, notebook, and tablet computers) as well as computers that are generally non-portable (such as desktop computers, workstations and/or servers), or other type of electronic device, such as handheld portable electronic devices (e.g., digital media player or mobile phone). In particular, FIGS. 3 and 4 depict the electronic device 10 in the form of a laptop computer 40 and a desktop computer 50, respectively. FIGS. 5 and 6 show front and rear views, respectively, of the electronic device 10 in the form of a handheld portable device 60.

As shown in FIG. 3, the depicted laptop computer 40 includes a housing 42, the display 28, the I/O ports 12, and the input structures 14. The input structures 14 may include a keyboard and a touchpad mouse that are integrated with the housing 42. Additionally, the input structure 14 may include various other buttons and/or switches which may be used to interact with the computer 40, such as to power on or start the computer, to operate a GUI or an application running on the computer 40, as well as adjust various other aspects relating to operation of the computer 40 (e.g., sound volume, display brightness, etc.). The computer 40 may also include various I/O ports 12 that provide for connectivity to additional devices, as discussed above, such as a FireWire® or USB port, a high definition multimedia interface (HDMI) port, or any other type of port that is suitable for connecting to an external device. Additionally, the computer 40 may include network connectivity (e.g., network device 26), memory (e.g., memory 20), and storage capabilities (e.g., storage device 22), as described above with respect to FIG. 1.

Further, the laptop computer 40, in the illustrated embodiment, may include an integrated imaging device 30 (e.g., camera). In other embodiments, the laptop computer 40 may utilize an external camera (e.g., an external USB camera or a "webcam") connected to one or more of the I/O ports 12 instead of or in addition to the integrated camera 30. For instance, an external camera may be an iSight® camera available from Apple Inc. The camera 30, whether integrated or external, may provide for the capture and recording of images. Such images may then be viewed by a user using an image viewing application, or may be utilized by other applications, including video-conferencing applications, such as iChat®, and image editing/viewing applications, such as Photo Booth®, Aperture®, iPhoto®, or Preview®, which are available from Apple Inc. In certain embodiments, the depicted laptop computer 40 may be a model of a MacBook®, MacBook® Pro, MacBook Air®, or PowerBook® available from Apple Inc. Additionally, the computer 40, in one embodiment, may be a portable tablet computing device, such as a model of an iPad® tablet computer, also available from Apple Inc.

FIG. 4 further illustrates an embodiment in which the electronic device 10 is provided as a desktop computer 50. As will be appreciated, the desktop computer 50 may include a number of features that may be generally similar to those provided by the laptop computer 40 shown in FIG. 4, but may have a generally larger overall form factor. As shown, the desktop computer 50 may be housed in an enclosure 42 that includes the display 28, as well as various other components discussed above with regard to the block diagram shown in FIG. 1. Further, the desktop computer 50 may include an external keyboard and mouse (input structures 14) that may be coupled to the computer 50 via one or more I/O ports 12 (e.g., USB) or may communicate with the computer 50 wirelessly (e.g., RF, Bluetooth, etc.). The desktop computer 50 also includes an imaging device 30, which may be an integrated or external camera, as discussed above. In certain embodiments, the depicted desktop computer 50 may be a model of an iMac®, Mac® mini, or Mac Pro®, available from Apple Inc.

As further shown, the display 28 may be configured to generate various images that may be viewed by a user. For example, during operation of the computer 50, the display 28 may display a graphical user interface ("GUI") 52 that allows the user to interact with an operating system and/or application running on the computer 50. The GUI 52 may include various layers, windows, screens, templates, or other graphical elements that may be displayed in all, or a portion, of the display device 28. For instance, in the depicted embodiment, an operating system GUI 52 may include various graphical icons 54, each of which may correspond to various applications that may be opened or executed upon detecting a user selection (e.g., via keyboard/mouse or touchscreen input). The icons 54 may be displayed in a dock 56 or within one or more graphical window elements 58 displayed on the screen. In some embodiments, the selection of an icon 54 may lead to a hierarchical navigation process, such that selection of an icon 54 leads to a screen or opens another graphical window that includes one or more additional icons or other GUI elements. By way of example only, the operating system GUI 52 displayed in FIG. 4 may be from a version of the Mac OS® operating system, available from Apple Inc.

Continuing to FIGS. 5 and 6, the electronic device 10 is further illustrated in the form of portable handheld electronic device 60, which may be a model of an iPod® or iPhone® available from Apple Inc. In the depicted embodiment, the handheld device 60 includes an enclosure 42, which may function to protect the interior components from physical damage and to shield them from electromagnetic interference. The enclosure 42 may be formed from any suitable material or combination of materials, such as plastic, metal, or a composite material, and may allow certain frequencies of electromagnetic radiation, such as wireless networking signals, to pass through to wireless communication circuitry (e.g., network device 24), which may be disposed within the enclosure 42, as shown in FIG. 5.

The enclosure 42 also includes various user input structures 14 through which a user may interface with the handheld device 60. For instance, each input structure 14 may be configured to control one or more respective device functions when pressed or actuated. By way of example, one or more of the input structures 14 may be configured to invoke a "home" screen 42 or menu to be displayed, to toggle between a sleep, wake, or powered on/off mode, to silence a ringer for a cellular phone application, to increase or decrease a volume output, and so forth. It should be understood that the illustrated input structures 14 are merely exemplary, and that the handheld device 60 may include any number of suitable user input structures existing in various forms including buttons, switches, keys, knobs, scroll wheels, and so forth.

As shown in FIG. 5, the handheld device 60 may include various I/O ports 12. For instance, the depicted I/O ports 12 may include a proprietary connection port **12*a* for transmitting and receiving data files or for charging a power source 26 and an audio connection port 12*b* for connecting the device 60 to an audio output device (e.g., headphones or speakers). Further, in embodiments where the handheld device 60 provides mobile phone functionality, the device 60 may include an I/O port 12*c* for receiving a subscriber identify module (SIM) card (e.g., an expansion card 22**).

The display device 28, which may be an LCD, OLED, or any suitable type of display, may display various images generated by the handheld device 60. For example, the display 28 may display various system indicators 64 providing feedback to a user with regard to one or more states of handheld device 60, such as power status, signal strength, external device connections, and so forth. The display may also display a GUI 52 that allows a user to interact with the device 60, as discussed above with reference to FIG. 4. The GUI 52 may include graphical elements, such as the icons 54 which may correspond to various applications that may be opened or executed upon detecting a user selection of a respective icon 54. By way of example, one of the icons 54 may represent a camera application 66 that may be used in conjunction with a camera 30 (shown in phantom lines in FIG. 5) for acquiring images. Referring briefly to FIG. 6, a rear view of the handheld electronic device 60 depicted in FIG. 5 is illustrated, which shows the camera 30 as being integrated with the housing 42 and positioned on the rear of the handheld device 60.

As mentioned above, image data acquired using the camera 30 may be processed using the image processing circuitry 32, which my include hardware (e.g., disposed within the enclosure 42) and/or software stored on one or more storage devices (e.g., memory 18 or non-volatile storage 20) of the device 60. Images acquired using the camera application 66 and the camera 30 may be stored on the device 60 (e.g., in storage device 20) and may be viewed at a later time using a photo viewing application 68.

The handheld device 60 may also include various audio input and output elements. For example, the audio input/output elements, depicted generally by reference numeral 70, may include an input receiver, such as one or more microphones. For instance, where the handheld device 60 includes cell phone functionality, the input receivers may be configured to receive user audio input, such as a user's voice. Additionally, the audio input/output elements 70 may include one or more output transmitters. Such output transmitters may include one or more speakers which may function to transmit audio signals to a user, such as during the playback of music data using a media player application 72. Further, in embodiments where the handheld device 60 includes a cell phone application, an additional audio output transmitter 74 may be provided, as shown in FIG. 5. Like the output transmitters of the audio input/output elements 70, the output transmitter 74 may also include one or more speakers configured to transmit audio signals to a user, such as voice data received during a telephone call. Thus, the audio input/output elements 70 and 74 may operate in conjunction to function as the audio receiving and transmitting elements of a telephone.

Having now provided some context with regard to various forms that the electronic device 10 may take, the present discussion will now focus on the image processing circuitry 32 depicted in FIG. 1. As mentioned above, the image processing circuitry 32 may be implemented using hardware and/or software components, and may include various processing units that define an image signal processing (ISP) pipeline. In particular, the following discussion may focus on aspects of the image processing techniques set forth in the present disclosure, particularly those relating to defective pixel detection/correction techniques, lens shading correction techniques, demosaicing techniques, and image sharpening techniques.

Figure 7:
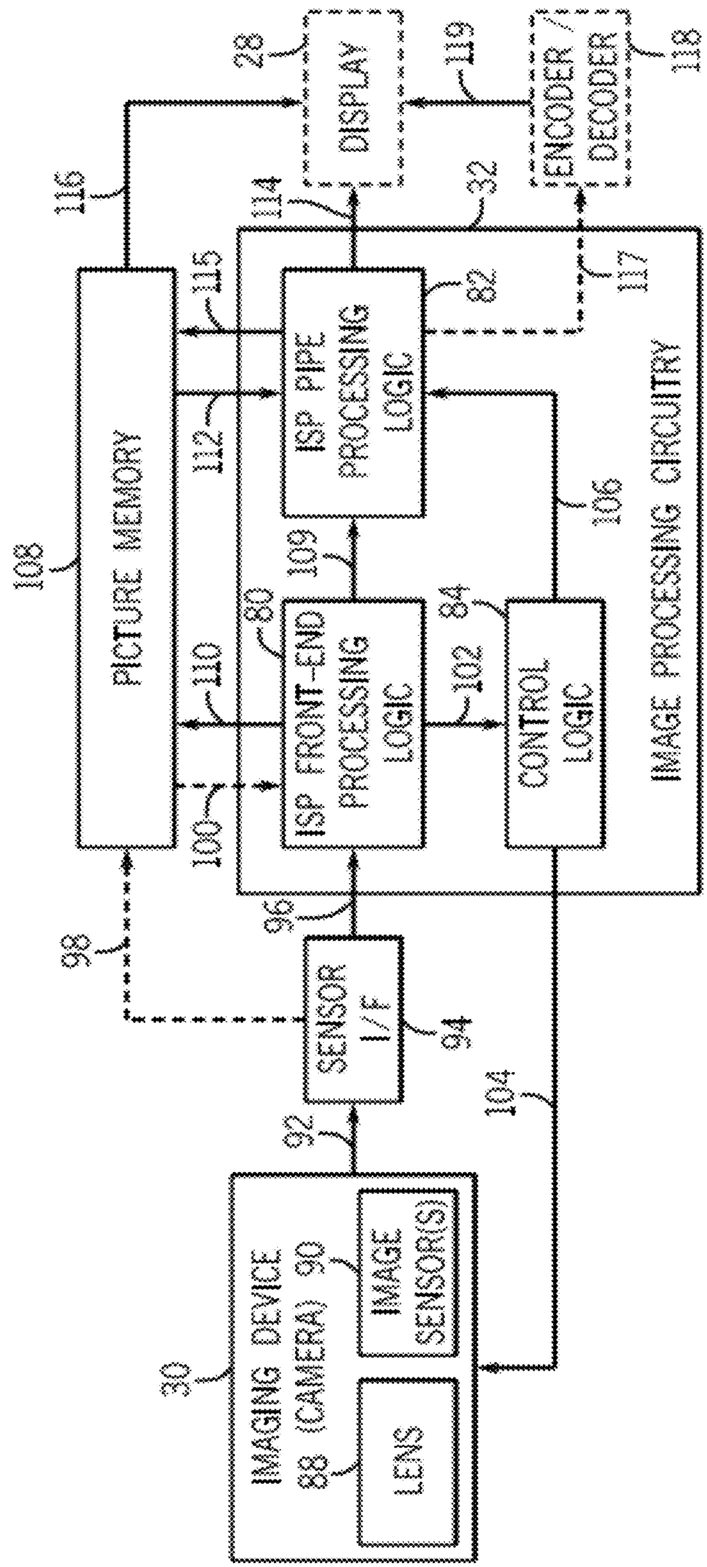
FIG. 7 is a block diagram illustrating an embodiment of the image processing circuitry of FIG. 1 that includes front-end image signal processing (ISP) logic and ISP pipe processing logic, in accordance with aspects of the present disclosure.

Referring now to FIG. 7, a simplified top-level block diagram depicting several functional components that may be implemented as part of the image processing circuitry 32 is illustrated, in accordance with one embodiment of the presently disclosed techniques. Particularly, FIG. 7 is intended to illustrate how image data may flow through the image processing circuitry 32, in accordance with at least one embodiment. In order to provide a general overview of the image processing circuitry 32, a general description of how these functional components operate to process image data is provided here with reference to FIG. 7, while a more specific description of each of the illustrated functional components, as well as their respective sub-components, will be further provided below.

Referring to the illustrated embodiment, the image processing circuitry 32 may include image signal processing (ISP) front-end processing logic 80, ISP pipe processing logic 82, and control logic 84. Image data captured by the imaging device 30 may first be processed by the ISP front-end logic 80 and analyzed to capture image statistics that may be used to determine one or more control parameters for the ISP pipe logic 82 and/or the imaging device 30. The ISP front-end logic 80 may be configured to capture image data from an image sensor input signal. For instance, as shown in FIG. 7, the imaging device 30 may include a camera having one or more lenses 88 and image sensor(s) 90. As discussed above, the image sensor(s) 90 may include a color filter array (e.g., a Bayer filter) and may thus provide both light intensity and wavelength information captured by each imaging pixel of the image sensors 90 to provide for a set of raw image data that may be processed by the ISP front-end logic 80. For instance, the output 92 from the imaging device 30 may be received by a sensor interface 94, which may then provide the raw image data 96 to the ISP front-end logic 80 based, for example, on the sensor interface type. By way of example, the sensor interface 94 may utilize a Standard Mobile Imaging Architecture (SMIA) interface or other serial or parallel camera interfaces, or some combination thereof. In certain embodiments, the ISP front-end logic 80 may operate within its own clock domain and may provide an asynchronous interface to the sensor interface 94 to support image sensors of different sizes and timing requirements. The sensor interface 94 may include, in some embodiments, a sub-interface on the sensor side (e.g., sensor-side interface) and a sub-interface on the ISP front-end side, with the sub-interfaces forming the sensor interface 94.

The raw image data 96 may be provided to the ISP front-end logic 80 and processed on a pixel-by-pixel basis in a number of formats. For instance, each image pixel may have a bit-depth of 8, 10, 12, or 14 bits. Various examples of memory formats showing how pixel data may be stored and addressed in memory are discussed in further detail below. The ISP front-end logic 80 may perform one or more image processing operations on the raw image data 96, as well as collect statistics about the image data 96. The image processing operations, as well as the collection of statistical data, may be performed at the same or at different bit-depth precisions. For example, in one embodiment, processing of the raw image pixel data 96 may be performed at a precision of 14-bits. In such embodiments, raw pixel data received by the ISP front-end logic 80 that has a bit-depth of less than 14 bits (e.g., 8-bit, 10-bit, 12-bit) may be up-sampled to 14-bits for image processing purposes. In another embodiment, statistical processing may occur at a precision of 8-bits and, thus, raw pixel data having a higher bit-depth may be down-sampled to an 8-bit format for statistics purposes. As will be appreciated, down-sampling to 8-bits may reduce hardware size (e.g., area) and also reduce processing/computational complexity for the statistics data. Additionally, the raw image data may be averaged spatially to allow for the statistics data to be more robust to noise.

Further, as shown in FIG. 7, the ISP front-end logic 80 may also receive pixel data from the memory 108. For instance, as shown by reference number 98, the raw pixel data may be sent to the memory 108 from the sensor interface 94. The raw pixel data residing in the memory 108 may then be provided to the ISP front-end logic 80 for processing, as indicated by reference number 100. The memory 108 may be part of the memory device 18, the storage device 20, or may be a separate dedicated memory within the electronic device 10 and may include direct memory access (DMA) features. Further, in certain embodiments, the ISP front-end logic 80 may operate within its own clock domain and provide an asynchronous interface to the sensor interface 94 to support sensors of different sizes and having different timing requirements.

Upon receiving the raw image data 96 (from sensor interface 94) or 100 (from memory 108), the ISP front-end logic 80 may perform one or more image processing operations, such as temporal filtering and/or binning compensation filtering. The processed image data may then be provided to the ISP pipe logic 82 (output signal 109) for additional processing prior to being displayed (e.g., on display device 28), or may be sent to the memory (output signal 110). The ISP pipe logic 82 receives the "front-end" processed data, either directly form the ISP front-end logic 80 or from the memory 108 (input signal 112), and may provide for additional processing of the image data in the raw domain, as well as in the RGB and YCbCr color spaces. Image data processed by the ISP pipe logic 82 may then be output (signal 114) to the display 28 for viewing by a user and/or may be further processed by a graphics engine or GPU. Additionally, output from the ISP pipe logic 82 may be sent to memory 108 (signal 115) and the display 28 may read the image data from memory 108 (signal 116), which may, in certain embodiments, be configured to implement one or more frame buffers. Further, in some implementations, the output of the ISP pipe logic 82 may also be provided to a compression/decompression engine 118 (signal 117) for encoding/decoding the image data. The encoded image data may be stored and then later decompressed prior to being displayed on the display 28 device (signal 119). By way of example, the compression engine or "encoder" 118 may be a JPEG compression engine for encoding still images, or an H.264 compression engine for encoding video images, or some combination thereof, as well as a corresponding decompression engine for decoding the image data. Additional information with regard to image processing operations that may be provided in the ISP pipe logic 82 will be discussed in greater detail below with regard to FIGS. 98 to 133. Also, it should be noted that the ISP pipe logic 82 may also receive raw image data from the memory 108, as depicted by input signal 112.

Statistical data 102 determined by the ISP front-end logic 80 may be provided to a control logic unit 84. The statistical data 102 may include, for example, image sensor statistics relating to auto-exposure, auto-white balance, auto-focus, flicker detection, black level compensation (BLC), lens shading correction, and so forth. The control logic 84 may include a processor and/or microcontroller configured to execute one or more routines (e.g., firmware) that may be configured to determine, based upon the received statistical data 102, control parameters 104 for the imaging device 30, as well as control parameters 106 for the ISP pipe processing logic 82. By way of example only, the control parameters 104 may include sensor control parameters (e.g., gains, integration time for exposure control), camera flash control parameters, lens control parameters (e.g., focal length for focusing or zoom), or a combination of such parameters. The ISP control parameters 106 may include gain levels and color correction matrix (CCM) coefficients for auto-white balance and color adjustment (e.g., during RGB processing), as well as lens shading correction parameters which, as discussed below, may be determined based upon white point balance parameters. In some embodiments, the control logic 84 may, in addition to analyzing statistics data 102, also analyze historical statistics, which may be stored on the electronic device 10 (e.g., in memory 18 or storage 20).

Referring to the illustrated embodiment, the image processing circuitry 32 may include image signal processing (ISP) front-end processing logic 80, ISP pipe processing logic 82, and control logic 84. Image data captured by the imaging device 30 may first be processed by the ISP front-end logic 80 and analyzed to capture image statistics that may be used to determine one or more control parameters for the ISP pipe logic 82 and/or the imaging device 30. The ISP front-end logic 80 may be configured to capture image data from an image sensor input signal. For instance, as shown in FIG. 7, the imaging device 30 may include a camera having one or more lenses 88 and image sensor(s) 90. As discussed above, the image sensor(s) 90 may include a color filter array (e.g., a Bayer filter) and may thus provide both light intensity and wavelength information captured by each imaging pixel of the image sensors 90 to provide for a set of raw image data that may be processed by the ISP front-end logic 80. For instance, the output 92 from the imaging device 30 may be received by a sensor interface 94, which may then provide the raw image data 96 to the ISP front-end logic 80 based, for example, on the sensor interface type. By way of example, the sensor interface 94 may utilize a Standard Mobile Imaging Architecture (SMIA) interface or other serial or parallel camera interfaces, or some combination thereof. In certain embodiments, the ISP front-end logic 80 may operate within its own clock domain and may provide an asynchronous interface to the sensor interface 94 to support image sensors of different sizes and timing requirements.

Figure 8:
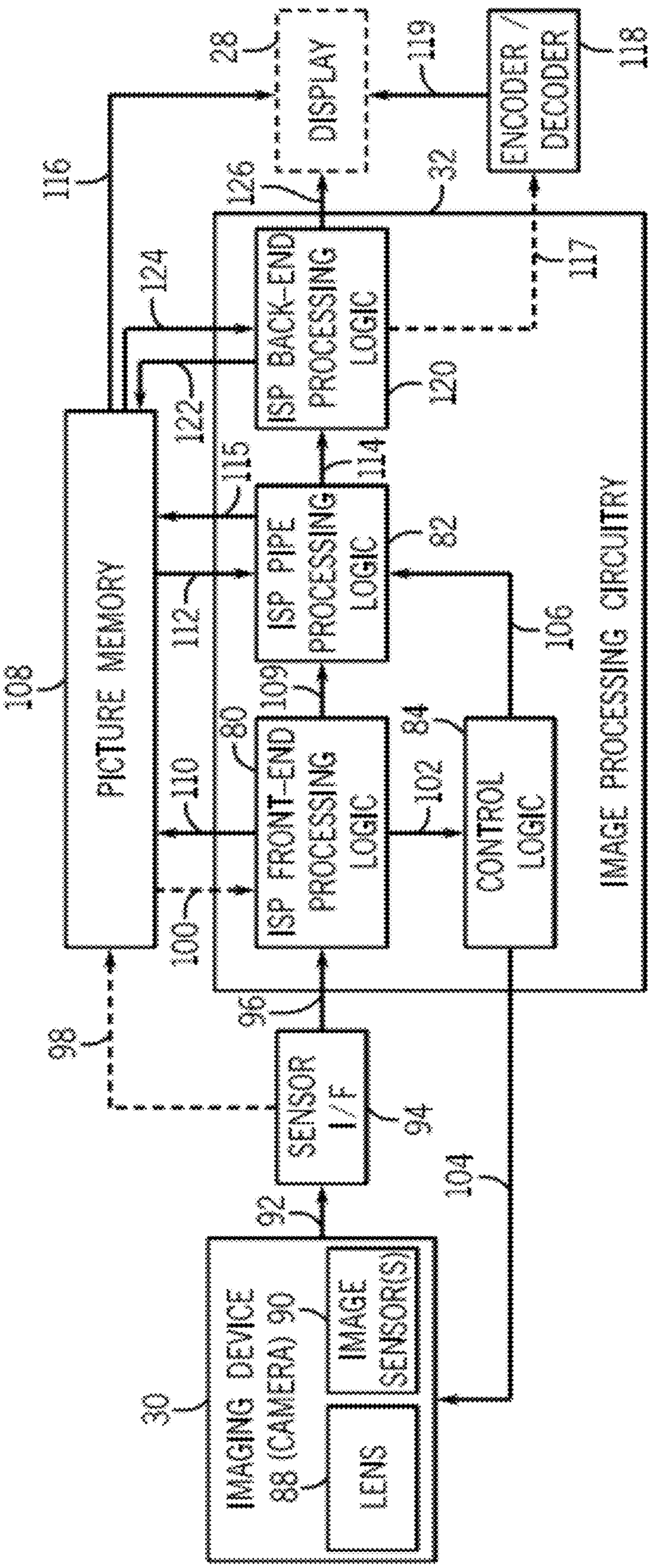
FIG. 8 is a block diagram illustrating another embodiment of the image processing circuitry of FIG. 1 that includes front-end image signal processing (ISP) logic, ISP pipe (pipeline) processing logic, and ISP back-end processing logic, in accordance with aspects of the present disclosure.

FIG. 8 shows a block diagram depicting another embodiment of the image processing circuitry 32, wherein the same components are labeled with the same reference numbers. Generally, the operation and functionality of the image processing circuitry 32 of FIG. 8 is similar to the image processing circuitry 32 of FIG. 7, except that the embodiment shown in FIG. 8 further includes an ISP back-end processing logic unit 120, which may be coupled downstream from the ISP pipeline 82 and may provide for additional post-processing steps.

In the illustrated embodiment, the ISP back-end logic 120 may receive the output 114 from the ISP pipeline 82 and perform post-processing the received data 114. Additionally, the ISP back-end 120 may receive image data directly from memory 108, as shown by input 124. As will be discussed further below with reference to FIGS. 134 to 142, one embodiment of the ISP-back-end logic 120 may provide for dynamic range compression of image data (often referred to as "tone mapping"), brightness, contrast, and color adjustments, as well as scaling logic for scaling the image data to a desired size or resolution (e.g., based upon a resolution of an output display device). Further, the ISP-back-end logic 120 may also include feature detection logic for detecting certain features in the image data. For instance, in one embodiment, the feature detection logic may include face detection logic configured to identify areas in which faces and/or facial features are located and/or positioned within the image data. Facial detection data may be fed to the front-end statistics processing unit as feedback data for determination auto-white balance, auto-focus, flicker, and auto-exposure statistics. For instance, the statistics processing units in the ISP front-end 80 (discussed in more detail below in FIGS. 68-97) may be configured to select windows for statistics processing based on the determined locations of faces and/or facial features in the image data.

In some embodiments, the facial detection data, in addition to or instead of being fed back to an ISP front-end statistics feedback control loop, may also be provided to at least one of local tone mapping processing logic, an ISP back-end statistics unit, or to the encoder/decoder unit 118. As discussed further below, the facial detection data provided to the back-end statistics unit may be utilized to control quantization parameters. For instance, when encoding or compressing the output image data (e.g., in macroblocks) quantization may be reduced for areas of the image that have been determined to include faces and/or facial features, thus improving the visual quality of faces and facial features when the image is displayed and viewed by a user.

In further embodiments, the feature detection logic may also be configured to detect the locations of corners of objects in the image frame. This data may be used to identify the location of features in consecutive image frames in order to determine an estimation of global motion between frames, which may be used to perform certain image processing operations, such as image registration. In one embodiment, the identification of corner features and the like may be particularly useful for algorithms that combine multiple image frames, such as in certain high dynamic range (HDR) imaging algorithms, as well as certain panoramic stitching algorithms.

Further, as shown in FIG. 8, image data processed by the ISP back-end logic 120 may be output (signal 126) to the display device 28 for viewing by a user and/or may be further processed by a graphics engine or GPU. Additionally, output from the ISP back-end logic 120 may be sent to memory 108 (signal 122) and the display 28 may read the image data from memory 108 (signal 116), which may, in certain embodiments, be configured to implement one or more frame buffers. In the illustrated embodiment, the output of the ISP back-end logic 120 may also be provided to the compression/decompression engine 118 (signal 117) for encoding/decoding the image data for storage and subsequent playback, as generally discussed above in FIG. 7. In further embodiments, the ISP sub-system 32 of FIG. 8 may have the option of bypassing the ISP back-end processing unit 120. In such embodiments, if the back-end processing unit 120 is bypassed, the ISP sub-system 32 of FIG. 8 may operate in a manner similar to that shown in FIG. 7, i.e., the output of the ISP pipeline 82 is sent directly/indirectly one or more of memory 108, the encoder/decoder 118, or the display 28.

Figure 9:
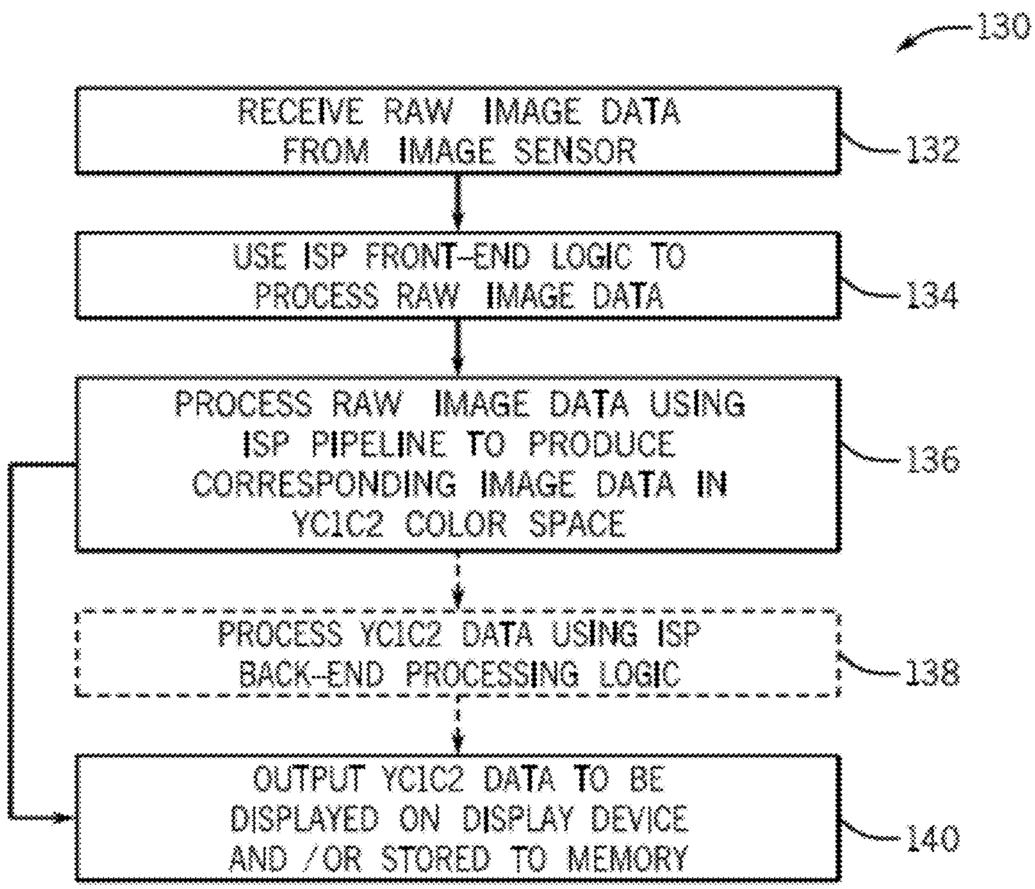
FIG. 9 is a flow chart depicting methods for processing image data using either the image processing circuitry of FIG. 7 or FIG. 8, in accordance with aspects of the present disclosure.

The image processing techniques depicted in the embodiments shown in FIG. 7 and FIG. 8 may be generally summarized by the method 130 depicted by way of a flow chart in FIG. 9. As shown, the method 130 begins at block 132, at which raw image data (e.g., Bayer pattern data) is received using a sensor interface from an image sensor (e.g., 90). At block 134, the raw image data received at step 132 is processed using the ISP front-end logic 80. As mentioned above, the ISP front-end logic 80 may be configured to apply temporal filtering, binning compensation filtering. Next at step 136, the raw image data processed by the ISP front-end logic 80 may be further processed by the ISP pipeline 82, which may perform various processing steps to demosaic the raw image data into full-color RGB data and to further convert the RGB color data into a YUV or YC1C2 color space (where C1 and C2 represent different chroma difference colors and wherein C1 and C2 may represent blue-difference (Cb) and red-difference (Cr) chroma in one embodiment).

From step 136, the method 130 may either continue to step 138 or to step 160. For instance, in an embodiment (FIG. 7) where the output of the ISP pipeline 82 is provided to a display device 28, the method 130 continues to step 140, wherein the YC1C2 image data is displayed using the display device 28 (or sent to from the ISP pipeline 82 to memory 108). Alternatively, in an embodiment where the output of the ISP pipeline 82 is post-processed by an ISP back-end unit 120 (FIG. 8), the method 130 may continue from step 136 to step 138, where the YC1C2 output of the ISP pipeline 82 is processed using the ISP back-end processing logic 120 before being displayed by the display device at step 140.

Due to the generally complex design of the image processing circuitry 32 shown herein, it may be beneficial to separate the discussion of the ISP front-end logic 80, the ISP pipe processing logic 82 (or ISP pipeline), and the ISP back-end processing logic 120 into separate sections, as shown below. Particularly, FIGS. 10 to 97 of the present application may relate to the discussion of various embodiments and aspects of the ISP front-end logic 80, FIGS. 98 to 133 of the present application may relate to the discussion of various embodiments and aspects of the ISP pipe processing logic 82, and FIGS. 134 to 142 may relate to discussion of various embodiments and aspects of the ISP back-end logic 120.

The ISP Front-End Processing Logic

Figure 10:
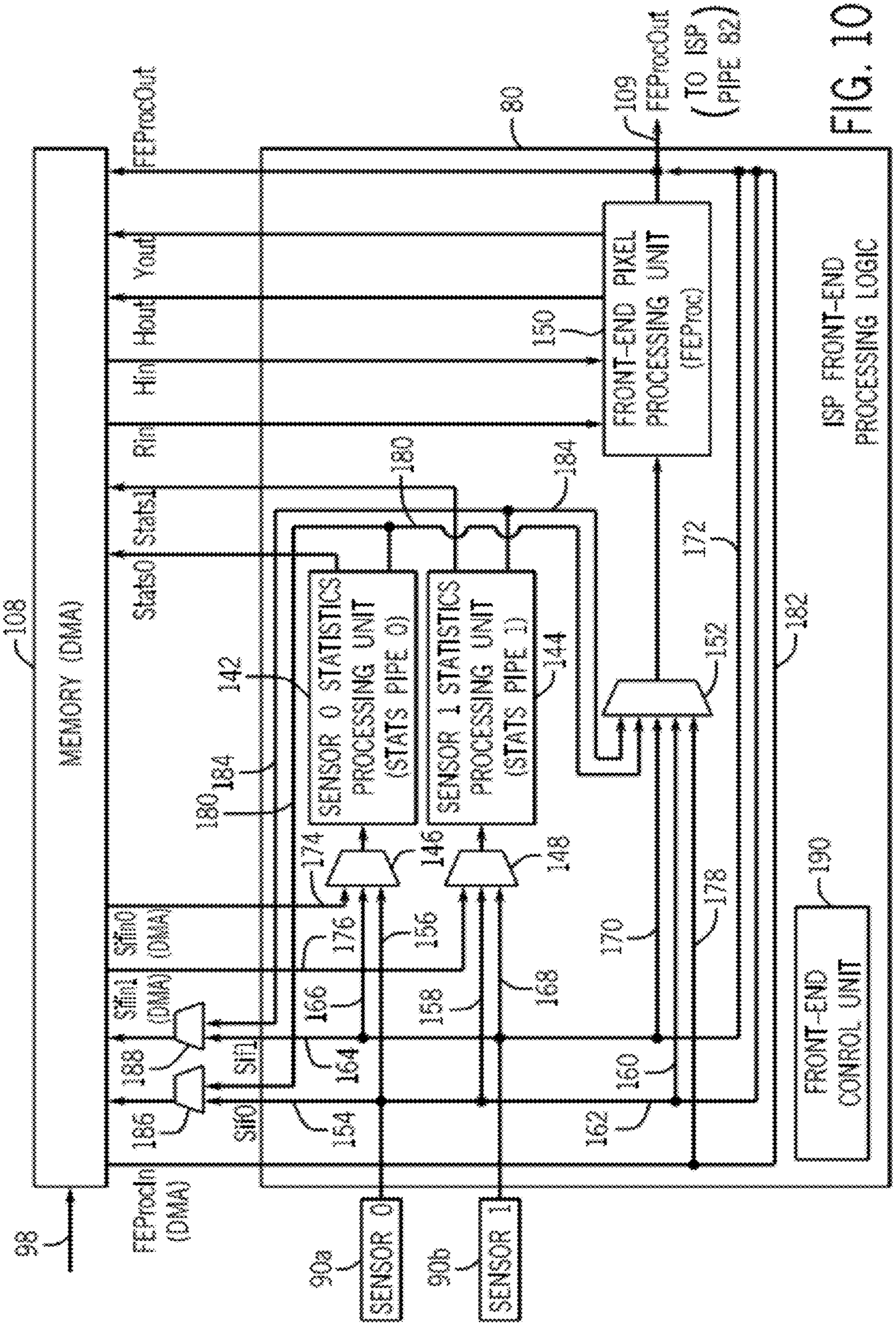
FIG. 10 is a more detailed block diagram showing an embodiment of the ISP front-end logic that may be implemented in FIG. 7 or FIG. 8, in accordance with aspects of the present disclosure.

FIG. 10 is a more detailed block diagram showing functional logic blocks that may be implemented in the ISP front-end logic 80, in accordance with one embodiment. Depending on the configuration of the imaging device 30 and/or sensor interface 94, as discussed above in FIG. 7, raw image data may be provided to the ISP front-end logic 80 by one or more image sensors 90. In the depicted embodiment, raw image data may be provided to the ISP front-end logic 80 by a first image sensor 90*a* (Sensor0) and a second image sensor 90*b* (Sensor1). As will be discussed further below, each image sensor 90*a* and 90*b* may be configured to apply binning to full resolution image data in order to increase signal-to-noise ratio of the image signal. For instance, a binning technique, such as 2×2 binning, may be applied which may interpolate a "binned" raw image pixel based upon four full-resolution image pixels of the same color. In one embodiment, this may result in there being four accumulated signal components associated with the binned pixel versus a single noise component, thus improving signal-to-noise of the image data, but reducing overall resolution. Additionally, binning may also result in an uneven or non-uniform spatial sampling of the image data, which may be corrected using binning compensation filtering, as will be discussed in more detail below.

As shown, the image sensors 90*a* and 90*b* may provide the raw image data as signals Sif0, and Sif1, respectively. Each of the image sensors 90*a* and 90*b* may be generally associated with the respective statistics processing units 142 (StatsPipe0) and 144 (StatsPipe1), which may be configured to process image data for the determination of one or more sets of statistics (as indicated by signals Stats0 and Stats1), including statistics relating to auto-exposure, auto-white balance, auto-focus, flicker detection, black level compensation, and lens shading correction, and so forth. In certain embodiments, when only one of the sensors 90*a* or 90*b* is actively acquiring image, the image data may be sent to both StatsPipe0 and StatsPipe1 if additional statistics are desired. For instance, to provide one example, if StatsPipe0 and StatsPipe1 are both available, StatsPipe0 may be utilized to collect statistics for one color space (e.g., RGB), and StatsPipe1 may be utilized to collect statistics for another color space (e.g., YUV or YCbCr). That is, the statistics process units 142 and 144 may operate in parallel to collect multiple sets of statistics for each frame of the image data acquired by the active sensor.

In the present embodiment, five asynchronous sources of data are provided in the ISP front-end 80. These include: (1) a direct input from a sensor interface corresponding to Sensor0 (90*a*) (referred to as Sif0 or Sens0), (2) a direct input from a sensor interface corresponding to Sensor1 (90*b*) (referred to as Sif1 or Sens1), (3) Sensor0 data input from the memory 108 (referred to as SifIn0 or Sens0DMA), which may include a DMA interface, (4) Sensor1 data input from the memory 108 (referred to as SifIn1 or Sens1DMA), and (5) a set of image data with frames from Sensor0 and Sensor1 data input retrieved from the memory 108 (referred to as FeProcIn or ProcInDMA). The ISP front-end 80 may also include multiple destinations to which image data from the sources may be routed, wherein each destination may be either a storage location in memory (e.g., in 108), or a processing unit. For instance, in the present embodiment, the ISP front-end 80 includes six destinations: (1) Sif0DMA for receiving Sensor0 data in the memory 108, (2) Sif1DMA for receiving Sensor1 data in the memory 108, (3) the first statistics processing unit 142 (StatsPipe0), (4) the second statistics processing unit 144 (StatsPipe1), (5) the front-end pixel processing unit (FEProc) 150, and (6) FeOut (or FEProcOut) to memory 108 or the ISP pipeline 82 (discussed in further detail below). In one embodiment, the ISP front-end 80 may be configured such that only certain destinations are valid for a particular source, as shown in Table 1 below.

TABLE 1

| Example of ISP Front-end valid destinations for each source | | | | | | |
|---|---|---|---|---|---|---|
| | SIf0DMA | SIf1DMA | StatsPipe0 | StatsPipe1 | FEProc | FEOut |
| Sens0 | X | | X | X | X | X |
| Sens1 | | X | X | X | X | X |
| Sens0DMA | | | X | | | |
| Sens1DMA | | | | X | | |
| ProcInDMA | | | | | X | X |

For instance, in accordance with Table 1, source Sens0 (sensor interface of Sensor0) may be configured to provide data to destinations SIf0DMA (signal 154), StatsPipe0 (signal 156), StatsPipe1 (signal 158), FEProc (signal 160), or FEOut (signal 162). With regard to FEOut, source data may, in some instances, be provided to FEOut to bypass pixel processing by FEProc, such as for debugging or test purposes. Additionally, source Sens1 (sensor interface of Sensor1) may be configured to provide data to destinations SIf1DMA (signal 164), StatsPipe0 (signal 166), StatsPipe1 (signal 168), FEProc (signal 170), or FEOut (signal 172), source Sens0DMA (Sensor0 data from memory 108) may be configured to provide data to StatsPipe0 (signal 174), source Sens1DMA (Sensor1 data from memory 108) may be configured to provide data to StatsPipe1 (signal 176), and source ProcInDMA (Sensor0 and Sensor1 data from memory 108) may be configured to provide data to FEProc (signal 178) and FEOut (signal 182).

It should be noted that the presently illustrated embodiment is configured such that Sens0DMA (Sensor0 frames from memory 108) and Sens1DMA (Sensor1 frames from memory 108) are only provided to StatsPipe0 and StatesPipe1, respectively. This configuration allows the ISP front-end 80 to retain a certain number of previous frames (e.g., 5 frames) in memory. For example, due to a delay or lag between the time a user initiates a capture event (e.g., transitioning the image system from a preview mode to a capture or a recording mode, or even by just turning on or initializing the image sensor) using the image sensor to when an image scene is captured, not every frame that the user intended to capture may be captured and processed in substantially real-time. Thus, by retaining a certain number of previous frames in memory 108 (e.g., from a preview phase), these previous frames may be processed later or alongside the frames actually captured in response to the capture event, thus compensating for any such lag and providing a more complete set of image data.

With regard to the illustrated configuration of FIG. 10, it should be noted that the StatsPipe0 142 is configured to receive one of the inputs 156 (from Sens0), 166 (from Sens1), and 174 (from Sens0DMA), as determined by a selection logic 146, such as a multiplexer. Similarly, selection logic 148 may select an input from the signals 158, 176, and 168 to provide to StatsPipe1, and selection logic 152 may select an input from the signals 160, 170, and 178 to provide to FEProc. As mentioned above, the statistical data (Stats0 and Stats1) may be provided to the control logic 84 for the determination of various control parameters that may be used to operate the imaging device 30 and/or the ISP pipe processing logic 82. As can be appreciated, the selection logic blocks (146, 148, and 152) shown in FIG. 10 may be provided by any suitable type of logic, such as a multiplexer that selects one of multiple input signals in response to a control signal.

The pixel processing unit (FEProc) 150 may be configured to perform various image processing operations on the raw image data on a pixel-by-pixel basis. As shown, FEProc 150, as a destination processing unit, may receive image data from sources Sens0 (signal 160), Sens1 (signal 170), or ProcInDMA (signal 178) by way of the selection logic 152. FEProc 150 may also receive and output various signals (e.g., Rin, Hin, Hout, and Yout—which may represent motion history and luma data used during temporal filtering) when performing the pixel processing operations, which may include temporal filtering and binning compensation filtering, as will be discussed further below. The output 109 (FEProcOut) of the pixel processing unit 150 may then be forwarded to the ISP pipe logic 82, such as via one or more first-in-first-out (FIFO) queues, or may be sent to the memory 108.

Further, as shown in FIG. 10, the selection logic 152, in addition to receiving the signals 160, 170, and 178, may further receive the signals 180 and 184. The signal 180 may represented "pre-processed" raw image data from StatsPipe0, and the signal 184 may represent "pre-processed" raw image data from StatsPipe1. As will be discussed below, each of the statistics processing units may apply one or more pre-processing operations to the raw image data before collecting statistics. In one embodiment, each of the statistics processing units may perform a degree of defective pixel detection/correction, lens shading correction, black level compensation, and inverse black level compensation. Thus, the signals 180 and 184 may represent raw image data that has been processed using the aforementioned pre-processing operations (as will be discussed in further detail below in FIG. 68). Thus, the selection logic 152 gives the ISP front-end processing logic 80 the flexibility of providing either un-pre-processed raw image data from the Sensor0 (signal 160) and Sensor1 (signal 170) or pre-processed raw image data from StatsPipe0 (signal 180) and StatsPipe1 (signal 184). Additionally, as shown by selection logic units 186 and 188, the ISP front-end processing logic 80 also has the flexibility of writing either un-pre-processed raw image data from Sensor0 (signal 154) or Sensor1 (signal 164) to the memory 108, or writing pre-processed raw image data from StatsPipe0 (signal 180) or StatsPipe1 (signal 184) to the memory 108.

To control the operation of the ISP front-end logic 80, a front-end control unit 190 is provided. The control unit 190 may be configured to initialize and program control registers (referred to herein as "go registers") for configuring and starting the processing of an image frame and to select an appropriate register bank(s) for updating double-buffered data registers. In some embodiments, the control unit 190 may also provide performance monitoring logic to log clock cycles, memory latency, and quality of service (QOS) information. Further, the control unit 190 may also control dynamic clock gating, which may be used to disable clocks to one or more portions of the ISP front-end 0 when there is not enough data in the input queue from an active sensor.

Using the "go registers" mentioned above, the control unit 190 may be able to control the updating of various parameters for each of the processing units (e.g., StatsPipe0, StatsPipe1, and FEProc) and may interface with the sensor interfaces to control the starting and stopping of the processing units. Generally each of the front-end processing units operates on a frame-by-frame basis. As discussed above (Table 1), the input to the processing units may be from the sensor interface (Sens0 or Sens1) or from memory 108. Further, the processing units may utilize various parameters and configuration data, which may be stored in corresponding data registers. In one embodiment, the data registers associated with each processing unit or destination may be grouped into blocks forming a register bank group. In the embodiment of FIG. 10, seven register bank groups may be defined in ISP Front-end: SIf0, SIf1, StatsPipe0, StatsPipe1, ProcPipe, FEOut and ProcIn. Each register block address space is duplicated to provide two banks of registers. Only the registers that are double buffered are instantiated in the second bank. If a register is not double buffered, the address in the second bank may be mapped to the address of the same register in the first bank.

For registers that are double buffered, registers from one bank are active and used by the processing units while the registers from the other bank are shadowed. The shadowed register may be updated by the control unit 190 during the current frame interval while hardware is using the active registers. The determination of which bank to use for a particular processing unit at a particular frame may be specified by a "NextBk" (next bank) field in a go register corresponding to the source providing the image data to the processing unit. Essentially, NextBk is a field that allows the control unit 190 to control which register bank becomes active on a triggering event for the subsequent frame.

Figure 11:
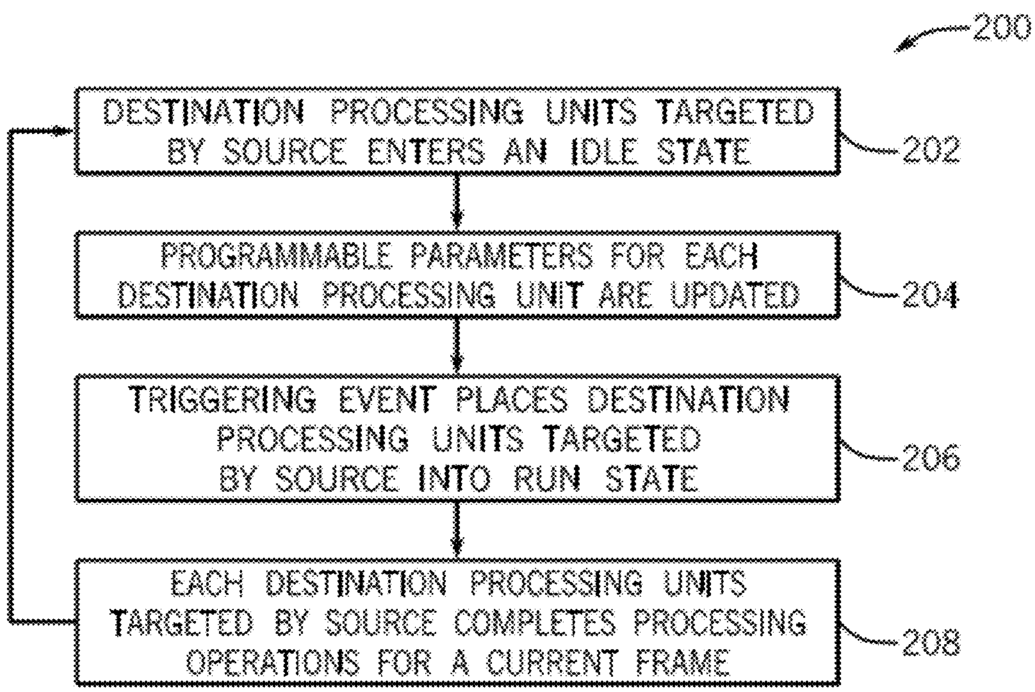
FIG. 11 is flow chart depicting a method for processing image data in the ISP front-end logic of FIG. 10, in accordance with an embodiment

Before discussing the operation of the go registers in detail, FIG. 11 provides a general method 200 for processing image data on a frame-by-frame basis in accordance with the present techniques. Beginning at step 202, the destination processing units targeted by a data source (e.g., Sens0, Sens1, Sens0DMA, Sens1DMA, or ProcInDMA) enter an idle state. This may indicate that processing for the current frame is completed and, therefore, the control unit 190 may prepare for processing the next frame. For instance, at step 204, programmable parameters for each destination processing unit are updated. This may include, for example, updating the NextBk field in the go register corresponding to the source, as well as updating any parameters in the data registers corresponding to the destination units. Thereafter, at step 206, a triggering event may place the destination units into a run state. Further, as shown at step 208, each destination unit targeted by the source completes its processing operations for the current frame, and the method 200 may subsequently return to step 202 for the processing of the next frame.

Figure 12:
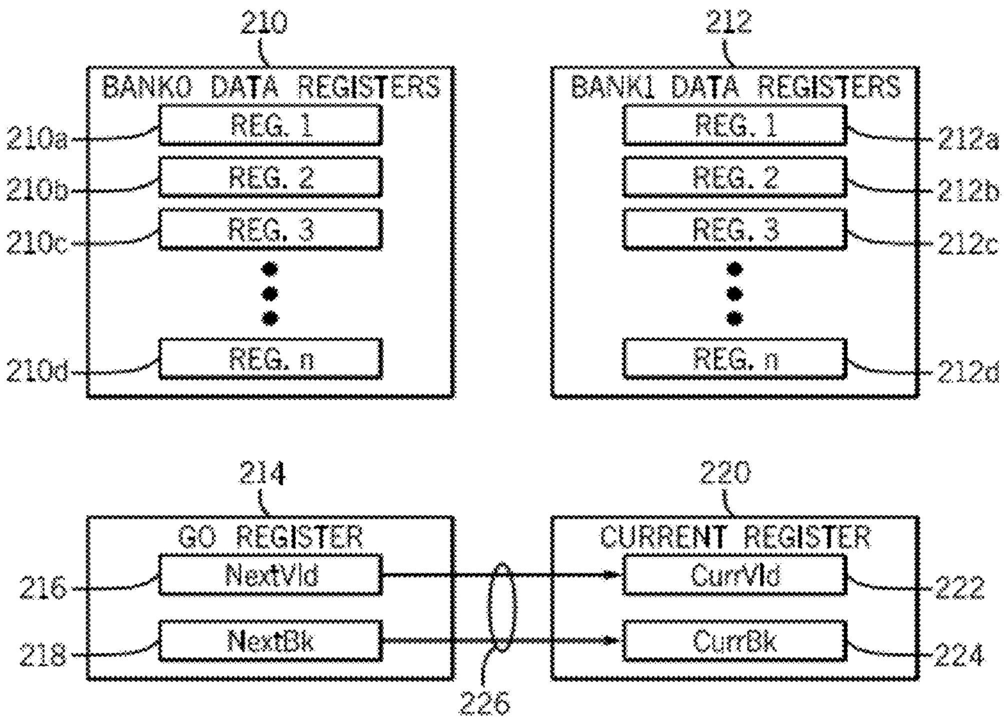
FIG. 12 is block diagram illustrating a configuration of double buffered registers and control registers that may be utilized for processing image data in the ISP front-end logic, in accordance with one embodiment.

FIG. 12 depicts a block diagram view showing two banks of data registers 210 and 212 that may be used by the various destination units of the ISP-front end. For instance, Bank 0 (210) may include the data registers 1-n (210*a*-210*d*), and Bank 1 (212) may include the data registers 1-n (212*a*-212*d*). As discussed above, the embodiment shown in FIG. 10 may utilize a register bank (Bank 0) having seven register bank groups (e.g., SIf0, SIf1, StatsPipe0, StatsPipe1, ProcPipe, FEOut and ProcIn). Thus, in such an embodiment, the register block address space of each register is duplicated to provide a second register bank (Bank 1).

FIG. 12 also illustrates go register 214 that may correspond to one of the sources. As shown, the go register 214 includes a "NextVld" field 216 and the above-mentioned "NextBk" field 218. These fields may be programmed prior to starting the processing of the current frame. Particularly, NextVld may indicate the destination(s) to where data from the source is to be sent. As discussed above, NextBk may select a corresponding data register from either Bank0 or Bank1 for each destination targeted, as indicated by NextVld. Though not shown in FIG. 12, the go register 214 may also include an arming bit, referred to herein as a "go bit," which may be set to arm the go register. When a triggering event 226 for a current frame is detected, NextVld and NextBk may be copied into a CurrVld field 222 and a CurrBk field 224 of a corresponding current or "active" register 220. In one embodiment, the current register(s) 220 may be read-only registers that may set by hardware, while remaining inaccessible to software commands within the ISP front-end 80.

As will be appreciated, for each ISP front-end source, a corresponding go register may be provided. For the purposes of this disclosure, the go registers corresponding to the above-discussed sources Sens0, Sens1, Sens0DMA, Sens1DMA, and ProcInDMA may be referred to as Sens0Go, Sens1Go, Sens0DMAGo, Sens1DMAGo and ProcInDMAGo, respectively. As mentioned above, the control unit may utilize the go registers to control the sequencing of frame processing within the ISP front end 80. Each go register contains a NextVld field and a NextBk field to indicate what destinations will be valid, and which register bank (0 or 1) will be used, respectively, for the next frame. When the next frame's triggering event 226 occurs, the NextVld and NextBk fields are copied to a corresponding active read-only register 220 that indicates the current valid destinations and bank numbers, as shown above in FIG. 12. Each source may be configured to operate asynchronously and can send data to any of its valid destinations. Further, it should be understood that for each destination, generally only one source may be active during a current frame.

With regard to the arming and triggering of the go register 214, asserting an arming bit or "go bit" in the go register 214 arms the corresponding source with the associated NextVld and NextBk fields. For triggering, various modes are available depending on whether the source input data is read from memory (e.g., Sens0DMA, Sens1DMA or ProcInDMA), or whether the source input data is from a sensor interface (e.g., Sens0 or Sens1). For instance, if the input is from memory 108, the arming of the go bit itself may serve as the triggering event, since the control unit 190 has control over when data is read from the memory 108. If the image frames are being input by the sensor interface, then triggering event may depend on the timing at which the corresponding go register is armed relative to when data from the sensor interface is received. In accordance with the present embodiment, three different techniques for triggering timing from a sensor interface input are shown in FIGS. 13-15.

Figure 13:
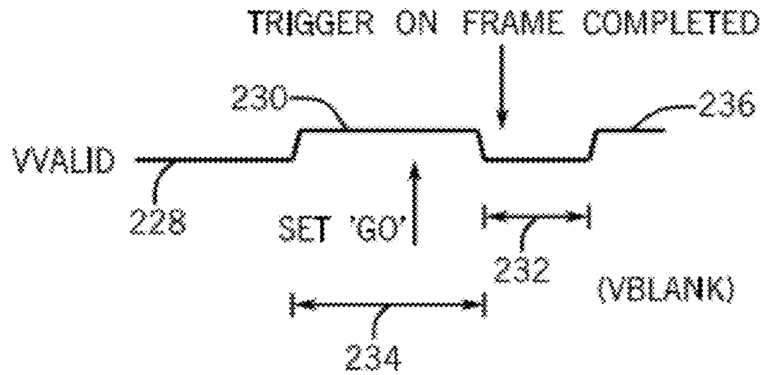
FIGS. 13-15 are timing diagrams depicting different modes for triggering the processing of an image frame, in accordance with embodiments of the present techniques.

Referring first to FIG. 13, a first scenario is illustrated in which triggering occurs once all destinations targeted by the source transition from a busy or run state to an idle state. Here, a data signal VVALID (228) represents an image data signal from a source. The pulse 230 represents a current frame of image data, the pulse 236 represents the next frame of image data, and the interval 232 represents a vertical blanking interval (VBLANK) 232 (e.g., represents the time differential between the last line of the current frame 230 and the next frame 236). The time differential between the rising edge and falling edge of the pulse 230 represents a frame interval 234. Thus, in FIG. 13, the source may be configured to trigger when all targeted destinations have finished processing operations on the current frame 230 and transition to an idle state. In this scenario, the source is armed (e.g., by setting the arming or "go" bit) before the destinations complete processing so that the source can trigger and initiate processing of the next frame 236 as soon as the targeted destinations go idle.

During the vertical blanking interval 232 the processing units may be set up and configured for the next frame 236 using the register banks specified by the go register corresponding to the source before the sensor input data arrives. By way of example only, read buffers used by FEProc 150 may be filled before the next frame 236 arrives. In this case, shadowed registers corresponding to the active register banks may be updated after the triggering event, thus allowing for a full frame interval to setup the double-buffered registers for the next frame (e.g., after frame 236).

Figure 14:
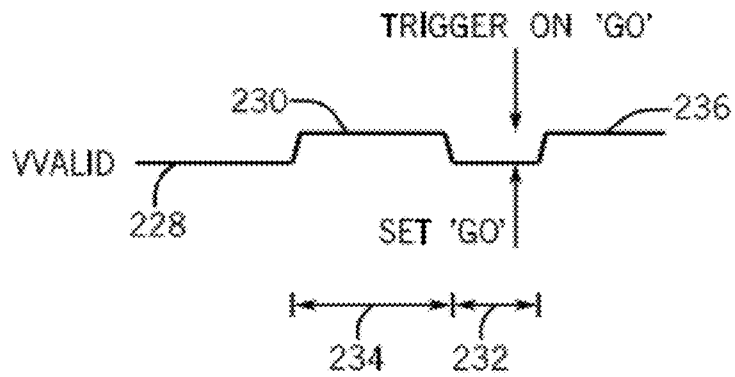
Figure 15:
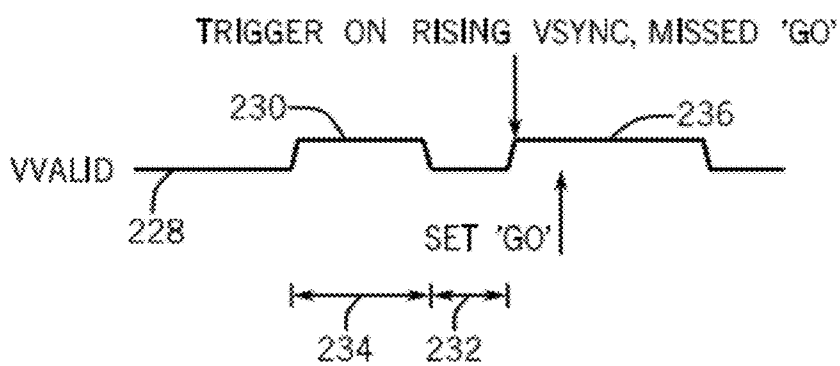

FIG. 14 illustrates a second scenario in which the source is triggered by arming the go bit in the go register corresponding to the source. Under this "trigger-on-go" configuration, the destination units targeted by the source are already idle and the arming of the go bit is the triggering event. This triggering mode may be utilized for registers that are not double-buffered and, therefore, are updated during vertical blanking (e.g., as opposed to updating a double-buffered shadow register during the frame interval 234).

FIG. 15 illustrates a third triggering mode in which the source is triggered upon detecting the start of the next frame, i.e., a rising VSYNC. However, it should be noted that in this mode, if the go register is armed (by setting the go bit) after the next frame 236 has already started processing, the source will use the target destinations and register banks corresponding to the previous frame, since the CurrVld and CurrBk fields are not updated before the destination start processing. This leaves no vertical blanking interval for setting up the destination processing units and may potentially result in dropped frames, particularly when operating in a dual sensor mode. It should be noted, however, that this mode may nonetheless result in accurate operation if the image processing circuitry 32 is operating in a single sensor mode that uses the same register banks for each frame (e.g., the destination (NextVld) and register banks (NextBk) do not change).

Figure 16:
FIG. 16 is a diagram depicting a control register in more detail, in accordance with one embodiment.

Referring now to FIG. 16, a control register (or "go register") 214 is illustrated in more detail. The go register 214 includes the arming "go" bit 238, as well as the NextVld field 216 and the NextBk field 218. As discussed above, each source (e.g., Sens0, Sens1, Sens0DMA, Sens1DMA, or ProcInDMA) of the ISP front-end 80 may have a corresponding go register 214. In one embodiment, the go bit 238 may be a single-bit field, and the go register 214 may be armed by setting the go bit 238 to 1. The NextVld field 216 may contain a number of bits corresponding to the number of destinations in the ISP front-end 80. For instance, in the embodiment shown in FIG. 10, the ISP front-end includes six destinations: Sif0DMA, Sif1DMA, StatsPipe0, StatsPipe1, FEProc, and FEOut. Thus, the go register 214 may include six bits in the NextVld field 216, with one bit corresponding to each destination, and wherein targeted destinations are set to 1. Similarly, the NextBk field 216 may contain a number of bits corresponding to the number of data registers in the ISP front-end 80. For instance, as discussed above, the embodiment of the ISP front-end 80 shown in FIG. 10 may include seven data registers: SIf0, SIf1, StatsPipe0, StatsPipe1, ProcPipe, FEOut and ProcIn. Accordingly, the NextBk field 218 may include seven bits, with one bit corresponding to each data register, and wherein data registers corresponding to Bank 0 and 1 are selected by setting their respective bit values to 0 or 1, respectively. Thus, using the go register 214, the source, upon triggering, knows precisely which destination units are to receive frame data, and which register banks are to be used for configuring the targeted destination units.

Additionally, due to the dual sensor configuration supported by the ISP circuitry 32, the ISP front-end may operate in a single sensor configuration mode (e.g., only one sensor is acquiring data) and a dual sensor configuration mode (e.g., both sensors are acquiring data). In a typical single sensor configuration, input data from a sensor interface, such as Sens0, is sent to StatsPipe0 (for statistics processing) and FEProc (for pixel processing). In addition, sensor frames may also be sent to memory (SIf0DMA) for future processing, as discussed above.

An example of how the NextVld fields corresponding to each source of the ISP front-end 80 may be configured when operating in a single sensor mode is depicted below in Table 2.

TABLE 2

NextVld per source example: Single sensor mode

| | SIf0DMA | SIf1DMA | StatsPipe0 | StatsPipe1 | FEProc | FEOut |
|---|---|---|---|---|---|---|
| Sens0Go | 1 | X | 1 | 0 | 1 | 0 |
| Sens1Go | X | 0 | 0 | 0 | 0 | 0 |
| Sens0DMAGo | X | X | 0 | X | X | X |
| Sens1DMAGo | X | X | X | 0 | X | X |
| ProcInDMAGo | X | X | X | X | 0 | 0 |

As discussed above with reference to Table 1, the ISP front-end 80 may be configured such that only certain destinations are valid for a particular source. Thus, the destinations in Table 2 marked with "X" are intended to indicate that the ISP front-end 80 is not configured to allow a particular source to send frame data to that destination. For such destinations, the bits of the NextVld field of the particular source corresponding to that destination may always be 0. It should be understood, however, that this is merely one embodiment and, indeed, in other embodiments, the ISP front-end 80 may be configured such that each source is capable of targeting each available destination unit.

The configuration shown above in Table 2 represents a single sensor mode in which only Sensor0 is providing frame data. For instance, the Sens0Go register indicates destinations as being SIf0DMA, StatsPipe0, and FEProc. Thus, when triggered, each frame of the Sensor0 image data, is sent to these three destinations. As discussed above, SIf0DMA may store frames in memory 108 for later processing, StatsPipe0 applies statistics processing to determine various statistic data points, and FEProc processes the frame using, for example, temporal filtering and binning compensation filtering. Further, in some configurations where additional statistics are desired (e.g., statistics in different color spaces), StatsPipe1 may also be enabled (corresponding NextVld set to 1) during the single sensor mode. In such embodiments, the Sensor0 frame data is sent to both StatsPipe0 and StatsPipe1. Further, as shown in the present embodiment, only a single sensor interface (e.g., Sens0 or alternatively Sen0) is the only active source during the single sensor mode.

Figure 17:
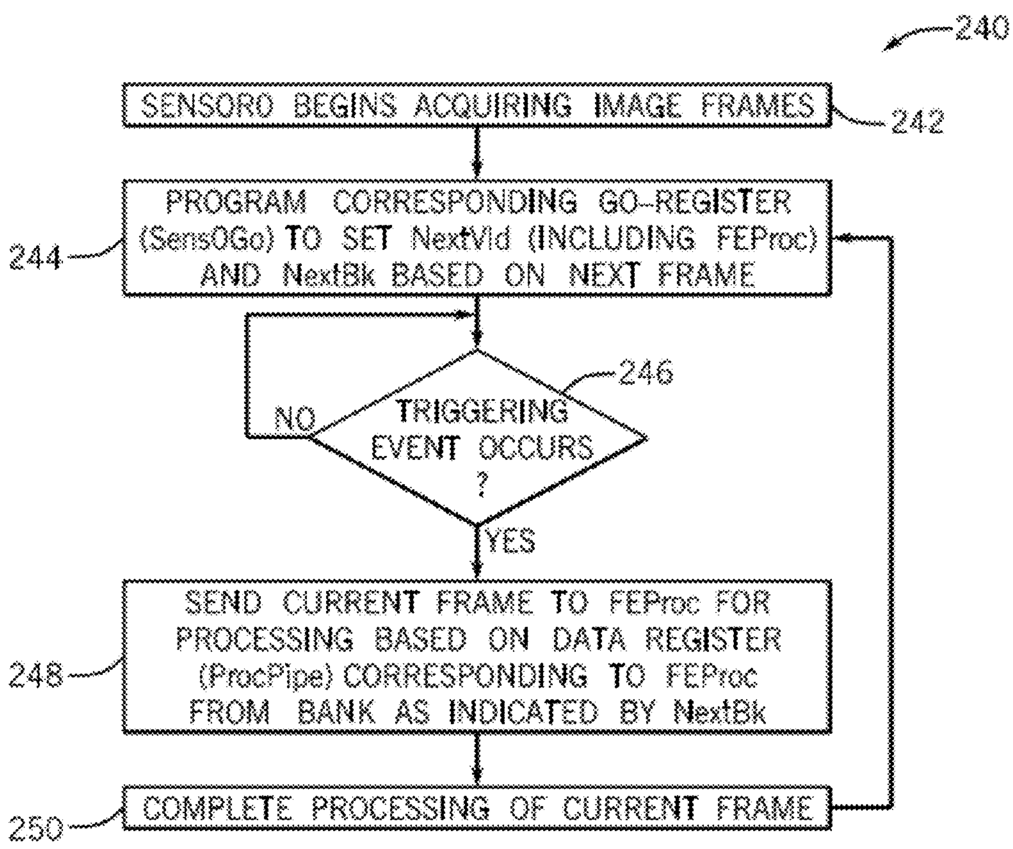
FIG. 17 is a flow chart depicting a method for using a front-end pixel processing unit to process image frames when the ISP front-end logic of FIG. 10 is operating in a single sensor mode.

With this in mind, FIG. 17 provides a flow chart depicting a method 240 for processing frame data in the ISP front-end 80 when only a single sensor is active (e.g., Sensor 0). While the method 240 illustrates in particular the processing of Sensor0 frame data by FEProc 150 as an example, it should be understood that this process may be applied to any other source and corresponding destination unit in the ISP front-end 80. Beginning at step 242, Sensor0 begins acquiring image data and sending the captured frames to the ISP front-end 80. The control unit 190 may initialize programming of the go register corresponding to Sens0 (the Sensor0 interface) to determine target destinations (including FEProc) and what bank registers to use, as shown at step 244. Thereafter, decision logic 246 determines whether a source triggering event has occurred. As discussed above, frame data input from a sensor interface may utilize different triggering modes (FIGS. 13-15). If a trigger event is not detected, the process 240 continues to wait for the trigger. Once triggering occurs, the next frame becomes the current frame and is sent to FEProc (and other target destinations) for processing at step 248. FEProc may be configured using data parameters based on a corresponding data register (ProcPipe) specified in the NextBk field of the Sens0Go register. After processing of the current frame is completed at step 250, the method 240 may return to step 244, at which the Sens0Go register is programmed for the next frame.

When both Sensor0 and Sensor1 of the ISP front-end 80 are both active, statistics processing remains generally straightforward, since each sensor input may be processed by a respective statistics block, StatsPipe0 and StatsPipe1. However, because the illustrated embodiment of the ISP front-end 80 provides only a single pixel processing unit (FEProc), FEProc may be configured to alternate between processing frames corresponding to Sensor0 input data and frames corresponding to Sensor1 input data. As will be appreciated, the image frames are read from FEProc in the illustrated embodiment to avoid a condition in which image data from one sensor is processed in real-time while image data from the other sensor is not processed in real-time. For instance, as shown in Table 3 below, which depicts one possible configuration of NextVld fields in the go registers for each source when the ISP-front end 80 is operating in a dual sensor mode, input data from each sensor is sent to memory (SIf0DMA and SIf1DMA) and to the corresponding statistics processing unit (StatsPipe0 and StatsPipe1).

TABLE 3

NextVld per source example: Dual sensor mode

| | SIf0DMA | SIf1DMA | StatsPipe0 | StatsPipe1 | FEProc | FEOut |
|---|---|---|---|---|---|---|
| Sens0Go | 1 | X | 1 | 0 | 0 | 0 |
| Sens1Go | X | 1 | 0 | 1 | 0 | 0 |
| Sens0DMAGo | X | X | 0 | X | X | X |
| Sens1DMAGo | X | X | X | 0 | X | X |
| ProcInDMAGo | X | X | X | X | 1 | 0 |

The sensor frames in memory are sent to FEProc from the ProcInDMA source, such that they alternate between Sensor0 and Sensor1 at a rate based on their corresponding frame rates. For instance, if Sensor0 and Sensor1 are both acquiring image data at a rate of 30 frames per second (fps), then their sensor frames may be interleaved in a 1-to-1 manner. If Sensor0 (30 fps) is acquiring image data at a rate twice that of Sensor1 (15 fps), then the interleaving may be 2-to-1, for example. That is, two frames of Sensor0 data are read out of memory for every one frame of Sensor1 data.

Figure 18:
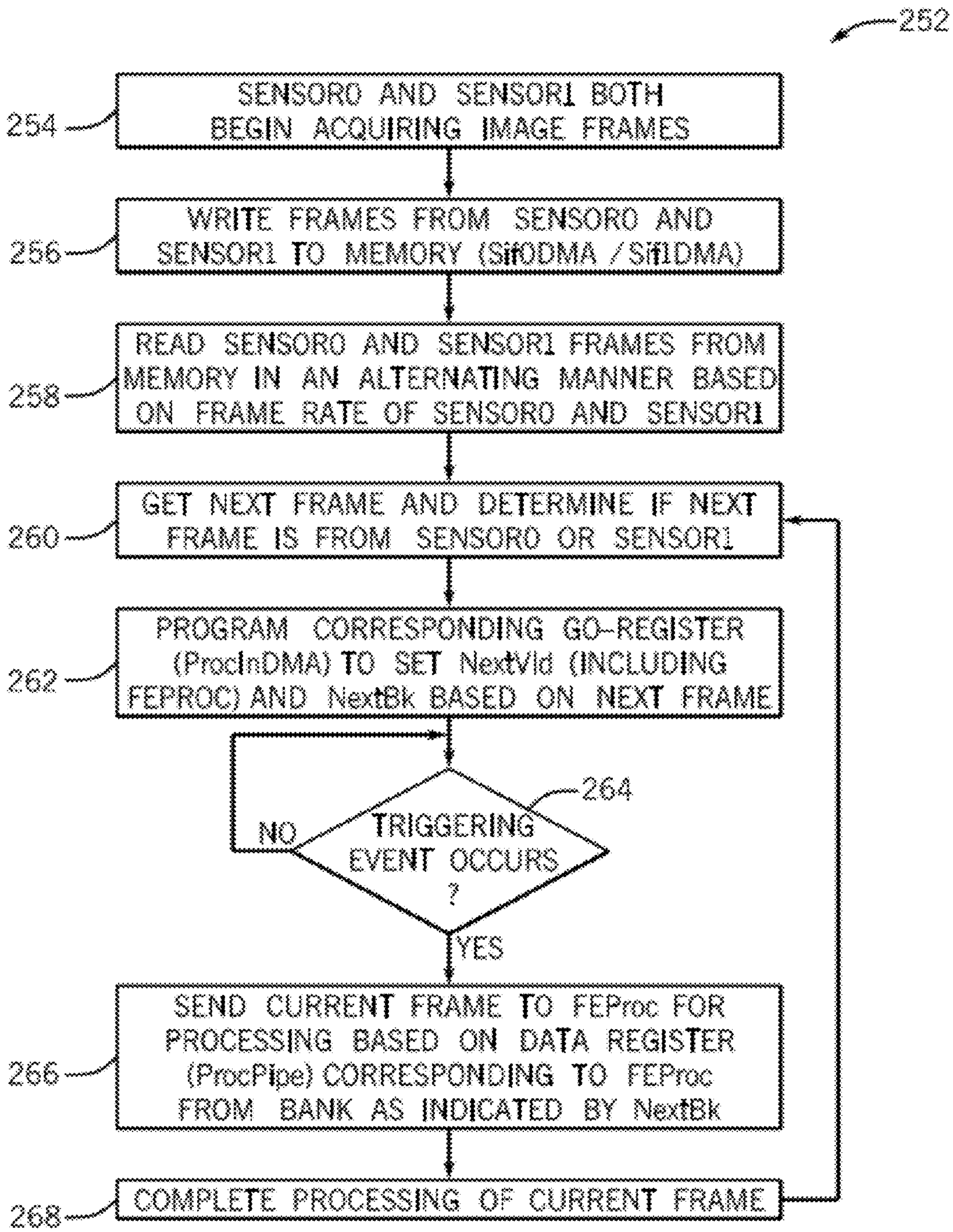
FIG. 18 is a flow chart depicting a method for using a front-end pixel processing unit to process image frames when the ISP front-end logic of FIG. 10 is operating in a dual sensor mode.

With this in mind, FIG. 18 depicts a method 252 for processing frame data in the ISP front-end 80 having two sensors acquiring image data simultaneously. At step 254, both Sensor0 and Sensor1 begin acquiring image frames. As will be appreciated, Sensor0 and Sensor1 may acquire the image frames using different frame rates, resolutions, and so forth. At step 256, the acquired frames from Sensor0 and Sensor1 written to memory 108 (e.g., using SIf0DMA and SIf1DMA destinations). Next, source ProcInDMA reads the frame data from the memory 108 in an alternating manner, as indicated at step 258. As discussed, frames may alternate between Sensor0 data and Sensor1 data depending on frame rate at which the data is acquired. At step 260, the next frame from ProcInDMA is acquired. Thereafter, at step 262, the NextVld and NextBk fields of the go register corresponding to the source, here ProcInDMA, is programmed depending on whether the next frame is Sensor0 or Sensor1 data. Thereafter, decision logic 264 determines whether a source triggering event has occurred. As discussed above, data input from memory may be triggered by arming the go bit (e.g., "trigger-on-go" mode). Thus, triggering may occur once the go bit of the go register is set to 1. Once triggering occurs, the next frame becomes the current frame and is sent to FEProc for processing at step 266. As discussed above, FEProc may be configured using data parameters based on a corresponding data register (ProcPipe) specified in the NextBk field of the ProcInDMAGo register. After processing of the current frame is completed at step 268, the method 252 may return to step 260 and continue.

A further operational event that the ISP front-end 80 is configured to handle is a configuration change during image processing. For instance, such an event may occur when the ISP front-end 80 transitions from a single sensor configuration to a dual sensor configuration, or vice-versa. As discussed above, the NextVld fields for certain sources may be different depending on whether one or both image sensors are active. Thus, when the sensor configuration is changed, the ISP front-end control unit 190 may release all destination units before they are targeted by a new source. This may avoid invalid configurations (e.g., assigning multiple sources to one destination). In one embodiment, the release of the destination units may be accomplished by setting the NextVld fields of all the go registers to 0, thus disabling all destinations, and arming the go bit. After the destination units are released, the go registers may be reconfigured depending on the current sensor mode, and image processing may continue.

Figure 19:
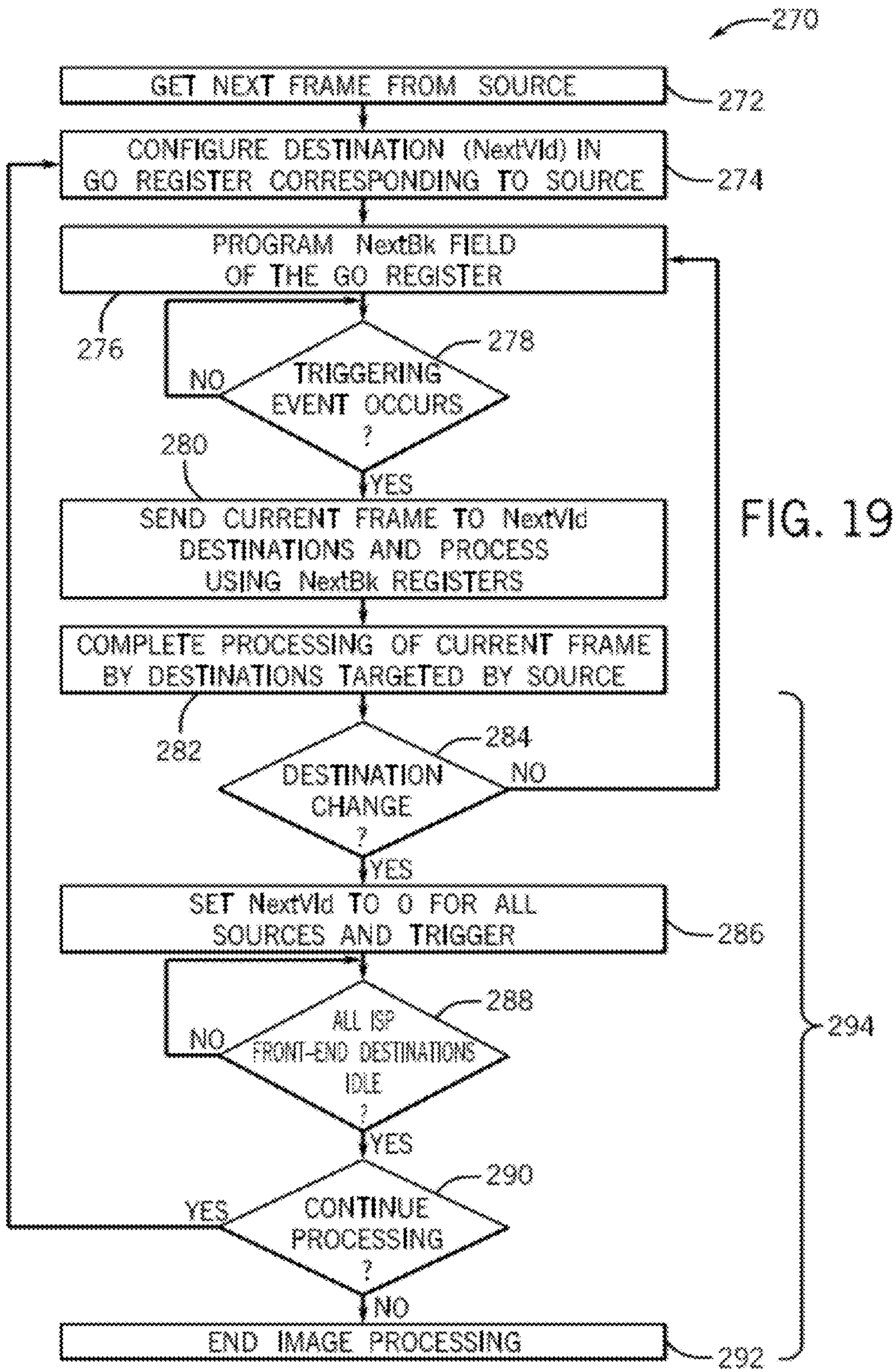
FIG. 19 is a flow chart depicting a method for using a front-end pixel processing unit to process image frames when the ISP front-end logic of FIG. 10 is operating in a dual sensor mode.

A method 270 for switching between single and dual sensor configurations is shown in FIG. 19, in accordance with one embodiment. Beginning at step 272, a next frame of image data from a particular source of the ISP front-end 80 is identified. At step 274, the target destinations (NextVld) are programmed into the go register corresponding to the source. Next, at step 276, depending on the target destinations, NextBk is programmed to point to the correct data registers associated with the target destinations. Thereafter, decision logic 278 determines whether a source triggering event has occurred. Once triggering occurs, the next frame is sent to the destination units specified by NextVld and processed by the destination units using the corresponding data registers specified by NextBk, as shown at step 280. The processing continues until step 282, at which the processing of the current frame is completed.

Subsequently, decision logic 284 determines whether there is a change in the target destinations for the source. As discussed above, NextVld settings of the go registers corresponding to Sens0 and Sens1 may vary depending on whether one sensor or two sensors are active. For instance, referring to Table 2, if only Sensor0 is active, Sensor0 data is sent to SIf0DMA, StatsPipe0, and FEProc. However, referring to Table 3, if both Sensor0 and Sensor1 are active, then Sensor0 data is not sent directly to FEProc. Instead, as mentioned above, Sensor0 and Sensor1 data is written to memory 108 and is read out to FEProc in an alternating manner by source ProcInDMA. Thus, if no target destination change is detected at decision logic 284, the control unit 190 deduces that the sensor configuration has not changed, and the method 270 returns to step 276, whereat the NextBk field of the source go register is programmed to point to the correct data registers for the next frame, and continues.

If, however, at decision logic 284, a destination change is detected, then the control unit 190 determines that a sensor configuration change has occurred. For instance, this could represent switching from single sensor mode to dual sensor mode, or shutting off the sensors altogether. Accordingly, the method 270 continues to step 286, at which all bits of the NextVld fields for all go registers are set to 0, thus effectively disabling the sending of frames to any destination on the next trigger. Then, at decision logic 288, a determination is made as to whether all destination units have transition to an idle state. If not, the method 270 waits at decision logic 288 until all destinations units have completed their current operations. Next, at decision logic 290, a determination is made as to whether image processing is to continue. For instance, if the destination change represented the deactivation of both Sensor0 and Sensor1, then image processing ends at step 292. However, if it is determined that image processing is to continue, then the method 270 returns to step 274 and the NextVld fields of the go registers are programmed in accordance with the current operation mode (e.g., single sensor or dual sensor). As shown here, the steps 284-292 for clearing the go registers and destination fields may collectively be referred to by reference number 294.

Figure 20:
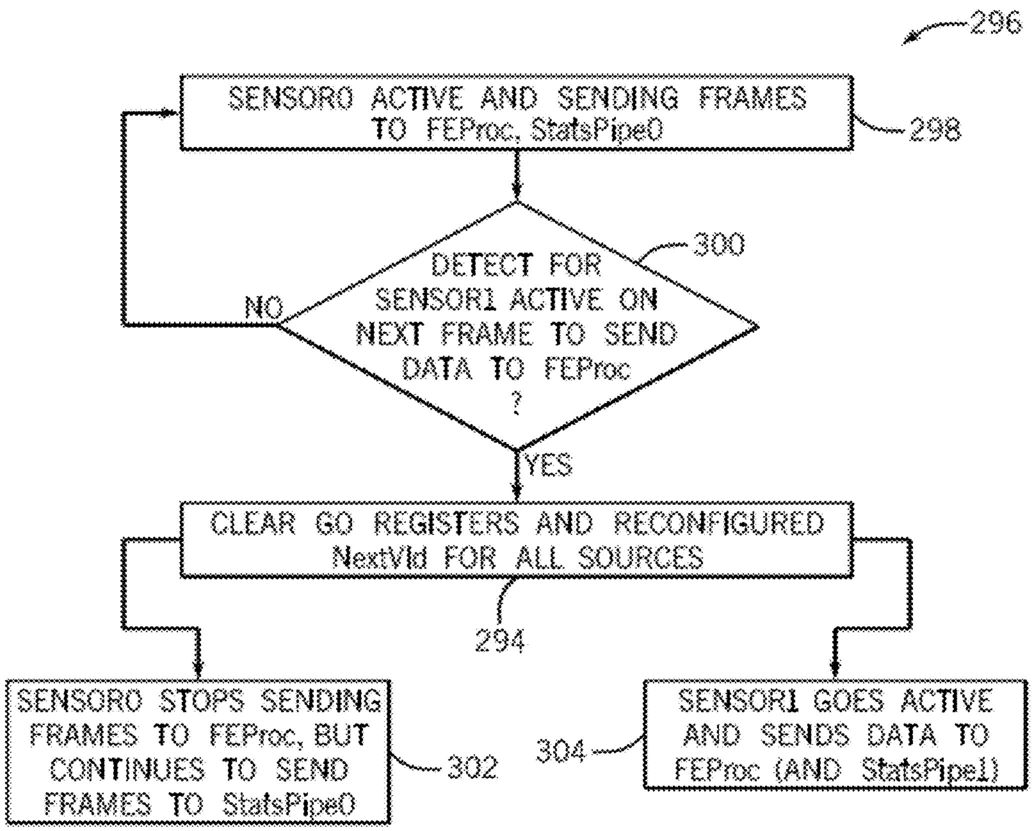
FIG. 20 is a flow chart depicting a method in which both image sensors are active, but wherein a first image sensor is sending image frames to a front-end pixel processing unit, while the second image sensor is sending image frames to a statistics processing unit so that imaging statistics for the second sensor are immediately available when the second image sensor continues sending image frames to the front-end pixel processing unit at a later time, in accordance with one embodiment.

Next, FIG. 20 shows a further embodiment by way of the flow chart (method 296) that provides for another dual sensor mode of operation. The method 296 depicts a condition in which one sensor (e.g., Sensor0) is actively acquiring image data and sending the image frames to FEProc 150 for processing, while also sending the image frames to StatsPipe0 and/or memory 108 (Sif0DMA), while the other sensor (e.g., Sensor1) is inactive (e.g., turned off), as shown at step 298. Decision logic 300 then detects for a condition in which Sensor1 will become active on the next frame to send image data to FEProc. If this condition is not met, then the method 296 returns to step 298. However, if this condition is met, then the method 296 proceeds by performing action 294 (collectively steps 284-292 of FIG. 19), whereby the destination fields of the sources are cleared and reconfigured at step 294. For instance, at step 294, the NextVld field of the go register associated with Sensor1 may be programmed to specify FEProc as a destination, as well as StatsPipe1 and/or memory (Sif1DMA), while the NextVld field of the go register associated with Sensor0 may be programmed to clear FEProc as a destination. In this embodiment, although frames captured by Sensor0 are not sent to FEProc on the next frame, Sensor0 may remain active and continue to send its image frames to StatsPipe0, as shown at step 302, while Sensor1 captures and sends data to FEProc for processing at step 304. Thus, both sensors, Sensor0 and Sensor1 may continue to operate in this "dual sensor" mode, although only image frames from one sensor are sent to FEProc for processing. For the purposes of this example, a sensor sending frames to FEProc for processing may be referred to as an "active sensor," a sensor that is not sending frame FEProc but is still sending data to the statistics processing units may be referred to as a "semi-active sensor," and a sensor that is not acquiring data at all may be referred to as an "inactive sensor."

One benefit of the foregoing technique is that the because statistics continue to be acquired for the semi-active sensor (Sensor0), the next time the semi-active sensor transitions to an active state and the current active sensor (Sensor1) transitions to a semi-active or inactive state, the semi-active sensor may begin acquiring data within one frame, since color balance and exposure parameters may already be available due to the continued collection of image statistics. This technique may be referred to as "hot switching" of the image sensors, and avoids drawbacks associated with "cold starts" of the image sensors (e.g., starting with no statistics information available). Further, to save power, since each source is asynchronous (as mentioned above), the semi-active sensor may operate at a reduced clock and/or frame rate during the semi-active period.

Before continuing with a more detailed description of the statistics processing and pixel processing operations depicted in the ISP front-end logic 80 of FIG. 10, it is believed that a brief introduction regarding several types of memory addressing formats that may be used in conjunction with the presently disclosed techniques, as well as a definition of various ISP frame regions, will help to facilitate a better understanding of the present subject matter.

Figure 21:
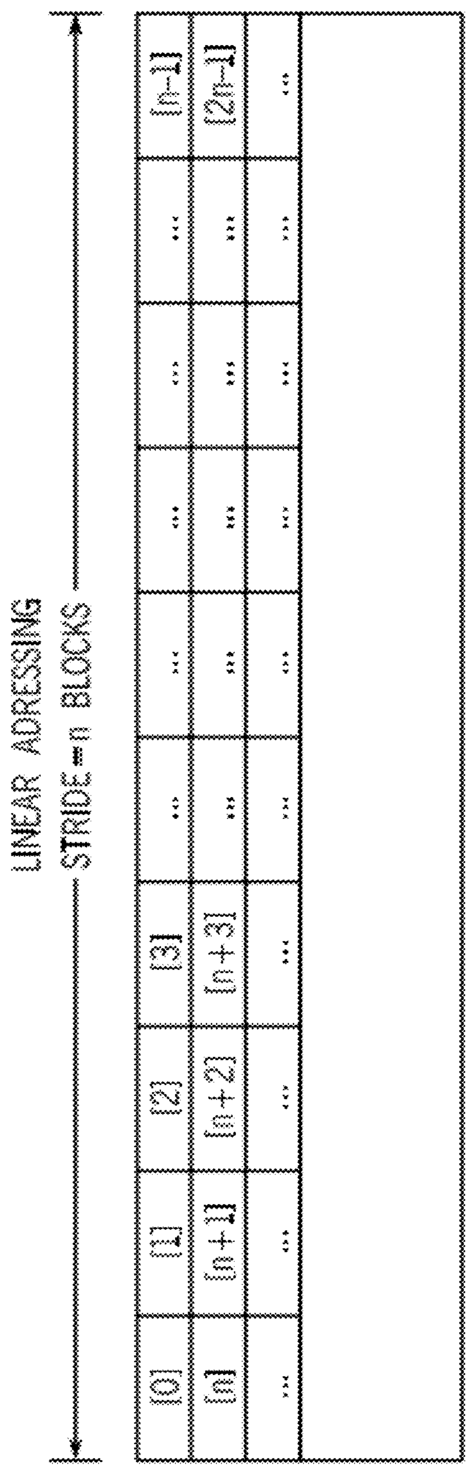
FIG. 21 is a graphical depiction of a linear memory addressing format that may be applied to pixel formats stored in a memory of the electronic device of FIG. 1, in accordance with aspects of the present disclosure.
Figure 22:
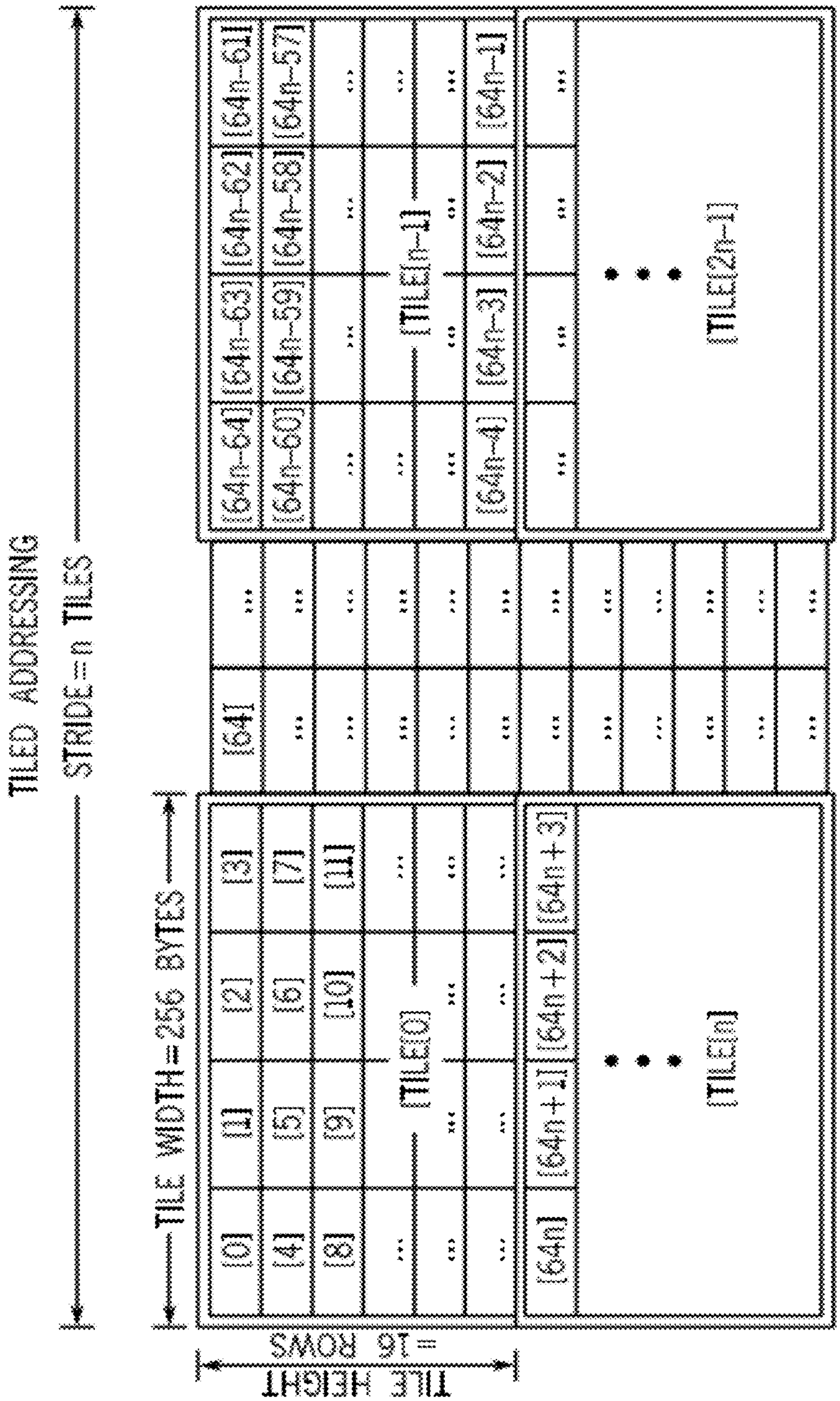
FIG. 22 is a graphical depiction of a tiled memory addressing format that may be applied to pixel formats stored in a memory of the electronic device of FIG. 1, in accordance with aspects of the present disclosure.

Referring now to FIGS. 21 and 22, a linear addressing mode and a tiled addressing mode that may be applied to pixel data received from the image sensor(s) 90 and stored into memory (e.g., 108) are illustrated, respectively. In the depicted embodiment may be based upon a host interface block request size of 64 bytes. As will be appreciated, other embodiments may utilize different block request sizes (e.g., 32 bytes, 128 bytes, and so forth). In the linear addressing mode shown in FIG. 21, image samples are located in memory in sequential order. The term "linear stride" specifies the distance in bytes between 2 adjacent vertical pixels. In the present example, the starting base address of a plane is aligned to a 64-byte boundary and the linear stride may be a multiple of 64 (based upon the block request size).

In the example of a tiled mode format, as shown in FIG. 22, the image samples are first arranged sequentially in "tiles," which are then stored in memory sequentially. In the illustrated embodiment, each tile may be 256 bytes wide by 16 rows high. The term "tile stride" should be understood to refer to the distance in bytes between 2 adjacent vertical tiles. In the present example, the starting base address of a plane in tiled mode is aligned to a 4096 byte boundary (e.g., the size of a tile) and the tile stride may be a multiple of 4096.

Figure 23:
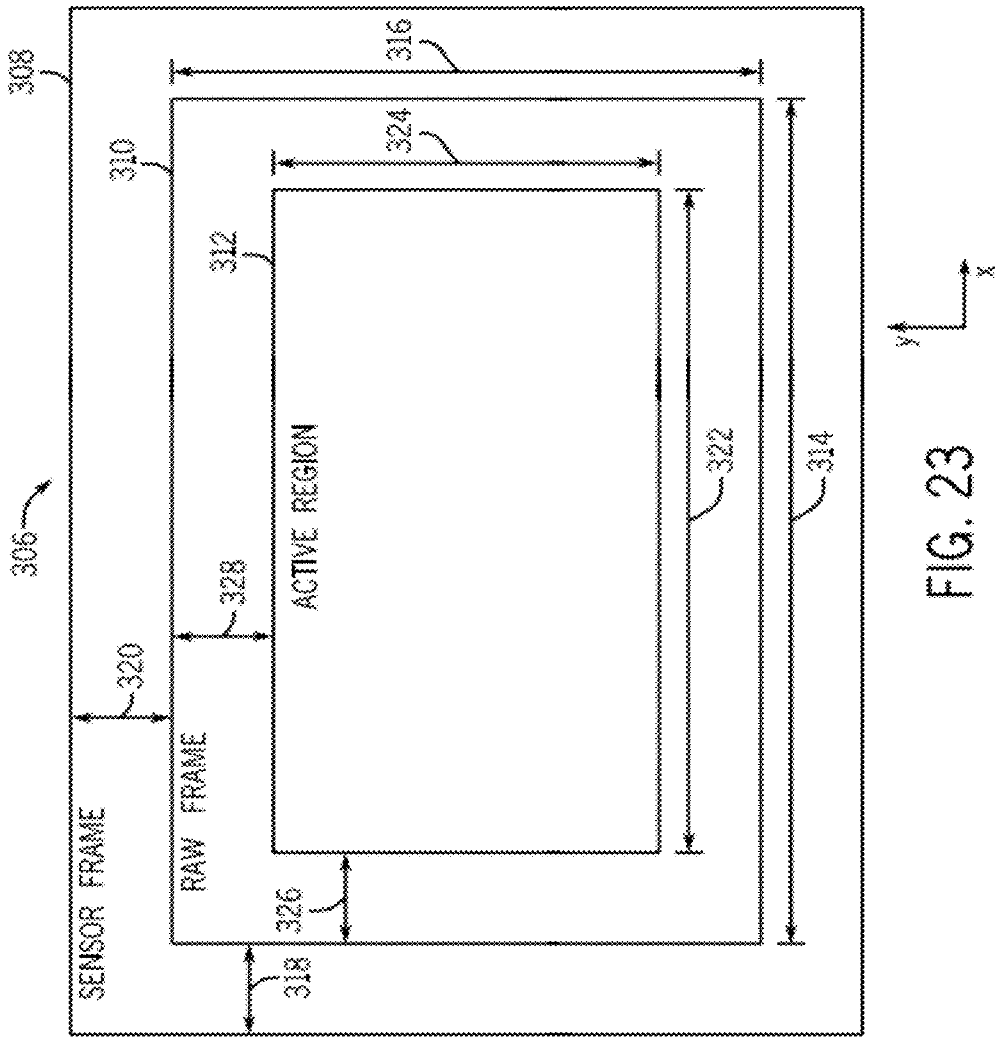
FIG. 23 is graphical depiction of various imaging regions that may be defined within a source image frame captured by an image sensor, in accordance with aspects of the present disclosure.

With this in mind, various frame regions that may be defined within an image source frame are illustrated in FIG. 23. The format for a source frame provided to the image processing circuitry 32 may use either the tiled or linear addressing modes discussed above, as may utilize pixel formats in 8, 10, 12, 14, or 16-bit precision. The image source frame 306, as shown in FIG. 23, may include a sensor frame region 308, a raw frame region 308, and an active region 310.

The sensor frame 308 is generally the maximum frame size that the image sensor 90 can provide to the image processing circuitry 32. The raw frame region 310 may be defined as the region of the sensor frame 308 that is sent to the ISP front-end processing logic 80. The active region 312 may be defined as a portion of the source frame 306, typically within the raw frame region 310, on which processing is performed for a particular image processing operation. In accordance with embodiments of the present technique, that active region 312 may be the same or may be different for different image processing operations.

In accordance with aspects of the present technique, the ISP front-end logic 80 only receives the raw frame 310. Thus, for the purposes of the present discussion, the global frame size for the ISP front-end processing logic 80 may be assumed as the raw frame size, as determined by the width 314 and height 316. In some embodiments, the offset from the boundaries of the sensor frame 308 to the raw frame 310 may be determined and/or maintained by the control logic 84. For instance, the control logic 84 may be include firmware that may determine the raw frame region 310 based upon input parameters, such as the x-offset 318 and the y-offset 320, that are specified relative to the sensor frame 308. Further, in some cases, a processing unit within the ISP front-end logic 80 or the ISP pipe logic 82 may have a defined active region, such that pixels in the raw frame but outside the active region 312 will not be processed, i.e., left unchanged. For instance, an active region 312 for a particular processing unit having a width 322 and height 324 may be defined based upon an x-offset 326 and y-offset 328 relative to the raw frame 310. Further, where an active region is not specifically defined, one embodiment of the image processing circuitry 32 may assume that the active region 312 is the same as the raw frame 310 (e.g., x-offset 326 and y-offset 328 are both equal to 0). Thus, for the purposes of image processing operations performed on the image data, boundary conditions may be defined with respect to the boundaries of the raw frame 310 or active region 312. Additionally, in some embodiments, a window (frame) may be specified by identifying a starting and ending location in memory, rather than a starting location and window size information.

Figure 24:
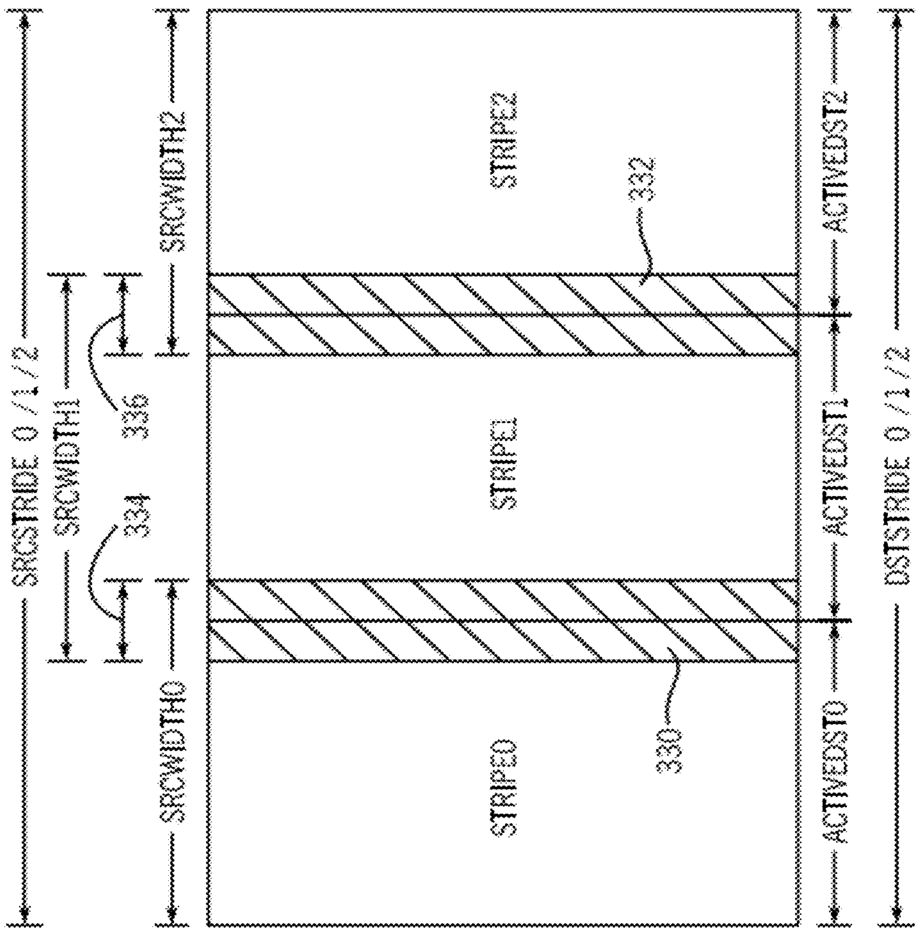
FIG. 24 is a graphical depiction of a technique for using the ISP front-end processing unit to process overlapping vertical stripes of an image frame.

In some embodiments, the ISP front-end processing unit (FEProc) 80 may also support the processing an image frame by way of overlapping vertical stripes, as shown in FIG. 24. For instance, image processing in the present example may occur in three passes, with a left stripe (Stripe0), a middle stripe (Stripe1), and a right stripe (Stripe2). This may allow the ISP front-end processing unit 80 to process a wider image in multiple passes without the need for increasing line buffer size. This technique may be referred to as "stride addressing."

When processing an image frame by multiple vertical stripes, the input frame is read with some overlap to allow for enough filter context overlap so that there is little or no difference between reading the image in multiple passes versus a single pass. For instance, in the present example, Stripe0 with a width SrcWidth0 and Stripe1 with a width SrcWidth1 partially overlap, as indicated by the overlapping region 330. Similarly, Stripe1 also overlaps on the right side with Stripe2 having a width of SrcWidth2, as indicated by the overlapping region 332. Here, the total stride is the sum of the width of each stripe (SrcWidth0, SrcWidth1, SrcWidth2) minus the widths (334, 336) of the overlapping regions 330 and 332. When writing the image frame to memory (e.g., 108), an active output region is defined and only data inside the output active region is written. As shown in FIG. 24, on a write to memory, each stripe is written based on non-overlapping widths of ActiveDst0, ActiveDst1, and ActiveDst2.

As discussed above, the image processing circuitry 32 may receive image data directly from a sensor interface (e.g., 94) or may receive image data from memory 108 (e.g., DMA memory). Where incoming data is provided from memory, the image processing circuitry 32 and the ISP front-end processing logic 80 may be configured to provide for byte swapping, wherein incoming pixel data from memory may be byte swapped before processing. In one embodiment, a swap code may be used to indicate whether adjacent double words, words, half words, or bytes of incoming data from memory are swapped. For instance, referring to FIG. 25, byte swapping may be performed on a 16 byte (bytes 0-15) set of data using a four-bit swap code.

Figure 25:
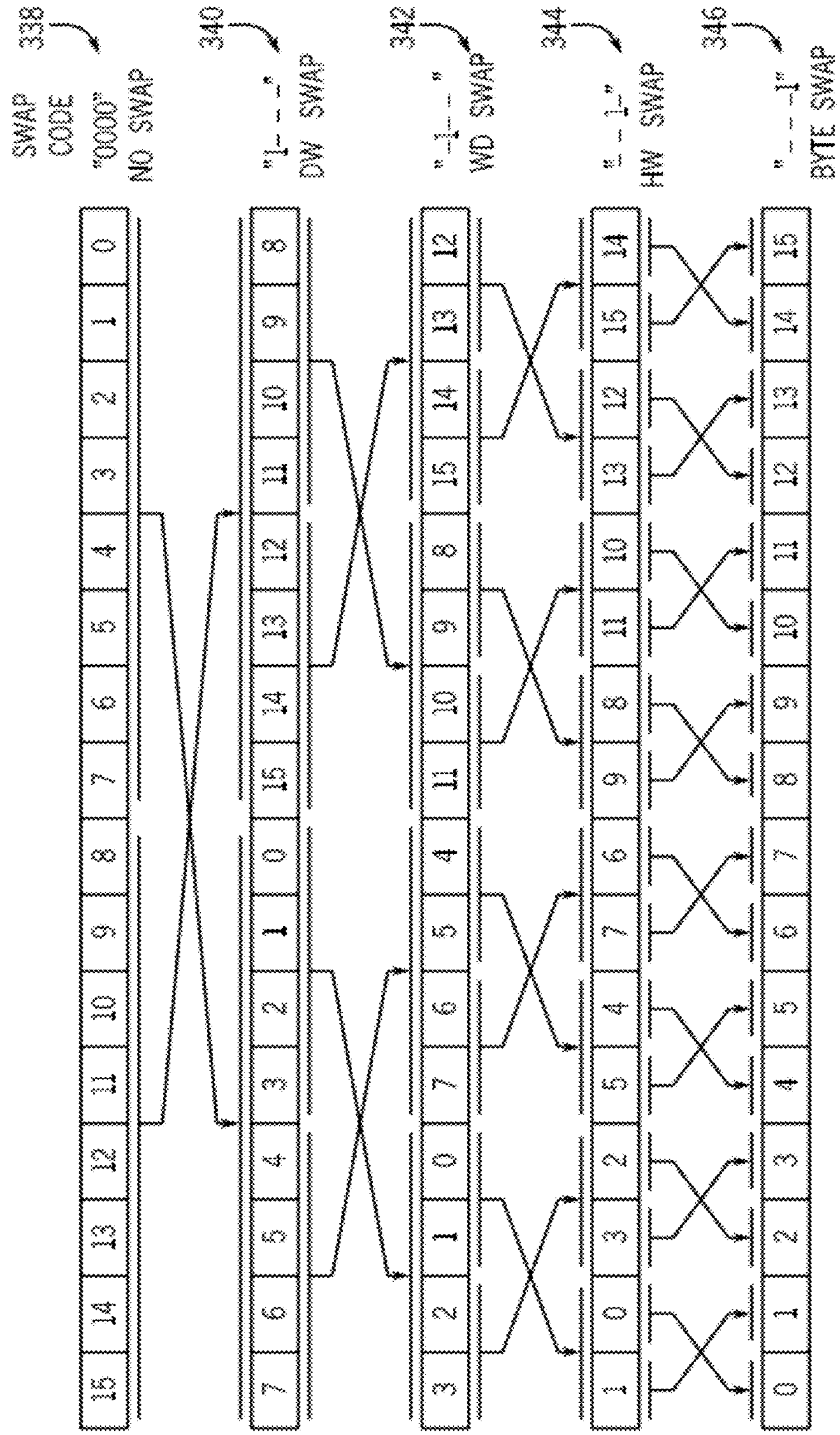
FIG. 25 is a diagram depicting how byte swapping may be applied to incoming image pixel data from memory using a swap code, in accordance with aspects of the present disclosure.

As shown, the swap code may include four bits, which may be referred to as bit3, bit2, bit1, and bit0, from left to right. When all bits are set to 0, as shown by reference number 338, no byte swapping is performed. When bit3 is set to 1, as shown by reference number 340, double words (e.g., 8 bytes) are swapped. For instance, as shown in FIG. 25, the double word represented by bytes 0-7 is swapped with the double word represented by bytes 8-15. If bit2 is set to 1, as shown by reference number 342, word (e.g., 4 bytes) swapping is performed. In the illustrated example, this may result in the word represented by bytes 8-11 being swapped with the word represented by bytes 12-15, and the word represented by bytes 0-3 being swapped with the word represented by bytes 4-7. Similarly, if bit1 is set to 1, as shown by reference number 344, then half word (e.g., 2 bytes) swapping is performed (e.g., bytes 0-1 swapped with bytes 2-3, etc.) and if bit0 is set to 1, as shown by reference number 346, then byte swapping is performed.

In the present embodiment, swapping may be performed in by evaluating bits 3, 2, 1, and 0 of the swap code in an ordered manner. For example, if bits 3 and 2 are set to a value of 1, then double word swapping (bit3) is first performed, followed by word swapping (bit2). Thus, as shown in FIG. 25, when the swap code is set to "1111," the end result is the incoming data being swapped from little endian format to big endian format.

Next, various memory formats for image pixel data that may be supported by the image processing circuitry 32 for raw image data (e.g., Bayer RGB data), RGB color data, and YUV (YCC, luma/chroma data) are discussed in further detail in accordance with certain disclosed embodiments. First, formats for raw image pixels (e.g., Bayer data prior to demosaicing) in a destination/source frame that may be supported by embodiments of the image processing circuitry 32 are discussed. As mentioned, certain embodiments may support processing of image pixels at 8, 10, 12, 14, and 16-bit precision. In the context of raw image data, 8, 10, 12, 14, and 16-bit raw pixel formats may be referred to herein as RAW8, RAW10, RAW12, RAW14, and RAW16 formats, respectively. Examples showing how each of the RAW8, RAW10, RAW12, RAW14, and RAW16 formats may be stored in memory are shown graphically unpacked forms in FIG. 26. For raw image formats having a bit-precision greater than 8 bits (and not being a multiple of 8-bits), the pixel data may also be stored in packed formats. For instance, FIG. 27 shows an example of how RAW10 image pixels may be stored in memory. Similarly, FIG. 28 and FIG. 29 illustrate examples by which RAW12 and RAW14 image pixels may be stored in memory. As will be discussed further below, when image data is being written to/read from memory, a control register associated with the sensor interface 94 may define the destination/source pixel format, whether the pixel is in a packed or unpacked format, addressing format (e.g., linear or tiled), and the swap code. Thus, the manner in which the pixel data is read and interpreted by, the ISP processing circuitry 32 may depend on the pixel format.

Figure 30:
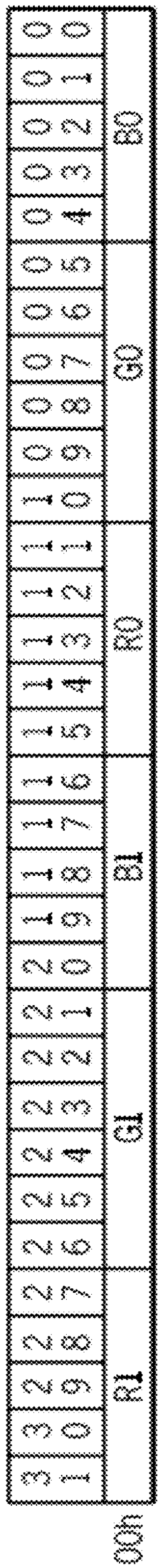

The image signal processing (ISP) circuitry 32 may also support certain formats of RGB color pixels in the sensor interface source/destination frame (e.g., 310). For instance, RGB image frames may be received from the sensor interface (e.g., in embodiments where the sensor interface includes on-board demosaicing logic) and saved to memory 108. In one embodiment, the ISP front-end processing logic 80 (FEProc) may bypass pixel and statistics processing when RGB frames are being received. By way of example only, the image processing circuitry 32 may support the following RGB pixel formats: RGB-565 and RGB-888. An example of how RGB-565 pixel data may be stored in memory is shown in FIG. 30. As illustrated, the RGB-565 format may provide one plane of an interleaved 5-bit red color component, 6-bit green color component, and 5-bit blue color component in RGB order. Thus, 16 bits total may be used to represent an RGB-565 pixel (e.g., {R0, G0, B0} or {R1, G1, B1}).

Figure 31:
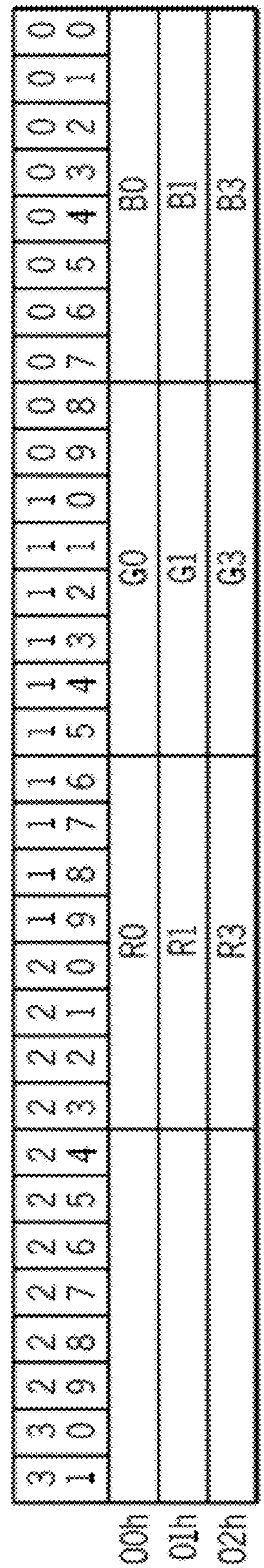

An RGB-888 format, as depicted in FIG. 31, may include one plane of interleaved 8-bit red, green, and blue color components in RGB order. In one embodiment, the ISP circuitry 32 may also support an RGB-666 format, which generally provides one plane of interleaved 6-bit red, green and blue color components in RGB order. In such an embodiment, when an RGB-666 format is selected, the RGB-666 pixel data may be stored in memory using the RGB-888 format shown in FIG. 31, but with each pixel left justified and the two least significant bits (LSB) set as zero.

In certain embodiments, the ISP circuitry 32 may also support RGB pixel formats that allow pixels to have extended range and precision of floating point values. For instance, in one embodiment, the ISP circuitry 32 may support the RGB pixel format shown in FIG. 32, wherein a red (R0), green (G0), and blue (B0) color component is expressed as an 8-bit value, with a shared 8-bit exponent (E0). Thus, in such an embodiment, the actual red (R'), green (G') and blue (B') values defined by R0, G0, B0, and E0 may be expressed as:

$$R'=R0[7:0]*2^{\wedge}E0[7:0]$$

$$G'=G0[7:0]*2^{\wedge}E0[7:0]$$

$$B'=B0[7:0]*2^{\wedge}E0[7:0]$$

This pixel format may be referred to as the RGBE format, which is also sometimes known as the Radiance image pixel format.

FIGS. 33 and 34 illustrate additional RGB pixel formats that may be supported by the ISP circuitry 32. Particularly, FIG. 33 depicts a pixel format that may store 9-bit red, green, and blue components with a 5-bit shared exponent. For instance, the upper eight bits [8:1] of each red, green, and blue pixel are stored in respective bytes in memory. An additional byte is used to store the 5-bit exponent (e.g., E0[4:0]) and the least significant bit [0] of each red, green, and blue pixel. Thus, in such an embodiment, the actual red (R'), green (G') and blue (B') values defined by R0, G0, B0, and E0 may be expressed as:

$$R'=R0[8:0]*2^{\wedge}E0[4:0]$$

$$G'=G0[8:0]*2^{\wedge}E0[4:0]$$

$$B'=B0[8:0]*2^{\wedge}E0[4:0]$$

Further, the pixel format illustrated in FIG. 33 is also flexible in that it may be compatible with the RGB-888 format shown in FIG. 31. For example, in some embodiments, the ISP processing circuitry 32 may process the full RGB values with the exponential component, or may also process only the upper 8-bit portion [7:1] of each RGB color component in a manner similar to the RGB-888 format.

FIG. 34 depicts a pixel format that may store 10-bit red, green, and blue components with a 2-bit shared exponent. For instance, the upper 8-bits [9:2] of each red, green, and blue pixel are stored in respective bytes in memory. An additional byte is used to store the 2-bit exponent (e.g., E0[1:0]) and the least significant 2-bits [1:0] of each red, green, and blue pixel. Thus, in such an embodiment, the actual red (R'), green (G') and blue (B') values defined by R0, G0, B0, and E0 may be expressed as:

$$R'=R0[9:0]*2^{\wedge}E0[1:0]$$

$$G'=G0[9:0]*2^{\wedge}E0[1:0]$$

$$B'=B0[9:0]*2^{\wedge}E0[1:0]$$

Additionally, like the pixel format shown in FIG. 33, the pixel format illustrated in FIG. 34 is also flexible in that it may be compatible with the RGB-888 format shown in FIG. 31. For example, in some embodiments, the ISP processing circuitry 32 may process the full RGB values with the exponential component, or may also process only the upper 8-bit portion (e.g., [9:2]) of each RGB color component in a manner similar to the RGB-888 format.

The ISP circuitry 32 may also further support certain formats of YCbCr (YUV) luma and chroma pixels in the sensor interface source/destination frame (e.g., 310). For instance, YCbCr image frames may be received from the sensor interface (e.g., in embodiments where the sensor interface includes on-board demosaicing logic and logic configured to convert RGB image data into a YCC color space) and saved to memory 108. In one embodiment, the ISP front-end processing logic 80 may bypass pixel and statistics processing when YCbCr frames are being received. By way of example only, the image processing circuitry 32 may support the following YCbCr pixel formats: YCbCr-4:2:0 8, 2, plane; and YCbCr-4:2:2 8, 1 plane.

Figure 35:
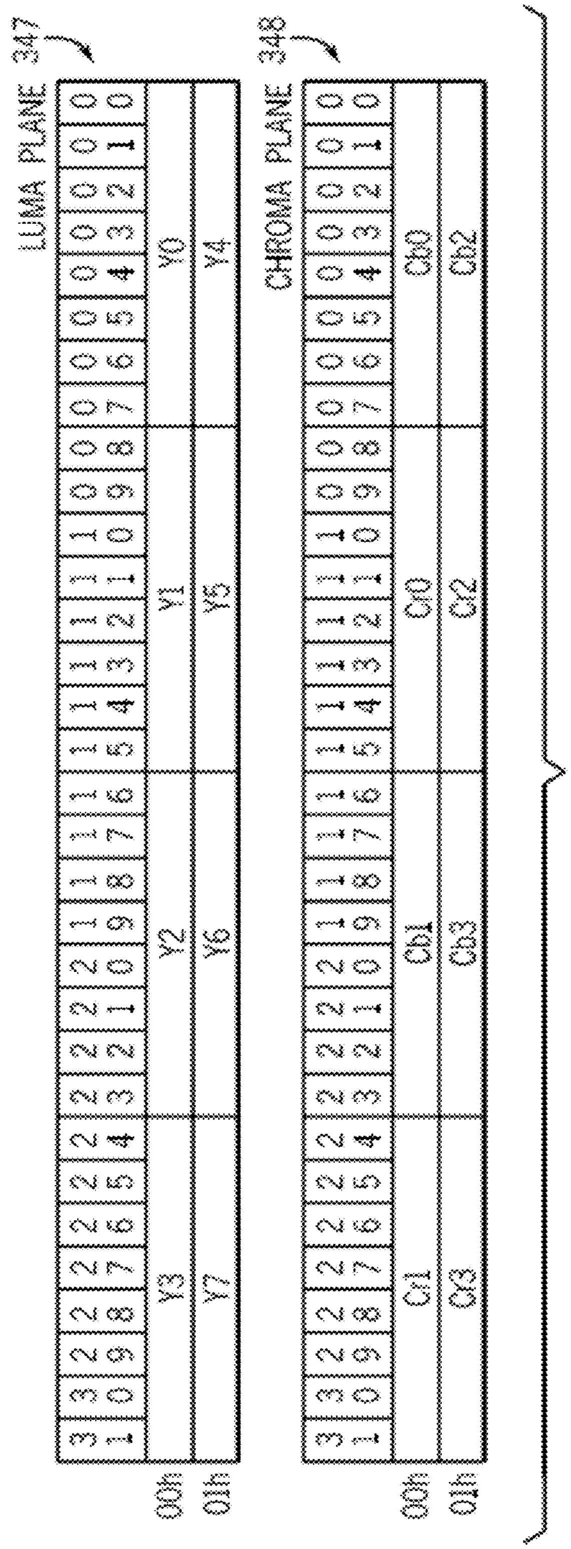
FIGS. 35-36 show examples of memory formats for luma/chroma image data (YUV/YC1C2) that may be supported by the image processing circuitry of FIG. 7 or FIG. 8, in accordance with embodiments of the present disclosure.
Figure 36:
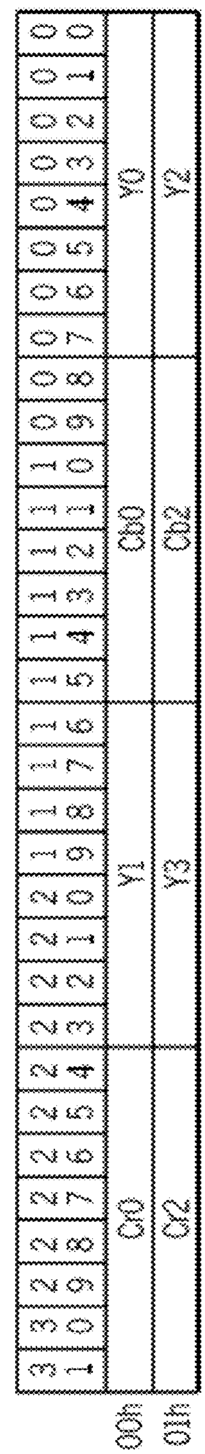

The YCbCr-4:2:0, 2 plane pixel format may provide two separate image planes in memory, one for luma pixels (Y) and one for chroma pixels (Cb, Cr), wherein the chroma plane interleaves the Cb and Cr pixel samples. Additionally, the chroma plane may be sub-sampled by one-half in both the horizontal (x) and vertical (y) directions. An example showing how YCbCr-4:2:0, 2 plane, data may be stored in memory is shown in FIG. 35, which depicts a luma plane 347 for storing the luma (Y) samples and a chroma plane 348 for storing chroma (Cb, Cr) samples. A YCbCr-4:2:2 8, 1 plane, format, which is shown in FIG. 36, may include one image plane of interleaved luma (Y) and chroma (Cb, Cr) pixel samples, with the chroma samples being sub-sampled by one-half both the horizontal (x) and vertical (y) directions. In some embodiment, the ISP circuitry 32 may also support 10-bit YCbCr pixel formats by saving the pixel samples to memory using the above-described 8-bit format with rounding (e.g., the two least significant bits of the 10-bit data are rounded off). Further, as will be appreciated, YC1C2 values may also be stored using any of the RGB pixel formats discussed above in FIGS. 30-34, wherein each of the Y, C1, and C2 components are stored in a manner analogous to an R, G, and B component.

Referring back to the ISP front-end processing logic 80 shown in FIG. 10, various read and write channels to memory 108 are provided. In one embodiment, the read/write channels may share a common data bus, which may be provided using Advanced Microcontroller Bus Architecture, such as an Advanced Extensible Interface (AXI) bus, or any other suitable type of bus (AHB, ASB, APB, ATB, etc.). Depending on the image frame information (e.g., pixel format, address format, packing method) which, as discussed above, may be determined via a control register, an address generation block, which may be implemented as part of the control logic 84, may be configured to provide address and burst size information to the bus interface. By way of example the address calculation may depend various parameters, such as whether the pixel data is packed or unpacked, the pixel data format (e.g., RAW8, RAW10, RAW12, RAW14, RAW16, RGB, or YCbCr/YUV formats), whether tiled or linear addressing format is used, x- and y-offsets of the image frame data relative to the memory array, as well as frame width, height, and stride. Further parameters that may be used in calculation pixel addresses may include minimum pixel unit values (MPU), offset masks, a byte per MPU value (BPPU), and a Log 2 of MPU value (L2MPU). Table 4, which is shown below, illustrates the aforementioned parameters for packed and unpacked pixel formats, in accordance with one embodiment.

TABLE 4

Pixel Address Calculation Parameters (MPU, L2MPU, BPPU)

| Format | | MPU (Minimum Pixel Unit) | L2MPU (Log2 of MPU) | OffsetMask | BPPU (Bytes Per MPU) |
|---|---|---|---|---|---|
| RAW8 | Unpacked | 1 | 0 | 0 | 1 |
| RAW16 | Unpacked | 1 | 0 | 0 | 2 |
| RAW10 | Packed | 4 | 2 | 3 | 5 |
| | Unpacked | 1 | 0 | 0 | 2 |
| RAW12 | Packed | 4 | 2 | 3 | 6 |
| | Unpacked | 1 | 0 | 0 | 2 |
| RAW14 | Packed | 4 | 2 | 3 | 7 |
| | Unpacked | 1 | 0 | 0 | 2 |
| RGB-888 | | 1 | 0 | 0 | 4 |
| RGB-666 | | 1 | 0 | 0 | 4 |
| RGB-565 | | 1 | 0 | 0 | 2 |
| YUV-4:2:0 (8-bit) | | 2 | 1 | 0 | 2 |
| YUV-4:2:0 (10-bit) | | 2 | 1 | 0 | 2 |
| YUV-4:2:2 (8-bit) | | 2 | 1 | 0 | 4 |
| YUV-4:2:2 (10-bit) | | 2 | 1 | 0 | 4 |

As will be understood, the MPU and BPPU settings allow the ISP circuitry 32 to assess the number of pixels that need to be read in order to read one pixel, even if not all of the read data is needed. That is, the MPU and BPPU settings may allow the ISP circuitry 32 read in pixel data formats that are both aligned with (e.g., a multiple of 8 bits (1 byte) is used to store a pixel value) and unaligned with memory byte (e.g., pixel values are stored using fewer or greater than a multiple of 8 bits (1 byte), i.e., RAW10, RAW12, etc.).

Figure 37:
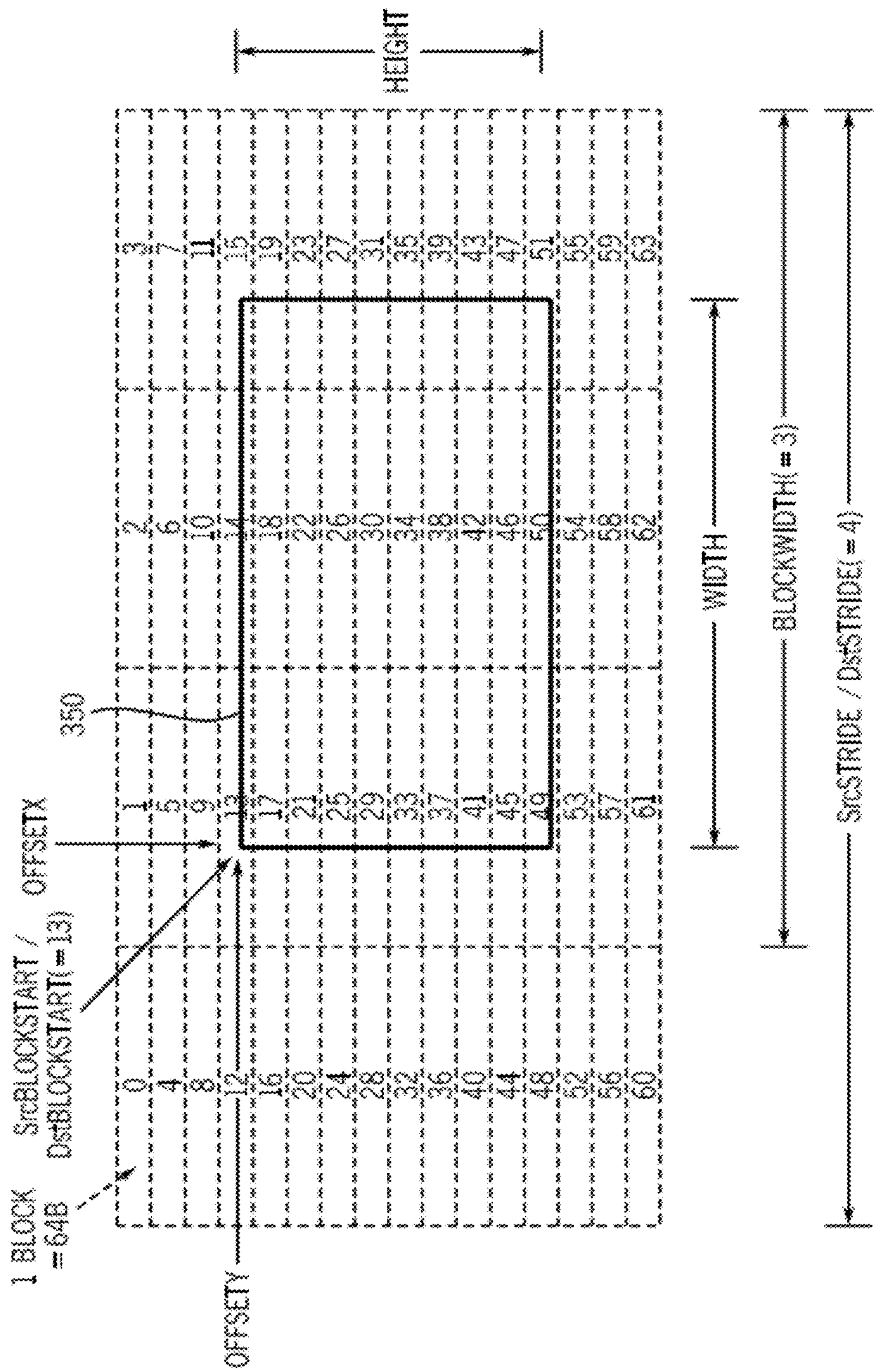
FIG. 37 shows an example of how to determine a frame location in memory in a linear addressing format, in accordance with aspects of the present disclosure.

Referring to FIG. 37, an example showing the location of an image frame 350 stored in memory under linear addressing is illustrated, which each block representing 64 bytes (as discussed above in FIG. 21). In one embodiment, the following pseudo-code illustrates a process that may be implemented by the control logic to identify a starting block and block width of the stored frame in linear addressing:

```
BlockWidth = LastBlockX − BlockOffsetX + 1; wherein
BlockOffsetX = (((OffsetX >> L2MPU) * BPPU ) >> 6)
LastBlockX = ((((OffsetX + Width − 1) >> L2MPU) * BPPU +
            BPPU − 1) >> 6)
BlockStart = OffsetY * Stride + BlockOffsetX
```

wherein Stride represents the frame strides in bytes and is a multiple of 64. For example, in FIG. 37, the SrcStride and DstStride is 4, meaning 4 blocks of 64 bytes. Referring to Table 4 above, the values for L2MPU and BPPU may depend on the format of the pixels in the frame 350. As shown, once BlockOffsetX is known, BlockStart may be determined. BlockWidth may subsequently be determined using BlockOffsetX and LastBlockX, which may be determined using the values of L2MPU and BPPU corresponding to the pixel format of the frame 350.

Figure 38:
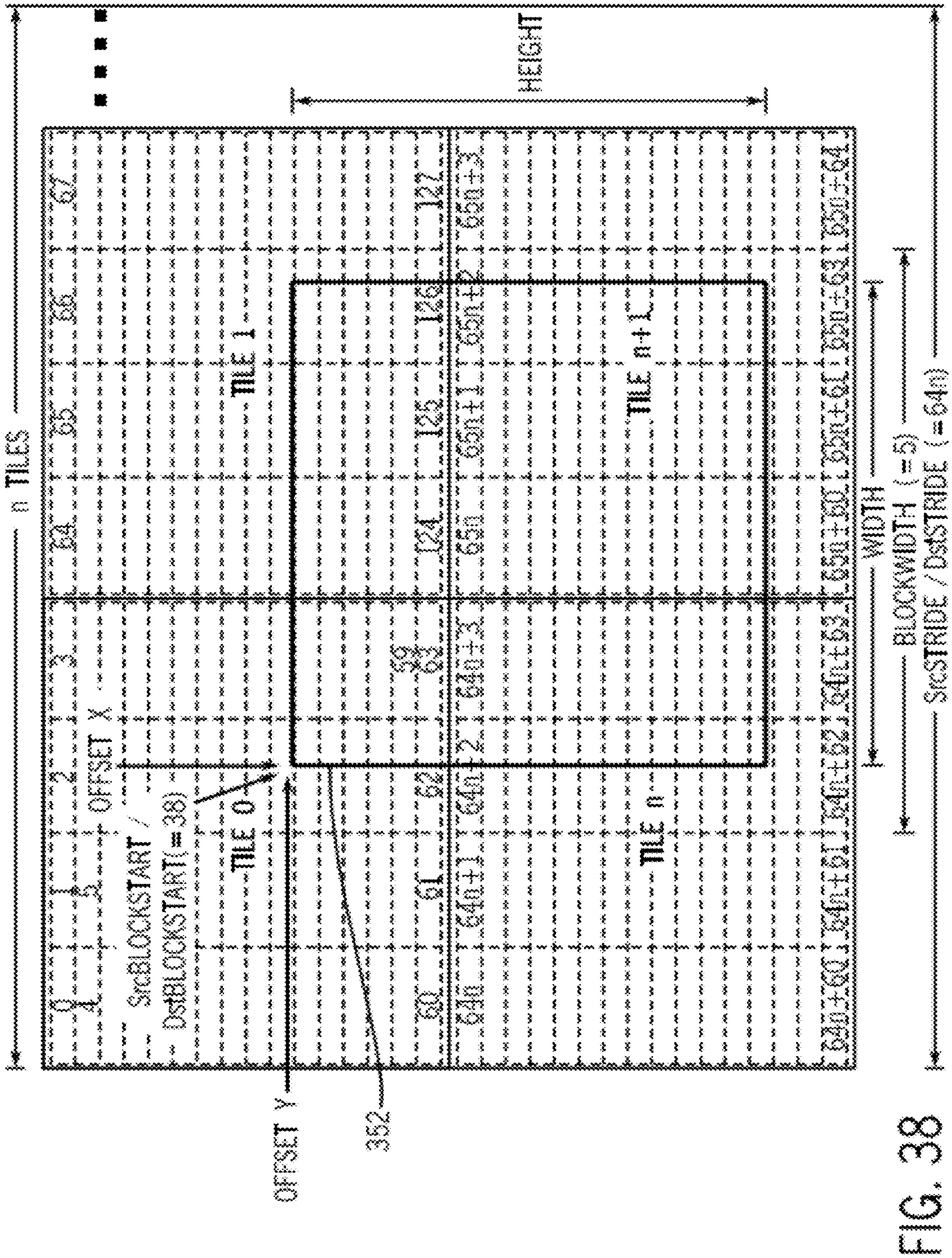
FIG. 38 shows an example of how to determine a frame location in memory in a tile addressing format, in accordance with aspects of the present disclosure

A similar example under tiled addressing is depicted in FIG. 38, wherein the source image frame, referred to here by reference number 352, is stored in memory and overlaps a portion of Tile0, Tile 1, Tile n, and Tile n+1. In one embodiment, the following pseudo-code illustrates a process that may be implemented by the control logic to identify a starting block and block width of the stored frame in tiled addressing

```
BlockWidth = LastBlockX − BlockOffsetX + 1; wherein
BlockOffsetX = (((OffsetX >> L2MPU) * BPPU ) >> 6)
LastBlockX = ((((OffsetX + Width − 1) >> L2MPU) * BPPU +
            BPPU − 1) >> 6)
BlockStart = ((OffsetY >> 4) * (Stride >> 6) +
            (BlockOffsetX >> 2) * 64 + OffsetY[3:0] * 4 +
            (BlockOffsetX[1:0])
```

In the above-depicted calculation, the expression "(OffsetY>>4)*(Stride>>6)" may represent the number of blocks to get to tile row in which the image frame is located in memory. The expression "(BlockOffsetX>>2)*64" may represent the number of blocks that the stored image frame is offset in the x-direction. The expression "OffsetY[3:0]*4" may represent the number of blocks to get to a row within a tile in which the starting address of the image frame is located. Further, the expression "BlockOffsetX[1:0]" may represent the number of blocks to get to an x-offset within a tile corresponding to the starting address of the image frame. Additionally, in the embodiment illustrated in FIG. 38, the number of blocks for each tile (BlocksPerTile) may be 64 blocks, and the number of bytes per block (BytesPerBlock) may be 64 bytes.

As shown above in Table 4, for pixels stored in RAW10, RAW12 and RAW14 packed formats, four pixels make a minimum pixel unit (MPU) of five, six, or seven bytes (BPPU), respectively. For instance, referring to the RAW10 pixel format example shown in FIG. 27, an MPU of four pixels P0-P3 includes 5 bytes, wherein the upper 8 bits of each of the pixels P0-P3 are stored in four respective bytes, and the lower 2 bytes of each of the pixels are stored in bits 0-7 of the 32-bit address 01h. Similarly, referring back to FIG. 28, an MPU of four pixels P0-P3 using the RAW12 format includes 6 bytes, with the lower 4 bits of pixels P0 and P1 being stored in the byte corresponding to bits 16-23 of address 00h and the lower 4 bits of pixels P2 and P3 being stored in the byte corresponding to bits 8-15 of address 01h. FIG. 29 shows an MPU of four pixels P0-P3 using the RAW14 format as including 7 bytes, with 4 bytes for storing the upper 8 bits of each pixel of the MPU and 3 bytes for storing the lower 6 bits of each pixel of the MPU.

Using these pixel formats, it is possible at the end of a frame line to have a partial MPU where less than four pixels of the MPU are used (e.g., when the line width modulo four is non-zero). When reading a partial MPU, unused pixels may be ignored. Similarly, when writing a partial MPU to a destination frame, unused pixels may be written with a value of zero. Further, in some instances, the last MPU of a frame line may not align to a 64-byte block boundary. In one embodiment, bytes after the last MPU and up to the end of the last 64-byte block are not written.

In accordance with embodiments of the present disclosure, the ISP processing circuitry 32 may also be configured to provide overflow handling. For instance, an overflow condition (also referred to as "overrun") may occur in certain situations where the ISP front-end processing logic 80 receives back-pressure from its own internal processing units, from downstream processing units (e.g., the ISP pipeline 82 and/or ISP back-end processing logic 120), or from a destination memory (e.g., where the image data is to be written). Overflow conditions may occur when pixel data is being read in (e.g., either from the sensor interface or memory) faster than one or more processing blocks is able to process the data, or faster than the data may be written to a destination (e.g., memory 108).

As will be discussed further below, reading and writing to memory may contribute to overflow conditions. However, since the input data is stored, in the case of an overflow condition, the ISP circuitry 32 may simply stall the reading of the input data until the overflow condition recovers. However, when image data is being read directly from an image sensor, the "live" data generally cannot be stalled, as the image sensor is generally acquiring the image data in real time. For instance, the image sensor (e.g., 90) may operate in accordance with a timing signal based upon its own internal clock and may be configured to output image frames at a certain frame rate, such as 15 or 30 frames per second (fps). The sensor inputs to the ISP circuitry 32 and memory 108 may thus include input queues which may buffer the incoming image data before it is processed (by the ISP circuitry 32) or written to memory (e.g., 108). Accordingly, if image data is being received at the input queue faster than it can be read out of the queue and processed or stored (e.g., written to memory), an overflow condition may occur. That is, if the buffers/queues are full, additional incoming pixels cannot be buffered and, depending on the overflow handling technique implemented, may be dropped.

Figure 39:
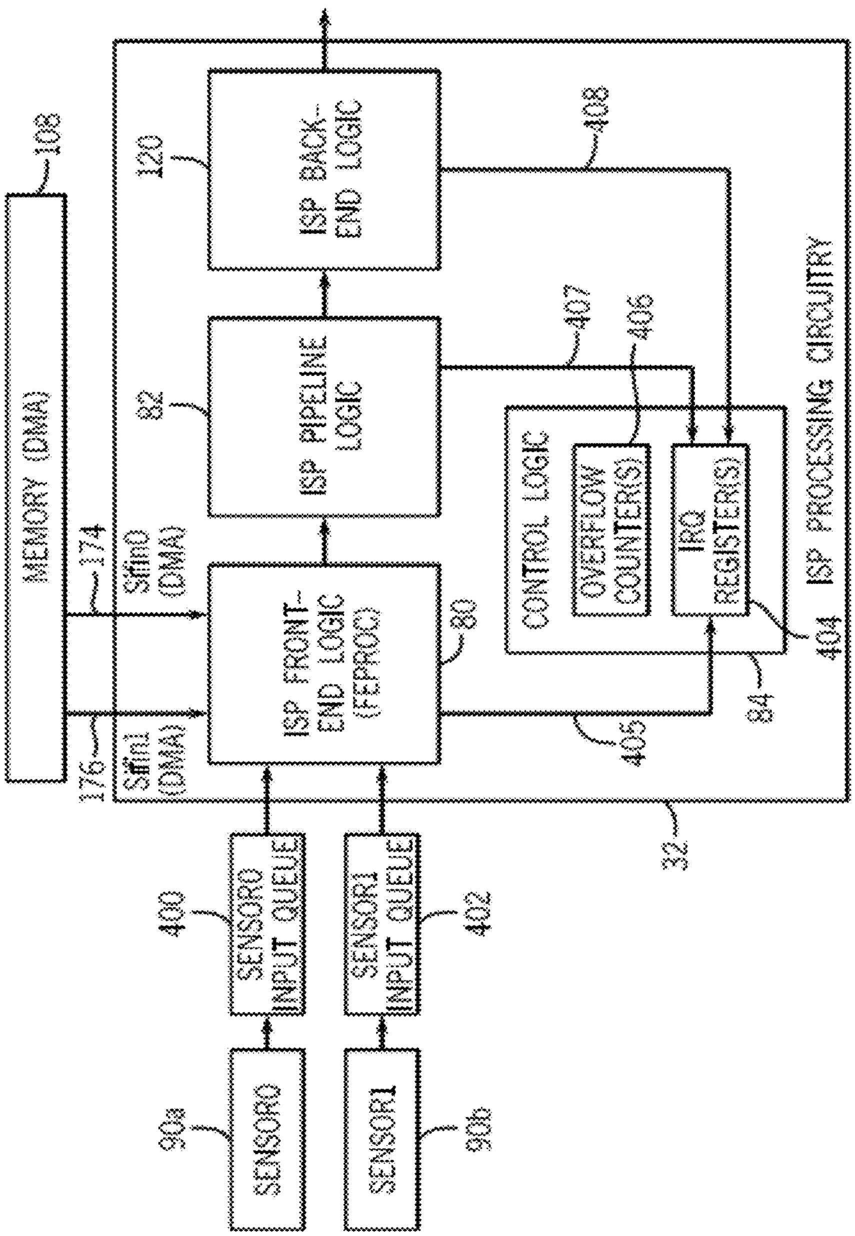
FIG. 39 is a block diagram of the ISP circuitry of FIG. 8 depicting how overflow handling may be performed, in accordance with an embodiment of the present disclosure.

FIG. 39 shows a block diagram of the ISP processing circuitry 32, and focuses on features of the control logic 84 that may provide for overflow handling in accordance with one embodiment. As illustrated, image data associated with Sensor0 90*a* and Sensor1 90*b* may be read in from memory 108 (by way of interfaces 174 and 176, respectively) to the ISP front-end processing logic 80 (FEProc), or may be provided to the ISP front-end processing logic 80 directly from the respective sensor interfaces. In the latter case, incoming pixel data from the image sensors 90*a* and 90*b* may be passed to input queues 400 and 402, respectively, before being sent to the ISP front-end processing logic 80.

When an overflow condition occurs, the processing block(s) (e.g., blocks 80, 82, or 120) or memory (e.g., 108) in which the overflow occurred may provide a signal (as indicated by signals 405, 407, and 408) to set a bit in an interrupt request (IRQ) register 404. In the present embodiment, the IRQ register 404 may be implemented as part of the control logic 84. Additionally, separate IRQ registers 404 may be implemented for each of Sensor0 image data and Sensor1 image data. Based on the value stored in the IRQ register 404, the control logic 84 may be able to determine which logic units within the ISP processing blocks 80, 82, 120 or memory 108 generated the overflow condition. The logic units may be referred to as "destination units," as they may constitute destinations to which pixel data is sent. Based on the overflow conditions, the control logic 84 may also (e.g., through firmware/software handling) govern which frames are dropped (e.g., either not written to memory or not output to the display for viewing).

Once an overflow condition is detected, the manner in which overflow handling is carried may depend on whether the ISP front-end is reading pixel data from memory 108 or from the image sensor input queues (e.g., buffers) 400, 402, which may be first-in-first-out (FIFO) queues in one embodiment. In one embodiment, when input pixel data is read from memory 108 through, for example, an associated DMA interface (e.g., 174 or 176), the ISP-front-end will stall the reading of the pixel data if it receives back-pressure as a result of an overflow condition being detected (e.g., via control logic 84 using the IRQ register 404) from any downstream destination blocks which may include the ISP pipeline 82, the ISP back-end processing logic 120, or the memory 108 in instances where the output of the ISP front-end logic 80 is written to memory 108. In this scenario, the control logic 84 may prevent overflow by stopping the reading of the pixel data from memory 108 until the overflow condition recovers. For instance, overflow recovery may be signaled when a downstream unit causing the overflow condition sets a corresponding bit in the IRQ register 404 indicating that overflow is no longer occurring. An embodiment of this process is generally illustrated by steps 412-420 of the method 410 of FIG. 40.

While overflow conditions may generally be monitored at the sensor input queues, it should be understood that many additional queues may be present between processing units of the ISP sub-system 32 (e.g., including internal units of the ISP front-end logic 80, the ISP pipeline 82, as well as the ISP back-end logic 120). Additionally, the various internal units of the ISP sub-system 32 may also include line buffers, which may also function as queues. Thus, all the queues and line buffers of the ISP sub-system 32 may provide buffering. Accordingly, when the last processing block in a particular chain of processing blocks is full (e.g., its line buffers and any intermediate queues are full), back-pressure may be applied to the preceding (e.g., upstream) processing block and so forth, such that the back-pressure propagates up through the chain of logic until it reaches the sensor interface, where overflow conditions may be monitored. Thus, when an overflow occurs at the sensor interface, it may mean that all the downstream queues and line buffers are full.

Figure 40:
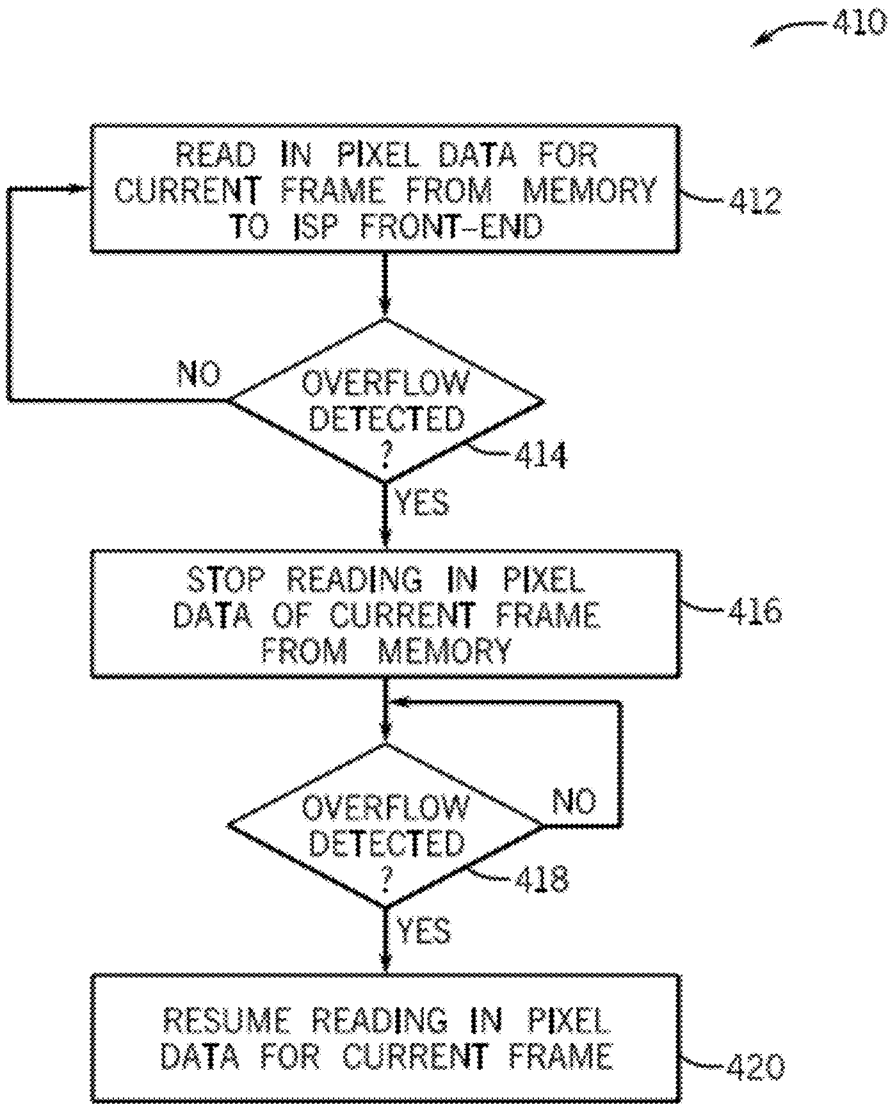
FIG. 40 is a flow chart depicting a method for overflow handling when an overflow condition occurs while image pixel data is being read from picture memory, in accordance with aspects of the present disclosure.

As shown in FIG. 40, the method 410 begins at block 412, at which pixel data for a current from is read from memory to the ISP front-end processing unit 80. Decision logic 414 then determines whether an overflow condition is present. As discussed above, this may be assessed by determining the state of bits in the IRQ register(s) 404. If no overflow condition is detected, then the method 410 returns to step 412 and continues to read in pixels from the current frame. If an overflow condition is detected by decision logic 414, the method 410 stops reading pixels of the current frame from memory, as shown at block 416. Next, at decision logic 418, it is determined whether the overflow condition has recovered. If the overflow condition still persists, the method 410 waits at decision logic 418 until the overflow condition recovers. If decision logic 418 indicates that the overflow condition has recovered, then the method 410 proceeds to block 420 and resumes reading pixel data for the current frame from memory.

When an overflow condition occurs while input pixel data is being read in from the sensor interface(s), interrupts may indicate which downstream units (e.g., processing blocks or destination memory) generated the overflow. In one embodiment, overflow handling may be provided based on two scenarios. In a first scenario, the overflow condition occurs during an image frame, but recovers prior to the start of the subsequent image frame. In this case, input pixels from the image sensor are dropped until the overflow condition recovers and space becomes available in the input queue corresponding to the image sensor. The control logic 84 may provide a counter 406 which may keep track of the number of dropped pixels and/or dropped frames. When the overflow condition recovers, the dropped pixels may be replaced with undefined pixel values (e.g., all 1's (e.g., 11111111111111 for an 14-bit pixel value), all 0's, or a value programmed into a data register that sets what the undefined pixel values are), and downstream processing may resume. In a further embodiment, the dropped pixels may be replaced with a previous non-overflow pixel (e.g., the last "good" pixel read into the input buffer). This ensures that a correct number of pixels (e.g., a number of pixels corresponding to the number of pixels expected in a complete frame) is sent to the ISP front-end processing logic 80, thus enabling the ISP front-end processing logic 80 to output the correct number of pixels for the frame that was being read in from the sensor input queue when the overflow occurred.

While the correct number of pixels may be output by the ISP front-end under this first scenario, depending on the number of pixels that were dropped and replaced during the overflow condition, software handling (e.g., firmware), which may be implemented as part of the control logic 84, may choose to drop (e.g., exclude) the frame from being sent to the display and/or written to memory. Such a determination may be based, for example, upon the value of the dropped pixel counter 406 compared to an acceptable dropped pixel threshold value. For instance, if an overflow condition occurs only briefly during the frame such that only a relatively small amount of pixels are dropped (e.g., and replaced with undefined or dummy values; e.g., 10-20 pixels or less), then the control logic 84 may choose to display and/or store this image despite the small number of dropped pixels, even though the presence of the replacement pixels may appear very briefly as a minor artifact in the resulting image. However, due to the small number of replacement pixels, such an artifact may go generally unnoticed or marginally perceivable by a user. That is, the presence any such artifacts due to the undefined pixels from the brief overflow condition may not significantly degrade the aesthetic quality of the image (e.g., any such degradation is minimal or negligible to the human eye).

In a second scenario, the overflow condition may remain present into the start of the subsequent image frame. In this case, the pixels of the current frame are also dropped and counted like the first scenario described above. However, if an overflow condition is still present upon detecting a VSYNC rising edge (e.g., indicating the start of a subsequent frame), the ISP front-end processing logic 80 may be configured to hold off the next frame, thus dropping the entire next frame. In this scenario, the next frame and subsequent frames will continue to be dropped until overflow recovers. Once the overflow recovers, the previously current frame (e.g., the frame being read when the overflow was first detected) may replace its dropped pixels with the undefined pixel values, thus allowing the ISP front-end logic 80 to output the correct number of pixels for that frame. Thereafter, downstream processing may resume. As for the dropped frames, the control logic 84 may further include a counter that counts the number of dropped frames. This data may be used to adjust timings for audio-video synchronization. For instance, for video captured at 30 fps, each frame has a duration of approximately 33 milliseconds. Thus, if three frames are dropped due to overflow, then the control logic 84 may be configured to adjust audio-video synchronization parameters to account for the approximately 99 millisecond (33 milliseconds×3 frames) duration attributable to the dropped frames. For instance, to compensate for time attributable due to the dropped frames, the control logic 84 may control image output by repeating one or more previous frames.

Figure 41:
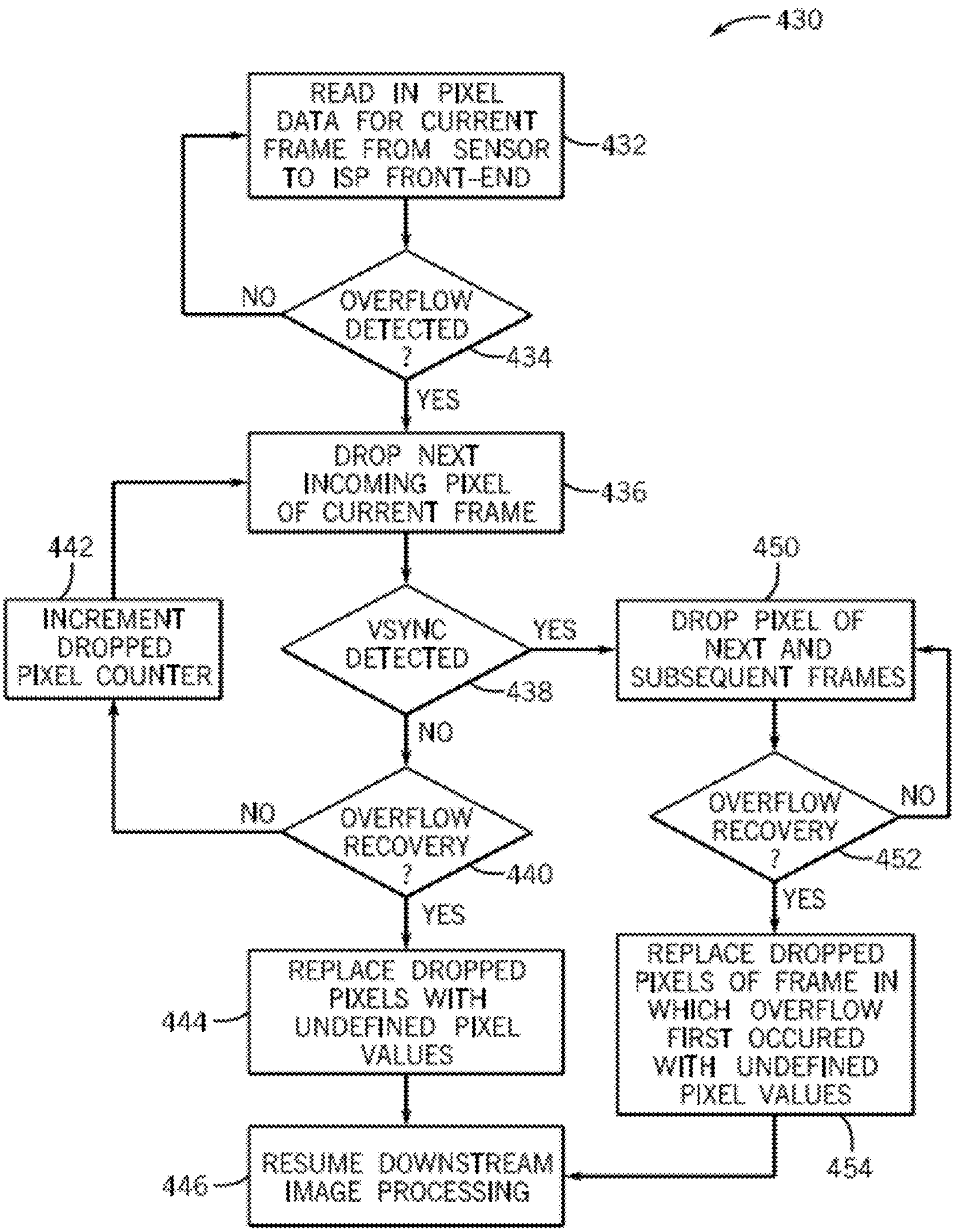
FIG. 41 is a flow chart depicting a method for overflow handling when an overflow condition occurs while image pixel data is being read in from an image sensor interface, in accordance with one embodiment of the present disclosure.

An embodiment of a process 430 showing the above-discussed scenarios that may occur when input pixel data is being read from the sensor interfaces is illustrated in FIG. 41. As shown, the method 430 begins at block 432, at which pixel data for a current frame is read in from the sensor to the ISP front-end processing unit 80. Decision logic 434 then determines whether an overflow condition exists. If there is no overflow, the method 430 continues to read in pixels of the current frame (e.g., returns to block 432). If decision logic 434 determines that an overflow condition is present, then the method 430 continues to block 436, where the next incoming pixel of the current frame is dropped. Next, decision logic 438 determines whether the current frame has ended and the next frame has begun. For instance, in one embodiment, this may include detecting a rising edge in the VSYNC signal. If the sensor is still sending the current frame, the method 430 continues to decision logic 440, which determines whether the overflow condition originally detected at logic 434 is still present. If the overflow condition has not recovered, then the method 430 proceeds to block 442, at which the dropped pixel counter is incremented (e.g., to account for the incoming pixel dropped at block 436). The method then returns to block 436 and continues.

If at decision logic 438, it is detected that the current frame has ended and that the sensor is sending the next frame (e.g., VSYNC rising detected), then the method 430 proceeds to block 450, and the all pixels of the next frame, and subsequent frames are dropped as long as the overflow condition remains (e.g., shown by decision logic 452). As discussed above, a separate counter may track the number of dropped frames, which may be used to adjust audio-video synchronization parameters. If decision logic 452 indicates that the overflow condition has recovered, then the dropped pixels from the initial frame in which the overflow condition first occurred are replaced with a number of undefined pixel values corresponding to the number of dropped pixels from that initial frame, as indicated by the dropped pixel counter. As mentioned above, the undefined pixel values may be all 1's all 0's, a replacement value programmed into a data register, or may take the value of a previous pixel that was read prior to the overflow condition (e.g., the last pixel read before the overflow condition was detected). Accordingly, this allows the initial frame to be processed with the correct number of pixels and, at block 446, downstream image processing may continue, which may include writing the initial frame to memory. As also discussed above, depending on the number of pixels that were dropped in the frame, the control logic 84 may either choose to exclude or include the frame when outputting video data (e.g., if the number of dropped pixels is above or below an acceptable dropped pixel threshold). As will be appreciated, overflow handling may be performed separately for each input queue 400 and 402 of the ISP sub-system 32.

Figure 42:
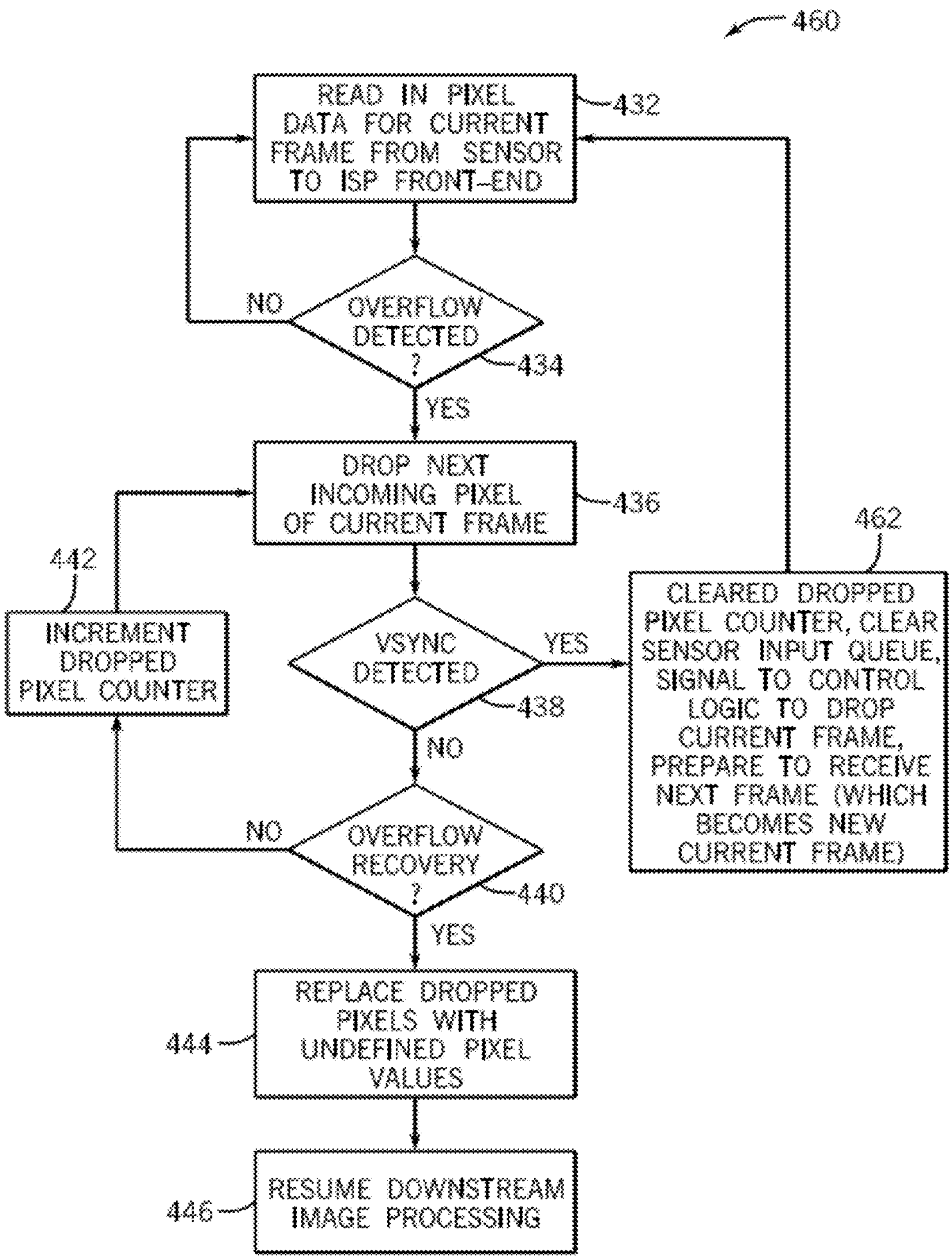
FIG. 42 is a flow chart depicting another method for overflow handling when an overflow condition occurs while image pixel data is being read in from an image sensor interface, in accordance a further embodiment of the present disclosure.

Another embodiment of overflow handling that may be implemented in accordance with the present disclosure is shown in FIG. 42 by way of a flowchart depicting method 460. Here, overflow handling for an overflow condition that occurs during a current frame but recovers prior to the end of a current frame is handled in the same manner as shown in FIG. 41 and, therefore, those steps have thus been numbered with like reference numbers 432-446. The difference between the method 460 of FIG. 42 and the method 430 of FIG. 41 pertains to overflow handling when an overflow condition continues into the next frame. For instance, referring to decision logic 438, when the overflow condition continues into the next frame, rather than drop the next frame as in the method 430 of FIG. 41, the method 460 implements block 462, in which the dropped pixel counter is cleared, the sensor input queue is cleared, and the control logic 84 is signaled to drop the partial current frame. By clearing the sensor input queue and dropped pixel counter, the method 460 prepares to acquire the next frame (which now becomes the current frame), returning the method to block 432. As will be appreciated, pixels for this current frame may be read into the sensor input queue. If the overflow condition recovers before the input queue becomes full, then downstream processing resumes. However, if the overflow condition persists, the method 460 will continue from block 436 (e.g., begin dropping pixels until overflow either recovers or the next frame starts).

Figure 43:
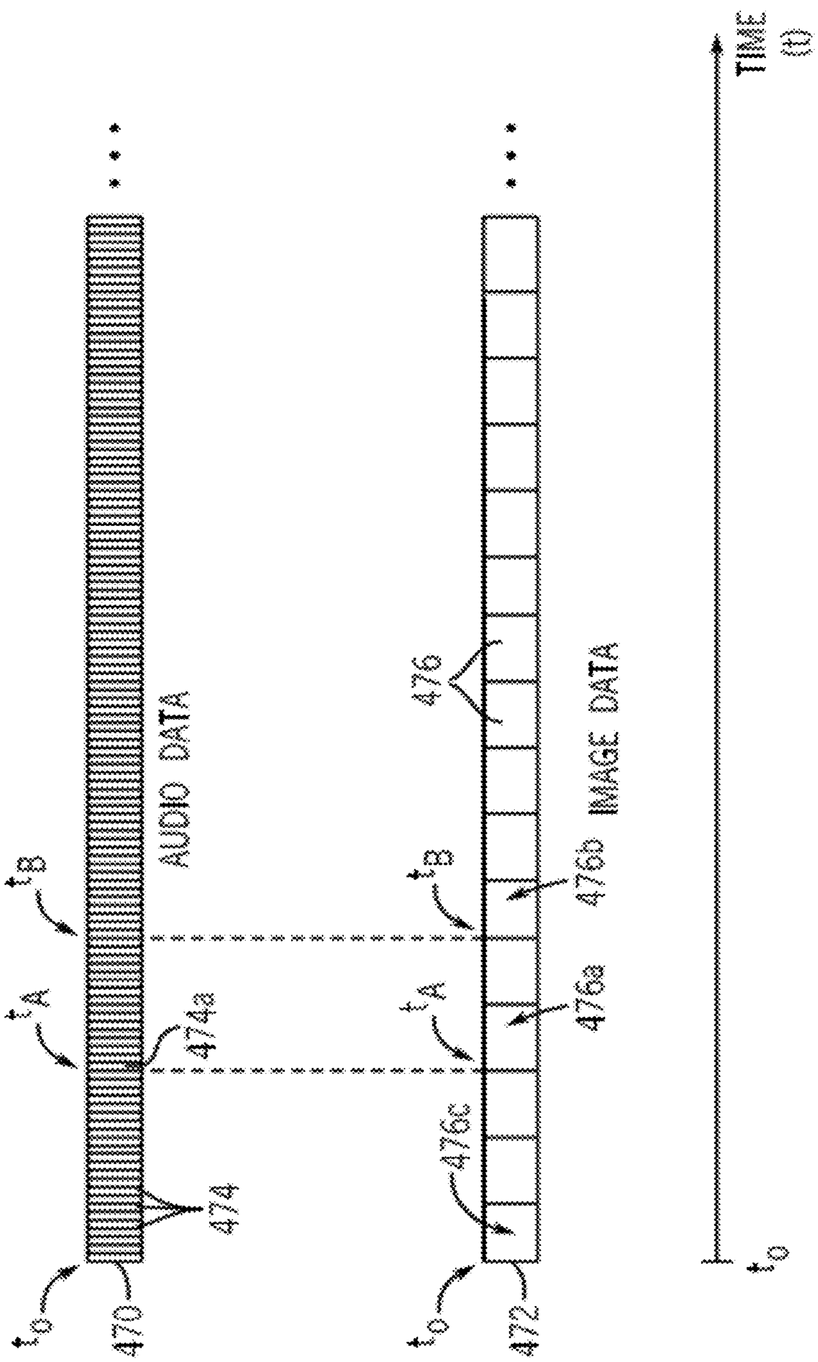
FIG. 43 provides a graphical depiction of image (e.g., video) and corresponding audio data that may be captured and stored by the electronic device of FIG. 1.

As mentioned above, the electronic device 10 may also provide for the capture of audio data (e.g., via an audio capture device provided as one of input structures 14) concurrently with image data (e.g., via imaging device 30 having image sensors 90). For instance, as shown diagrammatically in FIG. 43, audio data 470 and image data 472 may represent video and audio data captured concurrently by the electronic device. The audio data 470 may include audio samples 474 captured over time (t) and, similarly, the image data 472 may represent a series of image frames captured over time t. Each sample of the image data 472, referred to here by reference number 476, may represent a still image frame. Thus, when the still image frames are viewed on chronological succession over time (e.g., a particular number of frames per second, such as 15-30 frames per second), a viewer will perceive the appearance of a moving image, thus providing video data. When the audio data 470 is acquired and represented as digital data, it may be stored as binary values representing samples (e.g., 474) of the amplitude of the audio signal at equal time intervals. Further, though shown in FIG. 43 as having discrete divisions 474, it should be appreciated that audio data, in a practical implementation, may have a sample rate that is sufficiently fast that the human ear perceives the audio data 470 as continuous sound.

During playback of the video data 472, the corresponding audio data 470 may also be played back, thus allowing a viewer to not only view video data of a captured event, but to also hear sound corresponding to the captured event. Ideally, the video data 472 and audio data 470 are played back in a synchronized manner. For instance, if the audio sample designated here as 474*a* originally occurred at time $t_A$ then, under ideal playback conditions, an image frame originally captured at time $t_A$ is output concurrently with the audio sample 474*a*. However, if synchronization is not achieved, the viewer/listener may notice a time delay or shift between the audio and video data. For instance, suppose that the audio sample 474*a* is output with an image frame 476*c* originally captured at time $t_0$, which is chronologically earlier than time $t_A$. In this case, the audio data 470 is "ahead" of the video data 472, and the user may experience a delay between hearing the audio sample from time $t_A$ and seeing its expected corresponding video sample (image frame 476*a* from time $t_A$), the delay being the difference between times $t_A$ and $t_0$). Similarly, suppose that the audio sample 474*a* is output with an image frame 476*b* from time $t_B$, which is chronologically later than time $t_A$. In the latter case, the audio data 470 is "behind" the video data 472, and the user may experience a delay between seeing the video sample (476*a*) at time $t_A$ and hearing its corresponding audio sample from time $t_A$, the delay being the different between times $t_A$ and $t_B$). These types of delays are sometimes referred to as "lip-sync" error. As will be appreciated, the latter two scenarios may negatively affect the user experience. To achieve audio-video synchronization, a system is generally configured such that any compensation for synchronization issues prioritizes audio over video, e.g., if a synchronization issue is present, image frames may be dropped or repeated without altering audio.

In some conventional systems, synchronization of audio and video data is performed using start of frame interrupts (e.g., based on VSYNC signal). When such an interrupt occurs, indicating the start of a new frame, a processor may execute an interrupt service routine to service the interrupt (e.g., clear bits), and a timestamp corresponding to when the interrupt is serviced by the processor is associated with that frame. As will be appreciated, there is generally some latency between interrupt request and the time in which the interrupt is serviced by the processor. Thus, a timestamp that is associated with a particular image frame may reflect this latency, and thus may not actually represent the precise time at which the frame actually started. Additionally, this latency may be variable depending on processor load and bandwidth, which may further complicate audio-video synchronization issues.

Figure 44:
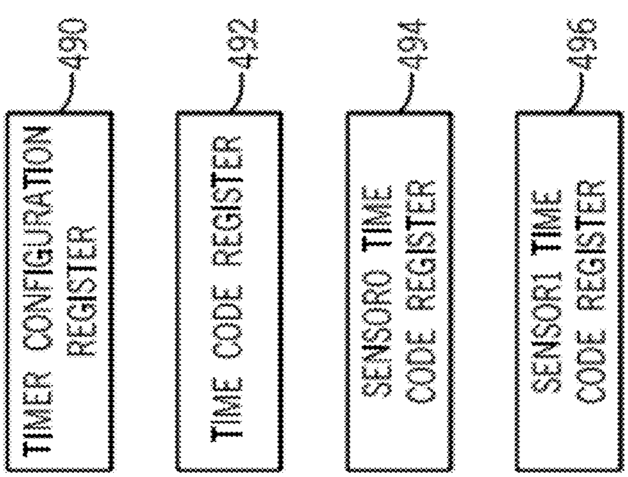
FIG. 44 illustrates a set of registers that may be used to provide timestamps for synchronizing the audio and video data of FIG. 43, in accordance with one embodiment.

As discussed above, the ISP front-end logic 80 may operate within its own clock domain and provide an asynchronous interface to the sensor interface 94 to support sensors of different sizes and having different timing requirements. To provide for synchronization of audio and video data, the ISP processing circuitry 32 may utilize the ISP front-end clock to provide a counter that may be used to generate timestamps that may be associated with captured image frames. For instance, referring to FIG. 44, four registers, including a timer configuration register 490, a time code register 492, a Sensor0 time code register 494 and a Sensor1 time code register 496, all of which may be utilized to provide timestamp functions in one embodiment based at least partially upon the clock for the ISP front-end processing logic 80. In one embodiment, the register 490, 492, 494, and 496 may include 32-bit registers.

The time configuration register 490 may be configured to provide a value, NClk, that may be used to provide a count for generating time stamp codes. In one embodiment, NClk may be a 4-bit value ranging from between 0-15. Based upon NClk, a timer or counter that indicates a current time code may be incremented by a value of one every 2^NClk clock cycles (based on the ISP front-end clock domain). The current time code may be stored in the time code register 492, thus providing for a time code with 32-bits of resolution. The time code register 492 may also be reset by the control logic 84.

Referring briefly to FIG. 10, for each sensor interface input, Sif0 and Sif1, the time code register 492 may be sampled when a rising edge is detected on the vertical synchronization (VSYNC) signal (or if a falling edge is detected depending on how VSYNC is configured), thus indicating the start of a new frame (e.g., at the end of a vertical blanking interval). The time code corresponding to the VSYNC rising edge may be stored in either the time code register 494 or 496 depending on the sensor (Sensor0 or Sensor1) from which the image frame is provided, thus providing a timestamp indicating the time at which capture of the current frame capture began. In some embodiments, the VSYNC signal from the sensor may have a programmed or programmable delay. For instance, if the first pixel of the frame is delayed by n clock cycles, the control logic 84 may be configured to compensate for this delay, such as by providing an offset in hardware or using software/firmware compensation. Thus, the timestamp may be generated from the VSYNC rising edge with a programmed delay added. In another embodiment, the timestamp corresponding to the start of a frame could be determine using the falling edge of the VSYNC signal with a programmable delay.

Figure 45:
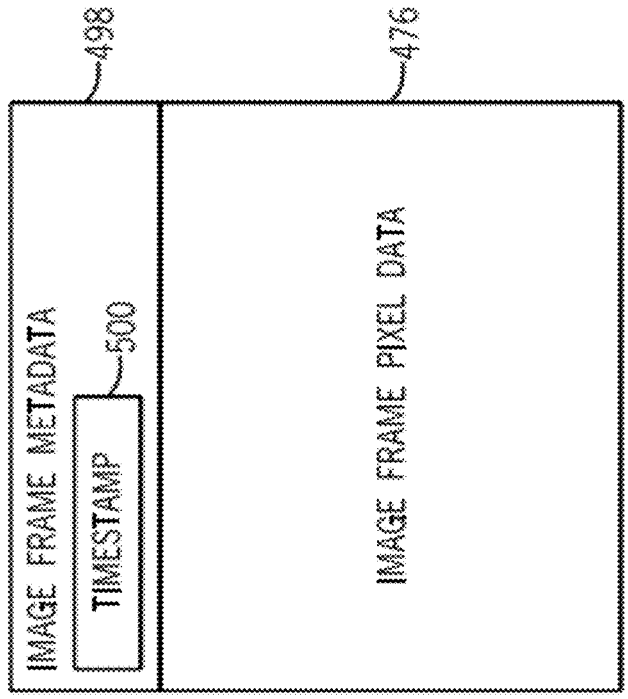
FIG. 45 is a simplified representation of an image frame that may be captured as part of the video data of FIG. 43 and showing how timestamp information may be stored as part of the image frame metadata, in accordance with aspects of the present disclosure.

As the current frame is being processed, the control logic 84 read the time stamp from the sensor time code register (494 or 496), and the timestamp may be associated with the video image frame as a parameter in metadata associated with the image frame. This is shown more clearly in FIG. 45, which provides a diagrammatical view of an image frame 476 and its associated metadata 498, which includes the timestamp 500 read from the appropriate time code register (e.g., register 494 for Sensor0 or register 496 for Sensor1). In one embodiment, the control logic 84 may then read the timestamp from the time code register when triggered by a start of frame interrupt. Thus, each image frame captured by the ISP processing circuitry 32 may have an associated timestamp based on the VSYNC signal. Control circuitry or firmware, which may be implemented as part of the ISP control logic 84 or part of a separate control unit of the electronic device 10, may use the image frame timestamps to align or synchronize a corresponding set of audio data, thus achieving audio-video synchronization.

In some embodiments, the device 10 may include an audio processor configured to handle processing of audio data (e.g., audio data 470). For instance, the audio processor may be a standalone processing unit (e.g., part of processor(s) 16), or may be integrated with a main processor, or may be part of a system-on-chip processing device. In such embodiments, the audio processor and the image processing circuitry 32, which may be controlled by a processor (e.g., part of control logic 84) separate from the audio processor, may operate based on independent clocks. For instance, the clocks could be generated using separate phase-locked loops (PLL). Thus, for audio-video synchronization purposes, the device 10 may need to be able to correlate an image timestamp with an audio timestamp. In one embodiment, this correlation may be accomplished using a main processor of the device 10 (e.g., a CPU). For example, the main processor may synchronize its own clock with that of the audio processor and of the ISP circuitry 32 to determine the different between the respective clocks of the audio processor and ISP circuitry 32. This difference, once known, may be used to correlate audio timestamps of the audio data (e.g., 470) with image frame timestamps of the image data (e.g., 472).

In one embodiment, the control logic 84 may also be configured to handle wrap-around conditions, such as when the maximum value of the 32-bit time code is reached, and wherein the next increment would require an additional bit (e.g., 33-bits) to provide an accurate value. To provide a simplified example, this type of wrap-around may occur when on a four-digit counter when the value 9999 is incremented and becomes 0000 rather than 10000 due to the four-digit limitation. While the control logic 84 may be capable of resetting the time code register 492, it may be undesirable to do so when the wrap-around condition occurs while a session of video is still being captured. Thus, in such instances, the control logic 84 may be include logic, which may be implemented by software in one embodiment, configured to handle the wrap-around condition by generating a higher precision timestamps (e.g., 64-bits) based upon the 32-bit register values. The software may generate the higher precision timestamps, which may be written to the image frame metadata until the time code register 492 is reset. In one embodiment, the software may be configured to detect wrap-around and to add the time difference resulting from the wrap-around condition to a higher resolution counter. For example, in one embodiment, when a wrap-around condition is detected for a 32-bit counter, the software may sum the maximum value of the 32-bit counter (to account for the wrap around) with the current time value indicated by the 32-bit counter and store the result in a higher resolution counter (e.g., greater than 32-bits). In such cases, the result in the high resolution counter may be written to image metadata information until the 32-bit counter is reset.

Figure 46:
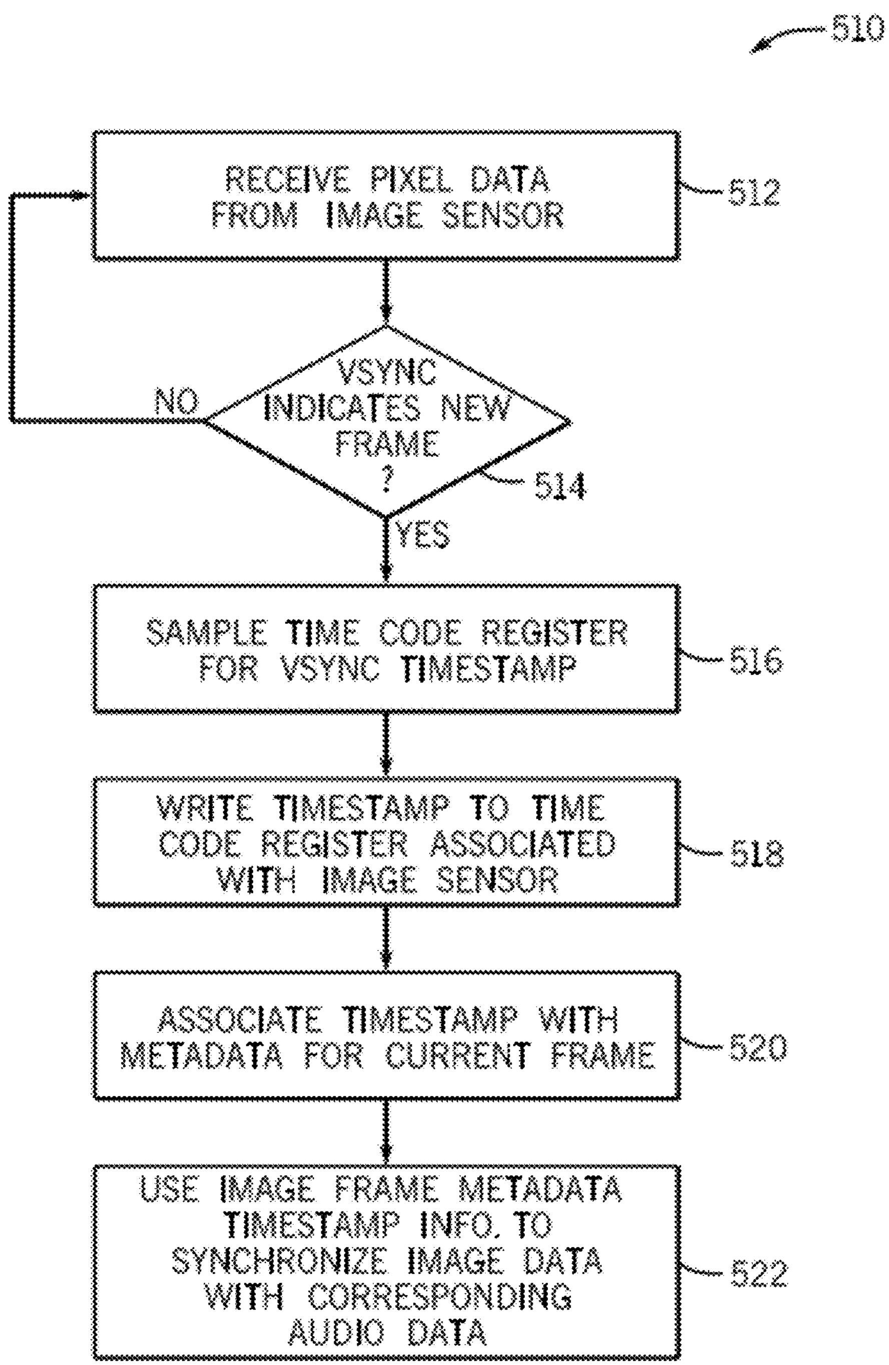
FIG. 46 is a flow chart depicting a method for using timestamps based upon a VSYNC signal to synchronize image data with audio data, in accordance with one embodiment.

FIG. 46 depicts a method 510 that generally describes the audio-video synchronization techniques discussed above. As shown, the method 510 begins at step 512, wherein pixel data is received from an image sensor (e.g., either Sensor0 or Sensor1). Next, at decision logic 514, a determination is made as to whether the VSYNC signal indicates a start of a new frame. If a new frame is not detected, the method 510 returns to step 512 and continues receiving pixel data from the current image frame. If a new frame is detected at decision logic 514, then the method 510 continues to step 516, at which the time code register (e.g., register 492) is sampled to obtain a timestamp value corresponding to the rising (or falling) edge of the VSYNC signal detected at step 514. Next, at step 518, the timestamp value is stored to the time code register (e.g., register 494 or 496) corresponding the image sensor providing the input pixel data. Subsequently, at step 520, the timestamp is associated with the metadata of the new image frame and, thereafter, the timestamp information in the image frame metadata may be used for audio-video synchronization. For instance, the electronic device 10 may be configured to provide audio-video synchronization by aligning video data (using the timestamps of each individual frame) to the corresponding audio data in a manner such that any delay between corresponding audio and video output is substantially minimized. For instance, as discussed above, a main processor of the device 10 may be utilized to determine how to correlate audio timestamps with video timestamps. In one embodiment, if the audio data is ahead the video data, image frames may be dropped to allow the correct image frame to "catch up" to the audio data stream and, if the audio data is behind the video data, image frames may be repeated to allow the audio data to "catch up" to the video stream.

Continuing to FIGS. 47 to 50, the ISP processing logic or sub-system 32 may also be configured to provide for flash (also referred to as "strobe") synchronization. For instance, when using a flash module, artificial lighting may be temporarily provided to aid in the illumination of an image scene. By way of example, the use of a flash may be beneficial when capturing an image scene under low light conditions. The flash or strobe may be provided using any suitable lighting source, such as an LED flash device or a xenon flash device, etc.

In the present embodiment, the ISP sub-system 32 may include a flash controller configured to control the timing and/or interval during which a flash module is active. As will be appreciated, it is generally desirable to control the timing and duration over which the flash module is active such that the flash interval starts before the first pixel of a target frame (e.g., an image frame that is to be captured) is captured and ends after the last pixel of the target frame is captured but before the start of a subsequent consecutive image frame. This helps to ensure that all pixels within the target frame are exposed to similar lighting conditions while the image scene is being captured.

Figure 47:
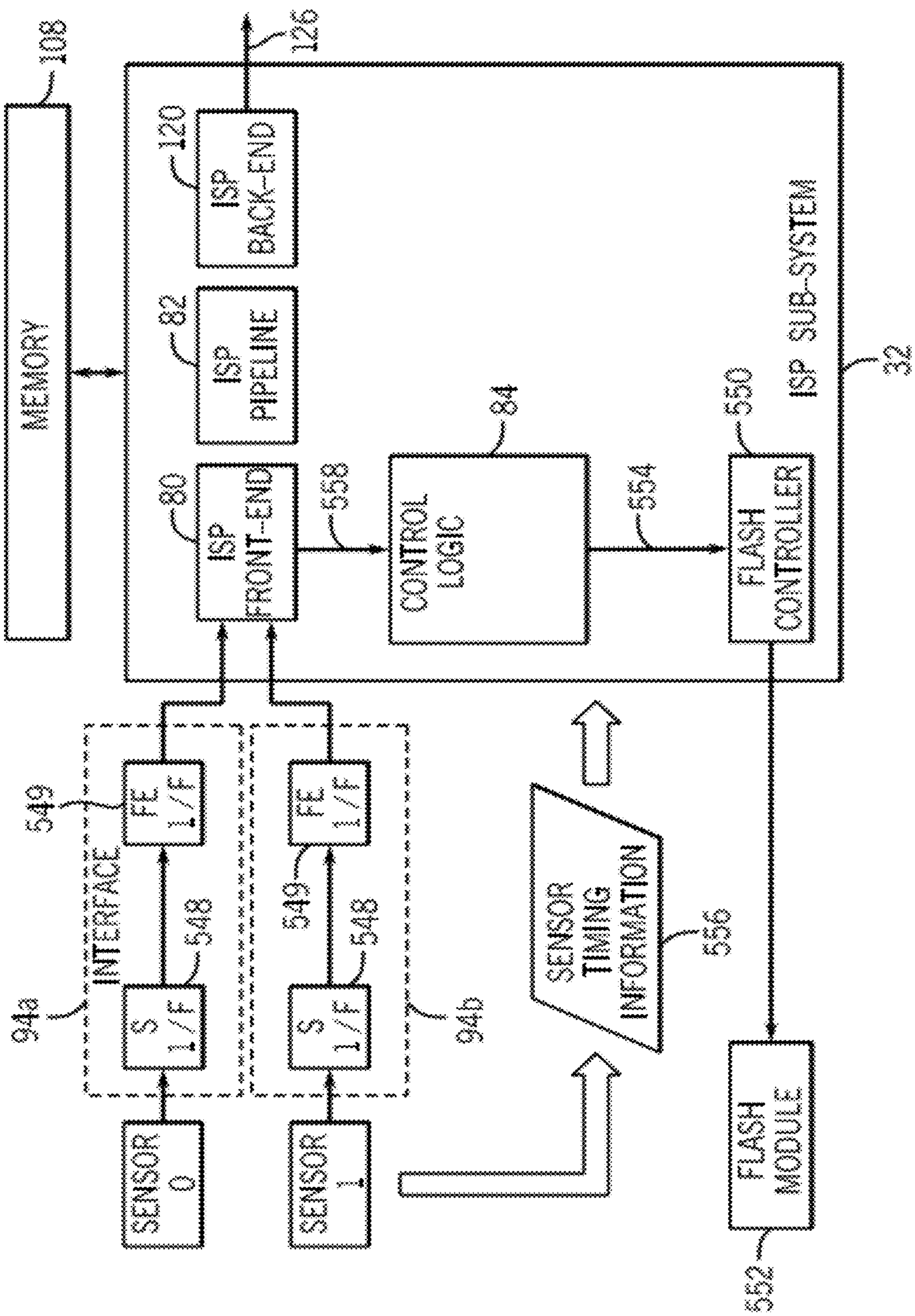
FIG. 47 is a block diagram of the ISP circuitry of FIG. 8 depicting how flash timing control may be performed, in accordance with an embodiment of the present disclosure.

Referring to FIG. 47, a block diagram showing a flash controller 550 implemented as part of the ISP sub-system 32 and configured to control a flash module 552 is illustrated in accordance with an embodiment of the present disclosure. In some embodiments, the flash module 552 may include more than one strobe device. For instance, in certain embodiments, the flash controller 550 may be configured to provide a pre-flash (e.g., for red-eye reduction), followed by a main flash. The pre-flash and main flash events may be sequential, and may be provided using the same or different strobe devices.

In the illustrated embodiment, timing of the flash module 552 may be controlled based on timing information provided from the image sensors 90*a* and 90*b*. For instance, the timing of an image sensor may be controlled using a rolling shutter technique, whereby integration time is governed using a slit aperture that scans over the pixel array of the image sensor (e.g., 90*a* and 90*b*). Using the sensor timing information (shown here as reference number 556), which may be provided to the ISP sub-system 32 via the sensor interfaces 94*a* and 94*b* (each of which may include a sensor-side interface 548 and a front-end-side interface 549), the control logic 84 may provide appropriate control parameters 554 to the flash controller 550, which may then be utilized by the flash controller 550 for activating the flash module 552. As discussed above, by using sensor timing information 556, the flash controller 556 may ensure that the flash module is activated before the first pixel of the target frame is captured and remains activated for the duration of the target frame, with the flash module being deactivated after the last pixel of the target frame is captured and prior to the start of the next frame (e.g., VSYNC rising). This process may be referred to as "flash synchronization" or "strobe synchronization," techniques of which are discussed further below.

Additionally, as shown in the embodiment of FIG. 47, the control logic 84 may also utilize statistics data from the ISP front-end 80, shown here as reference number 558, to determine whether present lighting conditions in the image scene corresponding to the target frame are appropriate for using the flash module. For instance, the ISP sub-system 32 may utilize auto-exposure to try to maintain a target exposure level (e.g., light level) by adjusting integration time and/or sensor gains. However, as will be appreciated, integration time cannot be longer than the frame time. For instance, for video data acquired at 30 fps, each frame has a duration of approximately 33 milliseconds. Thus, if a target exposure level cannot be achieved using a maximum integration time, sensor gains may also be applied. However, if the adjustment of both integration time and sensor gains is unable to achieve a target exposure (e.g., if the light level is less than a target threshold), then the flash controller may be configured to activate the flash module. Further, in one embodiment, integration time may also be limited to avoid motion blur. For instance, while integration time may be extended up to the duration of the frame, it could be further limited in some embodiments to avoid motion blur.

As discussed above, in order to ensure that the activation of the flash illuminates the target frame for its entire duration (e.g., that the flash is turned on prior to the first pixel of the target frame and turned off after the last pixel of the target frame), the ISP sub-system 32 may utilize sensor timing information 556 to determine when to activate/deactivate the flash 552

Figure 48:
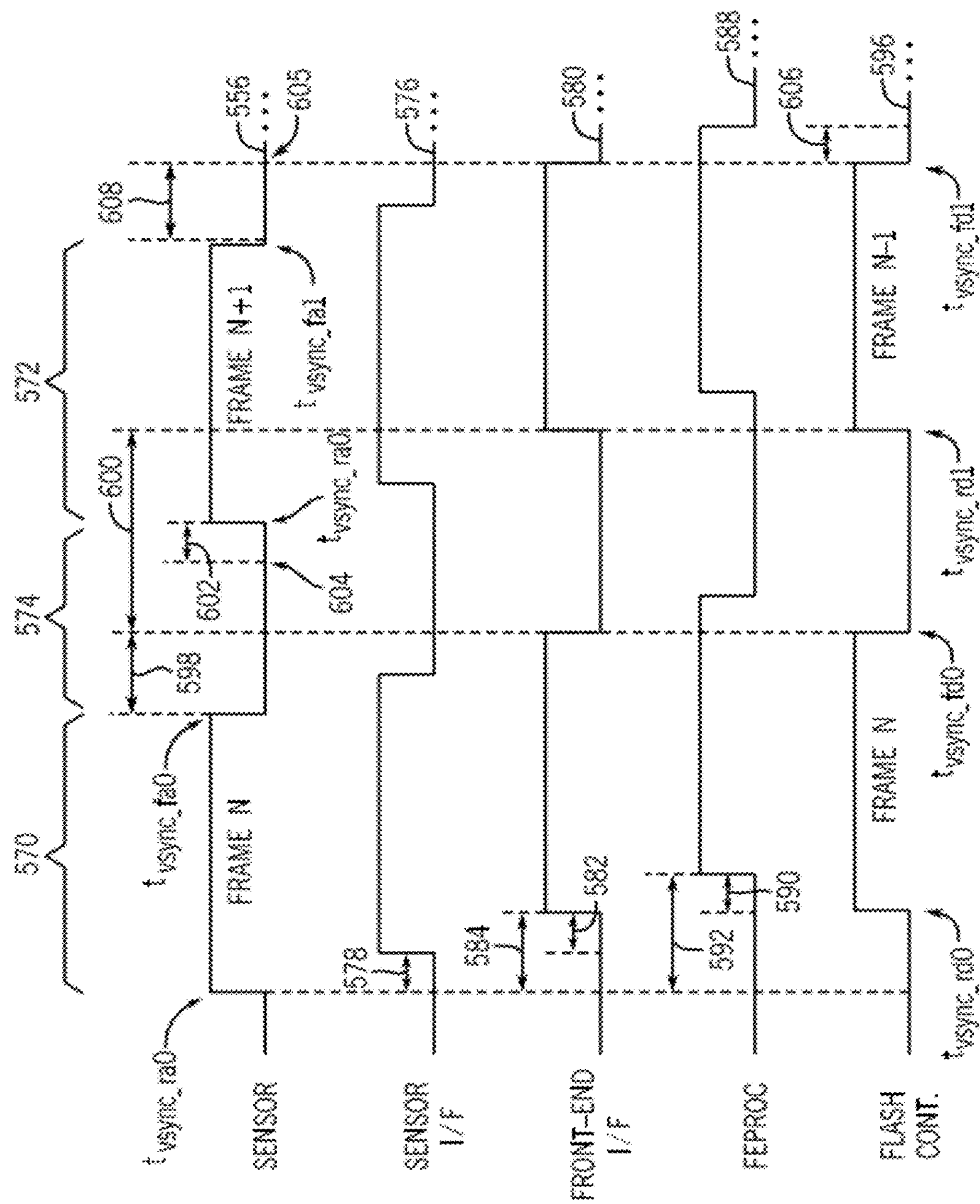
FIG. 48 depicts a technique for determining flash activation and deactivation times, in accordance with an embodiment of the present disclosure.

FIG. 48 shows depicts graphically how the sensor timing signal from the image sensors 90 may be used to control flash synchronization. For instance, FIG. 48 shows a portion of an image sensor timing signal 556 that may be provided by one of the image sensors 90*a* or 90*b*. The logical high portions of the signal 556 represent frame intervals. For instance, a first frame (FRAME N) is represented by reference number 570 and a second frame (FRAME N+1) is represented by reference number 572. The actual time at which the first frame 570 starts is indicated by the rising edge of the signal 556 at time $t_{VSYNC\_ra0}$ (e.g., with "r" designating a rising edge and "a" designating the "actual" aspect of the timing signal 556) and the actual time at which the first frame 570 ends is indicated by the falling edge of the signal 556 at time $t_{VSYNC\_fa0}$ (e.g., with "f" designating a falling edge). Similarly, the actual time at which the second frame 572 starts is indicated by the rising edge of the signal 556 at time $t_{VSYNC\_ra1}$ and the actual time at which the second frame 572 ends is indicated by the falling edge of the signal 556 at time $t_{VSYNC\_fa1}$. The interval 574 between the first and second frames may be referred to as a blanking interval (e.g., vertical blanking), which may allow image processing circuitry (e.g., ISP sub-system 32) to identify when image frames end and start. It should be appreciated that the frame intervals and vertical blanking intervals shown in the present figure are not necessarily drawn to scale.

As shown in FIG. 48, the signal 556 may represent the actual timing from the viewpoint of the image sensor 90. That is, the signal 556 represents the timing at which frames are actually being acquired by the image sensor. However, as the sensor timing information is provided to downstream components of the image processing system 32, delays may be introduced into the sensor timing signal. For instance, the signal 576 represents a delayed timing signal (delayed by a first time delay 578) that may be seen from the viewpoint of the sensor-side interface 548 of the interface logic 94 between the sensor 90 and the ISP front-end processing logic 80. The signal 580 may represent the delayed sensor timing signal from the viewpoint of the front-end-side interface 549, which is shown in FIG. 48 as being delayed relative to the sensor-side interface timing signal 572 by a second time delay 582, and delayed relative to the original sensor timing signal 556 by a third time delay 584, which is equal to the sum of the first time delay 578 and the second time delay 582. Next, as the signal 580 from the front-end-side 549 of the interface 94 is provided to the ISP front-end processing logic 80 (FEProc), an additional delay may be imparted such that from the delayed signal 588 is seen from the viewpoint of the ISP front-end processing logic 80. Specifically, the signal 588 seen by the ISP front-end processing logic 80 is shown here as being delayed relative to the delayed signal 580 (front-end-side timing signal) by a fourth time delay 590, and delayed relative to the original sensor timing signal 556 by a fifth time delay 592, which is equal to the sum of the first time delay 578, the second time delay 582, and the fourth time delay 590.

For purposes of controlling flash timing, the flash controller 550 may utilize the first signal available to the ISP front-end which is, therefore, shifted by the least amount of delay time relative to the actual sensor timing signal 556. Thus, in the present embodiment, the flash controller 550 may determine flash timing parameters based upon the sensor timing signal 580, as seen from the viewpoint of the front-end-side 549 of the sensor-to-ISP interface 94. Thus, the signal 596, which is used by the flash controller 550 in the present example, may be identical to the signal 580. As shown, the delayed signal 596 (delayed by the delay time 584 relative to signal 556) includes the frame intervals located between times $t_{VSYNC\_rd0}$ and $t_{VSYNC\_fd0}$ (e.g., where "d" represented "delayed") which correlate to the first frame 570 and between times $t_{VSYNC\_rd1}$ and $t_{VSYNC\_fd1}$, which correlate to the second frame 572. As discussed above, it is generally desirable to activate the flash prior to the start of a frame and for the duration of the frame (e.g., to deactivate the flash after the last pixel of the frame) to ensure that the image scene is illuminated for the entirety of the frame, and to account for any warm-up time that the flash may need during activation to reach full intensity (which may be on the order of a microseconds (e.g., 100-800 microseconds) to a few milliseconds (e.g., 1-5 millisecond)). However, since the signal 596 being analyzed by the flash controller 550 is delayed with respect to the actual timing signal 556, this delay is taken into account when determining flash timing parameters.

For instance, assuming that the flash is to be activated to illuminate the image scene for the second frame 572, the delayed rising edge at $t_{VSYNC\_rd1}$ occurs after the actual rising edge at $t_{VSYNC\_ra1}$. Thus, it may be difficult for the flash controller 550 to use the delayed rising edge $t_{VSYNC\_rd1}$ to determine a flash activation starting time, as the delayed rising edge $t_{VSYNC\_rd1}$ occurs after the second frame 572 has already started (e.g., after $t_{VSYNC\_ra1}$ of signal 556). In the present embodiment, the flash controller 550 may instead determine the flash activation starting time based on the end of the previous frame, here the falling edge at time $t_{VSYNC\_fd0}$. For instance, the flash controller 550 may add a time interval 600 (which represents the vertical blanking interval 574) to time $t_{VSYNC\_fd0}$, to calculate a time that corresponds to the delayed rising edge time $t_{VSYNC\_rd1}$ of the frame 572. As can be appreciated, the delayed rising edge time $t_{VSYNC\_rd1}$ occurs after the actual rising edge time $t_{VSYNC\_ra1}$ (signal 556) and, therefore, a time offset 598 (OffSet1), which corresponds to the time delay 584 of signal 580, is subtracted from the sum of time $t_{VSYNC\_fd0}$ and the blanking interval time 600. This produces a flash activation starting time that starts concurrently with the beginning of the second frame 572, at time $t_{VSYNC\_ra1}$. However, as mentioned above, depending on the type of flash device that is provided (e.g., xenon, LED, etc.), the flash module 552 may experience a warm-up time between when the flash module is activated and when the flash device reaches its full luminosity. The amount of the warm-up time may depend on the type of flash device used (e.g., xenon device, LED device, etc.). Thus, to account for such warm-up times, an additional offset 602 (OffSet2), which may be programmed or preset (e.g., using a control register), may be subtracted from the beginning of the second frame 572, at time $t_{VSYNC\_ra1}$. This moves the flash activation starting time back to time 604, thus ensuring that the flash is activated (if needed to illuminate the scene) prior to the start of the frame 572 being acquired by the image sensor. This process for determining flash activation time may be expressed using the formula below:

$$t_{flash\_start\_frame}=t_{VSYNC\_fd0}+t_{vert\_blank\_int}-t_{OffSet1}-t_{OffSet2}$$

In the illustrated embodiment, the deactivation of the flash may occur at time $t_{VSYNC\_fd1}$ of the flash controller signal 596, provided that time $t_{VSYNC\_fd1}$ occurs prior to the start of the frame after frame 572 (e.g., FRAME N+2, which is not shown in FIG. 48) as indicated by time 605 on the sensor timing signal 556. In other embodiments, the deactivation of the flash may occur at a time (e.g., an offset 606) after time $t_{VSYNC\_fd1}$ of signal 596 but before the start of the next frame (e.g., before a subsequent VSYNC rising edge on the sensor timing signal 556 indicating the start of FRAME N+2), or may occur within an interval 608 immediately prior to time $t_{VSYNC\_fd1}$, wherein the interval 608 is less than the amount of Offset1 (598). As can be appreciated, this ensures that the flash remains on for the entire duration of the target frame (e.g., frame 572).

Figure 49:
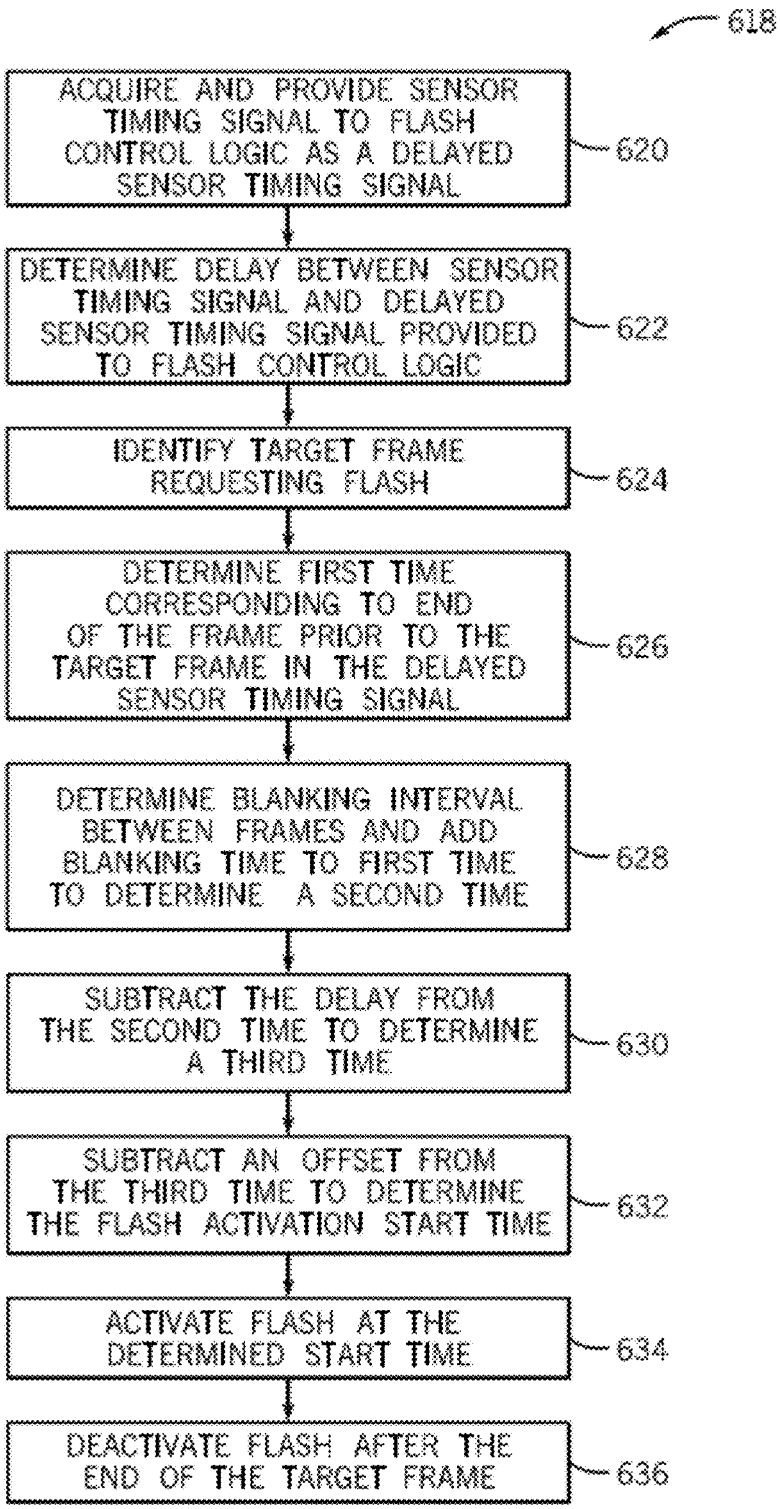
FIG. 49 is a flow chart depicting a method for determining flash activation times based on the technique shown in FIG. 48.

FIG. 49 depicts a process 618 for determining a flash activation start time on the electronic device 10 in accordance with the embodiment shown in FIG. 48. Beginning at block 620, a sensor timing signal (e.g., 556) from an image sensor is acquired and provided to flash control logic (e.g., flash controller 550), which may be part of an image signal processing sub-system (e.g., 32) of the electronic device 10. The sensor timing signal is provided to the flash control logic, but may be delayed with respect the original timing signal (e.g., 556). At block 622, the delay (e.g., delay 584) between the sensor timing signal and the delayed sensor timing signal (e.g., 596) is determined. Next, a target frame (e.g., frame 572) requesting flash illumination is identified at block 624. To determine the time at which the flash module (e.g., 552) should be activated to ensure that the flash is active prior to the start of the target frame, the process 618 then proceeds to block 626, at which a first time (e.g., time $t_{VSYNC\_fd0}$) corresponding to the end of the frame prior to the target frame, as indicated by the delayed timing signal, is determined. Thereafter after, at block 628, the length of a blanking interval between frames is determined and added to the first time determined at block 626 to determine a second time. The delay determined at block 622 is then subtracted from the second time, as shown at block 630, to determine a third time. As discussed above, this sets the flash activation time to coincide with the actual start of the target frame in accordance with the non-delayed sensor timing signal.

In order to ensure that the flash is active prior to the start of the target frame, an offset (e.g., 602, Offset2) is subtracted from the third time, as shown at block 632, to determine the desired flash activation time. As will be appreciated, in some embodiments, the offset from block 632 may not only ensure that the flash is on before the target frame, but may also compensate for any warm-up time that the flash may require between being initially activated and reaching full luminosity. At block 634, the flash 552 is activated at the flash start time determined at block 632. As discussed above and shown in block 636, the flash may remain on for the entire duration of the target frame, and may be deactivated after the end of the target frame, so that all pixels in the target frame are subject to similar lighting conditions. While the embodiment described above in FIGS. 48 and 49 have discussed the application of flash synchronization techniques using a single flash, it should be further appreciated that these flash synchronization techniques may also be applicable to embodiments of devices having two or more flash devices (e.g., two LED flashes). For instance, if more than one flash module is utilized, the above techniques may be applied to both flash modules, such that each flash module is activated by the flash controller prior to the start of a frame and remain on for the duration of the frame (e.g., the flash modules may not necessarily be activated for the same frames).

The flash timing techniques described herein may be applied when acquiring images using the device 10. For instance, in one embodiment, a pre-flash technique may be used during image acquisition. For example, when a camera or image acquisition application is active on the device 10, the application may operate in a "preview" mode. In the preview mode, the image sensor(s) (e.g., 90) may be acquiring frames of image data which may be processed by the ISP sub-system 32 of the device 10 for preview purposes (e.g., displaying on a display 28), although the frames may not actually be captured or stored until a capture request is initiated by a user to place the device 10 into a "capture" mode. By way of example, this may occur via user activation of a physical capture button on the device 10, or a soft-capture button, which may be implemented via software as part of a graphical user interface and displayed on a display of the device 10 and being responsive to user interface inputs (e.g., touch screen inputs).

Because the flash is not typically active during preview mode, the sudden activation of and the illumination of an image scene using a flash may, in some cases, significantly alter certain image statistics for a particular scene, such as those related to auto-white balance statistics, etc., relative to the same image scene that is not illuminated by the flash. Thus, in order to improve statistics used to process a desired target frame, in one embodiment, a pre-flash operation technique may include receiving a user request to capture an image frame that requests flash illumination, using the flash at a first time to illuminate a first frame while the device 10 is still in preview mode, and updating the statistics (e.g., auto-white balance statistics) prior to the start of the next frame. The device 10 may enter capture mode and capture the next frame using the updated statistics with the flash activated, thus providing improved image/color accuracy.

Figure 50:
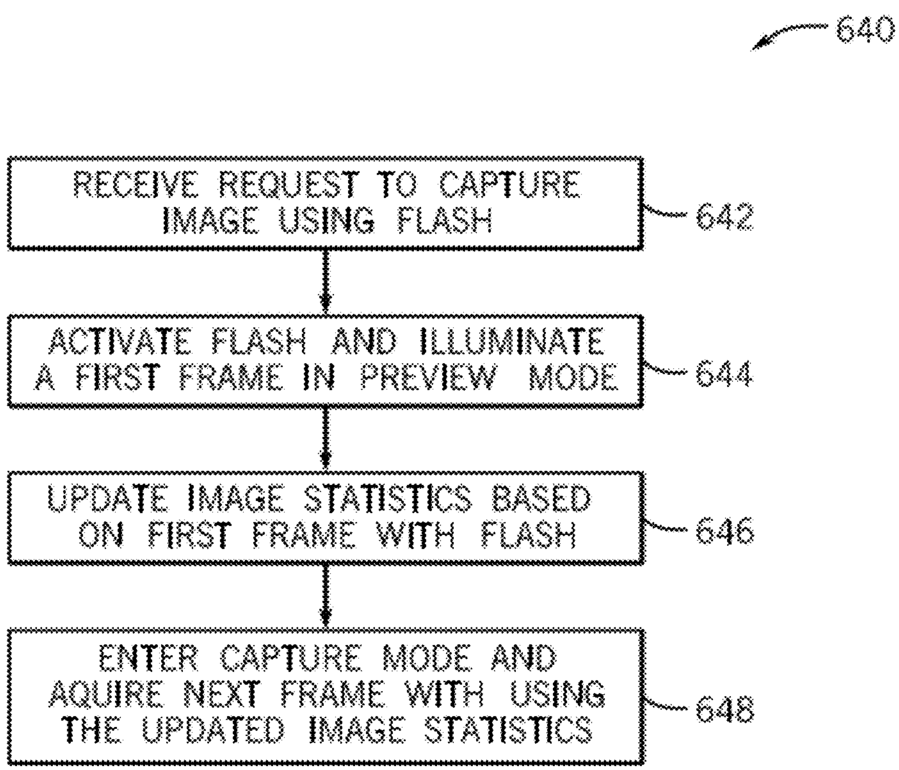
FIG. 50 is a flow chart depicting a method for using a pre-flash to update image statistics prior to acquisition of an image scene using a flash, in accordance with aspects of the present disclosure.

FIG. 50 depicts a flow chart illustrating such a process 640 in more detail. The process 640 begins at block 642 in which a request is received to capture an image using the flash. At block 644, the flash is activated (e.g., may be timed using the techniques shown in FIGS. 48 and 49) to illuminate a first frame while the device 10 is still in preview mode. Next, at block 646, image statistics, such as auto-white balance statistics, are updated based statistics acquired from the illuminated first frame. Thereafter, at block 648, the device 10 may enter the capture mode and acquire the next frame using the updated image statistics from block 646. For instance, the updated image statistics may be used to determine white balance gains and/or color correction matrices (CCM), which may be used by firmware (e.g., control logic 84) to program the ISP pipeline 82. Thus, the frame (e.g., next frame) acquired at block 648 may be processed by the ISP pipeline 82 using one or more parameters that are determined based upon the updated image statistics from block 646.

In another embodiment, color properties from a non-flash image scene (e.g., acquired or previewed without flash) may be applied when capturing an image frame with flash. As will be appreciated, a non-flash image scene generally exhibits better color properties relative to an image scene that is illuminated with the flash. The use of the flash may, however, offer reduced noise and improved brightness (e.g., in low light conditions) relative to the non-flash image. However, the use of the flash may also result in some of the colors in the flash image appearing somewhat washed out relative to a non-flash image of the same scene. Thus, in one embodiment, to retain the benefits of low noise and brightness of a flash image while also partially retaining some of the color properties from the non-flash image, the device 10 may be configured to analyze a first frame without the flash to obtain its color properties. Then, the device 10 may capture a second frame using the flash and may apply a color palette transfer technique to the flash image using the color properties from the non-flash image.

In certain embodiments, the device 10 configured to implement any of the flash/strobe techniques discussed above may be a model of an iPod®, iPhone®, iMac®, or MacBook® computing devices with integrated or external imaging devices, all of which are available from Apple Inc. Further, the imaging/camera application may be a version of the Camera®, iMovie®, or PhotoBooth® applications, also from Apple Inc.

Figure 51:
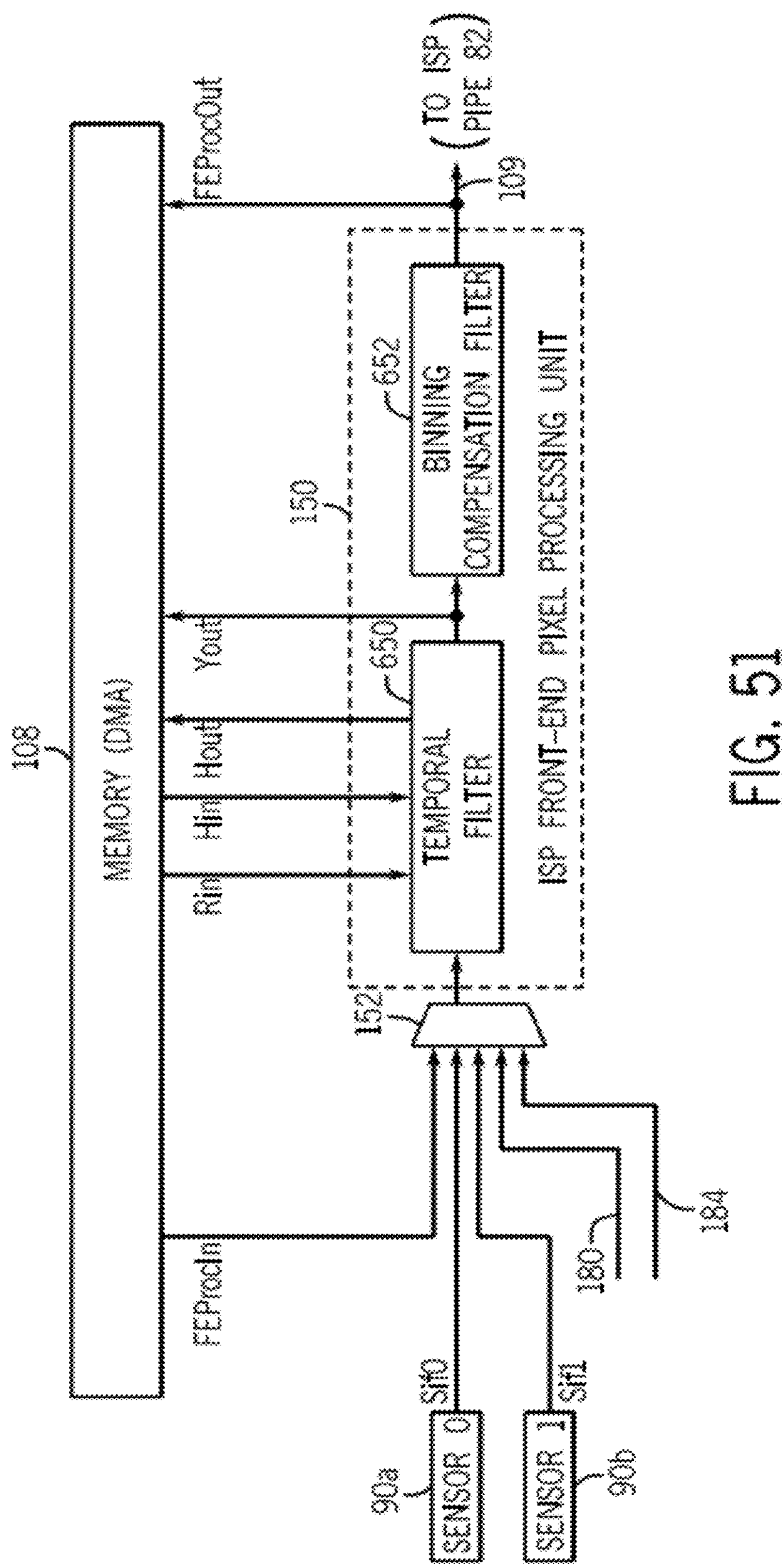
FIG. 51 is a block diagram that provides a more detailed view of one embodiment of the ISP front-end pixel processing unit, as shown in the ISP front-end logic of FIG. 10, in accordance with aspects of the present disclosure.

Continuing to FIG. 51, a more detailed view of the ISP front-end pixel processing logic 150 (previously discussed in FIG. 10) is illustrated, in accordance with an embodiment of the present technique. As shown, the ISP front-end pixel processing logic 150 includes a temporal filter 650 and a binning compensation filter 652. The temporal filter 650 may receive one of the input image signals Sif0, Sif1, FEProcIn, or pre-processed image signals (e.g., 180, 184) and may operate on the raw pixel data before any additional processing is performed. For example, the temporal filter 650 may initially process the image data to reduce noise by averaging image frames in the temporal direction. The binning compensation filter 652, which is discussed in more detail below, may apply scaling and re-sampling on binned raw image data from an image sensor (e.g., 90*a*, 90*b*) to maintain an even spatial distribution of the image pixels.

The temporal filter 650 may be pixel-adaptive based upon motion and brightness characteristics. For instance, when pixel motion is high, the filtering strength may be reduced in order to avoid the appearance of "trailing" or "ghosting artifacts" in the resulting processed image, whereas the filtering strength may be increased when little or no motion is detected. Additionally, the filtering strength may also be adjusted based upon brightness data (e.g., "luma"). For instance, as image brightness increases, filtering artifacts may become more noticeable to the human eye. Thus, the filtering strength may be further reduced when a pixel has a high level of brightness.

In applying temporal filtering, the temporal filter 650 may receive reference pixel data (Rin) and motion history input data (Hin), which may be from a previous filtered or original frame. Using these parameters, the temporal filter 650 may provide motion history output data (Hout) and filtered pixel output (Yout). The filtered pixel output Yout is then passed to the binning compensation filter 652, which may be configured to perform one or more scaling operations on the filtered pixel output data Yout to produce the output signal FEProcOut. The processed pixel data FEProcOut may then be forwarded to the ISP pipe processing logic 82, as discussed above.

Figure 52:
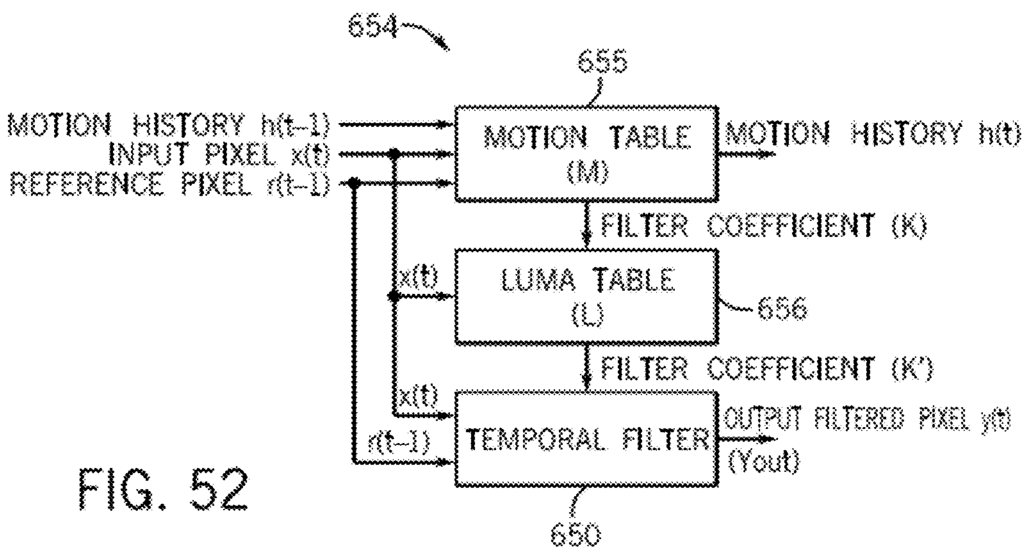
FIG. 52 is a process diagram illustrating how temporal filtering may be applied to image pixel data received by the ISP front-end pixel processing unit shown in FIG. 51, in accordance with one embodiment.

Referring to FIG. 52, a process diagram depicting a temporal filtering process 654 that may be performed by the temporal filter shown in FIG. 51 is illustrated, in accordance with a first embodiment. The temporal filter 650 may include a 2-tap filter, wherein the filter coefficients are adjusted adaptively on a per pixel basis based at least partially upon motion and brightness data. For instance, input pixels x(t), with the variable "t" denoting a temporal value, may be compared to reference pixels r(t−1) in a previously filtered frame or a previous original frame to generate a motion index lookup in a motion history table (M) 655 that may contain filter coefficients. Additionally, based upon motion history input data h(t−1), a motion history output h(t) corresponding to the current input pixel x(t) may be determined.

The motion history output h(t) and a filter coefficient, K, may be determined based upon a motion delta d(j,i,t), wherein (j,i) represent coordinates of the spatial location of a current pixel x(j,i,t). The motion delta d(j,i,t) may be computed by determining the maximum of three absolute deltas between original and reference pixels for three horizontally collocated pixels of the same color. For instance, referring briefly to FIG. 53, the spatial locations of three collocated reference pixels 657, 658, and 659 that corresponding to original input pixels 660, 661, and 662 are illustrated. In one embodiment, the motion delta may be calculated based on these original and reference pixels using formula below:

$$d(j,i,t)=\max3[\text{abs}(x(j,i-2,t)-r(j,i-2,t-1)),$$

$$(\text{abs}(x(j,i,t)-r(j,i,t-1)),$$

$$(\text{abs}(x(j,i+2,t)-r(j,i+2,t-1))] \quad (1a)$$

A flow chart depicting this technique for determining the motion delta value is illustrated further below in FIG. 55. Further, it should be understood that the technique for calculating the motion delta value, as shown above in Equation 1a (and below in FIG. 55), is only intended to provide one embodiment for determining a motion delta value.

In other embodiments, an array of same-colored pixels could be evaluated to determine a motion delta value. For instance, in addition to the three pixels referenced in Equation 1a, one embodiment for determining motion delta values may include also evaluating the absolute deltas between same colored pixels from two rows above (e.g., j−2; assuming a Bayer pattern) the reference pixels 660, 661, and 662 and their corresponding collocated pixels, and two rows below (e.g., j+2; assuming a Bayer pattern) the reference pixels 660, 661, and 662 and their corresponding collocated pixels. For instance, in one embodiment, the motion delta value may be expressed as follows:

$$d(j,i,t)=\max9[\text{abs}(x(j,i-2,t)-r(j,i-2,t-1)),$$

$$(\text{abs}(x(j,i,t)-r(j,i,t-1)),$$

$$(\text{abs}(x(j,i+2,t)-r(j,i+2,t-1)),$$

$$(\text{abs}(x(j-2,i-2,t)-r(j-2,i-2,t-1)),$$

$$(\text{abs}(x(j-2,i,t)-r(j-2,i,t-1)),$$

$$(\text{abs}(x(j-2,i+2,t)-r(j-2,i+2,t-1)),$$

$$(\text{abs}(x(j+2,i-2,t)-r(j+2,i-2,t-1))$$

$$(\text{abs}(x(j+2,i,t)-r(j+2,i,t-1)),$$

$$(\text{abs}(x(j+2,i+2,t)-r(j+2,i+2,t-1))] \quad (1b)$$

Thus, in the embodiment depicted by Equation 1b, the motion delta value may be determined by comparing the absolute delta between a 3×3 array of same-colored pixels, with the current pixel (661) being located at the center of the 3×3 array (e.g., really a 5×5 array for Bayer color patterns if pixels of different colors are counted). It should be appreciated, that any suitable two-dimensional array of same-colored pixels (e.g., including arrays having all pixels in the same row (e.g., Equation 1a) or arrays having all pixels in the same column) with the current pixel (e.g., 661) being located at the center of the array could be analyzed to determine a motion delta value. Further, while the motion delta value could be determined as the maximum of the absolute deltas (e.g., as shown in Equations 1a and 1b), in other embodiments, the motion delta value could also be selected as the mean or median of the absolute deltas. Additionally, the foregoing techniques may also be applied to other types of color filter arrays (e.g., RGBW, CYGM, etc.), and is not intended to be exclusive to Bayer patterns.

Referring back to FIG. 52, once the motion delta value is determined, a motion index lookup that may be used to selected the filter coefficient K from the motion table (M) 655 may be calculated by summing the motion delta d(t) for the current pixel (e.g., at spatial location (j,i)) with the motion history input h(t−1). For instance, the filter coefficient K may be determined as follows:

$$K=M[d(j,i,t)+h(j,i,t-1)] \quad (2a)$$

Additionally, the motion history output h(t) may be determined using the following formula:

$$h(j,i,t)=d(j,i,t)+(1-K)\times h(j,i,t-1) \quad (3a)$$

Next, the brightness of the current input pixel x(t) may be used to generate a luma index lookup in a luma table (L) 656. In one embodiment, the luma table may contain attenuation factors that may be between 0 and 1, and may be selected based upon the luma index. A second filter coefficient, K', may be calculated by multiplying the first filter coefficient K by the luma attenuation factor, as shown in the following equation:

$$K'=K\times L[x(j,i,t)] \quad (4a)$$

The determined value for K' may then be used as the filtering coefficient for the temporal filter 650. As discussed above, the temporal filter 650 may be a 2-tap filter. Additionally, the temporal filter 650 may be configured as an infinite impulse response (IIR) filter using previous filtered frame or as a finite impulse response (FIR) filter using previous original frame. The temporal filter 650 may compute the filtered output pixel y(t) (Yout) using the current input pixel x(t), the reference pixel r(t−1), and the filter coefficient K' using the following formula:

$$y(j,i,t)=r(j,i,t-1)+K'(x(j,i,t)-r(j,i,t-1)) \quad (5a)$$

As discussed above, the temporal filtering process 654 shown in FIG. 52 may be performed on a pixel-by-pixel basis. In one embodiment, the same motion table M and luma table L may be used for all color components (e.g., R, G, and B). Additionally, some embodiments may provide a bypass mechanism, in which temporal filtering may be bypassed, such as in response to a control signal from the control logic 84. Further, as will be discussed below with respect to FIGS. 57 and 58, one embodiment of the temporal filter 650 may utilize separate motion and luma tables for each color component of the image data.

Figure 53:
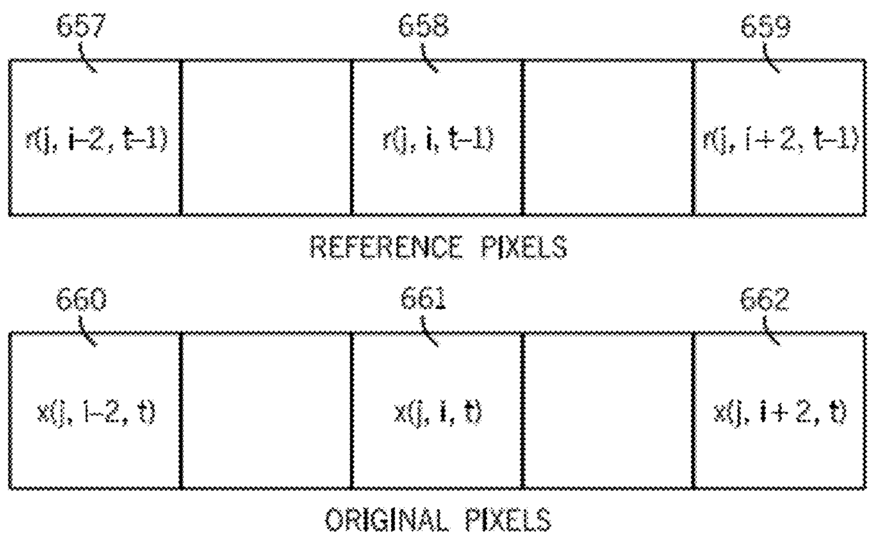
FIG. 53 illustrates a set of reference image pixels and a set of corresponding current image pixels that may be used to determine one or more parameters for the temporal filtering process shown in FIG. 52.
Figure 54:
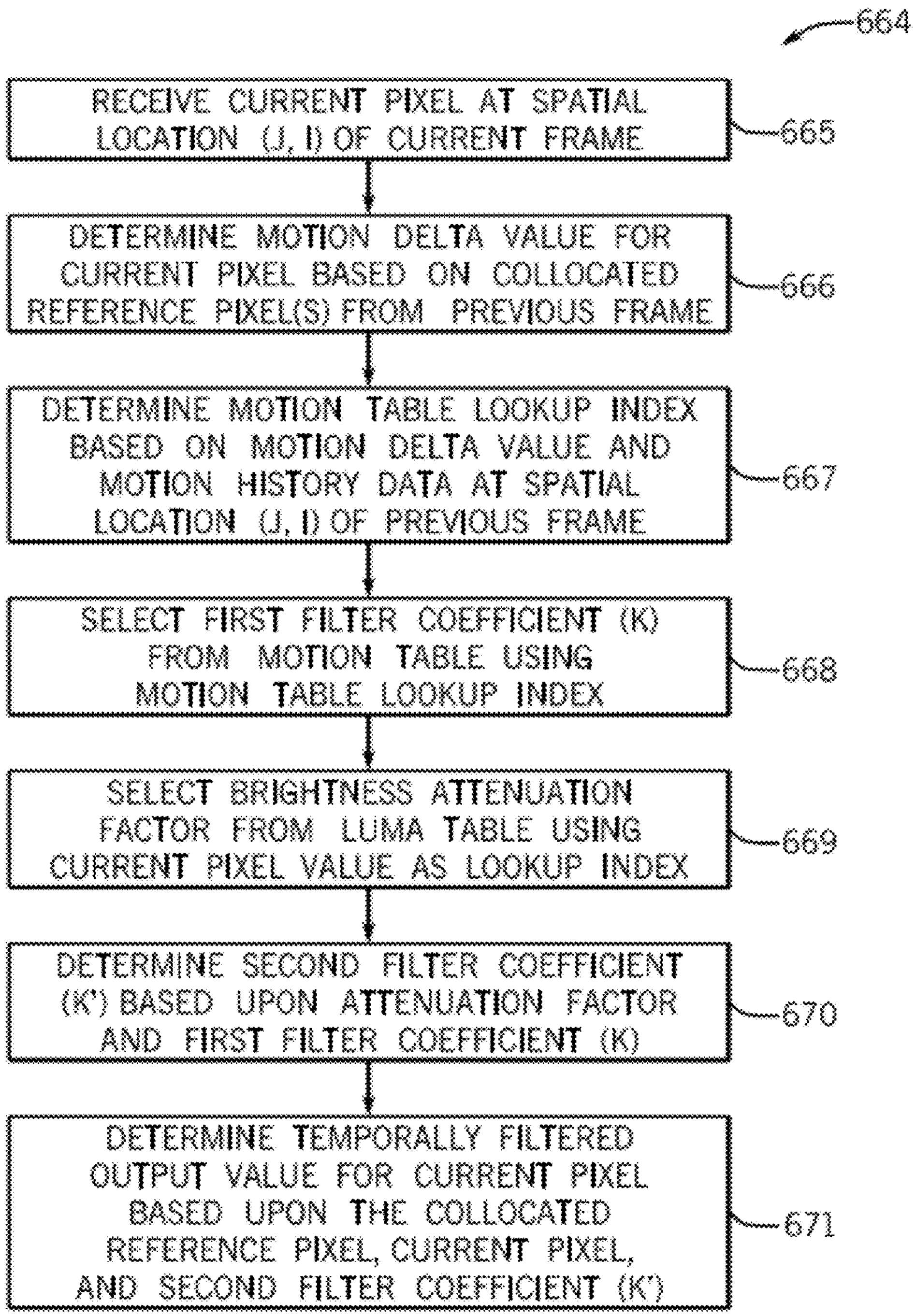
FIG. 54 is a flow chart illustrating a process for applying temporal filtering to a current image pixel of a set of image data, in accordance with one embodiment.

The embodiment of the temporal filtering technique described with reference to FIGS. 52 and 53 may be better understood in view of FIG. 54, which depicts a flow chart illustrating a method 664, in accordance with the above-described embodiment. The method 664 begins at step 665, at which a current pixel x(t) located at spatial location (j,i) of a current frame of image data is received by the temporal filtering system 654. At step 666, a motion delta value d(t) is determined for the current pixel x(t) based at least partially upon one or more collocated reference pixels (e.g., r(t−1)) from a previous frame of the image data (e.g., the image frame immediately preceding the current frame). A technique for determining a motion delta value d(t) at step 666 is further explained below with reference to FIG. 55, and may be performed in accordance with Equation 1a, as shown above.

Once the motion delta value d(t) from step 666 is obtained, a motion table lookup index may be determined using the motion delta value d(t) and a motion history input value h(t−1) corresponding to the spatial location (j,i) from the previous frame, as shown in step 667. Additionally, though not shown, a motion history value h(t) corresponding to the current pixel x(t) may also be determined at step 667 once the motion delta value d(t) is known, for example, by using Equation 3a shown above. Thereafter, at step 668, a first filter coefficient K may be selected from a motion table 655 using the motion table lookup index from step 667. The determination of the motion table lookup index and the selection of the first filter coefficient K from the motion table may be performed in accordance with Equation 2a, as shown above.

Next, at step 669, an attenuation factor may be selected from a luma table 656. For instance, the luma table 656 may contain attenuation factors ranging from between approximately 0 and 1, and the attenuation factor may be selected from the luma table 656 using the value of the current pixel x(t) as a lookup index. Once the attenuation factor is selected, a second filter coefficient K' may be determined at step 670 using the selected attenuation factor and the first filter coefficient K (from step 668), as shown in Equation 4a above. Then, at step 671, a temporally filtered output value y(t) corresponding to the current input pixel x(t) is determined based upon the second filter coefficient K' (from step 669), the value of the collocated reference pixel r(t−1), and the value of the input pixel x(t). For instance, in one embodiment, the output value y(t) may be determined in accordance with Equation 5a, as shown above.

Figure 55:
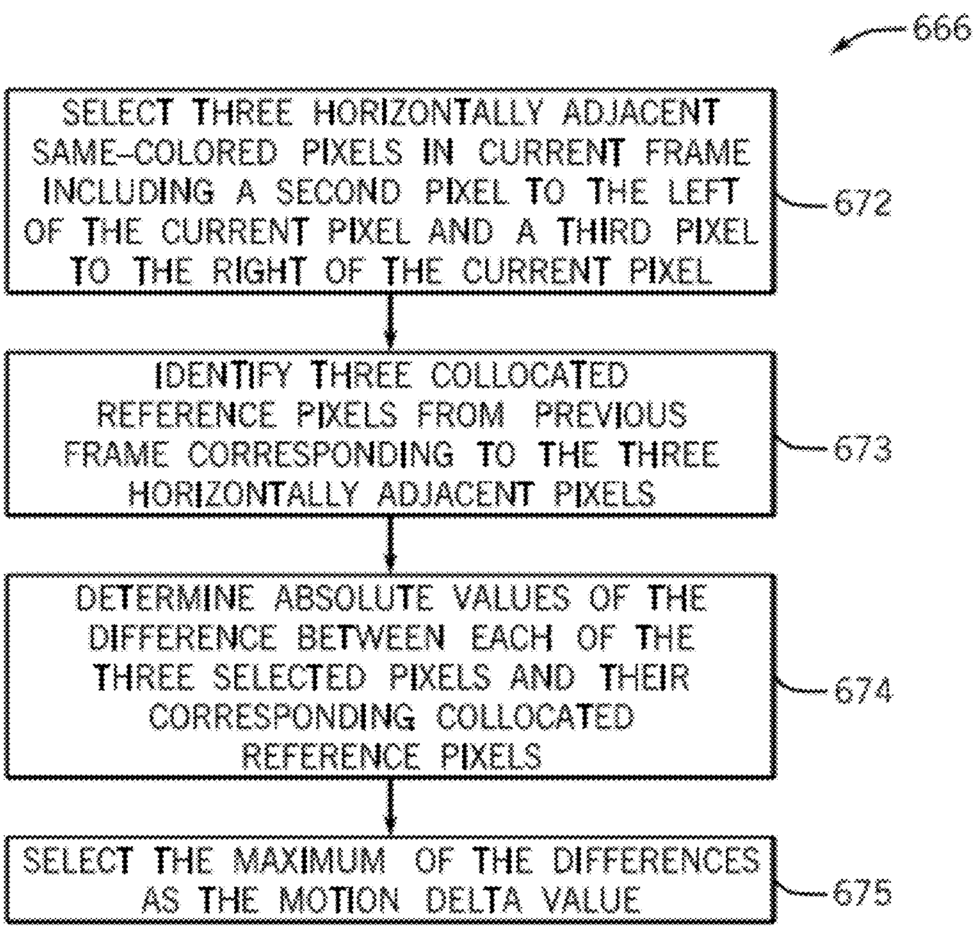
FIG. 55 is a flow chart showing a technique for calculating a motion delta value for use with the temporal filtering of the current image pixel of FIG. 54, in accordance with one embodiment.

Referring to FIG. 55, the step 666 for determining the motion delta value d(t) from the method 664 is illustrated in more detail in accordance with one embodiment. In particular, the determination of the motion delta value d(t) may generally correspond to the operation depicted above in accordance with Equation 1a. As shown, the step 666 may include the sub-steps 672-675. Beginning at sub-step 672, a set of three horizontally adjacent pixels having the same color value as the current input pixel x(t) are identified. By way of example, in accordance with the embodiment shown in FIG. 53 the image data may include Bayer image data, and the three horizontally adjacent pixels may include the current input pixel x(t) (661), a second pixel 660 of the same color to the left of the current input pixel 661, and a third pixel of the same color to the right of the current input pixel 661.

Next, at sub-step 673, three collocated reference pixels 657, 658, and 659 from the previous frame corresponding to the selected set of three horizontally adjacent pixels 660, 661, and 662 are identified. Using the selected pixels 660, 661, and 662 and the three collocated reference pixels 657, 658, and 659, the absolute values of the differences between each of the three selected pixels 660, 661, and 662 and their corresponding collocated reference pixels 657, 658, and 659, respectively, are determined at sub-step 674. Subsequently, at sub-step 675, the maximum of the three differences from sub-step 674 is selected as the motion delta value d(t) for the current input pixel x(t). As discussed above, FIG. 55, which illustrates the motion delta value calculation technique shown in Equation 1a, is only intended to provide one embodiment. Indeed, as discussed above, any suitable two-dimensional array of same-colored pixels with the current pixel being centered in the array may be used to determine a motion delta value (e.g., Equation 1b).

Figure 56:
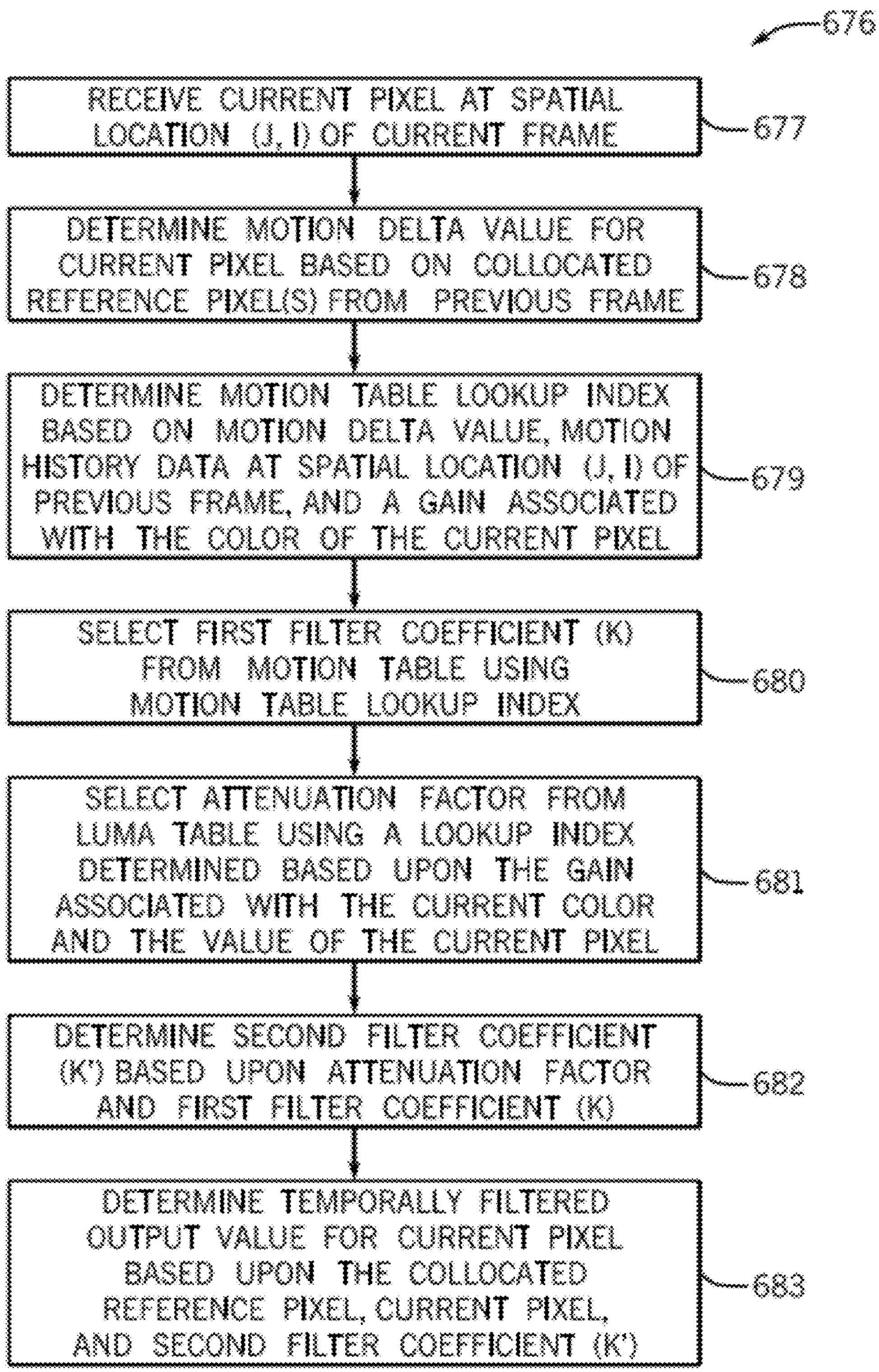
FIG. 56 is a flow chart illustrating another process for applying temporal filtering to a current image pixel of a set of image data that includes the use of different gains for each color component of the image data, in accordance with another embodiment.

Another embodiment of a technique for applying temporal filtering to image data is further depicted in FIG. 56. For instance, since signal to noise ratios for different color components of the image data may be different, a gain may be applied to the current pixel, such that the current pixel is gained before selecting motion and luma values from the motion table 655 and luma table 656. By applying a respective gain that is color dependent, signal to noise ratio may be more consistent among the different color components. By way of example only, in an implementation that uses raw Bayer image data, the red and blue color channels may generally be more sensitive compared to the green (Gr and Gb) color channels. Thus, by applying an appropriate color-dependent gain to each processed pixel, the signal to noise variation between each color component may be generally reduced, thereby reducing, among other things, ghosting artifacts, as well as consistency across different colors after auto-white balance gains.

With this in mind, FIG. 56 provides a flow chart depicting a method 676 for applying temporal filtering to image data received by the front-end processing unit 150 in accordance with such an embodiment. Beginning at step 677, a current pixel x(t) located at spatial location (j,i) of a current frame of image data is received by the temporal filtering system 654. At step 678, a motion delta value d(t) is determined for the current pixel x(t) based at least partially upon one or more collocated reference pixels (e.g., r(t−1)) from a previous frame of the image data (e.g., the image frame immediately preceding the current frame). The step 678 may be similar to the step 666 of FIG. 54, and may utilize the operation represented in Equation 1 above.

Next, at step 679, a motion table lookup index may be determined using the motion delta value d(t), a motion history input value h(t−1) corresponding to the spatial location (j,i) from the previous frame (e.g., corresponding to the collocated reference pixel r(t−1)), and a gain associated with the color of the current pixel. Thereafter, at step 680, a first filter coefficient K may be selected from the motion table 655 using the motion table lookup index determined at step 679. By way of example only, in one embodiment, the filter coefficient K and the motion table lookup index may be determined as follows:

$$K=M[\text{gain}[c]\times(d(j,i,t)+h(j,i,t-1))], \tag{2b}$$

wherein M represents the motion table, and wherein the gain [c] corresponds to a gain associated with the color of the current pixel. Additionally, though not shown in FIG. 56, it should be understood that a motion history output value h(t) for the current pixel may also be determined and may be used to apply temporal filtering to a collocated pixel of a subsequent image frame (e.g., the next frame). In the present embodiment, the motion history output h(t) for the current pixel x(t) may be determined using the following formula:

$$h(j,i,t)=d(j,i,t)+K[h(j,i,t-1)-d(j,i,t)] \tag{3b}$$

Next, at step 681, an attenuation factor may be selected from the luma table 656 using a luma table lookup index determined based upon the gain (gain[c]) associated with the color of the current pixel x(t). As discussed above, the attenuation factors stored in the luma table may have a range from approximately 0 to 1. Thereafter, at step 682, a second filter coefficient K' may be calculated based upon the attenuation factor (from step 681) and the first filter coefficient K (from step 680). By way of example only, in one embodiment, the second filter coefficient K' and the luma table lookup index may be determined as follows:

$$K'=K\times L[\text{gain}[c]\times x(j,i,t)] \tag{4b}$$

Next, at step 683, a temporally filtered output value y(t) corresponding to the current input pixel x(t) is determined based upon the second filter coefficient K' (from step 682), the value of the collocated reference pixel r(t−1), and the value of the input pixel x(t). For instance, in one embodiment, the output value y(t) may be determined as follows:

$$y(j,i,t)=x(j,i,t)+K'(r(j,i,t-1)-x(j,i,t)) \tag{5b}$$

Figure 57:
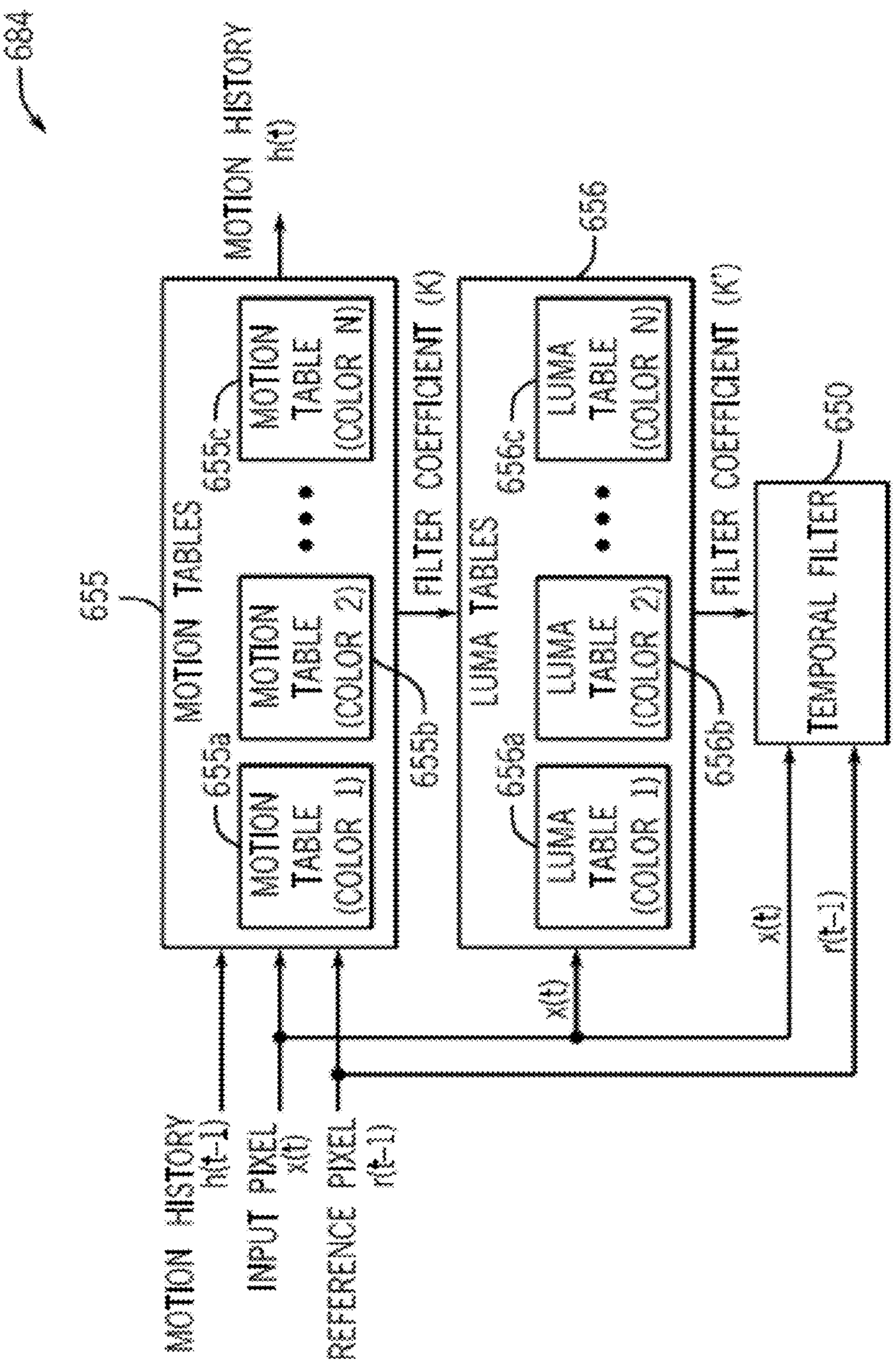
FIG. 57 is a process diagram illustrating a how a temporal filtering technique that utilizes separate motion and luma tables for each color component of the image pixel data received by the ISP front-end pixel processing unit shown in FIG. 51, in accordance with a further embodiment.

Continuing to FIG. 57, a further embodiment of the temporal filtering process 384 is depicted. Here, the temporal filtering process 384 may be accomplished in a manner similar to the embodiment discussed in FIG. 56, except that instead of applying a color-dependent gain (e.g., gain[c]) to each input pixel and using shared motion and luma tables, separate motion and luma tables are provided for each color components. For instance, as shown in FIG. 57, the motion tables 655 may include a motion table 655*a* corresponding to a first color, a motion table 655*b* corresponding to a second color, and a motion table 655*c* corresponding to an nth color, wherein n depends on the number of colors present in the raw image data. Similarly, the luma tables 656 may include a luma table 656*a* corresponding to the first color, a luma table 656*b* corresponding to the second color, and a luma table 656*c* corresponding to the nth color. Thus, in an embodiment where the raw image data is Bayer image data, three motion and luma tables may be provided for each of the red, blue, and green color components. As discussed below, the selection of filtering coefficients K and attenuation factors may depend on the motion and luma table selected for the current color (e.g., the color of the current input pixel).

Figure 58:
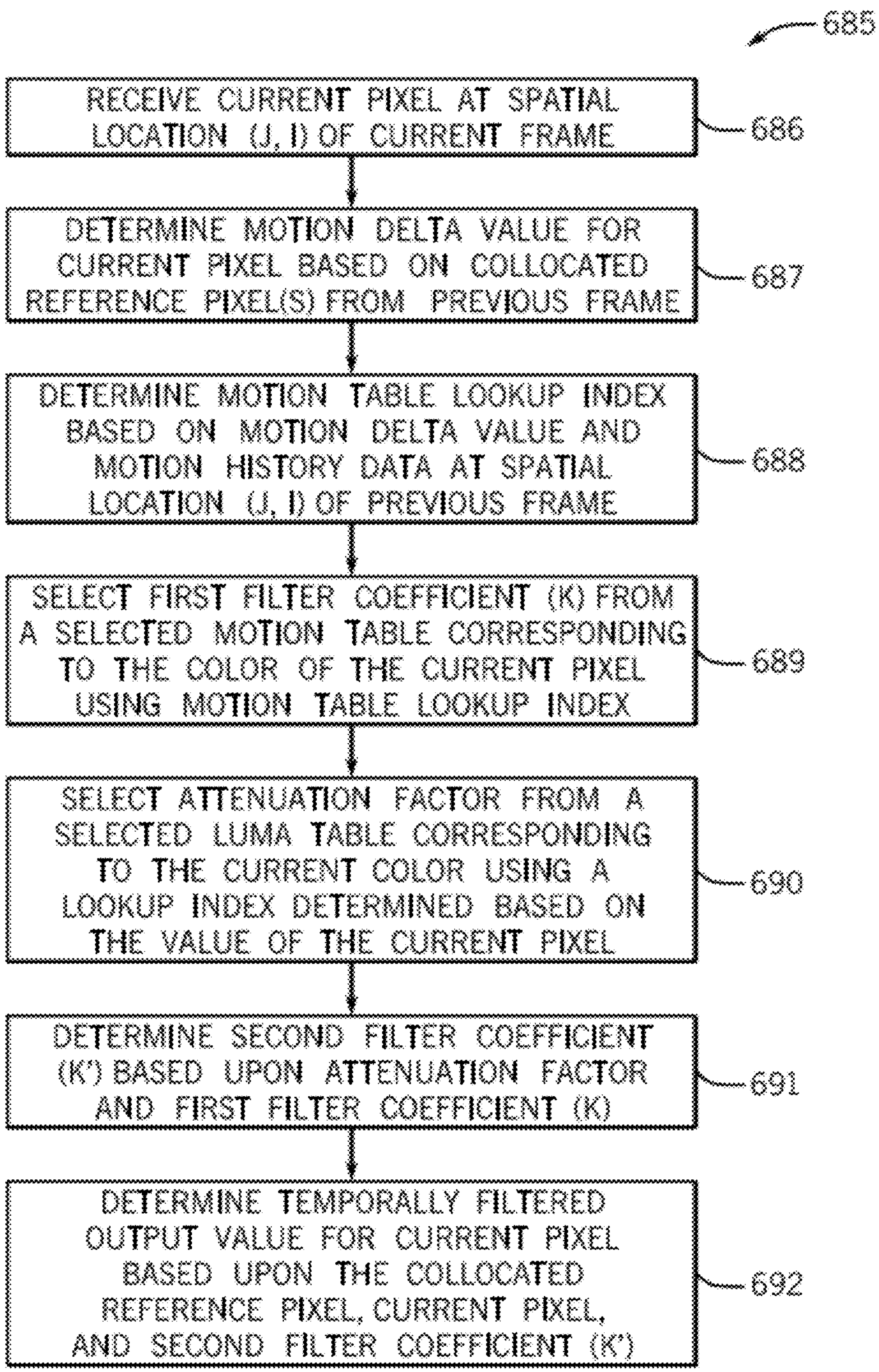
FIG. 58 is a flow chart illustrating a process for applying temporal filtering to a current image pixel of a set of image data using the motion and luma tables shown in FIG. 57, in accordance with further embodiment.

A method 685 illustrating a further embodiment for temporal filtering using color-dependent motion and luma tables is shown in FIG. 58. As will be appreciated, the various calculations and formulas that may be employed by the method 685 may be similar to the embodiment shown in FIG. 54, but with a particular motion and luma table being selected for each color, or similar to the embodiment shown in FIG. 56, but replacing the use of the color dependent gain[c] with the selection of a color-dependent motion and luma table.

Beginning at step 686, a current pixel x(t) located at spatial location (j,i) of a current frame of image data is received by the temporal filtering system 684 (FIG. 57). At step 687, a motion delta value d(t) is determined for the current pixel x(t) based at least partially upon one or more collocated reference pixels (e.g., r(t−1)) from a previous frame of the image data (e.g., the image frame immediately preceding the current frame). Step 687 may be similar to the step 666 of FIG. 54, and may utilize the operation shown in Equation 1 above.

Next, at step 688, a motion table lookup index may be determined using the motion delta value d(t) and a motion history input value h(t−1) corresponding to the spatial location (j,i) from the previous frame (e.g., corresponding to the collocated reference pixel r(t−1)). Thereafter, at step 689, a first filter coefficient K may be selected from one of the available motion tables (e.g., 655*a*, 655*b*, 655*c*) based upon the color of the current input pixel. For instance, one the appropriate motion table is identified, the first filter coefficient K may be selected using the motion table lookup index determined in step 688.

After selecting the first filter coefficient K, a luma table corresponding to the current color is selected and an attenuation factor is selected from the selected luma table based upon the value of the current pixel x(t), as shown at step 690. Thereafter, at step 691, a second filter coefficient K' is determined based upon the attenuation factor (from step 690) and the first filter coefficient K (step 689). Next, at step 692, a temporally filtered output value y(t) corresponding to the current input pixel x(t) is determined based upon the second filter coefficient K' (from step 691), the value of the collocated reference pixel r(t−1), and the value of the input pixel x(t). While the technique shown in FIG. 58 may be more costly to implement (e.g., due to the memory needed for storing additional motion and luma tables), it may, in some instances, offer further improvements with regard to ghosting artifacts and consistency across different colors after auto-white balance gains.

In accordance with further embodiments, the temporal filtering process provided by the temporal filter 650 may utilize a combination of color-dependent gains and color-specific motion and/or luma tables for applying temporal filtering to the input pixels. For instance, in one such embodiment, a single motion table may be provided for all color components, and the motion table lookup index for selecting the first filtering coefficient (K) from the motion table may be determined based upon a color dependent gain (e.g., as shown in FIG. 56, steps 679-680), while the luma table lookup index may not have a color dependent gain applied thereto, but may be used to select the brightness attenuation factor from one of multiple luma tables depending upon the color of the current input pixel (e.g., as shown in FIG. 58, step 690). Alternatively, in another embodiment, multiple motion tables may be provided and a motion table lookup index (without a color dependent gain applied) may be used to select the first filtering coefficient (K) from a motion table corresponding to the color of the current input pixel (e.g., as shown in FIG. 58, step 689), while a single luma table may be provided for all color components, and wherein the luma table lookup index for selecting the brightness attenuation factor may be determined based upon a color dependent gain (e.g., as shown in FIG. 56, steps 681-682). Further, in one embodiment where a Bayer color filter array is utilized, one motion table and/or luma table may be provided for each of the red (R) and blue (B) color components, while a common motion table and/or luma table may be provided for both green color components (Gr and Gb).

The output of the temporal filter 650 may subsequently be sent to the binning compensation filter (BCF) 652, which may be configured to process the image pixels to compensate for non-linear placement (e.g., uneven spatial distribution) of the color samples due to binning by the image sensor(s) 90*a* or 90*b*, such that subsequent image processing operations in the ISP pipe logic 82 (e.g., demosaicing, etc.) that depend on linear placement of the color samples can operate correctly. For example, referring now to FIG. 59, a full resolution sample 693 of Bayer image data is depicted. This may represent a full resolution sample raw image data captured by the image sensor 90*a* (or 90*b*) coupled to the ISP front-end processing logic 80.

As will be appreciated, under certain image capture conditions, it may be not be practical to send the full resolution image data captured by the image sensor 90*a* to the ISP circuitry 32 for processing. For instance, when capturing video data, in order to preserve the appearance of a fluid moving image from the perspective of the human eye, a frame rate of at least approximately 30 frames per second may be desired. However, if the amount of pixel data contained in each frame of a full resolution sample exceeds the processing capabilities of the ISP circuitry 32 when sampled at 30 frames per second, binning compensation filtering may be applied in conjunction with binning by the image sensor 90*a* to reduce the resolution of the image signal while also improving signal-to-noise ratio. For instance, as discussed above, various binning techniques, such as 2×2 binning, may be applied to produce a “binned” raw image pixel by averaging the values of surrounding pixels in the active region 312 of the raw frame 310.

Figure 59:
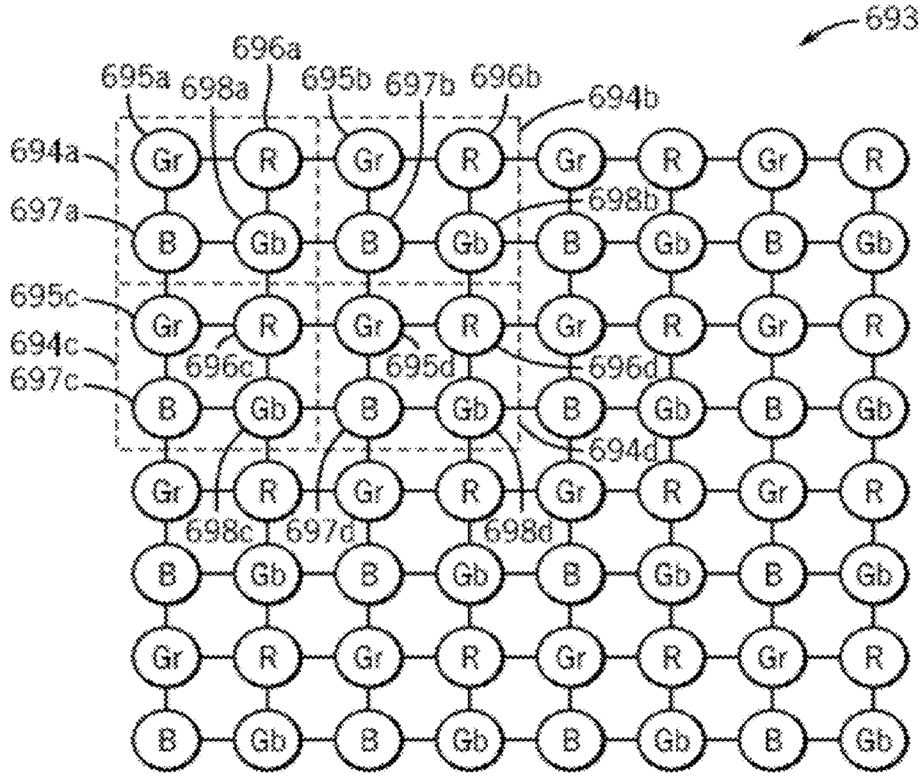
FIG. 59 depicts a sample of full resolution raw image data that may be captured by an image sensor, in accordance with aspects of the present disclosure.
Figure 60:
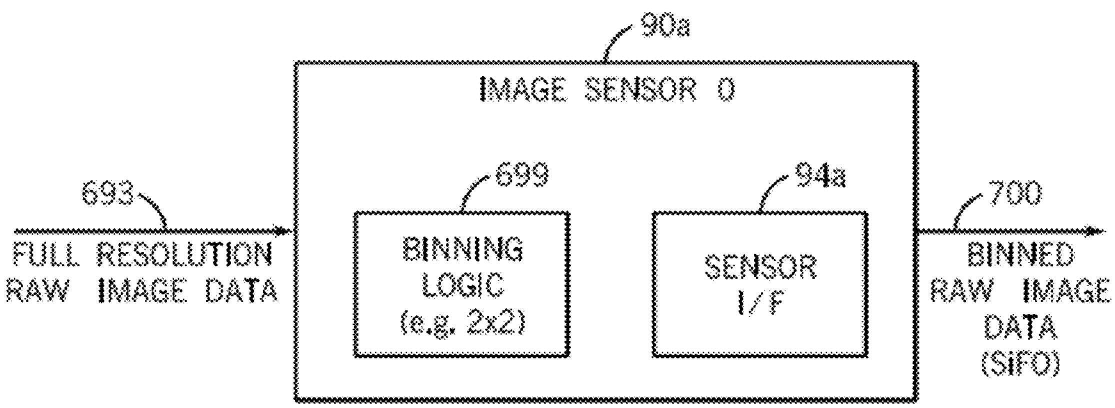
FIG. 60 illustrates an image sensor that may be configured to apply binning to the full resolution raw image data of FIG. 59 to output a sample of binned raw image data, in accordance with an embodiment of the present disclosure.
Figure 61:
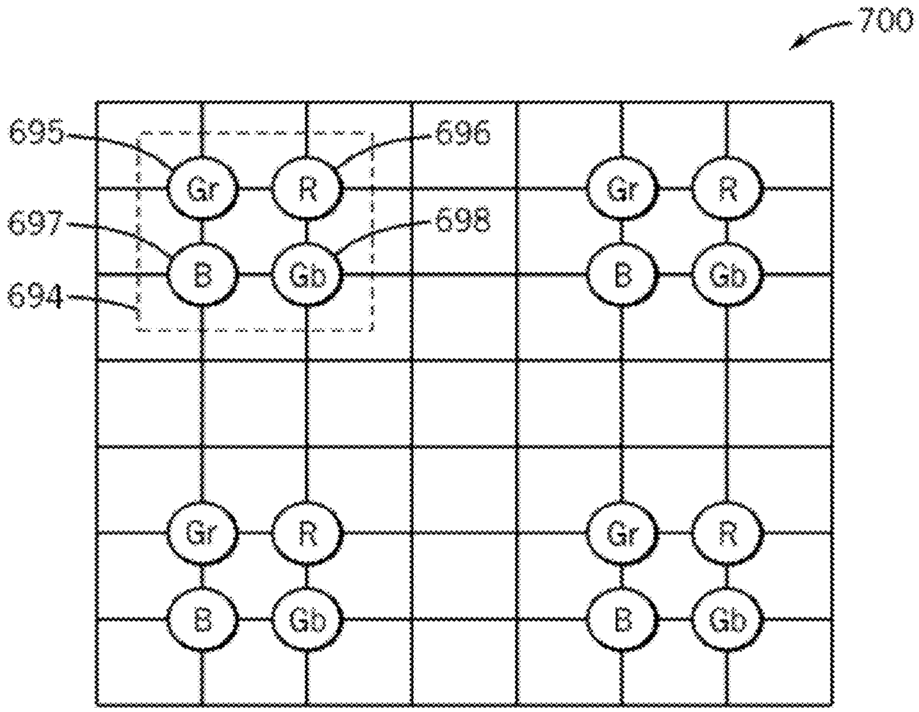
FIG. 61 depicts a sample of binned raw image data that may be provided by the image sensor of FIG. 60, in accordance with aspects of the present disclosure.

Referring to FIG. 60, an embodiment of the image sensor 90*a* that may be configured to bin the full resolution image data 693 of FIG. 59 to produce corresponding binned raw image data 700 shown in FIG. 61 is illustrated in accordance with one embodiment. As shown, the image sensor 90*a* may capture the full resolution raw image data 693. Binning logic 699 may be configured to apply binning to the full resolution raw image data 693 to produce the binned raw image data 700, which may be provided to the ISP front-end processing logic 80 using the sensor interface 94*a* which, as discussed above, may be an SMIA interface or any other suitable parallel or serial camera interfaces.

As illustrated in FIG. 61, the binning logic 699 may apply 2×2 binning to the full resolution raw image data 693. For example, with regard to the binned image data 700, the pixels 695, 696, 697, and 698 may form a Bayer pattern and may be determined by averaging the values of the pixels from the full resolution raw image data 693. For instance, referring to both FIGS. 59 and 61, the binned Gr pixel 695 may be determined as the average or mean of the full resolution Gr pixels 695*a*-695*d*. Similarly, the binned R pixel 696 may be determined as the average of the full resolution R pixels 696*a*-696*d*, the binned B pixel 697 may be determined as the average of the full resolution B pixels 697*a*-697*d*, and the binned Gb pixel 698 may be determined as the average of the full resolution Gb pixels 698*a*-698*d*. Thus, in the present embodiment, 2×2 binning may provide a set of four full resolution pixels including an upper left (e.g., 695*a*), upper right (e.g., 695*b*), lower left (e.g., 695*c*), and lower right (e.g., 695*d*) pixel that are averaged to derive a binned pixel located at the center of a square formed by the set of four full resolution pixels. Accordingly, the binned Bayer block 694 shown in FIG. 61 contains four "superpixels" that represent the 16 pixels contained in the Bayer blocks 694*a*-694*d* of FIG. 59.

In addition to reducing spatial resolution, binning also offers the added advantage of reducing noise in the image signal. For instance, whenever an image sensor (e.g., 90*a*) is exposed to a light signal, there may be a certain amount of noise, such as photon noise, associated with the image. This noise may be random or systematic and it also may come from multiple sources. Thus, the amount of information contained in an image captured by the image sensor may be expressed in terms of a signal-to-noise ratio. For example, every time an image is captured by an image sensor 90*a* and transferred to a processing circuit, such as the ISP circuitry 32, there may be some degree of noise in the pixels values because the process of reading and transferring the image data inherently introduces "read noise" into the image signal. This "read noise" may be random and is generally unavoidable. By using the average of four pixels, noise, (e.g., photon noise) may generally be reduced irrespective of the source of the noise.

Thus, when considering the full resolution image data 693 of FIG. 59, each Bayer pattern (2×2 block) 694*a*-694*d* contains 4 pixels, each of which contains a signal and noise component. If each pixel in, for example, the Bayer block 694*a*, is read separately, then four signal components and four noise components are present. However, by applying binning, as shown in FIGS. 59 and 61, such that four pixels (e.g., 695*a*, 695*b*, 695*c*, 695*d*) may be represented by a single pixel (e.g., 695) in the binned image data, the same area occupied by the four pixels in the full resolution image data 693 may be read as a single pixel with only one instance of a noise component, thus improving signal-to-noise ratio.

Further, while the present embodiment depicts the binning logic 699 of FIG. 60 as being configured to apply a 2×2 binning process, it should be appreciated that the binning logic 699 may be configured to apply any suitable type of binning process, such as 3×3 binning, vertical binning, horizontal binning, and so forth. In some embodiments, the image sensor 90*a* may be configured to select between different binning modes during the image capture process. Additionally, in further embodiments, the image sensor 90*a* may also be configured to apply a technique that may be referred to as "skipping," wherein instead of average pixel samples, the logic 699 selects only certain pixels from the full resolution data 693 (e.g., every other pixel, every 3 pixels, etc.) to output to the ISP front-end 80 for processing. Further, while only the image sensor 90*a* is shown in FIG. 60, it should be appreciated that the image sensor 90*b* may be implemented in a similar manner.

Figure 62:
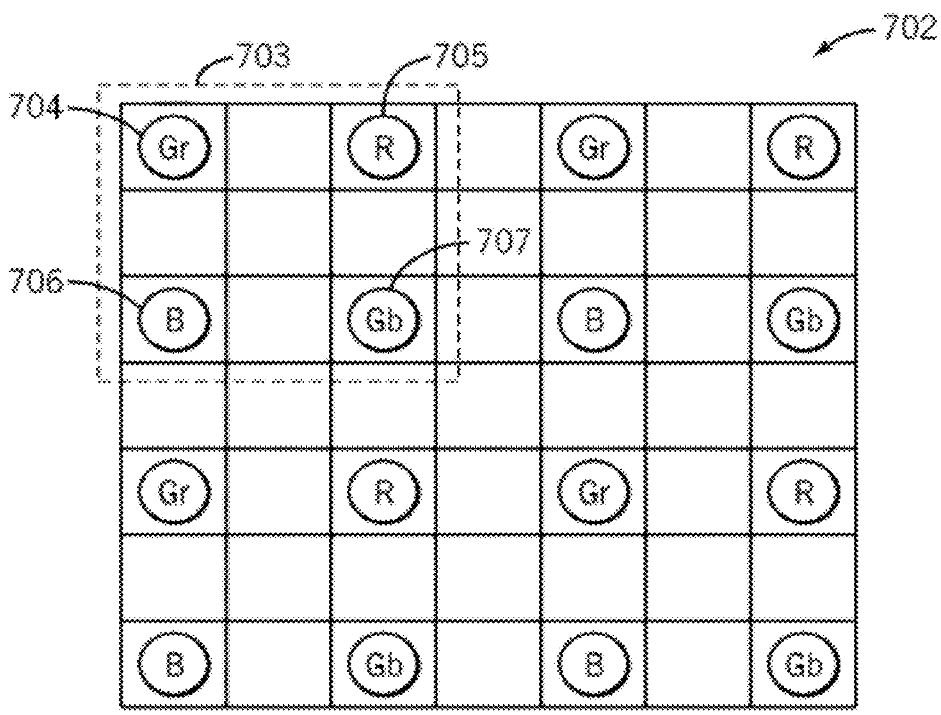
FIG. 62 depicts the binned raw image data from FIG. 61 after being re-sampled by a binning compensation filter to provide, in accordance with aspects of the present disclosure.

As also depicted in FIG. 61, one effect of the binning process is that the spatial sampling of the binned pixels may not be equally spaced. This spatial distortion may, in some systems, result in aliasing (e.g., jagged edges), which is generally not desirable. Further, because certain image processing steps in the ISP pipe logic 82 may depend upon on the linear placement of the color samples in order to operate correctly, the binning compensation filter (BCF) 652 may be applied to perform re-sampling and re-positioning of the binned pixels such that the binned pixels are spatially evenly distributed. That is, the BCF 652 essentially compensates for the uneven spatial distribution (e.g., shown in FIG. 61) by re-sampling the position of the samples (e.g., pixels). For instance, FIG. 62 illustrates a re-sampled portion of binned image data 702 after being processed by the BCF 652, wherein the Bayer block 703 containing the evenly distributed re-sampled pixels 704, 705, 706, and 707 correspond to the binned pixels 695, 696, 697, and 698, respectively, of the binned image data 700 from FIG. 61. Additionally, in an embodiment that utilizes skipping (e.g., instead of binning), as mentioned above, the spatial distortion shown in FIG. 61 may not be present. In this case, the BCF 652 may function as a low pass filter to reduce artifacts (e.g., aliasing) that may result when skipping is employed by the image sensor 90*a*.

Figure 63:
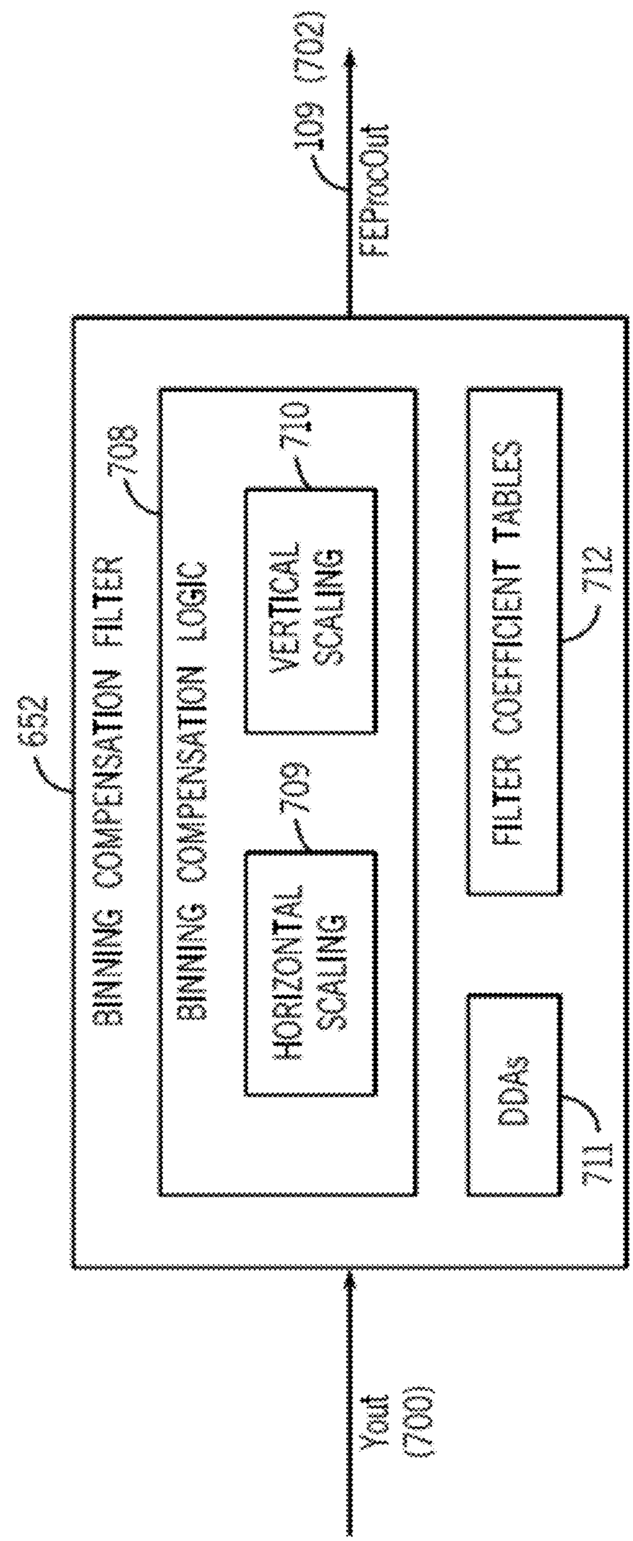
FIG. 63 depicts a binning compensation filter that may be implemented in the ISP front-end pixel processing unit of FIG. 51, in accordance with one embodiment.

FIG. 63 shows a block diagram of the binning compensation filter 652 in accordance with one embodiment. The BCF 652 may include binning compensation logic 708 that may process binned pixels 700 to apply horizontal and vertical scaling using horizontal scaling logic 709 and vertical scaling logic 710, respectively, to re-sample and re-position the binned pixels 700 so that they are arranged in a spatially even distribution, as shown in FIG. 62. In one embodiment, the scaling operation(s) performed by the BCF 652 may be performed using horizontal and vertical multi-tap polyphase filtering. For instance, the filtering process may include selecting the appropriate pixels from the input source image data (e.g., the binned image data 700 provided by the image sensor 90*a*), multiplying each of the selected pixels by a filtering coefficient, and summing up the resulting values to form an output pixel at a desired destination.

The selection of the pixels used in the scaling operations, which may include a center pixel and surrounding neighbor pixels of the same color, may be determined using separate differential analyzers 711, one for vertical scaling and one for horizontal scaling. In the depicted embodiment, the differential analyzers 711 may be digital differential analyzers (DDAs) and may be configured to control the current output pixel position during the scaling operations in the vertical and horizontal directions. In the present embodiment, a first DDA (referred to as 711*a*) is used for all color components during horizontal scaling, and a second DDA (referred to as 711*b*) is used for all color components during vertical scaling. By way of example only, the DDA 711 may be provided as a 32-bit data register that contains a 2's-complement fixed-point number having 16 bits in the integer portion and 16 bits in the fraction. The 16-bit integer portion may be used to determine the current position for an output pixel. The fractional portion of the DDA 711 may be used to determine a current index or phase, which may be based the between-pixel fractional position of the current DDA position (e.g., corresponding to the spatial location of the output pixel). The index or phase may be used to select an appropriate set of coefficients from a set of filter coefficient tables 712. Additionally, the filtering may be done per color component using same colored pixels.

Thus, the filtering coefficients may be selected based not only on the phase of the current DDA position, but also the color of the current pixel. In one embodiment, 8 phases may be present between each input pixel and, thus, the vertical and horizontal scaling components may utilize 8-deep coefficient tables, such that the high-order 3 bits of the 16-bit fraction portion are used to express the current phase or index. Thus, as used herein, the term "raw image" data or the like shall be understood to refer to multi-color image data that is acquired by a single sensor with a color filter array pattern (e.g., Bayer) overlaying it, those providing multiple color components in one plane. In another embodiment, separate DDAs may be used for each color component. For instance, in such embodiments, the BCF 652 may extract the R, B, Gr, and Gb components from the raw image data and process each component as a separate plane.

In operation, horizontal and vertical scaling may include initializing the DDA 711 and performing the multi-tap polyphase filtering using the integer and fractional portions of the DDA 711. While performed separately and with separate DDAs, the horizontal and vertical scaling operations are carried out in a similar manner. A step value or step size (DDAStepX for horizontal scaling and DDAStepY for vertical scaling) determines how much the DDA value (currDDA) is incremented after each output pixel is determined, and multi-tap polyphase filtering is repeated using the next currDDA value. For instance, if the step value is less than 1, then the image is up-scaled, and if the step value is greater than 1, the image is downscaled. If the step value is equal to 1, then no scaling occurs. Further, it should be noted that same or different step sizes may be used for horizontal and vertical scaling.

Figure 64:
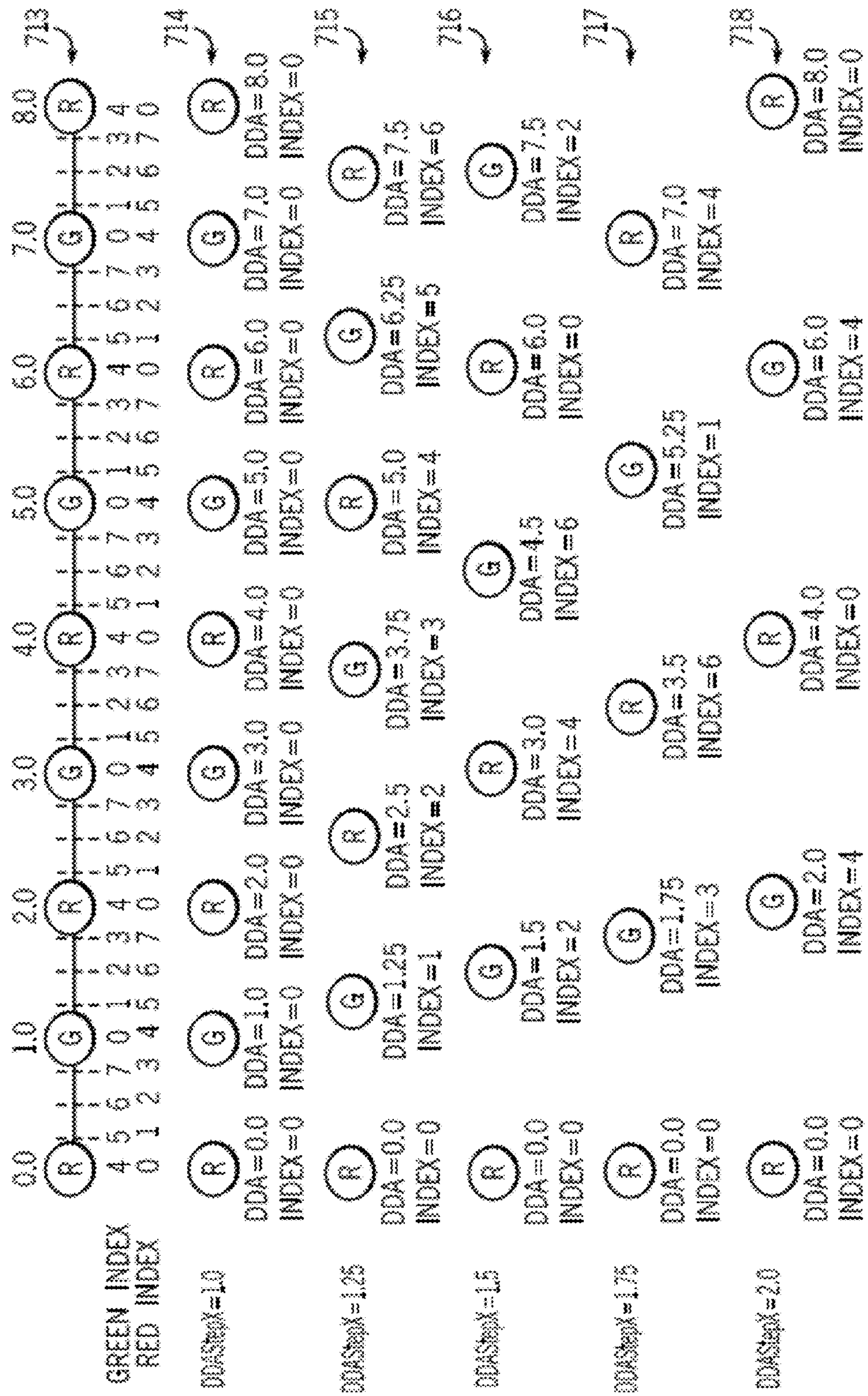
FIG. 64 is a graphical depiction of various step sizes that may be applied to a differential analyzer to select center input pixels and index/phases for binning compensation filtering, in accordance with aspects of the present disclosure.

Output pixels are generated by the BCF 652 in the same order as input pixels (e.g., using the Bayer pattern). In the present embodiment, the input pixels may be classified as being even or odd based on their ordering. For instance, referring to FIG. 64, a graphical depiction of input pixel locations (row 713) and corresponding output pixel locations based on various DDAStep values (rows 714-718) are illustrated. In this example, the depicted row represents a row of red (R) and green (Gr) pixels in the raw Bayer image data. For horizontal filtering purposes, the red pixel at position 0.0 in the row 713 may be considered an even pixel, the green pixel at position 1.0 in the row 713 may be considered an odd pixel, and so forth. For the output pixel locations, even and odd pixels may be determined based on the least significant bit in the fraction portion (lower 16 bits) of the DDA 711. For instance, assuming a DDAStep of 1.25, as shown in row 715, the least significant bit corresponds to the bit 14 of the DDA, as this bit gives a resolution of 0.25. Thus, the red output pixel at the DDA position (currDDA) 0.0 may be considered an even pixel (the least significant bit, bit 14, is 0), the green output pixel at currDDA 1.0 (bit 14 is 1), and so forth. Further, while FIG. 64 is discussed with respect to filtering in the horizontal direction (using DDAStepX), it should be understood that the determination of even and odd input and output pixels may be applied in the same manner with respect to vertical filtering (using DDAStepY). In other embodiments, the DDAs 711 may also be used to track locations of the input pixels (e.g., rather than track the desired output pixel locations). Further, it should be appreciated that DDAStepX and DDAStepY may be set to the same or different values. Further, assuming a Bayer pattern is used, it should be noted that the starting pixel used by the BCF 652 could be any one of a Gr, Gb, R, or B pixel depending, for instance, on which pixel is located at a corner within the active region 312.

With this in mind, the even/odd input pixels are used to generate the even/odd output pixels, respectively. Given an output pixel location alternating between even and odd position, a center source input pixel location (referred to herein as "currPixel") for filtering purposes is determined by the rounding the DDA to the closest even or odd input pixel location for even or odd output pixel locations (based on DDAStepX), respectively. In an embodiment where the DDA 711*a* is configured to use 16 bits to represent an integer and 16 bits to represent a fraction, currPixel may be determined for even and odd currDDA positions using Equations 6a and 6b below:

Even output pixel locations may be determined based on bits [31:16] of:

$$(\text{currDDA}+1.0)\ \&\ 0xFFFE.0000 \tag{6a}$$

Odd output pixel locations may be determined based on bits [31:16] of:

$$(\text{currDDA})|0x0001.0000 \tag{6b}$$

Essentially, the above equations present a rounding operation, whereby the even and odd output pixel positions, as determined by currDDA, are rounded to the nearest even and odd input pixel positions, respectively, for the selection of currPixel.

Additionally, a current index or phase (currIndex) may also be determined at each currDDA position. As discussed above, the index or phase values represent the fractional between-pixel position of the output pixel position relative to the input pixel positions. For instance, in one embodiment, 8 phases may be defined between each input pixel position. For instance, referring again to FIG. 64, 8 index values 0-7 are provided between the first red input pixel at position 0.0 and the next red input pixel at position 2.0. Similarly, 8 index values 0-7 are provided between the first green input pixel at position 1.0 and the next green input pixel at position 3.0. In one embodiment, the currIndex values may be determined in accordance with Equations 7a and 7b below for even and odd output pixel locations, respectively:

Even output pixel locations may be determined based on bits [16:14] of:

$$(\text{currDDA}+0.125) \tag{7a}$$

Odd output pixel locations may be determined based on bits [16:14] of:

$$(\text{currDDA}+1.125) \tag{7b}$$

For the odd positions, the additional 1 pixel shift is equivalent to adding an offset of four to the coefficient index for odd output pixel locations to account for the index offset between different color components with respect to the DDA 711.

Once currPixel and currIndex have been determined at a particular currDDA location, the filtering process may select one or more neighboring same-colored pixels based on currPixel (the selected center input pixel). By way of example, in an embodiment where the horizontal scaling logic 709 includes a 5-tap polyphase filter and the vertical scaling logic 710 includes a 3-tap polyphase filter, two same-colored pixels on each side of currPixel in the horizontal direction may be selected for horizontal filtering (e.g., −2, −1, 0, +1, +2), and one same-colored pixel on each side of currPixel in the vertical direction may be selected for vertical filtering (e.g., −1, 0, +1). Further, currIndex may be used as a selection index to select the appropriate filtering coefficients from the filter coefficients table 712 to apply to the selected pixels. For instance, using the 5-tap horizontal/3-tap vertical filtering embodiment, five 8-deep tables may be provided for horizontal filtering, and three 8-deep tables may be provided for vertical filtering. Though illustrated as part of the BCF 652, it should be appreciated that the filter coefficient tables 712 may, in certain embodiments, be stored in a memory that is physically separate from the BCF 652, such as the memory 108.

Before discussing the horizontal and vertical scaling operations in further detail, Table 5 below shows examples of how currPixel and currIndex values, as determined based on various DDA positions using different DDAStep values (e.g., could apply to DDAStepX or DDAStepY).

TABLE 5

Binning Compensation Filter - DDA Examples of currPixel and currIndex calculation

| Output Pixel (Even or Odd) | DDAStep 1.25 currDDA | DDAStep 1.25 currIndex | DDAStep 1.25 currPixel | DDAStep 1.5 currDDA | DDAStep 1.5 currIndex | DDAStep 1.5 currPixel | DDAStep 1.75 currDDA | DDAStep 1.75 currIndex | DDAStep 1.75 currPixel | DDAStep 2.0 currDDA | DDAStep 2.0 currIndex | DDAStep 2.0 currPixel |
|---|---|---|---|---|---|---|---|---|---|---|---|---|
| 0 | 0.0 | 0 | 0 | 0.0 | 0 | 0 | 0.0 | 0 | 0 | 0.0 | 0 | 0 |
| 1 | 1.25 | 1 | 1 | 1.5 | 2 | 1 | 1.75 | 3 | 1 | 2 | 4 | 3 |
| 0 | 2.5 | 2 | 2 | 3 | 4 | 4 | 3.5 | 6 | 4 | 4 | 0 | 4 |
| 1 | 3.75 | 3 | 3 | 4.5 | 6 | 5 | 5.25 | 1 | 5 | 6 | 4 | 7 |
| 0 | 5 | 4 | 6 | 6 | 0 | 6 | 7 | 4 | 8 | 8 | 0 | 8 |
| 1 | 6.25 | 5 | 7 | 7.5 | 2 | 7 | 8.75 | 7 | 9 | 10 | 4 | 11 |
| 0 | 7.5 | 6 | 8 | 9 | 4 | 10 | 10.5 | 2 | 10 | 12 | 0 | 12 |
| 1 | 8.75 | 7 | 9 | 10.5 | 6 | 11 | 12.25 | 5 | 13 | 14 | 4 | 15 |
| 0 | 10 | 0 | 10 | 12 | 0 | 12 | 14 | 0 | 14 | 16 | 0 | 16 |
| 1 | 11.25 | 1 | 11 | 13.5 | 2 | 13 | 15.75 | 3 | 15 | 18 | 4 | 19 |
| 0 | 12.5 | 2 | 12 | 15 | 4 | 16 | 17.5 | 6 | 18 | 20 | 0 | 20 |
| 1 | 13.75 | 3 | 13 | 16.5 | 6 | 17 | 19.25 | 1 | 19 | 22 | 4 | 23 |
| 0 | 15 | 4 | 16 | 18 | 0 | 18 | 21 | 4 | 22 | 24 | 0 | 24 |
| 1 | 16.25 | 5 | 17 | 19.5 | 2 | 19 | 22.75 | 7 | 23 | 26 | 4 | 27 |
| 0 | 17.5 | 6 | 18 | 21 | 4 | 22 | 24.5 | 2 | 24 | 28 | 0 | 28 |
| 1 | 18.75 | 7 | 19 | 22.5 | 6 | 23 | 26.25 | 5 | 27 | 30 | 4 | 31 |
| 0 | 20 | 0 | 20 | 24 | 0 | 24 | 28 | 0 | 28 | 32 | 0 | 32 |

To provide an example, let us assume that a DDA step size (DDAStep) of 1.5 is selected (row 716 of FIG. 64), with the current DDA position (currDDA) beginning at 0, indicating an even output pixel position. To determine currPixel, Equation 6a may be applied, as shown below:

$$currDDA = 0.0(\text{even})$$

$$\begin{array}{ll} & 0000\ 0000\ 0000\ 0001.0000\ 0000\ 0000\ 0000 \quad (currDDA + 1.0) \\ (\text{AND}) & 1111\ 1111\ 1111\ 1110.0000\ 0000\ 0000\ 0000 \quad (0\times FFFE.0000) \\ = & \underline{0000\ 0000\ 0000\ 0000}.0000\ 0000\ 0000\ 0000 \end{array}$$

$$currPixel\ (\text{determined as bits } [31:16] \text{ of the result}) = 0;$$

Thus, at the currDDA position 0.0 (row 716), the source input center pixel for filtering corresponds to the red input pixel at position 0.0 of row 713.

To determine currIndex at the even currDDA 0.0, Equation 7a may be applied, as shown below:

$$currDDA = 0.0(\text{even})$$

$$\begin{array}{ll} & 0000\ 0000\ 0000\ 0000.0000\ 0000\ 0000\ 0000 \quad (currDDA) \\ + & 0000\ 0000\ 0000\ 0000.0010\ 0000\ 0000\ 0000 \quad (0.125) \\ = & 0000\ 0000\ 0000\ 000\underline{0.00}10\ 0000\ 0000\ 0000 \end{array}$$

$$currIndex\ (\text{determined as bits } [16:14] \text{ of the result}) = [000] = 0;$$

Thus, at the currDDA position 0.0 (row 716), a currIndex value of 0 may be used to select filtering coefficients from the filter coefficients table 712.

Accordingly, filtering (which may be vertical or horizontal depending on whether DDAStep is in the X (horizontal) or Y (vertical) direction) may applied based on the determined currPixel and currIndex values at currDDA 0.0, and the DDA 711 is incremented by DDAStep (1.5), and the next currPixel and currIndex values are determined. For instance, at the next currDDA position 1.5 (an odd position), currPixel may be determined using Equation 6b as follows:

$$currDDA = 0.0(\text{odd})$$

$$\begin{array}{ll} & 0000\ 0000\ 0000\ 0001.1000\ 0000\ 0000\ 0000 \quad (currDDA) \\ (\text{OR}) & 0000\ 0000\ 0000\ 0001.0000\ 0000\ 0000\ 0000 \quad (0\times 0001.0000) \\ = & \underline{0000\ 0000\ 0000\ 0001}.1000\ 0000\ 0000\ 0000 \end{array}$$

$$currPixel\ (\text{determined as bits } [31:16] \text{ of the result}) = 1;$$

Thus, at the currDDA position 1.5 (row 716), the source input center pixel for filtering corresponds to the green input pixel at position 1.0 of row 713.

Further, currIndex at the odd currDDA 1.5 may be determined using Equation 7b, as shown below:

$$currDDA = 1.5(\text{odd})$$

$$\begin{array}{ll} & 0000\ 0000\ 0000\ 0001.1000\ 0000\ 0000\ 0000 \quad (currDDA) \\ + & 0000\ 0000\ 0000\ 0001.0010\ 0000\ 0000\ 0000 \quad (1.125) \\ = & 0000\ 0000\ 0000\ 001\underline{0.10}10\ 0000\ 0000\ 0000 \end{array}$$

$$currIndex\ (\text{determined as bits } [16:14] \text{ of the result}) = [010] = 2;$$

Thus, at the currDDA position 1.5 (row 716), a currIndex value of 2 may be used to select the appropriate filtering coefficients from the filter coefficients table 712. Filtering (which may be vertical or horizontal depending on whether DDAStep is in the X (horizontal) or Y (vertical) direction) may thus be applied using these currPixel and currIndex values.

Next, the DDA 711 is incremented again by DDAStep (1.5), resulting in a currDDA value of 3.0. The currPixel corresponding to currDDA 3.0 may be determined using Equation 6a, as shown below:

$$\begin{aligned}
&currDDA = 3.0(\text{even})\\
&\quad 0000\ 0000\ 0000\ 0100.0000\ 0000\ 0000\ 0000 \quad (currDDA + 1.0)\\
&(\text{AND})\ 1111\ 1111\ 1111\ 1110.0000\ 0000\ 0000\ 0000 \quad (0 \times FFFE.0000)\\
&= \underline{0000\ 0000\ 0000\ 0100}.0000\ 0000\ 0000\ 0000\\
&currPixel\ (\text{determined as bits } [31:16] \text{ of the result}) = 4;
\end{aligned}$$

Thus, at the currDDA position 3.0 (row 716), the source input center pixel for filtering corresponds to the red input pixel at position 4.0 of row 713.

Next, currIndex at the even currDDA 3.0 may be determined using Equation 7a, as shown below:

$$\begin{aligned}
&currDDA = 3.0(\text{even})\\
&\quad 0000\ 0000\ 0000\ 0011.0000\ 0000\ 0000\ 0000 \quad (currDDA)\\
&+\ 0000\ 0000\ 0000\ 0000.0010\ 0000\ 0000\ 0000 \quad (0.125)\\
&=\ 0000\ 0000\ 0000\ 001\underline{1.00}10\ 0000\ 0000\ 0000\\
&currPixel\ (\text{determined as bits } [16:14] \text{ of the result}) = [100] = 4;
\end{aligned}$$

Thus, at the currDDA position 3.0 (row 716), a currIndex value of 4 may be used to select the appropriate filtering coefficients from the filter coefficients table 712. As will be appreciated, the DDA 711 may continue to be incremented by DDAStep for each output pixel, and filtering (which may be vertical or horizontal depending on whether DDAStep is in the X (horizontal) or Y (vertical) direction) may be applied using the currPixel and currIndex determined for each currDDA value.

As discussed above, currIndex may be used as a selection index to select the appropriate filtering coefficients from the filter coefficients table 712 to apply to the selected pixels. The filtering process may include obtaining the source pixel values around the center pixel (currPixel), multiplying each of the selected pixels by the appropriate filtering coefficients selected from the filter coefficients table 712 based on currIndex, and summing the results to obtain a value of the output pixel at the location corresponding to currDDA. Further, because the present embodiment utilizes 8 phases between same colored pixels, using the 5-tap horizontal/3-tap vertical filtering embodiment, five 8-deep tables may be provided for horizontal filtering, and three 8-deep tables may be provided for vertical filtering. In one embodiment, each of the coefficient table entries may include a 16-bit 2's complement fixed point number with 3 integer bits and 13 fraction bits.

Further, assuming a Bayer image pattern, in one embodiment, the vertical scaling component may include four separate 3-tap polyphase filters, one for each color component: Gr, R, B, and Gb. Each of the 3-tap filters may use the DDA 711 to control the stepping of the current center pixel and the index for the coefficients, as described above. Similarly, the horizontal scaling components may include four separate 5-tap polyphase filters, one for each color component: Gr, R, B, and Gb. Each of the 5-tap filters may use the DDA 711 to control the stepping (e.g., via DDAStep) of the current center pixel and the index for the coefficients. It should be understood however, that fewer or more taps could be utilized by the horizontal and vertical scalars in other embodiments.

For boundary cases, the pixels used in the horizontal and vertical filtering process may depend upon the relationship of the current DDA position (currDDA) relative to a frame border (e.g., border defined by the active region 312 in FIG. 23). For instance, in horizontal filtering, if the currDDA position, when compared to the position of the center input pixel (SrcX) and the width (SrcWidth) of the frame (e.g., width 322 of the active region 312 of FIG. 23) indicates that the DDA 711 is close to the border such that there are not enough pixels to perform the 5-tap filtering, then the same-colored input border pixels may be repeated. For instance, if the selected center input pixel is at the left edge of the frame, then the center pixel may be replicated twice for horizontal filtering. If the center input pixel is near the left edge of the frame such that only one pixel is available between the center input pixel and the left edge, then, for horizontal filtering purposes, the one available pixel is replicated in order to provide two pixel values to the left of the center input pixel. Further, the horizontal scaling logic 709 may be configured such that the number of input pixels (including original and replicated pixels) cannot exceed the input width. This may be expressed as follows:

$$StartX = (((DDAInitX + 0x0001.0000)\ \&\ 0xFFFE.0000) >> 16)$$

$$EndX = (((DDAInitX + DDAStepX*(BCFOutWidth-1))\ 10x0001.0000) >> 16)$$

$$EndX - StartX <= SrcWidth-1$$

wherein, DDAInitX represents the initial position of the DDA 711, DDAStepX represents the DDA step value in the horizontal direction, and BCFOutWidth represents the width of the frame output by the BCF 652.

For vertical filtering, if the currDDA position, when compared to the position of the center input pixel (SrcY) and the width (SrcHeight) of the frame (e.g., width 322 of the active region 312 of FIG. 23) indicates that the DDA 711 is close to the border such that there are not enough pixels to perform the 3-tap filtering, then the input border pixels may be repeated. Further, the vertical scaling logic 710 may be configured such that the number of input pixels (including original and replicated pixels) cannot exceed the input height. This may be expressed as follows:

$$StartY = (((DDAInitY + 0x0001.0000)\ \&\ 0xFFFE.0000) >> 16)$$

$$EndY = (((DDAInitY + DDAStepY*(BCFOutHeight-1))\ 10x0001.0000) >> 16)$$

$$EndY - StartY <= SrcHeight-1$$

wherein, DDAInitY represents the initial position of the DDA 711, DDAStepY represents the DDA step value in the vertical direction, and BCFOutHeight represents the width of the frame output by the BCF 652.

Figure 65:
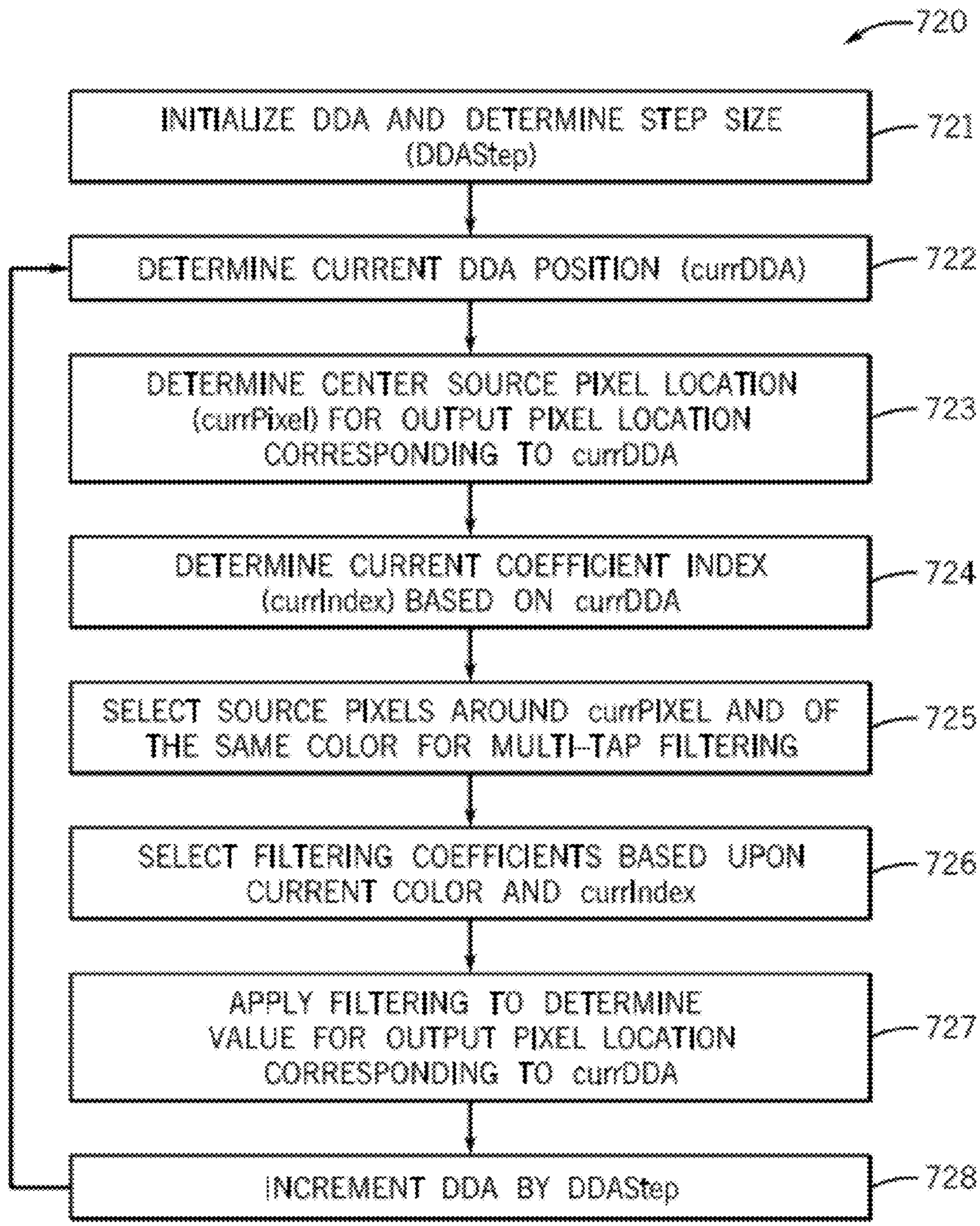
FIG. 65 is a flow chart illustrating a process for scaling image data using the binning compensation filter of FIG. 63, in accordance with one embodiment.

Referring now to FIG. 65, a flow chart depicting a method 720 for applying binning compensation filtering to image data received by the front-end pixel processing unit 150 in accordance with an embodiment. It will be appreciated that the method 720 illustrated in FIG. 65 may apply to both vertical and horizontal scaling. Beginning at step 721 the DDA 711 is initialized and a DDA step value (which may correspond to DDAStepX for horizontal scaling and DDAStepY for vertical scaling) is determined. Next, at step 722, a current DDA position (currDDA), based on DDAStep, is determined. As discussed above, currDDA may correspond to an output pixel location. Using currDDA, the method 720 may determine a center pixel (currPixel) from the input pixel data that may be used for binning compensation filtering to determine a corresponding output value at currDDA, as indicated at step 723. Subsequently, at step 724, an index corresponding to currDDA (currIndex) may be determined based on the fractional between-pixel position of currDDA relative to the input pixels (e.g., row 713 of FIG. 64). By way of example, in an embodiment where the DDA includes 16 integer bits and 16 fraction bits, currPixel may be determined in accordance with Equations 6a and 6b, and currIndex may be determined in accordance with Equations 7a and 7b, as shown above. While the 16 bit integer/16 bit fraction configuration is described herein as one example, it should be appreciated that other configurations of the DDA 711 may be utilized in accordance with the present technique. By way of example, other embodiments of the DDA 711 may be configured to include a 12 bit integer portion and 20 bit fraction portion, a 14 bit integer portion and 18 bit fraction portion, and so forth.

Once currPixel and currIndex are determined, same-colored source pixels around currPixel may be selected for multi-tap filtering, as indicated by step 725. For instance, as discussed above, one embodiment may utilize 5-tap polyphase filtering in the horizontal direction (e.g., selecting 2 same-colored pixels on each side of currPixel) and may utilize 3-tap polyphase filtering in the vertical direction (e.g., selecting 1 same-colored pixel on each side of currPixel). Next, at step 726, once the source pixels are selected, filtering coefficients may be selected from the filter coefficients table 712 of the BCF 652 based upon currIndex.

Thereafter, at step 727, filtering may be applied to the source pixels to determine the value of an output pixel corresponding to the position represented by currDDA. For instance, in one embodiment, the source pixels may be multiplied by their respective filtering coefficients, and the results may be summed to obtain the output pixel value. The direction in which filtering is applied at step 727 may be vertical or horizontal depending on whether DDAStep is in the X (horizontal) or Y (vertical) direction. Finally, at step 263, the DDA 711 is incremented by DDAStep at step 728, and the method 720 returns to step 722, whereby the next output pixel value is determined using the binning compensation filtering techniques discussed herein.

Figure 66:
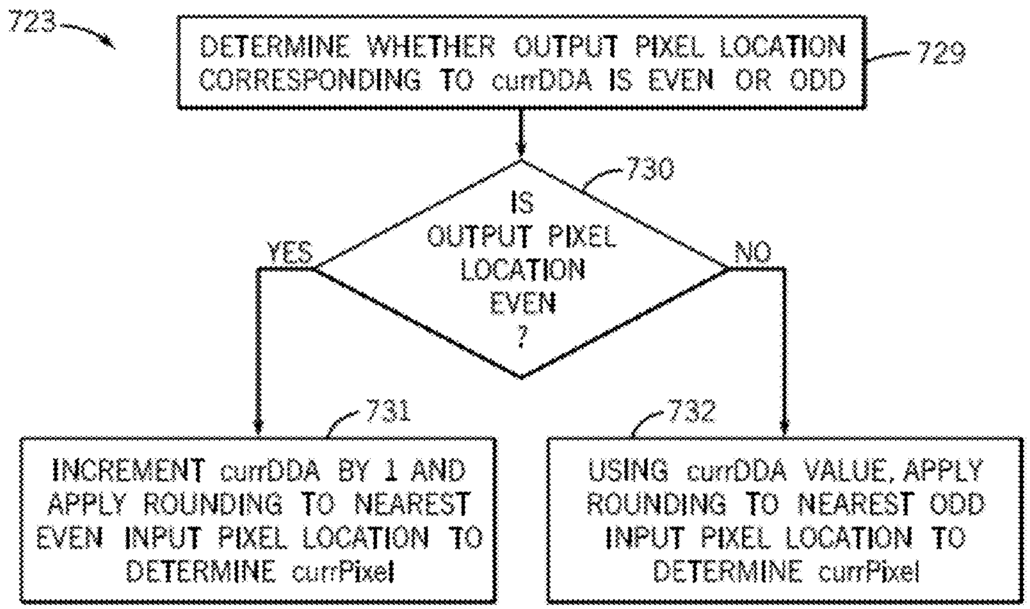
FIG. 66 is a flow chart illustrating a process for determining a current input source center pixel for horizontal and vertical filtering by the binning compensation filter of FIG. 63, in accordance with one embodiment.

Referring to FIG. 66, the step 723 for determining currPixel from the method 720 is illustrated in more detail in accordance with one embodiment. For instance, step 723 may include the sub-step 729 of determining whether the output pixel location corresponding to currDDA (from step 722) is even or odd. As discussed above, an even or odd output pixel may be determined based on the least significant bit of currDDA based on DDAStep. For instance, given a DDAStep of 1.25, a currDDA value of 1.25 may be determined as odd, since the least significant bit (corresponding to bit 14 of the fractional portion of the DDA 711) has a value of 1. For a currDDA value of 2.5, bit 14 is 0, thus indicating an even output pixel location.

At decision logic 730, a determination is made as to whether the output pixel location corresponding to currDDA is even or odd. If the output pixel is even, decision logic 730 continues to sub-step 731, wherein currPixel is determined by incrementing the currDDA value by 1 and rounding the result to the nearest even input pixel location, as represented by Equation 6a above. If the output pixel is odd, then decision logic 730 continues to sub-step 732, wherein currPixel is determined by rounding the currDDA value to the nearest odd input pixel location, as represented by Equation 6b above. The currPixel value may then be applied to step 725 of the method 720 to select source pixels for filtering, as discussed above.

Figure 67:
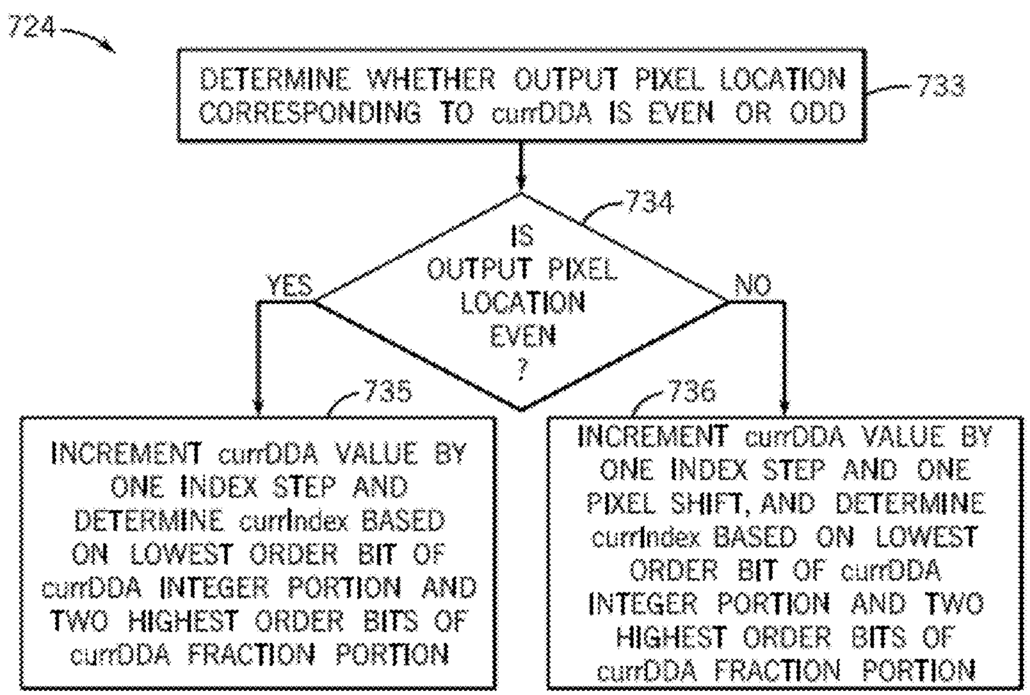
FIG. 67 is a flow chart illustrating a process for determining an index for selecting filtering coefficients for horizontal and vertical filtering by the binning compensation filter of FIG. 63, in accordance with one embodiment.

Referring also to FIG. 67, the step 724 for determining currIndex from the method 720 is illustrated in more detail in accordance with one embodiment. For instance, step 724 may include the sub-step 733 of determining whether the output pixel location corresponding to currDDA (from step 722) is even or odd. This determination may be performed in a similar manner as step 729 of FIG. 66. At decision logic 734, a determination is made as to whether the output pixel location corresponding to currDDA is even or odd. If the output pixel is even, decision logic 734 continues to sub-step 735, wherein currIndex is determined by incrementing the currDDA value by one index step determining currIndex based on the lowest order integer bit and the two highest order fraction bits of the DDA 711. For instance, in an embodiment wherein 8 phases are provided between each same-colored pixel, and wherein the DDA includes 16 integer bits and 16 fraction bits, one index step may correspond to 0.125, and currIndex may be determined based on bits [16:14] of the currDDA value incremented by 0.125 (e.g., Equation 7a). If the output pixel is odd, decision logic 734 continues to sub-step 736, wherein currIndex is determined by incrementing the currDDA value by one index step and one pixel shift, and determining currIndex based on the lowest order integer bit and the two highest order fraction bits of the DDA 711. Thus, in an embodiment wherein 8 phases are provided between each same-colored pixel, and wherein the DDA includes 16 integer bits and 16 fraction bits, one index step may correspond to 0.125, one pixel shift may correspond to 1.0 (a shift of 8 index steps to the next same colored pixel), and currIndex may be determined based on bits [16:14] of the currDDA value incremented by 1.125 (e.g., Equation 7b).

While the presently illustrated embodiment provides the BCF 652 as a component of the front-end pixel processing unit 150, other embodiments may incorporate the BCF 652 into a raw image data processing pipeline of the ISP pipe 82 which, as discussed further below, may include defective pixel detection/correction logic, gain/offset/compensation blocks, noise reduction logic, lens shading correction logic, and demosaicing logic. Further, in embodiments where the aforementioned defective pixel detection/correction logic, gain/offset/compensation blocks, noise reduction logic, lens shading correction logic do not rely upon the linear placement of the pixels, the BCF 652 may be incorporated with the demosaicing logic to perform binning compensation filtering and reposition the pixels prior to demosaicing, as demosaicing generally does rely upon the even spatial positioning of the pixels. For instance, in one embodiment, the BCF 652 may be incorporated anywhere between the sensor input and the demosaicing logic, with temporal filtering and/or defective pixel detection/correction being applied to the raw image data prior to binning compensation.

As discussed above the output of the BCF 652, which may be the output FEProcOut (109) having spatially evenly distributed image data (e.g., sample 702 of FIG. 62), may be forwarded to the ISP pipe processing logic 82 for additional processing. However, before shifting the focus of this discussion to the ISP pipe processing logic 82, a more detailed description of various functionalities that may be provided by the statistics processing units (e.g., 142 and 144) that may be implemented in the ISP front-end logic 80 will first be provided.

Referring back to the general description of the statistics processing units 142 and 144, these units may be configured to collect various statistics about the image sensors that capture and provide the raw image signals (Sif0 and Sif1), such as statistics relating to auto-exposure, auto-white balance, autofocus, flicker detection, black level compensation, and lens shading correction, and so forth. In doing so, the statistics processing units 142 and 144 may first apply one or more image processing operations to their respective input signals, Sif0 (from Sensor0) and Sif1 (from Sensor1).

Figure 68:
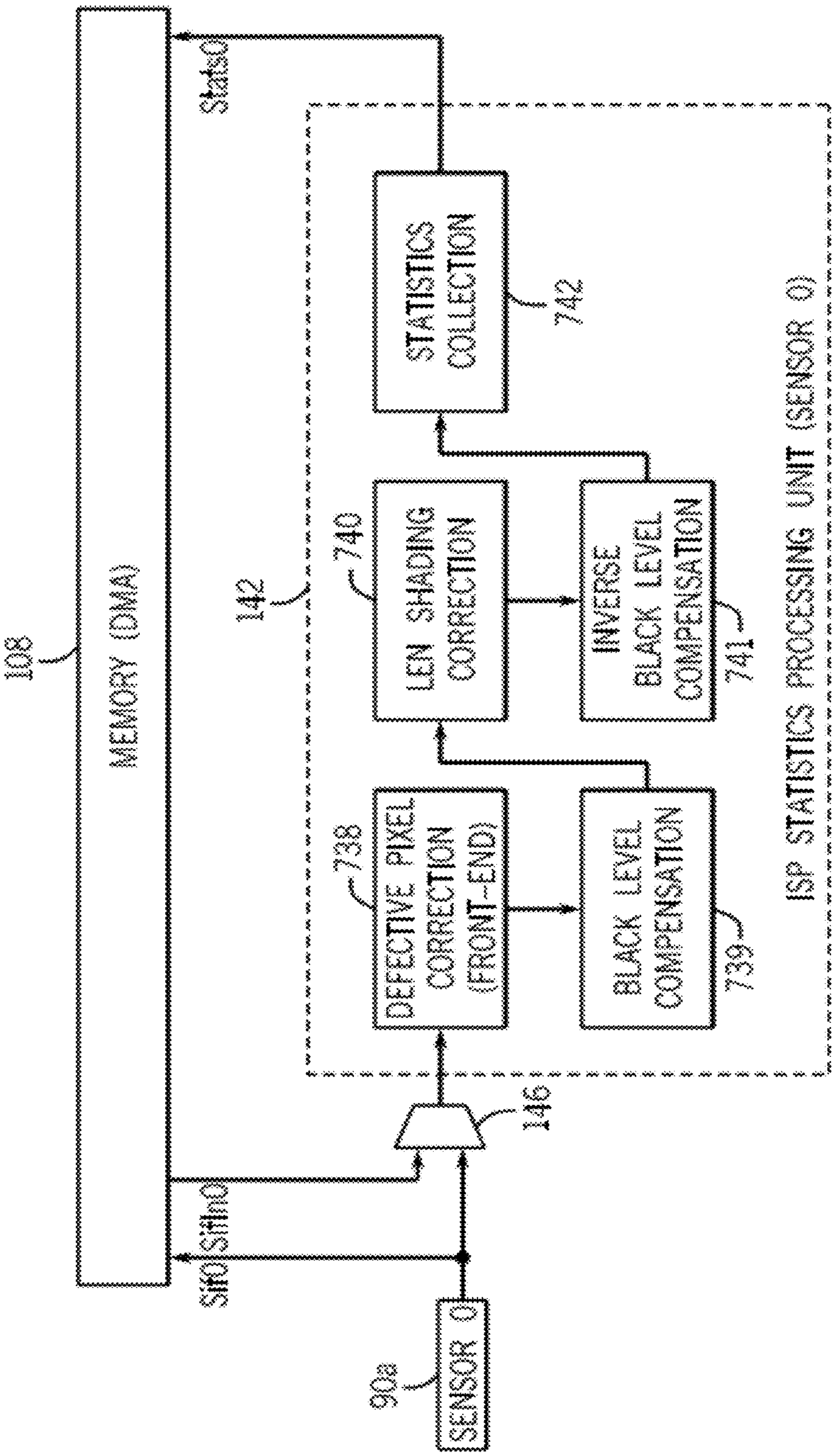
FIG. 68 is more a more detailed block diagram showing an embodiment of a statistics processing unit which may be implemented in the ISP front-end processing logic, as shown in FIG. 10, in accordance with aspects of the present disclosure.

For example, referring to FIG. 68, a more detailed block diagram view of the statistics processing unit 142 associated with Sensor0 (90*a*) is illustrated in accordance with one embodiment. As shown, the statistics processing unit 142 may include the following functional blocks: defective pixel detection and correction logic 738, black level compensation (BLC) logic 739, lens shading correction logic 740, inverse BLC logic 741, and statistics collection logic 742. Each of these functional blocks will be discussed below. Further, it should be understood that the statistics processing unit 144 associated with Sensor1 (90*b*) may be implemented in a similar manner.

Initially, the output of selection logic 146 (e.g., Sif0 or SifIn0) is received by the front-end defective pixel correction logic 738. As will be appreciated, "defective pixels" may be understood to refer to imaging pixels within the image sensor (s) 90 that fail to sense light levels accurately. Defective pixels may attributable to a number of factors, and may include "hot" (or leaky) pixels, "stuck" pixels, and "dead pixels." A "hot" pixel generally appears as being brighter than a non-defective pixel given the same amount of light at the same spatial location. Hot pixels may result due to reset failures and/or high leakage. For example, a hot pixel may exhibit a higher than normal charge leakage relative to non-defective pixels, and thus may appear brighter than non-defective pixels. Additionally, "dead" and "stuck" pixels may be the result of impurities, such as dust or other trace materials, contaminating the image sensor during the fabrication and/or assembly process, which may cause certain defective pixels to be darker or brighter than a non-defective pixel, or may cause a defective pixel to be fixed at a particular value regardless of the amount of light to which it is actually exposed. Additionally, dead and stuck pixels may also result from circuit failures that occur during operation of the image sensor. By way of example, a stuck pixel may appear as always being on (e.g., fully charged) and thus appears brighter, whereas a dead pixel appears as always being off.

The defective pixel detection and correction (DPDC) logic 738 in the ISP front-end logic 80 may correct (e.g., replace defective pixel values) defective pixels before they are considered in statistics collection (e.g., 742). In one embodiment, defective pixel correction is performed independently for each color component (e.g., R, B, Gr, and Gb for a Bayer pattern). Generally, the front-end DPDC logic 738 may provide for dynamic defect correction, wherein the locations of defective pixels are determined automatically based upon directional gradients computed using neighboring pixels of the same color. As will be understand, the defects may be "dynamic" in the sense that the characterization of a pixel as being defective at a given time may depend on the image data in the neighboring pixels. By way of example, a stuck pixel that is always on maximum brightness may not be regarded as a defective pixel if the location of the stuck pixel is in an area of the current image that is dominate by brighter or white colors. Conversely, if the stuck pixel is in a region of the current image that is dominated by black or darker colors, then the stuck pixel may be identified as a defective pixel during processing by the DPDC logic 738 and corrected accordingly.

Figure 69:
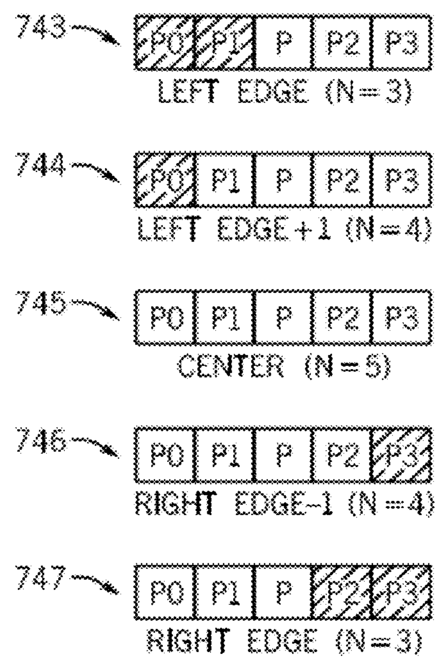
FIG. 69 shows various image frame boundary cases that may be considered when applying techniques for detecting and correcting defective pixels during statistics processing by the statistics processing unit of FIG. 68, in accordance with aspects of the present disclosure.

The DPDC logic 738 may utilize one or more horizontal neighboring pixels of the same color on each side of a current pixel to determine if the current pixel is defective using pixel-to-pixel directional gradients. If a current pixel is identified as being defective, the value of the defective pixel may be replaced with the value of a horizontal neighboring pixel. For instance, in one embodiment, five horizontal neighboring pixels of the same color that are inside the raw frame 310 (FIG. 23) boundary are used, wherein the five horizontal neighboring pixels include the current pixel and two neighboring pixels on either side. Thus, as illustrated in FIG. 69, for a given color component c and for the current pixel P, horizontal neighbor pixels P0, P1, P2, and P3 may be considered by the DPDC logic 738. It should be noted, however, that depending on the location of the current pixel P, pixels outside the raw frame 310 are not considered when calculating pixel-to-pixel gradients.

For instance, as shown in FIG. 69, in a "left edge" case 743, the current pixel P is at the leftmost edge of the raw frame 310 and, thus, the neighboring pixels P0 and P1 outside of the raw frame 310 are not considered, leaving only the pixels P, P2, and P3 (N=3). In a "left edge+1" case 744, the current pixel P is one unit pixel away from the leftmost edge of the raw frame 310 and, thus, the pixel P0 is not considered. This leaves only the pixels P1, P, P2, and P3 (N=4). Further, in a "centered" case 745, pixels P0 and P1 on the left side of the current pixel P and pixels P2 and P3 on the right side of the current pixel P are within the raw frame 310 boundary and, therefore, all of the neighboring pixels P0, P1, P2, and P3 (N=5) are considered in calculating pixel-to-pixel gradients. Additionally, similar cases 746 and 747 may be encountered as the rightmost edge of the raw frame 310 is approached. For instance, given the "right edge−1" case 746, the current pixel P is one unit pixel away the rightmost edge of the raw frame 310 and, thus, the pixel P3 is not considered (N=4). Similarly, in the "right edge" case 747, the current pixel P is at the rightmost edge of the raw frame 310 and, thus, both of the neighboring pixels P2 and P3 are not considered (N=3).

In the illustrated embodiment, for each neighboring pixel (k=0 to 3) within the picture boundary (e.g., raw frame 310), the pixel-to-pixel gradients may be calculated as follows:

$$G_k = \text{abs}(P - P_k),\ \text{for } 0 \le k \le 3 \text{ (only for } k \text{ within the raw frame)} \tag{8}$$

Once the pixel-to-pixel gradients have been determined, defective pixel detection may be performed by the DPDC logic 738 as follows. First, it is assumed that a pixel is defective if a certain number of its gradients $G_k$ are at or below a particular threshold, denoted by the variable dprTh. Thus, for each pixel, a count (C) of the number of gradients for neighboring pixels inside the picture boundaries that are at or below the threshold dprTh is accumulated. By way of example, for each neighbor pixel inside the raw frame 310, the accumulated count C of the gradients $G_k$ that are at or below the threshold dprTh may be computed as follows:

$$C = \sum_{k}^{N} (G_k \le dprTh), \tag{9}$$

$$\text{for } 0 \le k \le 3 \text{(only for } k \text{ within the raw frame)}$$

As will be appreciated, depending on the color components, the threshold value dprTh may vary. Next, if the accumulated count C is determined to be less than or equal to a maximum count, denoted by the variable dprMaxC, then the pixel may be considered defective. This logic is expressed below:

$$\text{if } (C \leq \text{dprMax}C)\text{, then the pixel is defective.} \quad (10)$$

Defective pixels are replaced using a number of replacement conventions. For instance, in one embodiment, a defective pixel may be replaced with the pixel to its immediate left, P1. At a boundary condition (e.g., P1 is outside of the raw frame 310), a defective pixel may replaced with the pixel to its immediate right, P2. Further, it should be understood that replacement values may be retained or propagated for successive defective pixel detection operations. For instance, referring to the set of horizontal pixels shown in FIG. 69, if P0 or P1 were previously identified by the DPDC logic 738 as being defective pixels, their corresponding replacement values may be used for the defective pixel detection and replacement of the current pixel P.

Figure 70:
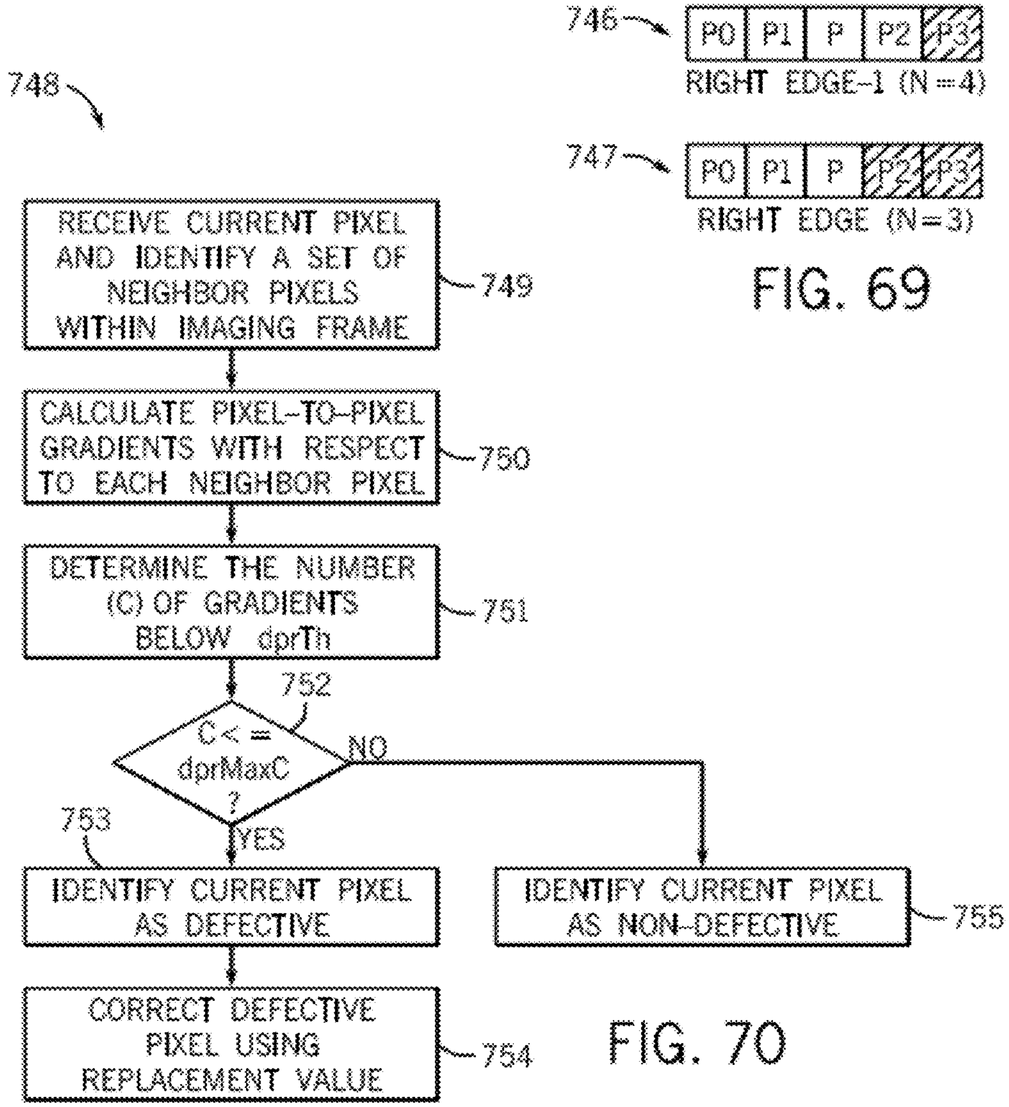
FIG. 70 is a flow chart illustrating a process for performing defective pixel detection and correction during statistics processing, in accordance with one embodiment.

To summarize the above-discussed defective pixel detection and correction techniques, a flow chart depicting such a process is provided in FIG. 70 and referred to by reference number 748. As shown, process 748 begins at step 749, at which a current pixel (P) is received and a set of neighbor pixels is identified. In accordance with the embodiment described above, the neighbor pixels may include two horizontal pixels of the same color component from opposite sides of the current pixel (e.g., P0, P1, P2, and P3). Next, at step 750, horizontal pixel-to-pixel gradients are calculated with respect to each neighboring pixel within the raw frame 310, as described in Equation 8 above. Thereafter, at step 751, a count C of the number of gradients that are less than or equal to a particular threshold dprTh is determined. As shown at decision logic 752, if C is less than or equal to dprMaxC, then the process 748 continues to step 753, and the current pixel is identified as being defective. The defective pixel is then corrected at step 754 using a replacement value. Additionally, referring back to decision logic 752, if C is greater than dprMaxC, then the process continues to step 755, and the current pixel is identified as not being defective, and its value is not changed.

It should be noted that the defective pixel detection/correction techniques applied during the ISP front-end statistics processing may be less robust than defective pixel detection/correction that is performed in the ISP pipe logic 82. For instance, as will be discussed in further detail below, defective pixel detection/correction performed in the ISP pipe logic 82 may, in addition to dynamic defect correction, further provide for fixed defect correction, wherein the locations of defective pixels are known a priori and loaded in one or more defect tables. Further, dynamic defect correction may in the ISP pipe logic 82 may also consider pixel gradients in both horizontal and vertical directions, and may also provide for the detection/correction of speckling, as will be discussed below.

Returning to FIG. 68, the output of the DPDC logic 738 is then passed to the black level compensation (BLC) logic 739. The BLC logic 739 may provide for digital gain, offset, and clipping independently for each color component "c" (e.g., R, B, Gr, and Gb for Bayer) on the pixels used for statistics collection. For instance, as expressed by the following operation, the input value for the current pixel is first offset by a signed value, and then multiplied by a gain.

$$Y=(X+O[c])\times G[c], \quad (11)$$

wherein X represents the input pixel value for a given color component c (e.g., R, B, Gr, or Gb), O[c] represents a signed 16-bit offset for the current color component c, and G[c] represents a gain value for the color component c. In one embodiment, the gain G[c] may be a 16-bit unsigned number with 2 integer bits and 14 fraction bits (e.g., 2.14 in floating point representation), and the gain G[c] may be applied with rounding. By way of example only, the gain G[c] may have a range of between 0 to 4× (e.g., 4 times the input pixel value).

Next, as shown by Equation 12 below, the computed value Y, which is signed, may then be then clipped to a minimum and maximum range:

$$Y=(Y<\min[c])?\min[c]:(Y>\max[c])?\max[c]:Y) \quad (12)$$

The variables min[c] and max[c] may represent signed 16-bit "clipping values for the minimum and maximum output values, respectively. In one embodiment, the BLC logic 739 may also be configured to maintain a count of the number of pixels that were clipped above and below maximum and minimum, respectively, per color component.

Subsequently, the output of the BLC logic 739 is forwarded to the lens shading correction (LSC) logic 740. The LSC logic 740 may be configured to apply an appropriate gain on a per-pixel basis to compensate for drop-offs in intensity, which are generally roughly proportional to the distance from the optical center of the lens 88 of the imaging device 30. As can be appreciated, such drop-offs may be the result of the geometric optics of the lens. By way of example, a lens having ideal optical properties may be modeled as the fourth power of the cosine of the incident angle, $\cos^4(\theta)$, referred to as the $\cos^4$ law. However, because lens manufacturing is not perfect, various irregularities in the lens may cause the optical properties to deviate from the assumed $\cos^4$ model. For instance, the thinner edged of the lens usually exhibits the most irregularities. Additionally, irregularities in lens shading patterns may also be the result of a microlens array within an image sensor not being perfectly aligned with the color array filter. Further, the infrared (IR) filter in some lenses may cause the drop-off to be illuminant-dependent and, thus, lens shading gains may be adapted depending upon the light source detected.

Figure 71:
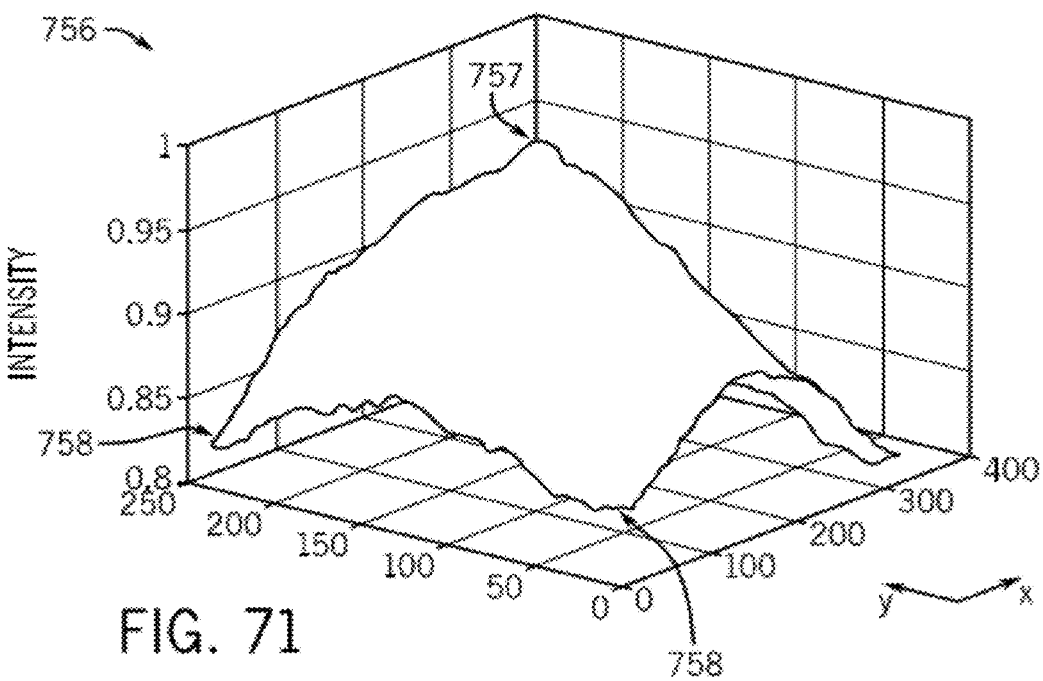
FIG. 71 shows a three-dimensional profile depicting light intensity versus pixel position for a conventional lens of an imaging device.

Referring to FIG. 71, a three-dimensional profile 756 depicting light intensity versus pixel position for a typical lens is illustrated. As shown, the light intensity near the center 757 of the lens gradually drops off towards the corners or edges 758 of the lens. The lens shading irregularities depicted in FIG. 71 may be better illustrated by FIG. 72, which shows a colored drawing of an image 759 that exhibits drop-offs in light intensity towards the corners and edges. Particularly, it should be noted that the light intensity at the approximate center of the image appears to be brighter than the light intensity at the corners and/or edges of the image.

In accordance with embodiments of the present techniques, lens shading correction gains may be specified as a two-dimensional grid of gains per color channel (e.g., Gr, R, B, Gb for a Bayer filter). The gain grid points may be distributed at fixed horizontal and vertical intervals within the raw frame 310 (FIG. 23). As discussed above in FIG. 23, the raw frame 310 may include an active region 312 which defines an area on which processing is performed for a particular image processing operation. With regard to the lens shading correction operation, an active processing region, which may be referred to as the LSC region, is defined within the raw frame region 310. As will be discussed below, the LSC region must be completely inside or at the gain grid boundaries, otherwise results may be undefined.

Figure 73:
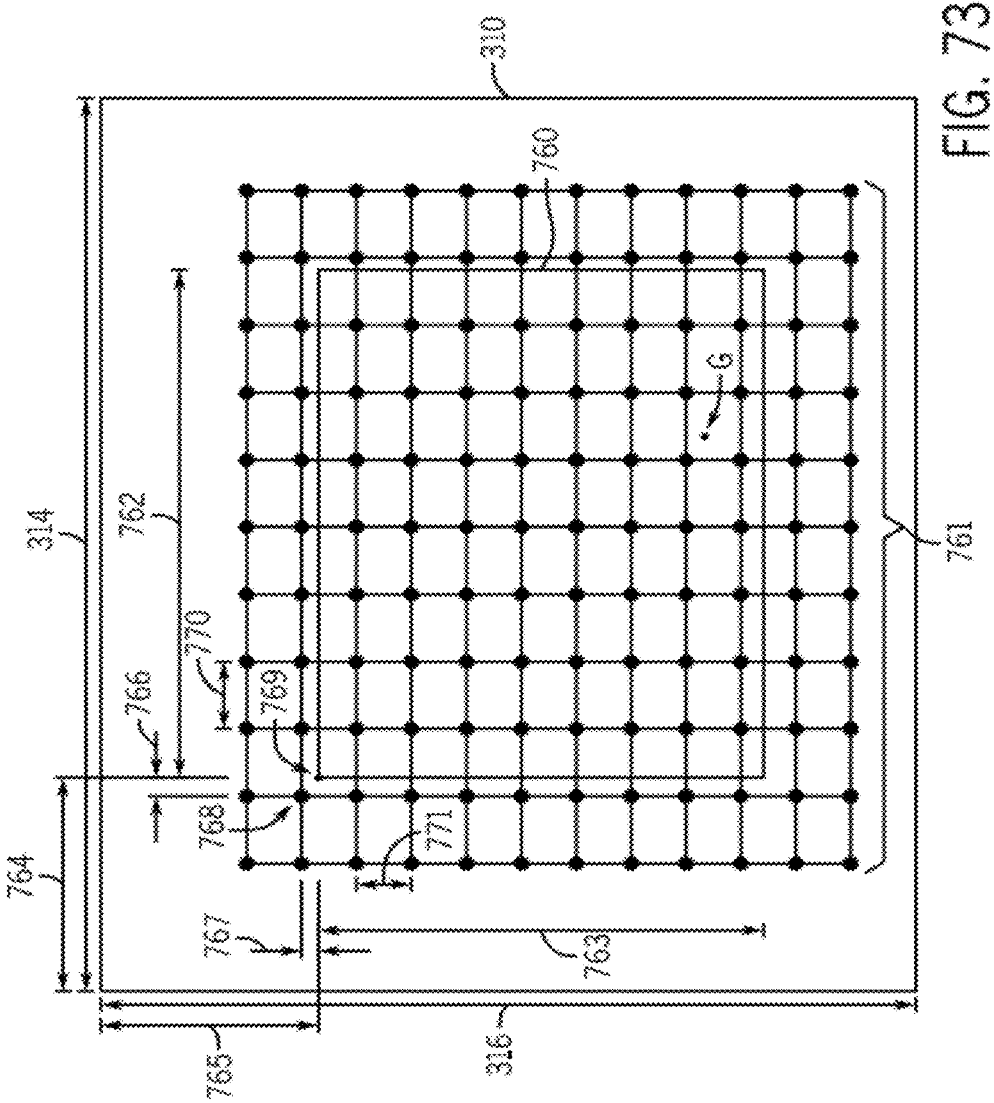
FIG. 73 is a graphical illustration of a raw imaging frame that includes a lens shading correction region and a gain grid, in accordance with aspects of the present disclosure.

For instance, referring to FIG. 73, an LSC region 760 and a gain grid 761 that may be defined within the raw frame 310 are shown. The LSC region 760 may have a width 762 and a height 763, and may be defined by an x-offset 764 and a y-offset 765 with respect to the boundary of the raw frame 310. Grid offsets (e.g., grid x-offset 766 and grid y-offset 767) from the base 768 of the grid gains 761 to the first pixel 769 in the LSC region 760 is also provided. These offsets may be within the first grid interval for a given color component. The horizontal α-direction) and vertical (y-direction) grid point intervals 770 and 771, respectively, may be specified independently for each color channel.

As discussed above, assuming the use of a Bayer color filter array, 4 color channels of grid gains (R, B, Gr, and Gb) may be defined. In one embodiment, a total of 4K (4096) grid points may be available, and for each color channel, a base address for the start location of grid gains may be provided, such as by using a pointer. Further, the horizontal (770) and vertical (771) grid point intervals may be defined in terms of pixels at the resolution of one color plane and, in certain embodiments, may be provide for grid point intervals separated by a power of 2, such as by 8, 16, 32, 64, or 128, etc., in horizontal and vertical directions. As can be appreciated, by utilizing a power of 2, efficient implementation of gain interpolation using a shift (e.g., division) and add operations may be achieved. Using these parameters, the same gain values can be used even as the image sensor cropping region is changing. For instance, only a few parameters need to be updated to align the grid points to the cropped region (e.g., updating the grid offsets 770 and 771) instead of updating all grid gain values. By way of example only, this may be useful when cropping is used during digital zooming operations. Further, while the gain grid 761 shown in the embodiment of FIG. 73 is depicted as having generally equally spaced grid points, it should be understood that in other embodiments, the grid points may not necessarily be equally spaced. For instance, in some embodiments, the grid points may be distributed unevenly (e.g., logarithmically), such that the grid points are less concentrated in the center of the LSC region 760, but more concentrated towards the corners of the LSC region 760, typically where lens shading distortion is more noticeable.

In accordance with the presently disclosed lens shading correction techniques, when a current pixel location is located outside of the LSC region 760, no gain is applied (e.g., the pixel is passed unchanged). When the current pixel location is at a gain grid location, the gain value at that particular grid point may be used. However, when a current pixel location is between grid points, the gain may be interpolated using bi-linear interpolation. An example of interpolating the gain for the pixel location "G" on FIG. 74 is provided below.

Figure 74:
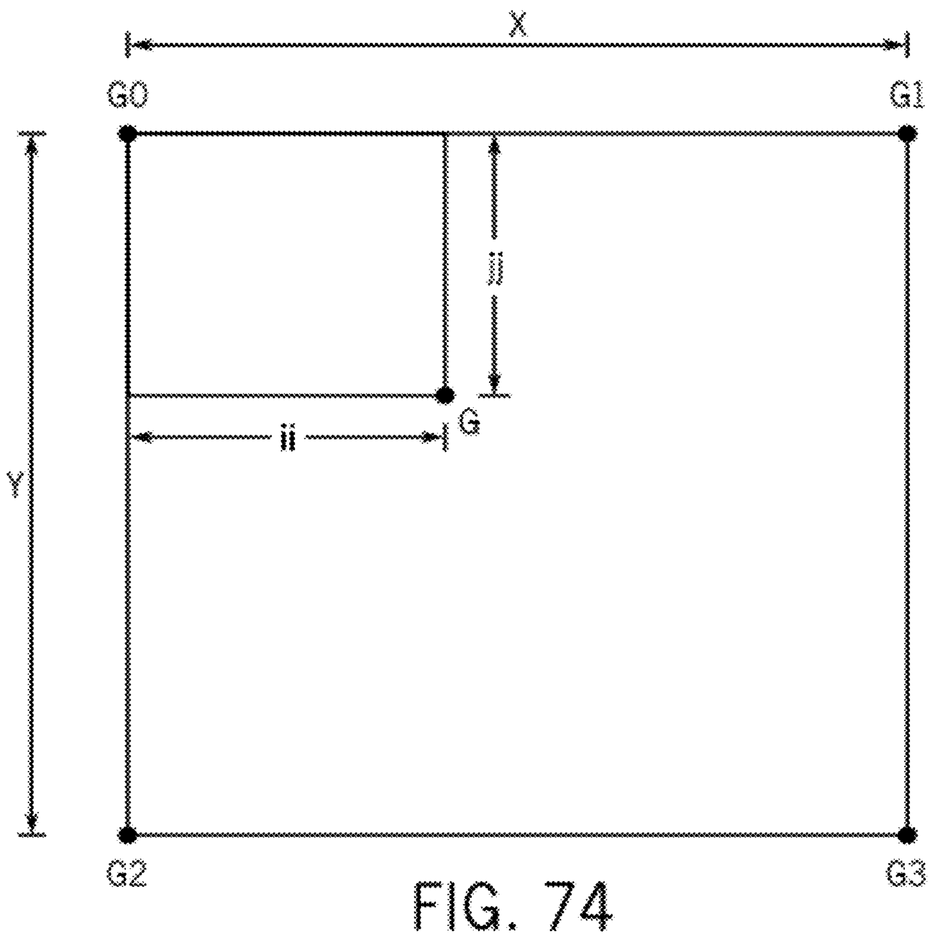
FIG. 74 illustrates the interpolation of a gain value for an image pixel enclosed by four bordering grid gain points, in accordance with aspects of the present disclosure.

As shown in FIG. 74, the pixel G is between the grid points G0, G1, G2, and G3, which may correspond to the top-left, top-right, bottom-left, and bottom-right gains, respectively, relative to the current pixel location G. The horizontal and vertical size of the grid interval is represented by X and Y, respectively. Additionally, ii and jj represent the horizontal and vertical pixel offsets, respectively, relative to the position of the top left gain G0. Based upon these factors, the gain corresponding to the position G may thus be interpolated as follows:

$$G=\frac{(G0(Y-jj)(X-ii))+(G1(Y-jj)(ii))+(G2(jj)(X-ii))+(G3(ii)(jj))}{XY} \tag{13a}$$

The terms in Equation 13a above may then be combined to obtain the following expression:

$$G=\frac{G0[XY-X(jj)-Y(ii)+(ii)(jj)]+G1[Y(ii)-(ii)(jj)]+G2[X(jj)-(ii)(jj)]+G3[(ii)(jj)]}{XY} \tag{13b}$$

In one embodiment, the interpolation method may be performed incrementally, instead of using a multiplier at each pixel, thus reducing computational complexity. For instance, the term (ii)(jj) may be realized using an adder that may be initialized to 0 at location (0, 0) of the gain grid 761 and incremented by the current row number each time the current column number increases by a pixel. As discussed above, since the values of X and Y may be selected as powers of two, gain interpolation may be accomplished using a simple shift operations. Thus, the multiplier is needed only at the grid point G0 (instead of at every pixel), and only addition operations are needed to determine the interpolated gain for the remaining pixels.

In certain embodiments, the interpolation of gains between the grid points may use 14-bit precision, and the grid gains may be unsigned 10-bit values with 2 integer bits and 8 fractional bits (e.g., 2.8 floating point representation). Using this convention, the gain may have a range of between 0 and 4×, and the gain resolution between grid points may be 1/256.

Figure 75:
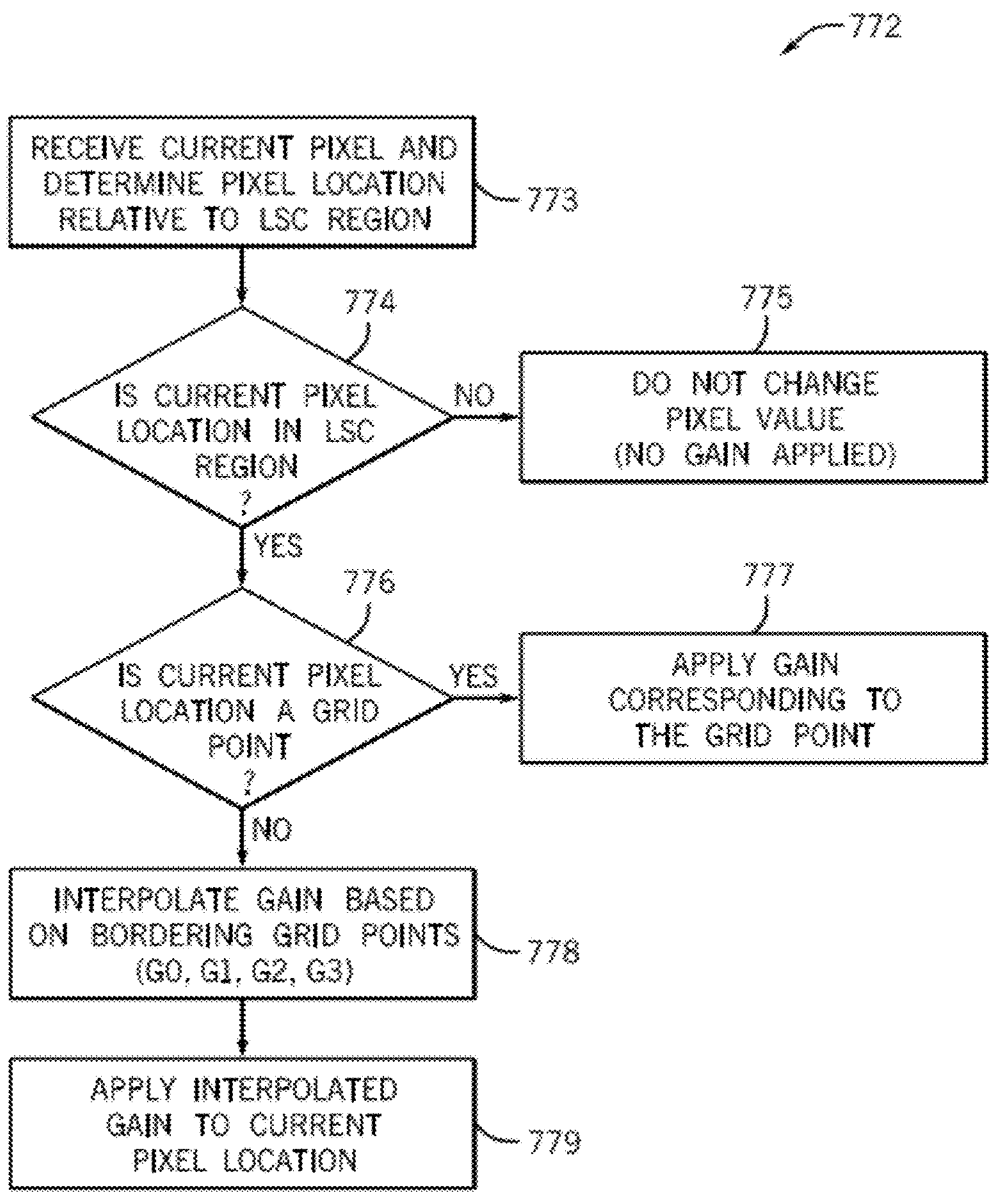
FIG. 75 is a flow chart illustrating a process for determining interpolated gain values that may be applied to imaging pixels during a lens shading correction operation, in accordance with an embodiment of the present technique.

The lens shading correction techniques may be further illustrated by the process 772 shown in FIG. 75. As shown, process 772 begins at step 773, at which the position of a current pixel is determined relative to the boundaries of the LSC region 760 of FIG. 73. Next, decision logic 774 determines whether the current pixel position is within the LSC region 760. If the current pixel position is outside of the LSC region 760, the process 772 continues to step 775, and no gain is applied to the current pixel (e.g., the pixel passes unchanged).

If the current pixel position is within the LSC region 760, the process 772 continues to decision logic 776, at which it is further determined whether the current pixel position corresponds to a grid point within the gain grid 761. If the current pixel position corresponds to a grid point, then the gain value at that grid point is selected and applied to the current pixel, as shown at step 777. If the current pixel position does not correspond to a grid point, then the process 772 continues to step 778, and a gain is interpolated based upon the bordering grid points (e.g., G0, G1, G2, and G3 of FIG. 74). For instance, the interpolated gain may be computed in accordance with Equations 13a and 13b, as discussed above. Thereafter, the process 772 ends at step 779, at which the interpolated gain from step 778 is applied to the current pixel.

Figure 72:
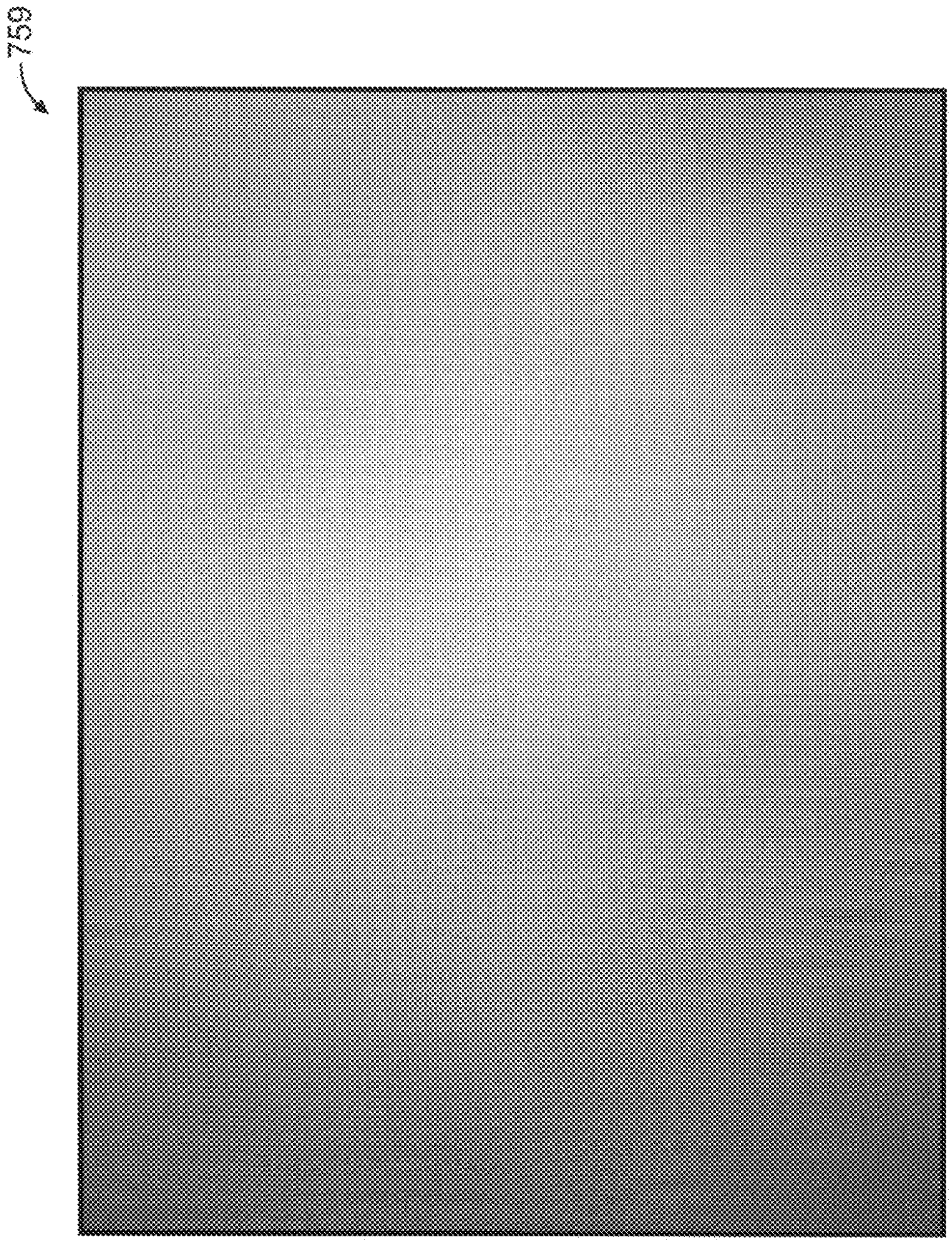
FIG. 72 is a colored drawing that exhibits non-uniform light intensity across the image, which may be the result of lens shading irregularities.
Figure 76:
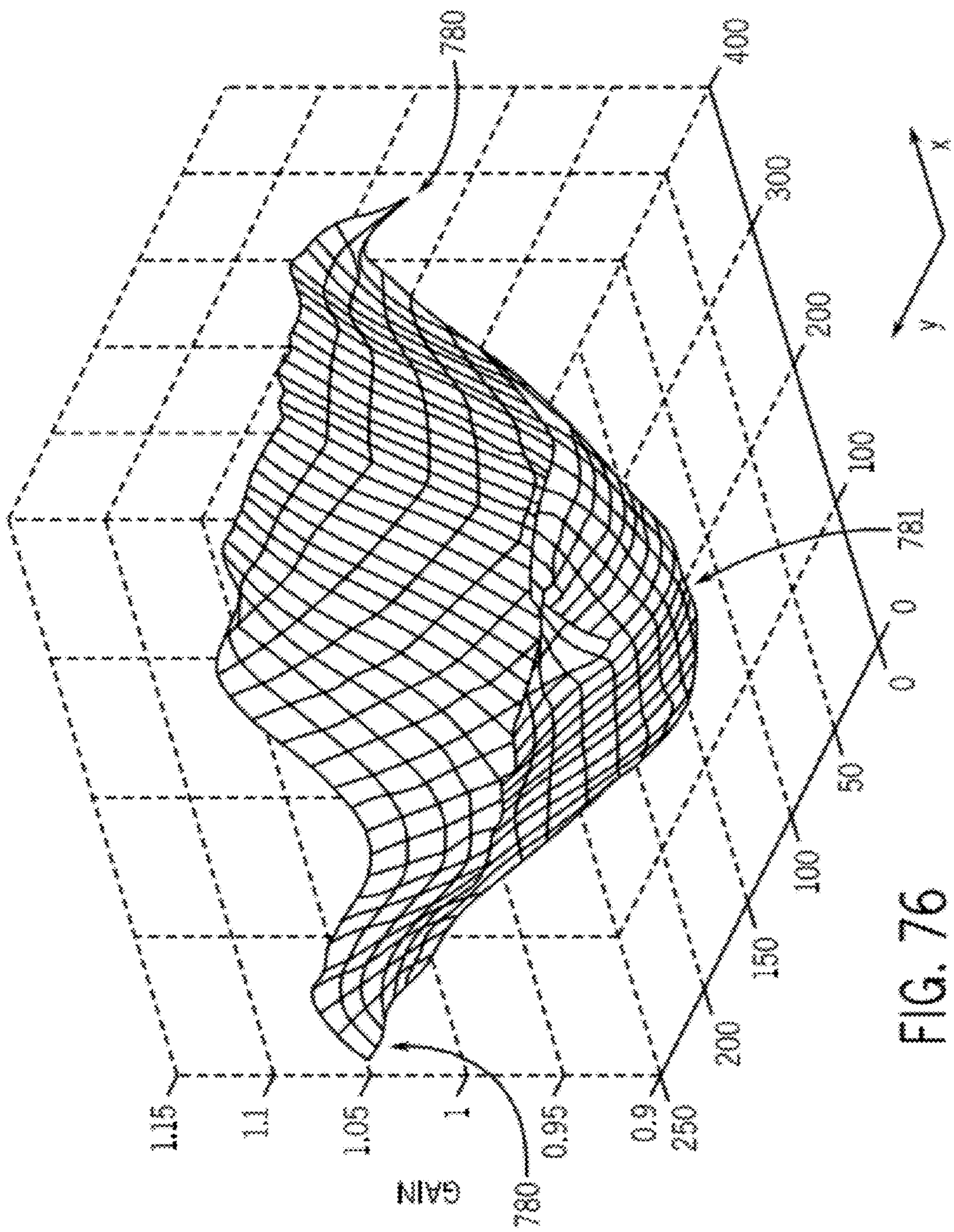
FIG. 76 is a three-dimensional profile depicting interpolated gain values that may be applied to an image that exhibits the light intensity characteristics shown in FIG. 71 when performing lens shading correction, in accordance with aspects of the present disclosure.
Figure 77:
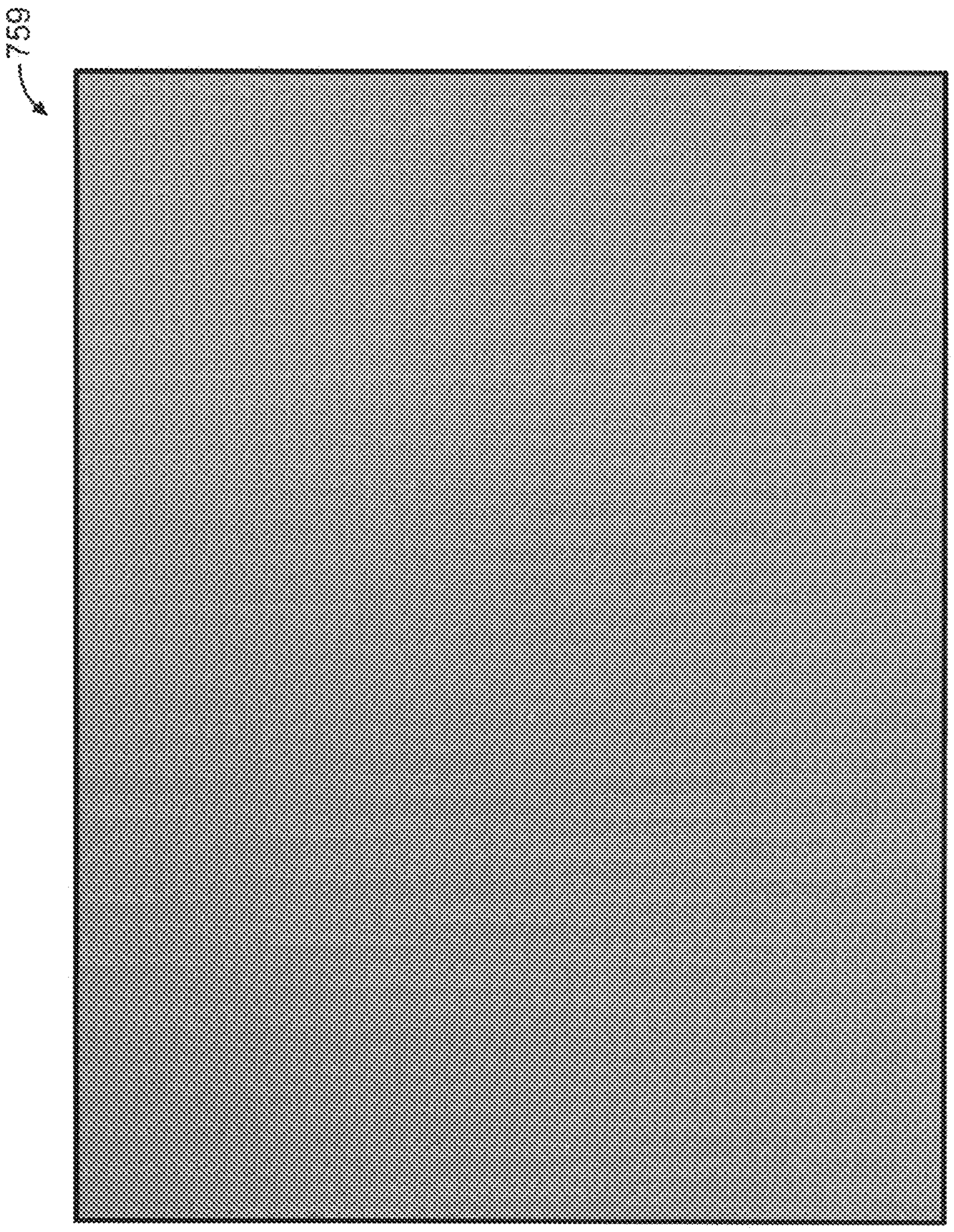
FIG. 77 shows the colored drawing from FIG. 72 that exhibits improved uniformity in light intensity after a lens shading correction operation is applied, in accordance with accordance aspects of the present disclosure.

As will be appreciated, the process 772 may be repeated for each pixel of the image data. For instance, as shown in FIG. 76, a three-dimensional profile depicting the gains that may be applied to each pixel position within a LSC region (e.g. 760) is illustrated. As shown, the gain applied at the corners 780 of the image may be generally greater than the gain applied to the center 781 of the image due to the greater drop-off in light intensity at the corners, as shown in FIGS. 71 and 72. Using the presently described lens shading correction techniques, the appearance of light intensity drop-offs in the image may be reduced or substantially eliminated. For instance, FIG. 77 provides an example of how the colored drawing of the image 759 from FIG. 72 may appear after lens shading correction is applied. As shown, compared to the original image from FIG. 72, the overall light intensity is generally more uniform across the image. Particularly, the light intensity at the approximate center of the image may be substantially equal to the light intensity values at the corners and/or edges of the image. Additionally, as mentioned above, the interpolated gain calculation (Equations 13a and 13b) may, in some embodiments, be replaced with an additive "delta" between grid points by taking advantage of the sequential column and row incrementing structure. As will be appreciated, this reduces computational complexity.

In further embodiments, in addition to using grid gains, a global gain per color component that is scaled as a function of the distance from the image center is used. The center of the image may be provided as an input parameter, and may be estimated by analyzing the light intensity amplitude of each image pixel in the uniformly illuminated image. The radial distance between the identified center pixel and the current pixel, may then be used to obtain a linearly scaled radial gain, $G_r$, as shown below:

$$G_r = G_p[c] \times R, \tag{14}$$

wherein $G_p[c]$ represents a global gain parameter for each color component c (e.g., R, B, Gr, and Gb components for a Bayer pattern), and wherein R represents the radial distance between the center pixel and the current pixel.

With reference to FIG. 78, which shows the LSC region 760 discussed above, the distance R may be calculated or estimated using several techniques. As shown, the pixel C corresponding to the image center may have the coordinates $(x_0, y_0)$, and the current pixel G may have the coordinates $(x_G, Y_e)$. In one embodiment, the LSC logic 740 may calculate the distance R using the following equation:

$$R = \sqrt{(x_G - x_0)^2 + (y_G - y_0)^2} \tag{15}$$

In another embodiment, a simpler estimation formula, shown below, may be utilized to obtain an estimated value for R.

$$R = \alpha \times \max(\mathrm{abs}(x_G - x_0), \mathrm{abs}(y_G - y_0)) + \beta \times \min(\mathrm{abs}(x_G - x_0), \mathrm{abs}(y_G - y_0)) \tag{16}$$

In Equation 16, the estimation coefficients α and β may be scaled to 8-bit values. By way of example only, in one embodiment, α may be equal to approximately 123/128 and β may be equal to approximately 51/128 to provide an estimated value for R. Using these coefficient values, the largest error may be approximately 4%, with a median error of approximately 1.3%. Thus, even though the estimation technique may be somewhat less accurate than utilizing the calculation technique in determining R (Equation 15), the margin of error is low enough that the estimated values or R are suitable for determining radial gain components for the present lens shading correction techniques.

The radial gain $G_r$ may then be multiplied by the interpolated grid gain value G (Equations 13a and 13b) for the current pixel to determine a total gain that may be applied to the current pixel. The output pixel Y is obtained by multiplying the input pixel value X with the total gain, as shown below:

$$Y = (G \times G_r \times X) \tag{17}$$

Thus, in accordance with the present technique, lens shading correction may be performed using only the interpolated gain, both the interpolated gain and the radial gain components. Alternatively, lens shading correction may also be accomplished using only the radial gain in conjunction with a radial grid table that compensates for radial approximation errors. For example, instead of a rectangular gain grid 761, as shown in FIG. 73, a radial gain grid having a plurality of grid points defining gains in the radial and angular directions may be provided. Thus, when determining the gain to apply to a pixel that does not align with one of the radial grid points within the LSC region 760, interpolation may be applied using the four grid points that enclose the pixel to determine an appropriate interpolated lens shading gain.

Figure 79:
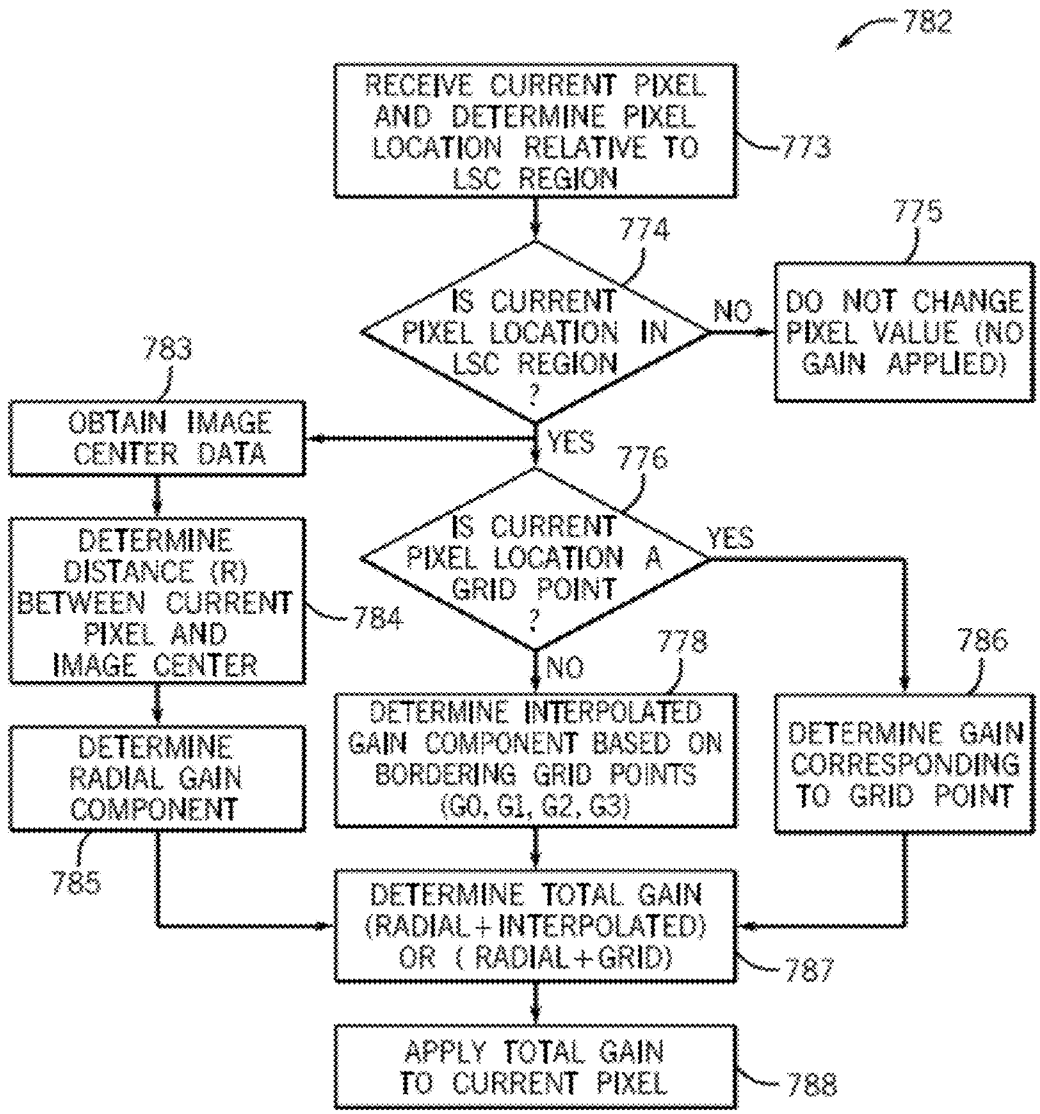
FIG. 79 is a flow chart illustrating a process by which radial gains and interpolated gains from a gain grid are used to determine a total gain that may be applied to imaging pixels during a lens shading correction operation, in accordance with an embodiment of the present technique.
Figure 80:
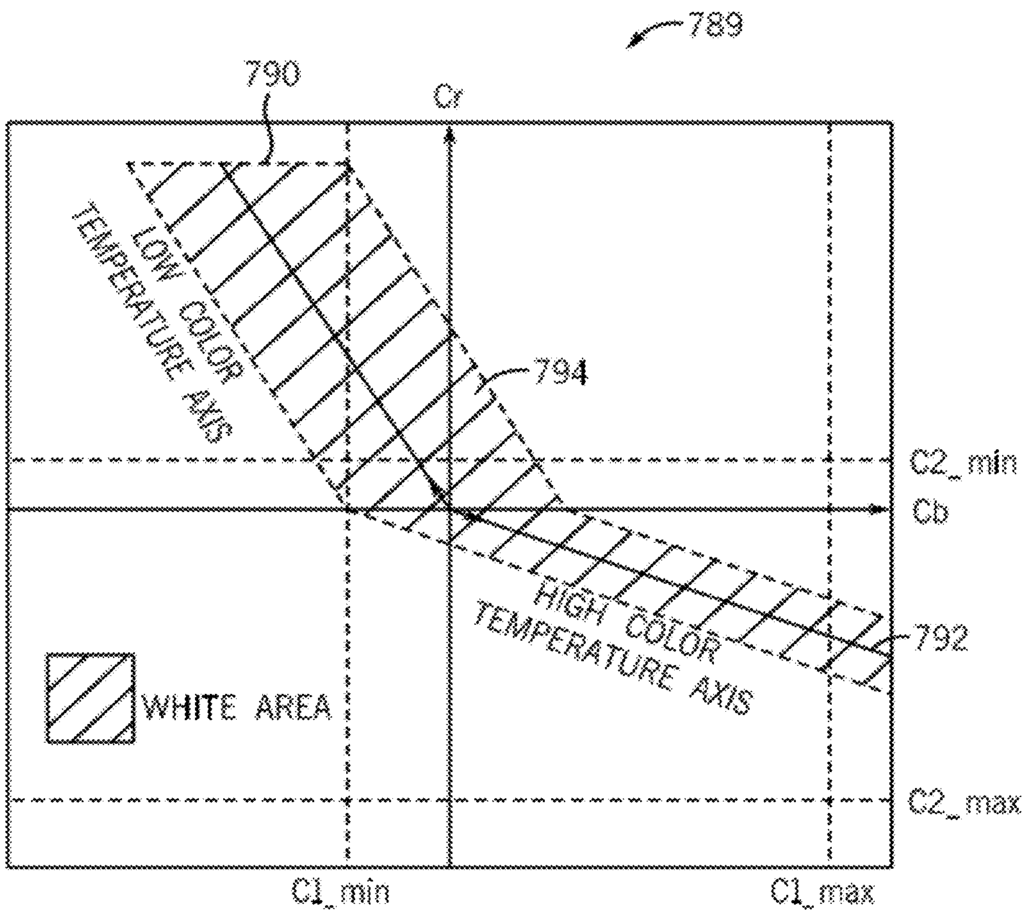
FIG. 80 is a graph showing white areas and low and high color temperature axes in a color space.

Referring to FIG. 79, the use of interpolated and radial gain components in lens shading correction is illustrated by the process 782. It should be noted that the process 782 may include steps that are similar to the process 772, described above in FIG. 75. Accordingly, such steps have been numbered with like reference numerals. Beginning at step 773, the current pixel is received and its location relative to the LSC region 760 is determined. Next, decision logic 774 determines whether the current pixel position is within the LSC region 760. If the current pixel position is outside of the LSC region 760, the process 782 continues to step 775, and no gain is applied to the current pixel (e.g., the pixel passes unchanged). If the current pixel position is within the LSC region 760, then the process 782 may continue simultaneously to step 783 and decision logic 776. Referring first to step 783, data identifying the center of the image is retrieved. As discussed above, determining the center of the image may include analyzing light intensity amplitudes for the pixels under uniform illumination. This may occur during calibration, for instance. Thus, it should be understood that step 783 does not necessarily encompass repeatedly calculating the center of the image for processing each pixel, but may refer to retrieving the data (e.g., coordinates) of previously determined image center. Once the center of the image is identified, the process 782 may continue to step 784, wherein the distance between the image center and the current pixel location (R) is determined. As discussed above, the value of R may be calculated (Equation 15) or estimated (Equation 16). Then, at step 785, a radial gain component $G_r$ may be computed using the distance R and global gain parameter corresponding to the color component of the current pixel (Equation 14). The radial gain component $G_r$ may be used to determine the total gain, as will be discussed in step 787 below.

Referring back to decision logic 776, a determined whether the current pixel position corresponds to a grid point within the gain grid 761. If the current pixel position corresponds to a grid point, then the gain value at that grid point is determined, as shown at step 786. If the current pixel position does not correspond to a grid point, then the process 782 continues to step 778, and an interpolated gain is computed based upon the bordering grid points (e.g., G0, G1, G2, and G3 of FIG. 74). For instance, the interpolated gain may be computed in accordance with Equations 13a and 13b, as discussed above. Next, at step 787, a total gain is determined based upon the radial gain determined at step 785, as well as one of the grid gains (step 786) or the interpolated gain (778). As can be appreciated, this may depend on which branch decision logic 776 takes during the process 782. The total gain is then applied to the current pixel, as shown at step 788. Again, it should be noted that like the process 772, the process 782 may also be repeated for each pixel of the image data.

The use of the radial gain in conjunction with the grid gains may offer various advantages. For instance, using a radial gain allows for the use of single common gain grid for all color components. This may greatly reduce the total storage space required for storing separate gain grids for each color component. For instance, in a Bayer image sensor, the use of a single gain grid for each of the R, B, Gr, and Gb components may reduce the gain grid data by approximately 75%. As will be appreciated, this reduction in grid gain data may decrease implementation costs, as grid gain data tables may account for a significant portion of memory or chip area in image processing hardware. Further, depending upon the hardware implementation, the use of a single set of gain grid values may offer further advantages, such as reducing overall chip area (e.g., such as when the gain grid values are stored in an on-chip memory) and reducing memory bandwidth requirements (e.g., such as when the gain grid values are stored in an off-chip external memory).

Having thoroughly described the functionalities of the lens shading correction logic 740 shown in FIG. 68, the output of the LSC logic 740 is subsequently forwarded to the inverse black level compensation (IBLC) logic 741. The IBLC logic 741 provides gain, offset and clip independently for each color component (e.g., R, B, Gr, and Gb), and generally performs the inverse function to the BLC logic 739. For instance, as shown by the following operation, the value of the input pixel is first multiplied by a gain and then offset by a signed value.

$$Y=(X\times G[c])+O[c], \tag{18}$$

wherein X represents the input pixel value for a given color component c (e.g., R, B, Gr, or Gb), O[c] represents a signed 16-bit offset for the current color component c, and G[c] represents a gain value for the color component c. In one embodiment, the gain G[c] may have a range of between approximately 0 to 4× (4 times the input pixel value X). It should be noted that these variables may be the same variables discussed above in Equation 11. The computed value Y may be clipped to a minimum and maximum range using, for example, Equation 12. In one embodiment, the IBLC logic 741 may be configured to maintain a count of the number of pixels that were clipped above and below maximum and minimum, respectively, per color component.

Thereafter, the output of the IBLC logic 741 is received by the statistics collection block 742, which may provide for the collection of various statistical data points about the image sensor(s) 90, such as those relating to auto-exposure (AE), auto-white balance (AWB), auto-focus (AF), flicker detection, and so forth. With this in mind, a description certain embodiments of the statistics collection block 742 and various aspects related thereto is provided below with respect to FIGS. 80-97.

As will be appreciated, AWB, AE, and AF statistics may be used in the acquisition of images in digital still cameras as well as video cameras. For simplicity, AWB, AE, and AF statistics may be collectively referred to herein as "3A statistics." In the embodiment of the ISP front-end logic illustrated in FIG. 68, the architecture for the statistics collection logic 742 ("3A statistics logic") may be implemented in hardware, software, or a combination thereof. Further, control software or firmware may be utilized to analyze the statistics data collected by the 3A statistics logic 742 and control various parameters of the lens (e.g., focal length), sensor (e.g., analog gains, integration times), and the ISP pipeline 82 (e.g., digital gains, color correction matrix coefficients). In certain embodiments, the image processing circuitry 32 may be configured to provide flexibility in statistics collection to enable control software or firmware to implement various AWB, AE, and AF algorithms.

With regard to white balancing (AWB), the image sensor response at each pixel may depend on the illumination source, since the light source is reflected from objects in the image scene. Thus, each pixel value recorded in the image scene is related to the color temperature of the light source. For instance, FIG. 79 shows a graph 789 illustrating the color range of white areas under low color and high color temperatures for a YCbCr color space. As shown, the x-axis of the graph 789 represents the blue-difference chroma (Cb) and the y-axis of the graph 789 represents red-difference chroma (Cr) of the YCbCr color space. The graph 789 also shows a low color temperature axis 790 and a high color temperature axis 791. The region 792 in which the axes 790 and 791 are positioned, represents the color range of white areas under low and high color temperatures in the YCbCr color space. It should be understood, however, that the YCbCr color space is merely one example of a color space that may be used in conjunction with auto white balance processing in the present embodiment. Other embodiments may utilize any suitable color space. For instance, in certain embodiments, other suitable color spaces may include a Lab (CIELab) color space (e.g., based on CIE 1976), a red/blue normalized color space (e.g., an R/(R+2G+B) and B/(R+2G+B) color space; a R/G and B/G color space; a Cb/Y and Cr/Y color space, etc.). Accordingly, for the purposes of this disclosure, the axes of the color space used by the 3A statistics logic 742 may be referred to as C1 and C2 (as is the case in FIG. 80).

When a white object is illuminated under a low color temperature, it may appear reddish in the captured image. Conversely, a white object that is illuminated under a high color temperature may appear bluish in the captured image. The goal of white balancing is, therefore, to adjust RGB values such that the image appears to the human eye as if it were taken under canonical light. Thus, in the context of imaging statistics relating to white balance, color information about white objects are collected to determine the color temperature of the light source. In general, white balance algorithms may include two main steps. First, the color temperature of the light source is estimated. Second, the estimated color temperature is used to adjust color gain values and/or determine/adjust coefficients of a color correction matrix. Such gains may be a combination of analog and digital image sensor gains, as well as ISP digital gains.

Figure 81:
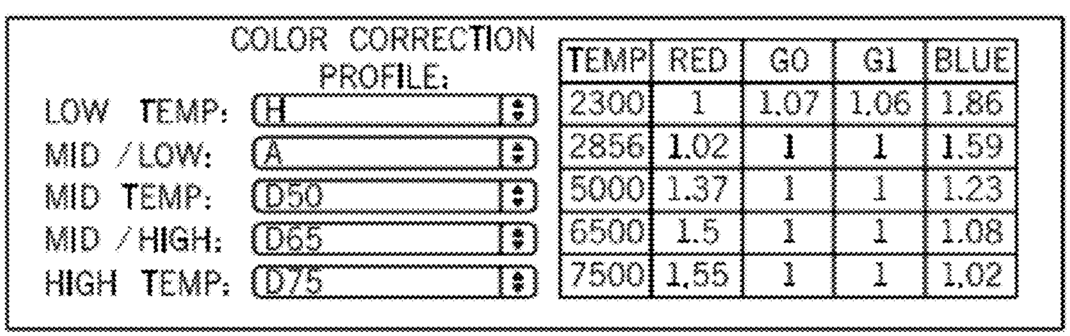
FIG. 81 is a table showing how white balance gains may be configured for various reference illuminant conditions, in accordance with one embodiment.

For instance, in some embodiments, the imaging device 30 may be calibrated using multiple different reference illuminants. Accordingly, the white point of the current scene may be determined by selecting the color correction coefficients corresponding to a reference illuminant that most closely matches the illuminant of the current scene. By way of example only, one embodiment may calibrate the imaging device 30 using five reference illuminants, a low color temperature illuminant, a middle-low color temperature illuminant, a middle color temperature illuminant, a middle-high color temperature illuminant, and a high color temperature illuminant. As shown in FIG. 81, one embodiment may define white balance gains using the following color correction profiles: Horizon (H) (simulating a color temperature of approximately 2300 degrees), Incandescent (A or IncA) (simulating a color temperature of approximately 2856 degrees), D50 (simulating a color temperature of approximately 5000 degrees), D65 (simulating a color temperature of approximately 6500 degrees), and D75 (simulating a color temperature of approximately 7500 degrees).

Depending on the illuminant of the current scene, white balance gains may be determined using the gains corresponding to the reference illuminant that most closely matches the current illuminant. For instance, if the statistics logic 742 (described in more detail in FIG. 82 below) determines that the current illuminant approximately matches the reference middle color temperature illuminant, D50, then white balance gains of approximately 1.37 and 1.23 may be applied to the red and blue color channels, respectively, while approximately no gain (1.0) is applied to the green channels (G0 and G1 for Bayer data). In some embodiments, if the current illuminant color temperature is in between two reference illuminants, white balance gains may be determined via interpolating the white balance gains between the two reference illuminants. Further, while the present example shows an imaging device being calibrated using H, A, D50, D65, and D75 illuminants, it should be understood that any suitable type of illuminant may be used for camera calibration, such as TL84 or CWF (fluorescent reference illuminants), and so forth.

As will be discussed further below, several statistics may be provided for AWB including a two-dimensional (2D) color histogram, and RGB or YCC sums to provide multiple programmable color ranges. For instance, in one embodiment, the statistics logic 742 may provide a set of multiple pixel filters, of which a subset of the multiple pixel filters may be selected for AWB processing. In one embodiment, eight sets of filters, each with different configurable parameters, may be provided, and three sets of color range filters may be selected from the set for gathering tile statistics, as well as for gathering statistics for each floating window. By way of example, a first selected filter may be configured to cover the current color temperature to obtain accurate color estimation, a second selected filter may be configured to cover the low color temperature areas, and a third selected filter may be configured to cover the high color temperature areas. This particular configuration may enable the AWB algorithm to adjust the current color temperature area as the light source is changing. Further, the 2D color histogram may be utilized to determine the global and local illuminants and to determine various pixel filter thresholds for accumulating RGB values. Again, it should be understood that the selection of three pixel filters is meant to illustrate just one embodiment. In other embodiments, fewer or more pixel filters may be selected for AWB statistics.

Further, in addition to selecting three pixel filters, one additional pixel filter may also be used for auto-exposure (AE), which generally refers to a process of adjusting pixel integration time and gains to control the luminance of the captured image. For instance, auto-exposure may control the amount of light from the scene that is captured by the image sensor(s) by setting the integration time. In certain embodiments, tiles and floating windows of luminance statistics may be collected via the 3A statistics logic 742 and processed to determine integration and gain control parameters.

Further, auto-focus may refer to determining the optimal focal length of the lens in order to substantially optimize the focus of the image. In certain embodiments, floating windows of high frequency statistics may be collected and the focal length of the lens may be adjusted to bring an image into focus. As discussed further below, in one embodiment, auto-focus adjustments may utilize coarse and fine adjustments based upon one or more metrics, referred to as auto-focus scores (AF scores) to bring an image into focus. Further, in some embodiments, AF statistics/scores may be determined for different colors, and the relativity between the AF statistics/scores for each color channel may be used to determine the direction of focus.

Thus, these various types of statistics, among others, may be determined and collected via the statistics collection block 742. As shown, the output STATS0 of the statistics collection block 742 of the Sensor0 statistics processing unit 142 may be sent to the memory 108 and routed to the control logic 84 or, alternatively, may be sent directly to the control logic 84. Further, it should be understood that the Sensor1 statistics processing unit 144 may also include a similarly configured 3A statistics collection block that provides statistics STATS1, as shown in FIG. 10.

As discussed above, the control logic 84, which may be a dedicated processor in the ISP subsystem 32 of the device 10, may process the collected statistical data to determine one or more control parameters for controlling the imaging device 30 and/or the image processing circuitry 32. For instance, such the control parameters may include parameters for operating the lens of the image sensor 90 (e.g., focal length adjustment parameters), image sensor parameters (e.g., analog and/or digital gains, integration time), as well as ISP pipe processing parameters (e.g., digital gain values, color correction matrix (CCM) coefficients). Additionally, as mentioned above, in certain embodiments, statistical processing may occur at a precision of 8-bits and, thus, raw pixel data having a higher bit-depth may be down-scaled to an 8-bit format for statistics purposes. As discussed above, down-scaling to 8-bits (or any other lower-bit resolution) may reduce hardware size (e.g., area) and also reduce processing complexity, as well as allow for the statistics data to be more robust to noise (e.g., using spatial averaging of the image data).

Figure 82:
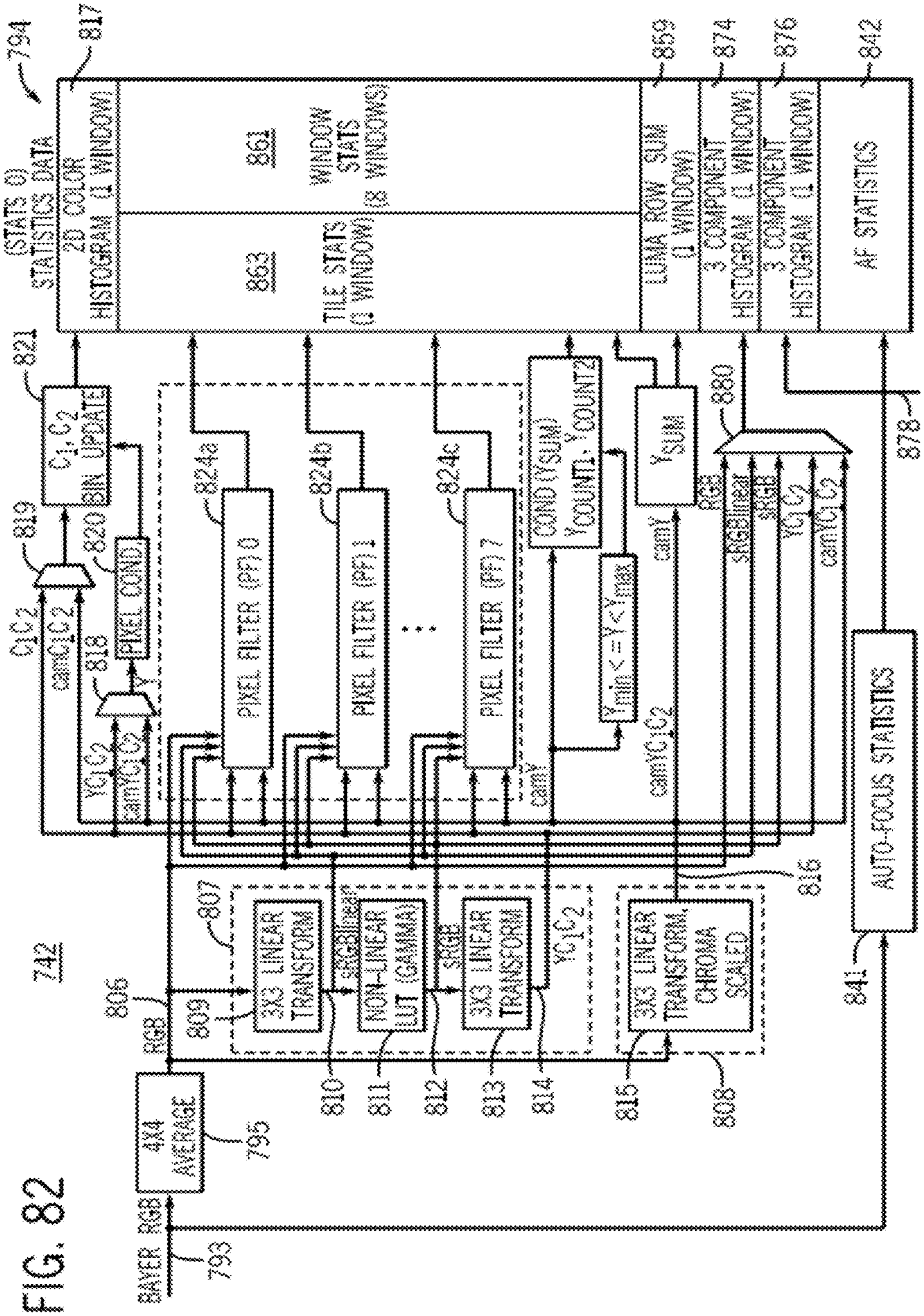
FIG. 82 is a block diagram showing a statistics collection engine that may be implemented in the ISP front-end processing logic, in accordance with an embodiment of the present disclosure.
Figure 83:
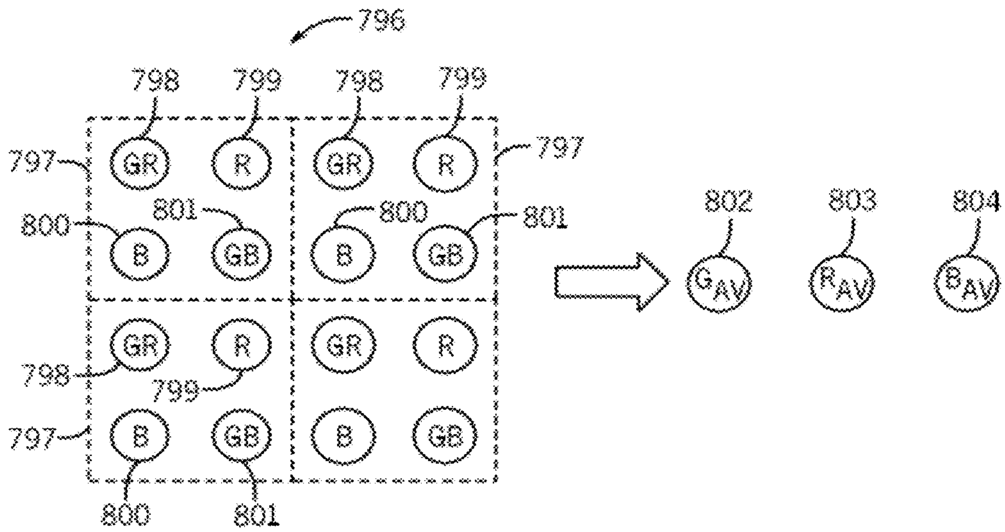
FIG. 83 illustrates the down-sampling of raw Bayer RGB data, in accordance with aspects of the present disclosure.

With the foregoing in mind, FIG. 82 is a block diagram depicting logic for implementing one embodiment of the 3A statistics logic 742. As shown, the 3A statistics logic 742 may receive a signal 793 representing Bayer RGB data which, as shown in FIG. 68, may correspond to the output of the inverse BLC logic 741. The 3A statistics logic 742 may process the Bayer RGB data 793 to obtain various statistics 794, which may represent the output STATS0 of the 3A statistics logic 742, as shown in FIG. 68, or alternatively the output STATS1 of a statistics logic associated with the Sensor1 statistics processing unit 144.

In the illustrated embodiment, for the statistics to be more robust to noise, the incoming Bayer RGB pixels 793 are first averaged by the logic 795. For instance, the averaging may be performed in a window size of 4×4 sensor pixels consisting of four 2×2 Bayer quads (e.g., a 2×2 block of pixels representing the Bayer pattern), and the averaged red (R), green (G), and blue (B) values in the 4×4 window may be computed and converted to 8-bits, as mentioned above. This process is illustrates in more detail with respect to FIG. 83, which shows a 4×4 window 796 of pixels formed as four 2×2 Bayer quads 797. Using this arrangement, each color channel includes a 2×2 block of corresponding pixels within the window 796, and same-colored pixels may be summed and averaged to produce an average color value for each color channel within the window 796. For instance, red pixels 799 may be averaged to obtain an average red value ($R_{AV}$) 803, and the blue pixels 800 may be averaged to obtain an average blue value ($B_{AV}$) 804 within the sample 796. With regard to averaging of the green pixels, several techniques may be utilized since the Bayer pattern has twice as many green samples as red or blue samples. In one embodiment, the average green value ($G_{AV}$) 802 may be obtained by averaging just the Gr pixels 798, just the Gb pixels 801, or all of the Gr and Gb pixels 798 and 801 together. In another embodiment, the Gr and Gb pixels 798 and 801 in each Bayer quad 797 may be averaged, and the average of the green values for each Bayer quad 797 may be further averaged together to obtain $G_{AV}$ 802. As will be appreciated, the averaging of the pixel values across pixel blocks may provide for the reduction of noise. Further, it should be understood that the use of a 4×4 block as a window sample is merely intended to provide one example. Indeed, in other embodiments, any suitable block size may be utilized (e.g., 8×8, 16×16, 32×32, etc.).

Thereafter, the down-scaled Bayer RGB values 806 are input to the color space conversion logic units 807 and 808. Because some of the 3A statistics data may rely upon pixel pixels after applying color space conversion, the color space conversion (CSC) logic 807 and CSC logic 808 may be configured to convert the down-sampled Bayer RGB values 806 into one or more other color spaces. In one embodiment, the CSC logic 807 may provide for a non-linear space conversion and the CSC logic 808 may provide for a linear space conversion. Thus, the CSC logic units 807 and 808 may convert the raw image data from sensor Bayer RGB to another color space (e.g., $sRGB_{linear}$, sRGB, YCbCr, etc.) that may be more ideal or suitable for performing white point estimation for white balance.

In the present embodiment, the non-linear CSC logic 807 may be configured to perform a 3×3 matrix multiply, followed by a non-linear mapping implemented as a lookup table, and further followed by another 3×3 matrix multiply with an added offset. This allows for the 3A statistics color space conversion to replicate the color processing of the RGB processing in the ISP pipeline 82 (e.g., applying white balance gain, applying a color correction matrix, applying RGB gamma adjustments, and performing color space conversion) for a given color temperature. It may also provide for the conversion of the Bayer RGB values to a more color consistent color space such as CIELab, or any of the other color spaces discussed above (e.g., YCbCr, a red/blue normalized color space, etc.). Under some conditions, a Lab color space may be more suitable for white balance operations because the chromaticity is more linear with respect to brightness.

As shown in FIG. 82, the output pixels from the Bayer RGB down-scaled signal 806 are processed with a first 3×3 color correction matrix (3A_CCM), referred to herein by reference number 808. In the present embodiment, the 3A_CCM 809 may be configured to convert from a camera RGB color space (camRGB), to a linear sRGB calibrated space ($sRGB_{linear}$). A programmable color space conversion that may be used in one embodiment is provided below by Equations 19-21:

$$sR_{linear}=\max(0,\min(255,(3A\_CCM\_00*R+3A\_CCM\_01*G+3A\_CCM\_02*B))); \quad (19)$$

$$sG_{linear}=\max(0,\min(255,(3A\_CCM\_10*R+3A\_CCM\_11*G+3A\_CCM\_12*B))); \quad (20)$$

$$sB_{linear}=\max(0,\min(255,(3A\_CCM\_20*R+3A\_CCM\_21*G+3A\_CCM\_22*B))); \quad (21)$$

wherein 3A_CCM_00-3A_CCM_22 represent signed coefficients of the matrix 808. Thus, each of the $sR_{linear}$, $sG_{linear}$, and $sB_{linear}$ components of the $sRGB_{linear}$ color space may be determined first determining the sum of the red, blue, and green down-sampled Bayer RGB values with corresponding 3A_CCM coefficients applied, and then clipping this value to either 0 or 255 (the minimum and maximum pixel values for 8-bit pixel data) if the value exceeds 255 or is less than 0. The resulting $sRGB_{linear}$ values are represented in FIG. 82 by reference number 810 as the output of the 3A_CCM 809. Additionally, the 3A statistics logic 742 may maintain a count of the number of clipped pixels for each of the $sR_{linear}$, $sG_{linear}$, and $sB_{linear}$ components, as expressed below:

3A_CCM_R_clipcount_low:number of $sR_{linear}$ pixels<0 clipped

3A_CCM_R_clipcount_high:number of $sR_{linear}$ pixels>255 clipped

3A_CCM_G_clipcount_low:number of $sG_{linear}$ pixels<0 clipped

3A_CCM_G_clipcount_high:number of $sG_{linear}$ pixels>255 clipped

3A_CCM_B_clipcount_low:number of $sB_{linear}$ pixels<0 clipped

3A_CCM_B_clipcount_high:number of $sB_{linear}$ pixels>255 clipped

Next, the $sRGB_{linear}$ pixels 810 may be processed using a non-linear lookup table 811 to produce sRGB pixels 812. The lookup table 811 may contain entries of 8-bit values, with each table entry value representing an output levels. In one embodiment, the look-up table 811 may include 65 evenly distributed input entries, wherein a table index represents input values in steps of 4. When the input value falls between intervals, the output values are linearly interpolated.

As will be appreciated, the sRGB color space may represent the color space of the final image produced by the imaging device 30 (FIG. 7) for a given white point, as white balance statistics collection is performed in the color space of the final image produced by the image device. In one embodiment, a white point may be determined by matching the characteristics of the image scene to one or more reference illuminants based, for example, upon red-to-green and/or blue-to-green ratios. For instance, one reference illuminant may be D65, a CIE standard illuminant for simulating daylight conditions. In addition to D65, calibration of the imaging device 30 may also be performed for other different reference illuminants, and the white balance determination process may include determining a current illuminant so that processing (e.g., color balancing) may be adjusted for the current illuminant based on corresponding calibration points. By way of example, in one embodiment, the imaging device 30 and 3A statistics logic 742 may be calibrated using, in addition to D65, a cool white fluorescent (CWF) reference illuminant, the TL84 reference illuminant (another fluorescent source), and the IncA (or A) reference illuminant, which simulates incandescent lighting. Additionally, as discussed above, various other illuminants corresponding to different color temperatures (e.g., H, IncA, D50, D65, and D75, etc.) may also be used in camera calibration for white balance processing. Thus, a white point may be determined by analyzing an image scene and determining which reference illuminant most closely matches the current illuminant source.

Referring still to the non-linear CSC logic 807, the sRGB pixel output 812 of the look-up table 811 may be further processed with a second 3×3 color correction matrix 813, referred to herein as 3A_CSC. In the depicted embodiment, the 3A_CSC matrix 813 is shown as being configured to convert from the sRGB color space to the YCbCr color space, though it may be configured to convert the sRGB values into other color spaces as well. By way of example, the following programmable color space conversion (Equations 22-27) may be used:

$$Y=3A\_CSC\_00*sR+3A\_CSC\_01*sG+3A\_CSC\_02*sB+3A\_OffsetY; \quad (22)$$

$$Y=\max(3A\_CSC\_MIN\_Y,\min(3A\_CSC\_MAX\_Y,Y)); \quad (23)$$

$$C1=3A\_CSC\_10*sR+3A\_CSC\_11*sG+3A\_CSC\_12*sB+3A\_OffsetC1; \quad (24)$$

$$C1=\max(3A\_CSC\_MIN\_C1,\min(3A\_CSC\_MAX\_C1,C1)); \quad (25)$$

$$C2=3A\_CSC\_20*sR+3A\_CSC\_21*sG+3A\_CSC\_22*sB+3A\_OffsetC2; \quad (26)$$

$$C2=\max(3A\_CSC\_MIN\_C2,\min(3A\_CSC\_MAX\_C2,C2)); \quad (27)$$

wherein 3A_CSC_00-3A_CSC_22 represent signed coefficients for the matrix 813, 3A_OffsetY, 3A_OffsetC1, and 3A_OffsetC2 represent signed offsets, and C1 and C2 represent different colors, here blue-difference chroma (Cb) and red-difference chroma (Cr), respectively. It should be understood, however, that C1 and C2 may represent any suitable difference chroma colors, and need not necessarily be Cb and Cr colors.

As shown in Equations 22-27, in determining each component of YCbCr, appropriate coefficients from the matrix 813 are applied to the sRGB values 812 and the result is summed with a corresponding offset (e.g., Equations 22, 24, and 26). Essentially, this step is a 3×1 matrix multiplication step. This result from the matrix multiplication is then clipped between a maximum and minimum value (e.g., Equations 23, 25, and 27). The associated minimum and maximum clipping values may be programmable and may depend, for instance, on particular imaging or video standards (e.g., BT.601 or BT.709) being utilized.

The 3A statistics logic 742 may also maintain a count of the number of clipped pixels for each of the Y, C1, and C2 components, as expressed below:

3A_CSC_Y_clipcount_low:number of Y pixels<3A_CSC_MIN_Y clipped

3A_CSC_Y_clipcount_high:number of Y pixels>3A_CSC_MAX_Y clipped

3A_CSC_C1_clipcount_high:number of C1 pixels>3A_CSC_MAX_C1 clipped

3A_CSC_C2_clipcount_low:number of C2 pixels<3A_CSC_MIN_C2 clipped

3A_CSC_C2_clipcount_high:number of C2 pixels>3A_CSC_MAX_C2 clipped

The output pixels from the Bayer RGB down-sample signal 806 may also be provided to the linear color space conversion logic 808, which may be configured to implement a camera color space conversion. For instance, the output pixels 806 from the Bayer RGB down-sample logic 795 may be processed via another 3×3 color conversion matrix (3A_CSC2) 815 of the CSC logic 808 to convert from sensor RGB (camRGB) to a linear white-balanced color space (camYC1C2), wherein C1 and C2 may correspond to Cb and Cr, respectively. In one embodiment, the chroma pixels may be scaled by luma, which may be beneficial in implementing a color filter that has improved color consistency and is robust to color shifts due to luma changes. An example of how the camera color space conversion may be performed using the 3×3 matrix 815 is provided below in Equations 28-31:

$$camY=3A\_CSC2\_00*R+3A\_CSC2\_01*G+3A\_CSC2\_02*B+3A\_Offset2Y; \quad (28)$$

$$camY=max(3A\_CSC2\_MIN\_Y,min(3A\_CSC2\_MAX\_Y,camY)); \quad (29)$$

$$camC1=(3A\_CSC2\_10*R+3A\_CSC2\_11*G+3A\_CSC2\_12*B); \quad (30)$$

$$camC2=(3A\_CSC2\_20*R+3A\_CSC2\_21*G+3A\_CSC2\_22*B); \quad (31)$$

wherein 3A_CSC2_00-3A_CSC2_22 represent signed coefficients for the matrix 815, 3A_Offset2Y represents a signed offset for camY, and camC1 and camC2 represent different colors, here blue-difference chroma (Cb) and red-difference chroma (Cr), respectively. As shown in Equation 28, to determine camY, corresponding coefficients from the matrix 815 are applied to the bayer RGB values 806, and the result is summed with 3A_Offset2Y. This result is then clipped between a maximum and minimum value, as shown in Equation 29. As discussed above, the clipping limits may be programmable.

At this point, the camC1 and camC2 pixels of the output 816 are signed. As discussed above, in some embodiments, chroma pixels may be scaled. For example, one technique for implementing chroma scaling is shown below:

$$camC1=camC1*ChromaScale*255/(camY?camY:1); \quad (32)$$

$$camC2=camC2*ChromaScale*255/(camY?camY:1); \quad (33)$$

wherein ChromaScale represents a floating point scaling factor between 0 and 8. In Equations 32 and 33, the expression (camY?camY:1) is meant to prevent a divide-by-zero condition. That is, if camY is equal to zero, the value of camY is set to 1. Further, in one embodiment, ChromaScale may be set to one of two possible values depending on the sign of camC1. For instance, as shown below in Equation 34, ChomaScale may be set to a first value (ChromaScale0) if camC1 is negative, or else may be set to a second value (ChromaScale1):

$$ChromaScale=ChromaScale0 \text{ if}(camC1<0)$$

$$ChromaScale1 \text{ otherwise} \quad (34)$$

Thereafter, chroma offsets are added, and the camC1 and camC2 chroma pixels are clipped, as shown below in Equations 35 and 36, to generate corresponding unsigned pixel values:

$$camC1=max(3A\_CSC2\_MIN\_C1,min(3A\_CSC2\_MAX\_C1,(camC1+3A\_Offset2C1))) \quad (35)$$

$$camC2=max(3A\_CSC2—MIN\_C2,min(3A\_CSC2\_MAX\_C2,(camC2+3A\_Offset2C2))) \quad (36)$$

wherein 3A_CSC2_00-3A_CSC2_22 are signed coefficients of the matrix 815, and 3A_Offset2C1 and 3A_Offset2C2 are signed offsets. Further, the number of pixels that are clipped for camY, camC1, and camC2 are counted, as shown below:

3A_CSC2_Y_clipcount_low:number of camY pixels<3A_CSC2_MIN_Y clipped

3A_CSC2_Y_clipcount_high:number of camY pixels>3A_CSC2_MAX_Y clipped

3A_CSC2_C1_clipcount_low:number of camC1 pixels<3A_CSC2—MIN_C1 clipped

3A_CSC2_C1_clipcount_high:number of camC1 pixels>3A_CSC2_MAX_C1 clipped

3A_CSC2_C2_clipcount_low:number of camC2 pixels<3A_CSC2_MIN_C2 clipped

3A_CSC2_C2_clipcount_high:number of camC2 pixels>3A_CSC2_MAX_C2 clipped

Thus, the non-linear and linear color space conversion logic 807 and 808 may, in the present embodiment, provide pixel data in various color spaces: $sRGB_{linear}$ (signal 810), sRGB (signal 812), YCbYr (signal 814), and camYCbCr (signal 816). It should be understood that the coefficients for each conversion matrix 809 (3A_CCM), 813 (3A_CSC), and 815 (3A_CSC2), as well as the values in the look-up table 811, may be independently set and programmed Referring still to FIG. 82, the chroma output pixels from either the non-linear color space conversion (YCbCr 814) or the camera color space conversion (camYCbCr 816) may be used to generate a two-dimensional (2D) color histogram 817. As shown, selection logic 818 and 819, which may be implemented as multiplexers or by any other suitable logic, may be configured to select between luma and chroma pixels from either the non-linear or camera color space conversion. The selection logic 818 and 819 may operate in response to respective control signals which, in one embodiment, may be supplied by the main control logic 84 of the image processing circuitry 32 (FIG. 7) and may be set via software.

For the present example, it may be assumed that the selection logic 818 and 819 select the YC1C2 color space conversion (814), where the first component is Luma, and where C1, C2 are the first and second colors (e.g., Cb, Cr). A 2D histogram 817 in the C1-C2 color space is generated for one window. For instance, the window may be specified with a column start and width, and a row start and height. In one embodiment, the window position and size may be set as a multiple of 4 pixels, and 32×32 bins may be used for a total of 1024 bins. The bin boundaries may be at fixed interval and, in order to allow for zooming and panning of the histogram collection in specific areas of the color space, a pixel scaling and offset may defined.

The upper 5 bits (representing a total of 32 values) of C1 and C2 after offset and scaling may used to determine the bin. The bin indices for C1 and C2, referred to herein by C1_index and C2_index, may be determined as follows:

$$C1\_index=((C1-C1\_offset)>>(3-C1\_scale)) \quad (37)$$

$$C2\_index=((C2-C2\_offset)>>(3-C2\_scale)) \quad (38)$$

Once the indices are determined, the color histogram bins are incremented by a Count value (which may have a value of between 0 and 3 in one embodiment) if the bin indices are in the range [0, 31], as shown below in Equation 39. Effectively, this allows for weighting the color counts based on luma values (e.g., brighter pixels are weighted more heavily, instead of weighting everything equally (e.g., by 1)).

```
if(C1_index>=0&&C1_index<=31&&C2_index>=0&&C2_
    index<=31)StatsCbCrHist[C2_index&31]
    [C1_index&31]+=Count;                              (39)
```

where Count is determined based on the selected luma value, Y in this example. As will be appreciated, the steps represented by Equations 37, 38, and 39 may be implemented by a bin update logic block 821. Further, in one embodiment, multiple luma thresholds may be set to define luma intervals. By way of example, four luma thresholds (Ythd0-Ythd3) may define five luma intervals, with Count values Count0-4 being defined for each interval. For instance, Count0-Count4 may be selected (e.g., by pixel condition logic 820) based on luma thresholds as follows:

```
if (Y<=Ythd0)
Count=Count0
else if (Y<=Ythd1)
Count=Count1
else if (Y<=Ythd2)
Count=Count2
else if (Y<=Ythd3)
Count=Count3
else
Count=Count4
```

Figure 84:
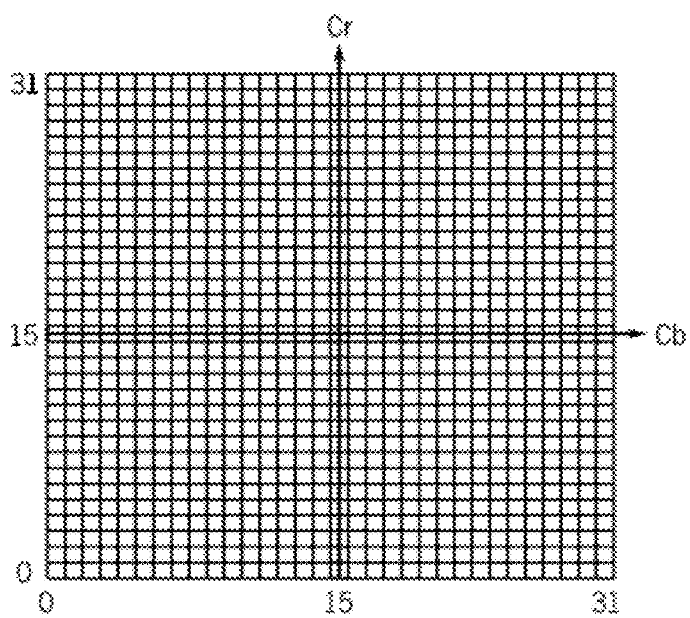
FIG. 84 depicts a two-dimensional color histogram that may be collected by the statistics collection engine of FIG. 82, in accordance with one embodiment.
Figure 85:
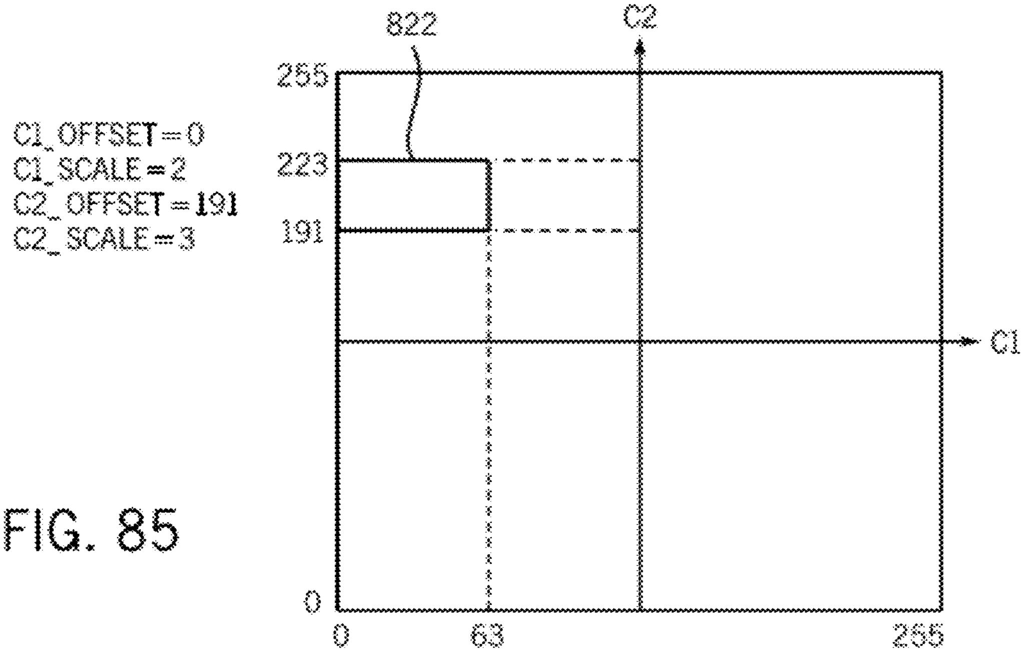
FIG. 85 depicts zooming and panning within a two-dimensional color histogram.

With the foregoing in mind, FIG. 84 illustrates the color histogram with scaling and offsets set to zero for both C1 and C2. The divisions within the CbCr space represent each of the 32×32 bins (1024 total bins). FIG. 85 provides an example of zooming and panning within the 2D color histogram for additional precision, wherein the rectangular area 822 where the small rectangle specifies the location of the 32×32 bins.

At the start of a frame of image data, bin values are initialized to zero. For each pixel going into the 2D color histogram 817, the bin corresponding to the matching C1C2 value is incremented by a determined Count value (Count0-Count4) which, as discussed above, may be based on the luma value. For each bin within the 2D histogram 817, the total pixel count is reported as part of the collected statistics data (e.g., STATS0). In one embodiment, the total pixel count for each bin may have a resolution of 22-bits, whereby an allocation of internal memory equal to 1024×22 bits is provided.

Referring back to FIG. 82, the Bayer RGB pixels (signal 806), $sRGB_{linear}$ pixels (signal 810), sRGB pixels (signal 812), and YC1C2 (e.g., YCbCr) pixels (signal 814) are provided to a set of pixel filters 824*a-c*, where by RGB, $sRGB_{linear}$, sRGB, YC1C2, or camYC1C2 sums may be accumulated conditionally upon either camYC1C2 or YC pixel conditions, as defined by each pixel filter 824. That is, Y, C1 and C2 values from either output of the non-linear color space conversion (YC1C2) or the output of the camera color space conversion (camYC1C2) are used to conditionally select RGB, $sRGB_{linear}$, sRGB or YC1C2 values to accumulate. While the present embodiment depicts the 3A statistics logic 742 as having 8 pixel filters (PF0-PF7) provided, it should be understood that any number of pixel filters may be provided.

Figure 86:
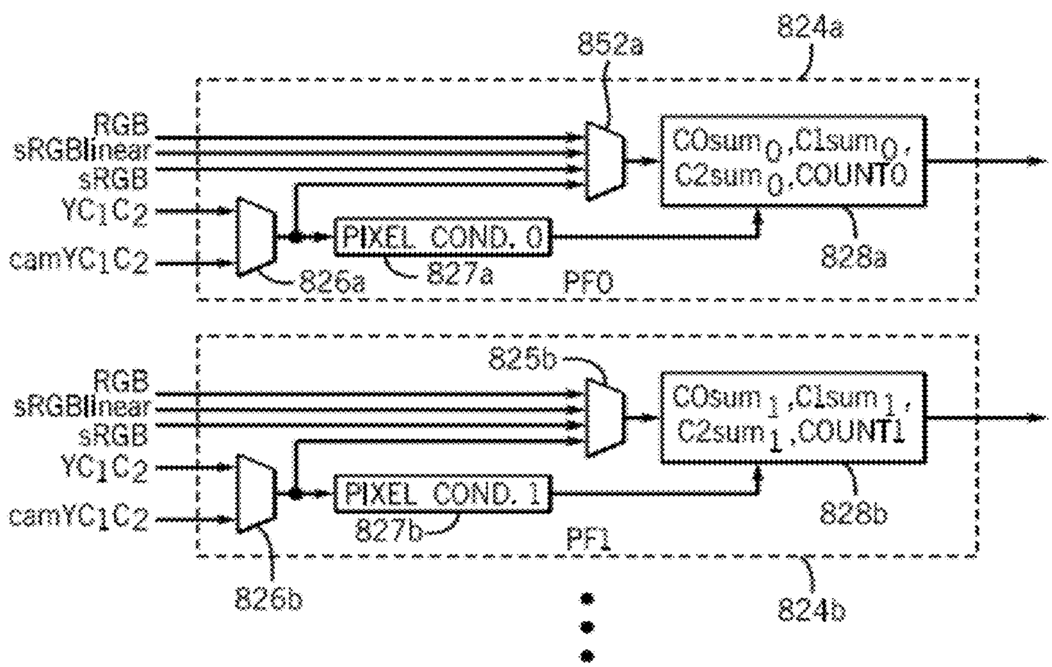
FIG. 86 is a more detailed view showing logic for implementing a pixel filter of the statistics collection engine, in accordance with one embodiment.

FIG. 86 shows a functional logic diagram depicting an embodiment of the pixel filters, specifically PF0 (824*a*) and PF1 (824*b*) from FIG. 82. As shown, each pixel filter 824 includes a selection logic, which receives the Bayer RGB pixels, the $sRGB_{linear}$ pixels, the sRGB pixels, and one of either the YC1C2 or camYC1C2 pixels, as selected by another selection logic 826. By way of example, the selection logic 825 and 826 may be implemented using multiplexers or any other suitable logic. The selection logic 826 may select either YC or camYC1C2. The selection may be made in response to a control signal which may be supplied by the main control logic 84 of the image processing circuitry 32 (FIG. 7) and/or set by software. Next, the pixel filter 824 may use logic 827 to evaluate the YC1C2 pixels (e.g., either non-linear or camera) selected by the selection logic 826 against a pixel condition. Each pixel filter 824 may use the selection circuit 825 to select one of either the Bayer RGB pixels, $sRGB_{linear}$ pixels, sRGB pixels, and YC1C2 or camYC1C2 pixel depending on the output from the selection circuit 826.

Figure 87:
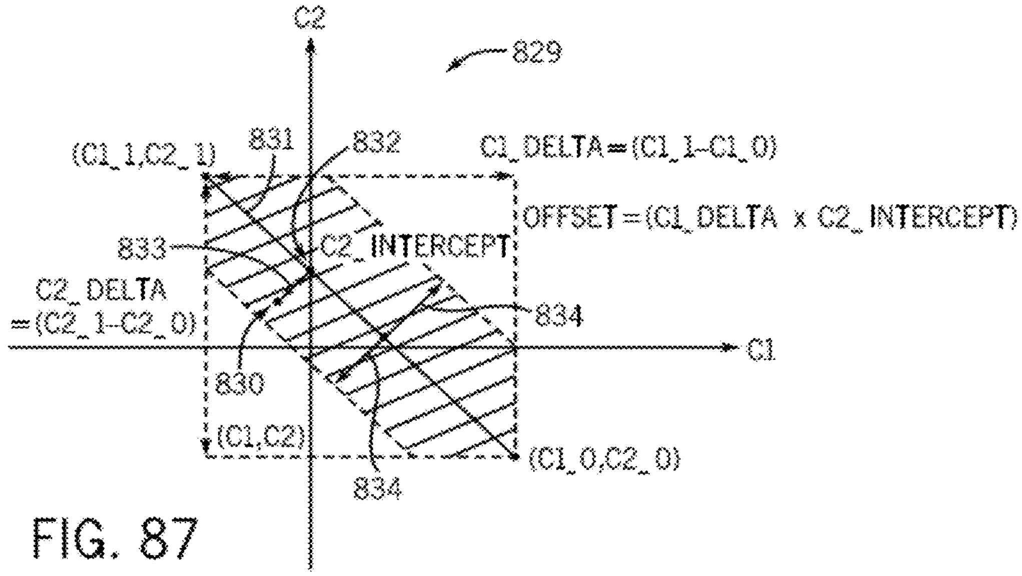
FIG. 87 is a graphical depiction of how the location of a pixel within a C1-C2 color space may be evaluated based on a pixel condition defined for a pixel filter, in accordance with one embodiment.

Using the results of the evaluation, the pixels selected by the selection logic 825 may be accumulated (828). In one embodiment, the pixel condition may be defined using thresholds C1_min, C1_max, C2_min, C2_max, as shown in graph 789 of FIG. 80. A pixel is included in the statistics if it satisfies the following conditions:

1. C1_min<=C1<=C1_max
2. C2_min<=C2<=C2_max
3. abs((C2_delta*C1)−(C1_delta*C2)+Offset)<distance_max
4. $Y_{min}$<=Y<=$Y_{max}$ Referring to graph 829 of FIG. 87, in one embodiment, the point 830 represents the values (C2, C1) corresponding to the current YC1C2 pixel data, as selected by the logic 826. C1_delta may be determined as the difference between C1__1 and C1__0, and C2_delta may be determined as the difference between C2__1 and C2__0. As shown in FIG. 87, the points (C1__0, C2__0) and (C1__1, C2__1) may define the minimum and maximum boundaries for C1 and C2. The Offset may be determined by multiplying C1_delta by the value 832 (C2_intercept) at where the line 831 intercepts the axis C2. Thus, assuming that Y, C1, and C2 satisfy the minimum and maximum boundary conditions, the selected pixels (Bayer RGB, $sRGB_{linear}$, sRGB, and YC1C2/camYC1C2) is included in the accumulation sum if its distance 833 from the line 831 is less than distance_max 834, which may be distance 833 in pixels from the line multiplied by a normalization factor:

$$distance\_max=distance*sqrt(C1\_delta^2+C2\_delta^2)$$

In the present embodiment, distance, C1_delta and C2_delta may have a range of −255 to 255. Thus, distance_max 834 may be represented by 17 bits. The points (C1_0, C2_0) and (C1_1, C2_1), as well as parameters for determining distance_max (e.g., normalization factor(s)), may be provided as part of the pixel condition logic 827 in each pixel filter 824. As will be appreciated, the pixel conditions 827 may be configurable/programmable.

Figure 88:
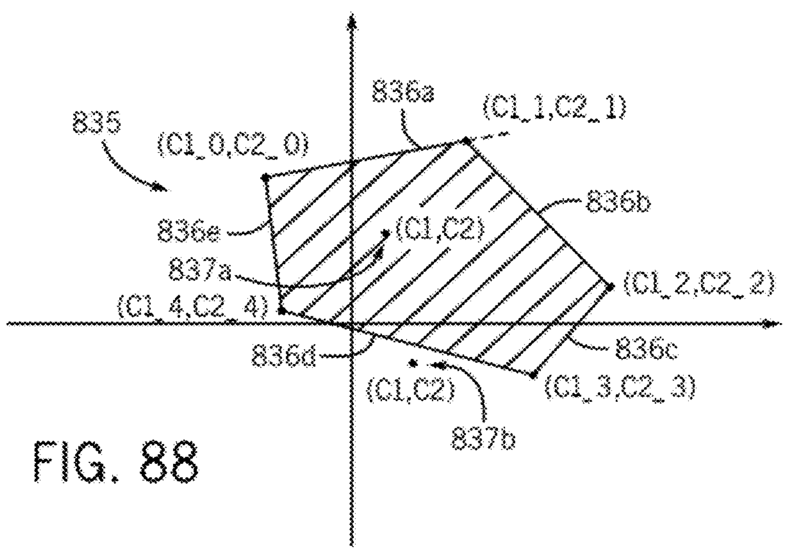
FIG. 88 is a graphical depiction of how the location of a pixel within a C1-C2 color space may be evaluated based on a pixel condition defined for a pixel filter, in accordance with another embodiment.

While the example shown in FIG. 87 depicts a pixel condition based on two sets of points (C1_0, C2_0) and (C1_1, C2_1), in additional embodiments, certain pixel filters may define more complex shapes and regions upon which pixel conditions are determined. For instance, FIG. 88 shows an embodiment where a pixel filter 824 may define a five-sided polygon 835 using points (C1_0, C2_0), (C1_1, C2_1), (C1_2, C2_2) and (C1_3, C2_3), and (C1_4, C2_4). Each side 836*a*-836*e* may define a line condition. However, unlike the case shown in FIG. 87 (e.g., the pixel may be on either side of line 831 as long as distance_max is satisfied), the condition may be that the pixel (C1, C2) must be located on the side of the line 836*a*-836*e* such that it is enclosed by the polygon 835. Thus, the pixel (C1, C2) is counted when the intersection of multiple line conditions is met. For instance, in FIG. 88, such an intersection occurs with respect to pixel 837*a*. However, pixel 837*b* fails to satisfy the line condition for line 836*d* and, therefore, would not be counted in the statistics when processed by a pixel filter configured in this manner.

Figure 89:
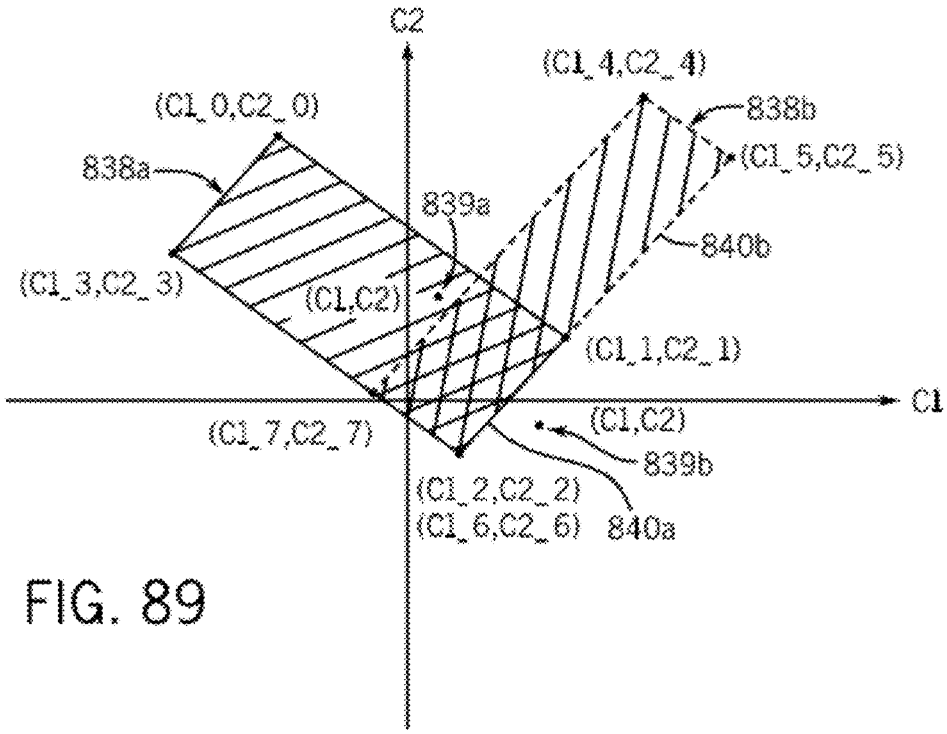
FIG. 89 is a graphical depiction of how the location of a pixel within a C1-C2 color space may be evaluated based on a pixel condition defined for a pixel filter, in accordance with yet a further embodiment.
Figure 90:
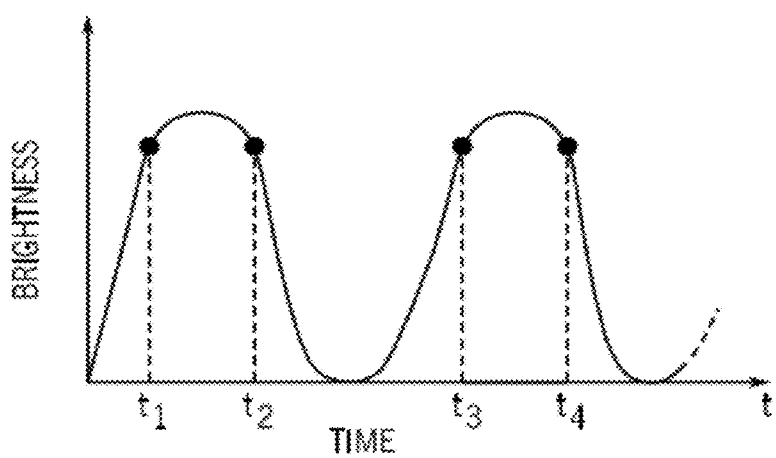
FIG. 90 is a graph showing how image sensor integration times may be determined to compensate for flicker, in accordance with one embodiment.
Figure 91:
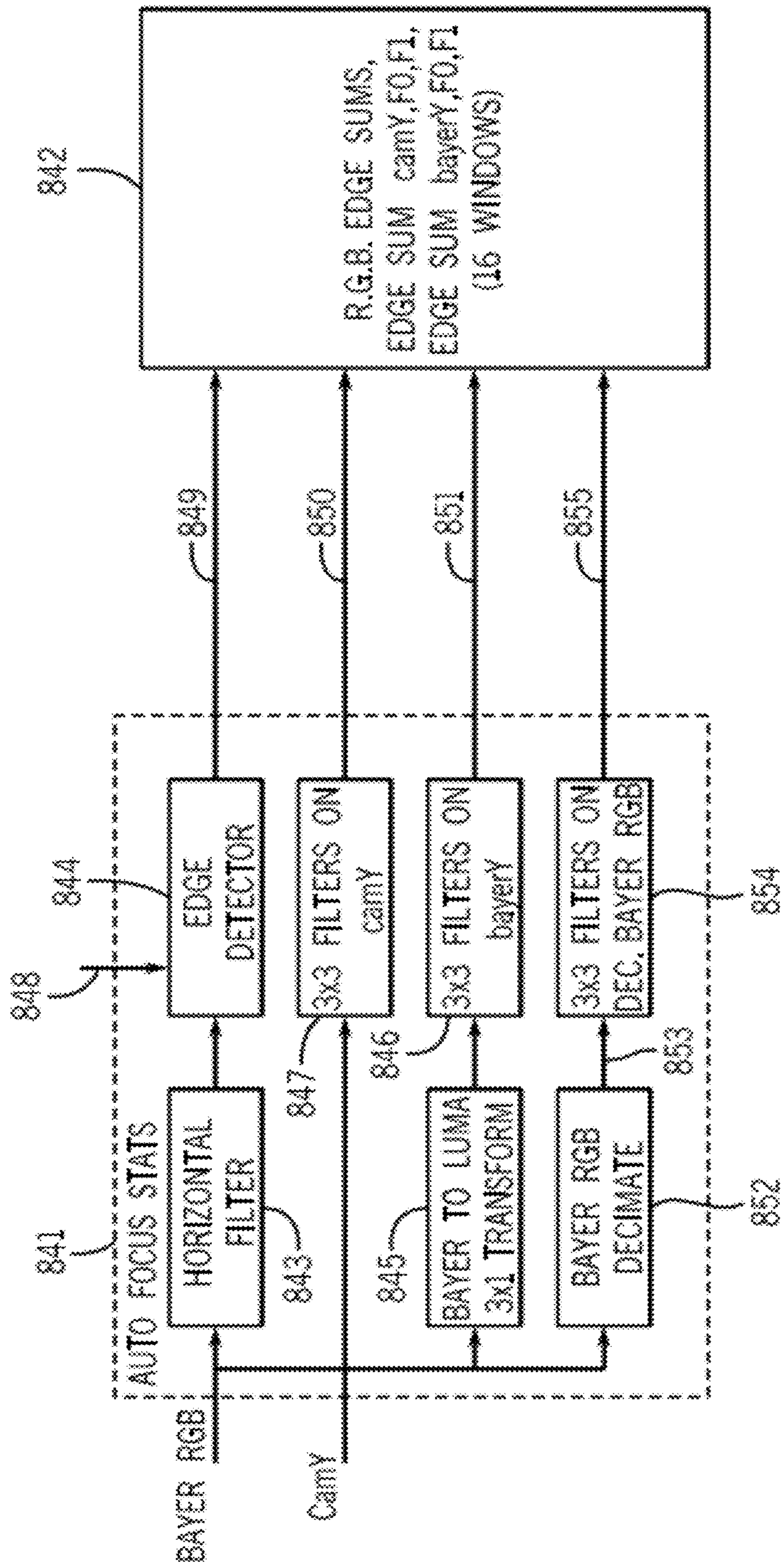
FIG. 91 is a detailed block diagram showing logic that may be implemented in the statistics collection engine of FIG. 82 and configured to collect auto-focus statistics in accordance with one embodiment.

In a further embodiment, shown in FIG. 89, a pixel condition may be determined based on overlapping shapes. For instance, FIG. 89 shows how a pixel filter 824 may have pixel conditions defined using two overlapping shapes, here rectangles 838*a* and 838*b* defined by points (C1_0, C2_0), (C1_1, C2_1), (C1_2, C2_2) and (C1_3, C2_3) and points (C1_4, C2_4), (C1_5, C2_5), (C1_6, C2_6) and (C1_7, C2_7), respectively. In this example, a pixel (C1, C2) may satisfy line conditions defined by such a pixel filter by being enclosed within the region collectively bounded by the shapes 838*a* and 838*b* (e.g., by satisfying the line conditions of each line defining both shapes). For instance, in FIG. 89, these conditions are satisfied with respect to pixel 839*a*. However, pixel 839*b* fails to satisfy these conditions (specifically with respect to line 840*a* of rectangle 838*a* and line 840*b* of rectangle 838*b*) and, therefore, would not be counted in the statistics when processed by a pixel filter configured in this manner.

For each pixel filter 824, qualifying pixels are identified based on the pixel conditions defined by logic 827 and, for qualifying pixel values, the following statistics may be collected by the 3A statistics engine 742: 32-bit sums: ($R_{sum}$, $G_{sum}$, $B_{sum}$) or ($sR_{linear\_sum}$, $sG_{linear\_sum}$, $sB_{linear\_sum}$), or ($sR_{sum}$, $sG_{sum}$, $sB_{sum}$) or ($Y_{sum}$, $C1_{sum}$, $C2_{sum}$) and a 24-bit pixel count, Count, which may represent the sum of the number of pixels that were included in the statistic. In one embodiment, software may use the sum to generate an average in within a tile or window.

When the camYC1C2 pixels are selected by logic 825 of a pixel filter 824, color thresholds may be performed on scaled chroma values. For instance, since chroma intensity at the white points increases with luma value, the use of chroma scaled with the luma value in the pixel filter 824 may, in some instances, provide results with improved consistency. For example, minimum and maximum luma conditions may allow the filter to ignore dark and/or bright areas. If the pixel satisfies the YC1C2 pixel condition, the RGB, $sRGB_{linear}$, sRGB or YC1C2 values are accumulated. The selection of the pixel values by the selection logic 825 may depend on the type of information needed. For instance, for white balance, typically RGB or $sRGB_{linear}$ pixels are selected. For detecting specific conditions, such as sky, grass, skin tones, etc., a YCC or sRGB pixel set may be more suitable.

In the present embodiment, eight sets of pixel conditions may be defined, one associated with each of the pixel filters PF0-PF7 824. Some pixel conditions may be defined to carve an area in the C1-C2 color space (FIG. 80) where the white point is likely to be. This may be determined or estimated based on the current illuminant. Then, accumulated RGB sums may be used to determine the current white point based on the R/G and/or B/G ratios for white balance adjustments. Further, some pixel conditions may be defined or adapted to perform scene analysis and classifications. For example, some pixel filters 824 and windows/tiles may be utilized to detect for conditions, such as blue sky in a top portion of an image frame, or green grass in a bottom portion of an image frame. This information can also be used to adjust white balance. Additionally, some pixel conditions may be defined or adapted to detect skin tones. For such filters, tiles may be used to detect areas of the image frame that have skin tone. By identifying these areas, the quality of skin tone may be improved by, for example, reducing the amount of noise filter in skin tone areas and/or decreasing the quantization in the video compression in those areas to improve quality.

The 3A statistics logic 742 may also provide for the collection of luma data. For instance, the luma value, camY, from the camera color space conversion (camYC1C2) may be used for accumulating luma sum statistics. In one embodiment, the following luma information is may be collected by the 3A statistics logic 742:

$Y_{sum}$:sum of camY cond($Y_{sum}$):sum of camY that satisfies the condition: $Y_{min}$<=camY<Y.

Ycount1:count of pixels where camY<$Y_{min}$,

Ycount2: count of pixels where camY>=$Y_{max}$

Here, Ycount1 may represent the number of underexposed pixels and Ycount2 may represent the number of overexposed pixels. This may be used to determine whether the image is overexposed or underexposed. For instance, if the pixels do not saturate, the sum of camY ($Y\text{-}_{sum}$) may indicate average luma in a scene, which may be used to achieve a target AE exposure. For instance, in one embodiment, the average luma may be determined by dividing $Y_{sum}$ by the number of pixels. Further, by knowing the luma/AE statistics for tile statistics and window locations, AE metering may be performed. For instance, depending on the image scene, it may be desirable to weigh AE statistics at the center window more heavily than those at the edges of the image, such as may be in the case of a portrait.

In the presently illustrated embodiment, the 3A statistics collection logic may be configured to collect statistics in tiles and windows. In the illustrated configuration, one window may be defined for tile statistics 863. The window may be specified with a column start and width, and a row start and height. In one embodiment, the window position and size may be selected as a multiple of four pixels and, within this window, statistics are gathered in tiles of arbitrary sizes. By way of example, all tiles in the window may be selected such that they have the same size. The tile size may be set independently for horizontal and vertical directions and, in one embodiment, the maximum limit on the number of horizontal tiles may be set (e.g., a limit of 128 horizontal tiles). Further, in one embodiment, the minimum tile size may be set to 8 pixels wide by 4 pixels high, for example. Below are some examples of tile configurations based on different video/imaging modes and standards to obtain a window of 16×16 tiles:

VGA 640×480:tile interval 40×30 pixels

HD 1280×720:tile interval 80×45 pixels

HD 1920×1080:tile interval 120×68 pixels

5 MP 2592×1944:tile interval 162×122 pixels

8 MP 3280×2464:tile interval 205×154 pixels

With regard to the present embodiment, from the eight available pixel filters 824 (PF0-PF7), four may be selected for tile statistics 863. For each tile, the following statistics may collected:

($R_{sum0}$, $G_{sum0}$, $B_{sum0}$) or ($sR_{linear\_sum0}$, $sG_{linear\_sum0}$, $sB_{linear\_sum0}$), or ($sR_{sum0}$, $sG_{sum0}$, $sB_{sum0}$) or ($Y_{sum0}$, $C1_{sum0}$, $C2_{sum0}$), Count0

($R_{sum1}$, $G_{sum1}$, $B_{sum1}$) or ($sR_{linear\_sum1}$, $sG_{linear\_sum1}$, $sB_{linear\_sum1}$), or ($sR_{sum1}$, $sG_{sum1}$, $sB_{sum1}$) or ($Y_{sum1}$, $C1_{sum1}$, $C2_{sum1}$), Count1

($R_{sum2}$, $G_{sum2}$, $B_{sum2}$) or ($sR_{linear\_sum2}$, $sG_{linear\_sum2}$, $sB_{linear\_sum2}$), or ($sR_{sum2}$, $sG_{sum2}$, $sB_{sum2}$) or ($Y_{sum2}$, $C1_{sum2}$, $C2_{sum2}$), Count2

($R_{sum3}$, $G_{sum3}$, $B_{sum3}$) or ($sR_{linear\_sum3}$, $sG_{linear\_sum3}$, $sB_{linear\_sum3}$), or ($sR_{sum3}$, $sG_{sum3}$, $sB_{sum3}$) or ($Y_{sum3}$, $C1_{sum3}$, $C2_{sum3}$), Count3

$Y_{sum}$, cond($Y_{sum}$), $Y_{count1}$, $Y_{count2}$ (from camY)

In the above-listed statistics, Count0-3 represents the count of pixels that satisfy pixel conditions corresponding to the selected four pixel filters. For example, if pixel filters PF0, PF1, PF5, and PF6 are selected as the four pixel filters for a particular tile or window, then the above-provided expressions may correspond to the Count values and sums corresponding to the pixel data (e.g., Bayer RGB, $sRGB_{linear}$, sRGB, YC1Y2, camYC1C2) which is selected for those filters (e.g., by selection logic 825). Additionally, the Count values may be used to normalize the statistics (e.g., by dividing color sums by the corresponding Count values). As shown, depending at least partially upon the types of statistics needed, the selected pixels filters 824 may be configured to select between either one of Bayer RGB, $sRGB_{linear}$, or sRGB pixel data, or YC1C2 (non-linear or camera color space conversion depending on selection by logic 826) pixel data, and determine color sum statistics for the selected pixel data. Additionally, as discussed above the luma value, camY, from the camera color space conversion (camYC1C2) is also collected for luma sum information for auto-exposure (AE) statistics.

Additionally, the 3A statistics logic 742 may also be configured to collect statistics 861 for multiple windows. For instance, in one embodiment, up to eight floating windows may be used, with any rectangular region having a multiple of four pixels in each dimension (e.g., height×width), up to a maximum size corresponding to the size of the image frame. However, the location of the windows is not necessarily restricted to multiples of four pixels. For instance, windows can overlap with one another.

In the present embodiment, four pixel filters 824 may be selected from the available eight pixel filters (PF0-PF7) for each window. Statistics for each window may be collected in the same manner as for tiles, discussed above. Thus, for each window, the following statistics 861 may be collected:

($R_{sum0}$, $G_{sum0}$, $B_{sum0}$) or ($sR_{linear\_sum0}$, $sG_{linear\_sum0}$, $sB_{linear\_sum0}$), or ($sR_{sum0}$, $sG_{sum0}$, $sB_{sum0}$) or ($Y_{sum0}$, $C1_{sum0}$, $C2_{sum0}$), Count0

($R_{sum1}$, $G_{sum1}$, $B_{sum1}$) or ($sR_{linear\_sum1}$, $sG_{linear\_sum1}$, $sB_{linear\_sum1}$), or ($sR_{sum1}$, $sG_{sum1}$, $sB_{sum1}$) or ($Y_{sum1}$, $C1_{sum1}$, $C2_{sum1}$), Count1

($R_{sum2}$, $G_{sum2}$, $B_{sum2}$) or ($sR_{linear\_sum2}$, $sG_{linear\_sum2}$, $sB_{linear\_sum2}$), or ($sR_{sum2}$, $sG_{sum2}$, $sB_{sum2}$) or ($Y_{sum2}$, $C1_{sum2}$, $C2_{sum2}$), Count2

($R_{sum3}$, $G_{sum3}$, $B_{sum3}$) or ($sR_{linear\_sum3}$, $sG_{linear\_sum3}$, $sB_{linear\_sum3}$), or ($sR_{sum3}$, $sG_{sum3}$, $sB_{sum3}$) or ($Y_{sum3}$, $C1_{sum3}$, $C2_{sum3}$), Count3

$Y_{sum}$, cond($Y_{sum}$), $Y_{count1}$, $Y_{count2}$ (from camY)

In the above-listed statistics, Count0-3 represents the count of pixels that satisfy pixel conditions corresponding to the selected four pixel filters for a particular window. From the eight available pixel filters PF0-PF7, the four active pixel filters may be selected independently for each window. Additionally, one of the sets of statistics may be collected using pixel filters or the camY luma statistics. The window statistics collected for AWB and AE may, in one embodiment, be mapped to one or more registers.

Referring still to FIG. 82, the 3A statistics logic 742 may also be configured to acquire luma row sum statistics 859 for one window using the luma value, camY, for the camera color space conversion. This information may be used to detect and compensate for flicker. Flicker is generated by a periodic variation in some fluorescent and incandescent light sources, typically caused by the AC power signal. For example, referring to FIG. 90, a graph illustrating how flicker may be caused by variations in a light source is shown. Flicker detection may thus be used to detect the frequency of the AC power used for the light source (e.g., 50 Hz or 60 Hz). Once the frequency is known, flicker may be avoided by setting the image sensor's integration time to an integer multiple of the flicker period.

To detect for flicker, the camera luma, camY, is accumulated over each row. Due to the down-sample of the incoming Bayer data, each camY value may corresponds to 4 rows of the original raw image data. Control logic and/or firmware may then perform a frequency analysis of the row average or, more reliably, of the row average differences over consecutive frames to determine the frequency of the AC power associated with a particular light source. For example, with respect to FIG. 90, integration times for the image sensor may be based on times t1, t2, t3, and t4 (e.g., such that integration occurs at times corresponding to when a lighting source exhibiting variations is generally at the same brightness level.

In one embodiment, a luma row sum window may be specified and statistics 859 are reported for pixels within that window. By way of example, for 1080p HD video capture, assuming a window of 1024 pixel high, 256 luma row sums are generated (e.g., one sum for every four rows due to downscaling by logic 795), and each accumulated value may be expressed with 18 bits (e.g., 8-bit camY values for up to 1024 samples per row).

The 3A statistics collection logic 742 of FIG. 82 may also provide for the collection of auto-focus (AF) statistics 842 by way of the auto-focus statistics logic 841. A functional block diagram showing an embodiment of the AF statistics logic 841 in more detail is provided in FIG. 91. As shown, the AF statistics logic 841 may include a horizontal filter 843 and an edge detector 844 which is applied to the original Bayer RGB (not down-sampled), two 3×3 filters 846 on Y from Bayer, and two 3×3 filters 847 on camY. In general, the horizontal filter 843 provides a fine resolution statistics per color component, the 3×3 filters 846 may provide fine resolution statistics on BayerY (Bayer RGB with 3×1 transform (logic 845) applied), and the 3×3 filters 847 may provide coarser two-dimensional statistics on camY (since camY is obtained using down-scaled Bayer RGB data, i.e., logic 815). Further, the logic 841 may include logic 852 for decimating the Bayer RGB data (e.g., 2×2 averaging, 4×4 averaging, etc.), and the decimated Bayer RGB data 853 may be filtered using 3×3 filters 854 to produce a filtered output 855 for decimated Bayer RGB data. The present embodiment provides for 16 windows of statistics. At the raw frame boundaries, edge pixels are replicated for the filters of the AF statistics logic 841. The various components of the AF statistics logic 841 are described in further detail below.

First, the horizontal edge detection process includes applying the horizontal filter 843 for each color component (R, Gr, Gb, B) followed by an optional edge detector 844 on each color component. Thus, depending on imaging conditions, this configuration allows for the AF statistic logic 841 to be set up as a high pass filter with no edge detection (e.g., edge detector disabled) or, alternatively, as a low pass filter followed by an edge detector (e.g., edge detector enabled). For instance, in low light conditions, the horizontal filter 843 may be more susceptible to noise and, therefore, the logic 841 may configure the horizontal filter as a low pass filter followed by an enabled edge detector 844. As shown, the control signal 848 may enable or disable the edge detector 844. The statistics from the different color channels are used to determine the direction of the focus to improve sharpness, since the different colors may focus at different depth. In particular, the AF statistics logic 841 may provide for techniques to enabling auto-focus control using a combination of coarse and fine adjustments (e.g., to the focal length of the lens). Embodiments of such techniques are described in additional detail below.

In one embodiment the horizontal filter may be a 7-tap filter and may be defined as follows in Equations 41 and 42:

$$out(i)=(af\_horzfilt\_coeff[0]*(in(i-3)+in(i+3))+af\_horzfilt\_coeff[1]*(in(i-2)+in(i+2))+af\_horzfilt\_coeff[2]*(in(i-1)+in(i+1))+af\_horzfilt\_coeff[3]in(i)) \quad (41)$$

$$out(i)=\max(-255,\min(255,out(i))) \quad (42)$$

Here, each coefficient af_horzfilt_coeff [0:3] may be in the range [−2, 2], and i represents the input pixel index for R, Gr, Gb or B. The filtered output out(i) may be clipped between a minimum and maximum value of −255 and 255, respectively (Equation 42). The filter coefficients may be defined independently per color component.

The optional edge detector 844 may follow the output of the horizontal filter 843. In one embodiment, the edge detector 844 may be defined as:

$$edge(i)=abs(-2*out(i-1)+2*out(i+1))+abs(-out(i-2)+out(i+2)) \quad (43)$$

$$edge(i)=\max(0,\min(255,edge(i))) \quad (44)$$

Thus, the edge detector 844, when enabled, may output a value based upon the two pixels on each side of the current input pixel i, as depicted by Equation 43. The result may be clipped to an 8-bit value between 0 and 255, as shown in Equation 44.

Depending on whether an edge is detected, the final output of the pixel filter (e.g., filter 843 and detector 844) may be selected as either the output of the horizontal filter 843 or the output of the edge detector 844. For instance, as shown in Equation 45, the output 849 of the edge detector 844 may be edge(i) if an edge is detected, or may be the absolute value of the horizontal filter output out(i) if no edge is detected.

$$edge(i)=(af\_horzfilt\_edge\_detected)?edge(i):abs(out(i)) \quad (45)$$

For each window the accumulated values, edge_sum[R, Gr, Gb, B], may be selected to be either (1) the sum of edge(j,i) for each pixel over the window, or (2) the maximum value of edge(i) across a line in the window, max(edge), summed over the lines in the window. Assuming a raw frame size of 4096×4096 pixels, the number of bits required to store the maximum values of edge_sum[R, Gr, Gb, B] is 30 bits (e.g., 8 bits per pixel, plus 22 bits for a window covering the entire raw image frame).

As discussed, the 3×3 filters 847 for camY luma may include two programmable 3×3 filters, referred to as F0 and F1, which are applied to camY. The result of the filter 847 goes to either a squared function or an absolute value function. The result is accumulated over a given AF window for both 3×3 filters F0 and F1 to generate a luma edge value. In one embodiment, the luma edge values at each camY pixel are defined as follows:

$$edgecamY\_FX(j,i)=FX*camY=FX(0,0)*camY(j-1,i-1)+FX(0,1)*camY(j-1,i)+FX(0,2)*camY(j-1,i+1)+FX(1,0)*camY(j,i-1)+FX(1,1)*camY(j,i)+FX(1,2)*camY(j,i+1)+FX(2,0)*camY(j+1,i-1)+FX(2,1)*camY(j+1,i)+FX(2,2)*camY(j+1,i+1) \quad (46)$$

$$edgecamY\_FX(j,i)=f(\max(-255,\min(255,edgecamY\_FX(j,i)))) \quad (47)$$

$$f(a)=a\hat{\ }2 \text{ or } abs(a)$$

where FX represents the 3×3 programmable filters, F0 and F1, with signed coefficients in the range [−4, 4]. The indices j and i represent pixel locations in the camY image. As discussed above, the filter on camY may provide coarse resolution statistics, since camY is derived using down-scaled (e.g., 4×4 to 1) Bayer RGB data. For instance, in one embodiment, the filters F0 and F1 may be set using a Scharr operator, which offers improved rotational symmetry over a Sobel operator, an example of which is shown below:

$$F0=\begin{bmatrix}-3 & 0 & 3\\ -10 & 0 & 10\\ -3 & 0 & 3\end{bmatrix}$$

$$F1=\begin{bmatrix}-3 & -10 & -3\\ 0 & 0 & 0\\ 3 & 10 & 3\end{bmatrix}$$

For each window, the accumulated values 850 determined by the filters 847, edgecamY_FX_sum (where FX=F0 and F1), can selected to be either (1) the sum of edgecamY_FX (j,i) for each pixel over the window, or (2) the maximum value of edgecamY_FX(j) across a line in the window, summed over the lines in the window. In one embodiment, edgecamY_FX_sum may saturate to a 32-bit value when f(a) is set to a^2 to provide "peakier" statistics with a finer resolution. To avoid saturation, a maximum window size X*Y in raw frame pixels may be set such that it does not exceed a total of 1024×1024 pixels (e.g., i.e. X*Y<=1048576 pixels). As noted above, f(a) may also be set as an absolute value to provide more linear statistics.

The AF 3×3 filters 846 on Bayer Y may defined in a similar manner as the 3×3 filters in camY, but they are applied to luma values Y generated from a Bayer quad (2×2 pixels). First, 8-bit Bayer RGB values are converted to Y with programmable coefficients in the range [0, 4] to generate a white balanced Y value, as shown below in Equation 48:

$$bayerY=\max(0,\min(255,bayerY\_Coeff[0]*R+bayerY\_Coeff[1]*(Gr+Gb)/2+bayerY\_Coeff[2]*B)) \quad (48)$$

Like the filters 847 for camY, the 3×3 filters 846 for bayerY luma may include two programmable 3×3 filters, referred to as F0 and F1, which are applied to bayerY. The result of the filter 846 goes to either a squared function or an absolute value function. The result is accumulated over a given AF window for both 3×3 filters F0 and F1 to generate a luma edge value. In one embodiment, the luma edge values at each bayerY pixel are defined as follows:

$$edgebayerY\_FX(j,i)=FX*bayerY=FX(0,0)*bayerY(j-1,i-1)+FX(0,1)*bayerY(j-1,i)+FX(0,2)*bayerY(j-1,i)+FX(1,0)*bayerY(j,i-1)+FX(1,1)*bayerY(j,i)+FX(1,2)*bayerY(j-1,i)+FX(2,0)*bayerY(j+1,i-1)+FX(2,1)*bayerY(j+1,i)+FX(2,2)*bayerY(j+1,i) \quad (49)$$

$$edgebayerY\_FX(j,i)=f(\max(-255,\min(255,edgebayerY\_FX(j,i)))) \quad (50)$$

$$f(a)=a\hat{}2 \text{ or } abs(a)$$

where FX represents the 3×3 programmable filters, F0 and F1, with signed coefficients in the range [−4, 4]. The indices j and i represent pixel locations in the bayerY image. As discussed above, the filter on Bayer Y may provide fine resolution statistics, since the Bayer RGB signal received by the AF logic 841 is not decimated. By way of examples only, the filters F0 and F1 of the filter logic 846 may be set using one of the following filter configurations:

$$\begin{bmatrix} -1 & -1 & -1 \\ -1 & 8 & -1 \\ -1 & -1 & -1 \end{bmatrix}$$

$$\begin{bmatrix} -6 & 10 & 6 \\ 10 & 0 & -10 \\ 6 & -10 & -6 \end{bmatrix}$$

$$\begin{bmatrix} 0 & -1 & 0 \\ -1 & 2 & 0 \\ 0 & 0 & 0 \end{bmatrix}$$

For each window, the accumulated values 851 determined by the filters 846, edgebayerY_FX_sum (where FX=F0 and F1), can selected to be either (1) the sum of edgebayerY_FX (j,i) for each pixel over the window, or (2) the maximum value of edgebayerY_FX(j) across a line in the window, summed over the lines in the window. Here, edgebayerY_FX_sum may saturates to 32-bits when f(a) is set to a^2. Thus, to avoid saturation, the maximum window size X*Y in raw frame pixels should be set such that it does not exceed a total of 512×512 pixels (e.g., X*Y<=262144). As discussed above, setting f(a) to a^2 may provide for peakier statistics, while setting f(a) to abs(a) may provide for more linear statistics.

As discussed above, statistics 842 for AF are collected for 16 windows. The windows may be any rectangular area with each dimension being a multiple of 4 pixels. Because each filtering logic 846 and 847 includes two filters, in some instances, one filter may be used for normalization over 4 pixels, and may be configured to filter in both vertical and horizontal directions. Further, in some embodiments, the AF logic 841 may normalize the AF statistics by brightness. This may be accomplished by setting one or more of the filters of the logic blocks 846 and 847 as bypass filters. In certain embodiments, the location of the windows may be restricted to multiple of 4 pixels, and windows are permitted to overlap. For instance, one window may be used to acquire normalization values, while another window may be used for additional statistics, such as variance, as discussed below. In one embodiment, the AF filters (e.g., 843, 846, 847) may not implement pixel replication at the edge of an image frame and, therefore, in order for the AF filters to use all valid pixels, the AF windows may be set such that they are each at least 4 pixels from the top edge of the frame, at least 8 pixels from the bottom edge of the frame and at least 12 pixels from the left/right edge of the frame. In the illustrated embodiment, the following statistics may be collected and reported for each window:

32-bit edgeGr_sum for Gr
32-bit edgeR_sum for R
32-bit edgeB_sum for B
32-bit edgeGb_sum for Gb
32-bit edgebayerY_F0_sum for Y from Bayer for filter0 (F0)
32-bit edgebayerY_F1_sum for Y from Bayer for filter1 (F1)
32-bit edgecamY_F0_sum for camY for filter0 (F0)
32-bit edgecamY_F1_sum for camY for filter1 (F1)

In such an embodiment, the memory required for storing the AF statistics 842 may be 16 (windows) multiplied by 8 (Gr, R, B, Gb, bayerY_F0, bayerY_F1, camY_F0, camY_F1) multiplied by 32 bits.

Thus, in one embodiment, the accumulated value per window may be selected between: the output of the filter (which may be configured as a default setting), the input pixel, or the input pixel squared. The selection may be made for each of the 16 AF windows, and may apply to all of the 8 AF statistics (listed above) in a given window. This may be used to normalize the AF score between two overlapping windows, one of which is configured to collect the output of the filter and one of which is configured to collect the input pixel sum. Additionally, for calculating pixel variance in the case of two overlapping windows, one window may be configured to collect the input pixel sum, and another to collect the input pixel squared sum, thus providing for a variance that may be calculated as:

$$Variance=(avg\_pixel^2)-(avg\_pixel)\hat{}2$$

Using the AF statistics, the ISP control logic 84 (FIG. 7) may be configured to adjust a focal length of the lens of an image device (e.g., 30) using a series of focal length adjustments based on coarse and fine auto-focus "scores" to bring an image into focus. As discussed above, the 3×3 filters 847 for camY may provide for coarse statistics, while the horizontal filter 843 and edge detector 844 may provide for comparatively finer statistics per color component, while the 3×3 filters 846 on BayerY may provide for fine statistics on BayerY. Further, the 3×3 filters 854 on a decimated Bayer RGB signal 853 may provide coarse statistics for each color channel. As discussed further below, AF scores may be calculated based on filter output values for a particular input signal (e.g., sum of filter outputs F0 and F1 for camY, BayerY, Bayer RGB decimated, or based on horizontal/edge detector outputs, etc.).

Figure 92:
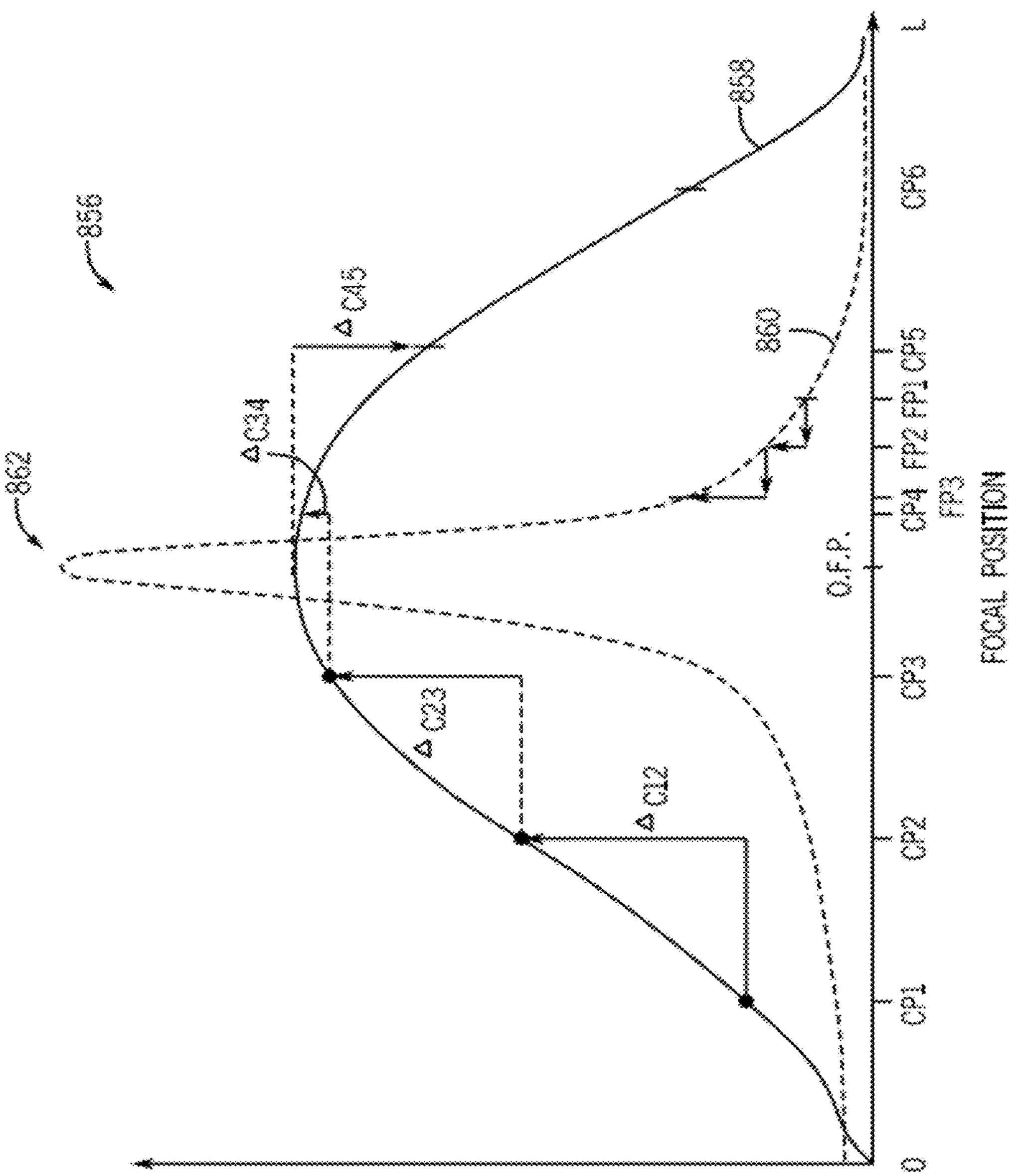
FIG. 92 is a graph depicting a technique for performing auto-focus using coarse and fine auto-focus scoring values, in accordance with one embodiment.

FIG. 92 shows a graph 856 that depicts curves 858 and 860 which represent coarse and fine AF scores, respectively. As shown, the coarse AF scores based upon the coarse statistics may have a more linear response across the focal distance of the lens. Thus, at any focal position, a lens movement may generate a change in an auto focus score which may be used to detect if the image is becoming more in focus or out of focus. For instance, an increase in a coarse AF score after a lens adjustment may indicate that the focal length is being adjusted in the correct direction (e.g., towards the optical focal position).

However, as the optical focal position is approached, the change in the coarse AF score for smaller lens adjustments steps may decrease, making it difficult to discern the correct direction of focal adjustment. For example, as shown on graph 856, the change in coarse AF score between coarse position (CP) CP1 and CP2 is represented by $\Delta_{C12}$, which shows an increase in the coarse from CP1 to CP2. However, as shown, from CP3 to CP4, the change $\Delta_{C34}$ in the coarse AF score (which passes through the optimal focal position (OFP)), though still increasing, is relatively smaller. It should be understood that the positions CP1-CP6 along the focal length L are not meant to necessarily correspond to the step sizes taken by the auto-focus logic along the focal length. That is, there may be additional steps taken between each coarse position that are not shown. The illustrated positions CP1-CP6 are only meant to show how the change in the coarse AF score may gradually decrease as the focal position approaches the OFP.

Once the approximate position of the OFP is determined (e.g., based on the coarse AF scores shown in FIG. 92, the approximate position of the OFP may be between CP3 and CP5), fine AF score values, represented by curve 860 may be evaluated to refine the focal position. For instance, fine AF scores may be flatter when the image is out of focus, so that a large lens positional change does not cause a large change in the fine AF score. However, as the focal position approaches the optical focal position (OFP), the fine AF score may change sharply with small positional adjustments. Thus, by locating a peak or apex 862 on the fine AF score curve 860, the OFP may be determined for the current image scene. Thus, to summarize, coarse AF scores may be used to determine the general vicinity of the optical focal position, while the fine AF scores may be used to pinpoints a more exact position within that vicinity.

In one embodiment, the auto-focus process may begin by acquiring coarse AF scores along the entire available focal length, beginning at position 0 and ending at position L (shown on graph 856) and determine the coarse AF scores at various step positions (e.g., CP1-CP6). In one embodiment, once the focal position of the lens has reached position L, the position may reset to 0 before evaluating AF scores at various focal positions. For instance, this may be due to coil settling time of a mechanical element controlling the focal position. In this embodiment, after resetting to position 0, the focal position may be adjusted toward position L to a position that first indicated a negative change in a coarse AF score, here position CP5 exhibiting a negative change $\Delta_{C45}$ with respect to position CP4. From position CP5, the focal position may be adjusted in smaller increments relative to increments used in the coarse AF score adjustments (e.g., positions FP1, FP2, FP3, etc.) back in the direction towards position 0, while searching for a peak 862 in the fine AF score curve 860. As discussed above, the focal position OFP corresponding to the peak 862 in the fine AF score curve 860 may be the optimal focal position for the current image scene.

As will be appreciated, the techniques described above for locating the optimal area and optimal position for focus may be referred to as "hill climbing," in the sense that the changes in the curves for the AF scores 858 and 860 are analyzed to locate the OFP. Further, while the analysis of the coarse AF scores (curve 858) and the fine AF scores (curve 860) is shown as using same-sized steps for coarse score analysis (e.g., distance between CP1 and CP2) and same-sized steps for fine score analysis (e.g., distance between FP1 and FP2), in some embodiments, the step sizes may be varied depending on the change in the score from one position to the next. For instance, in one embodiment, the step size between CP3 and CP4 may be reduced relative to the step size between CP1 and CP2 since the overall delta in the coarse AF score ($\Delta_{C34}$) is less then the delta from CP1 to CP2 ($\Delta_{C12}$).

Figure 93:
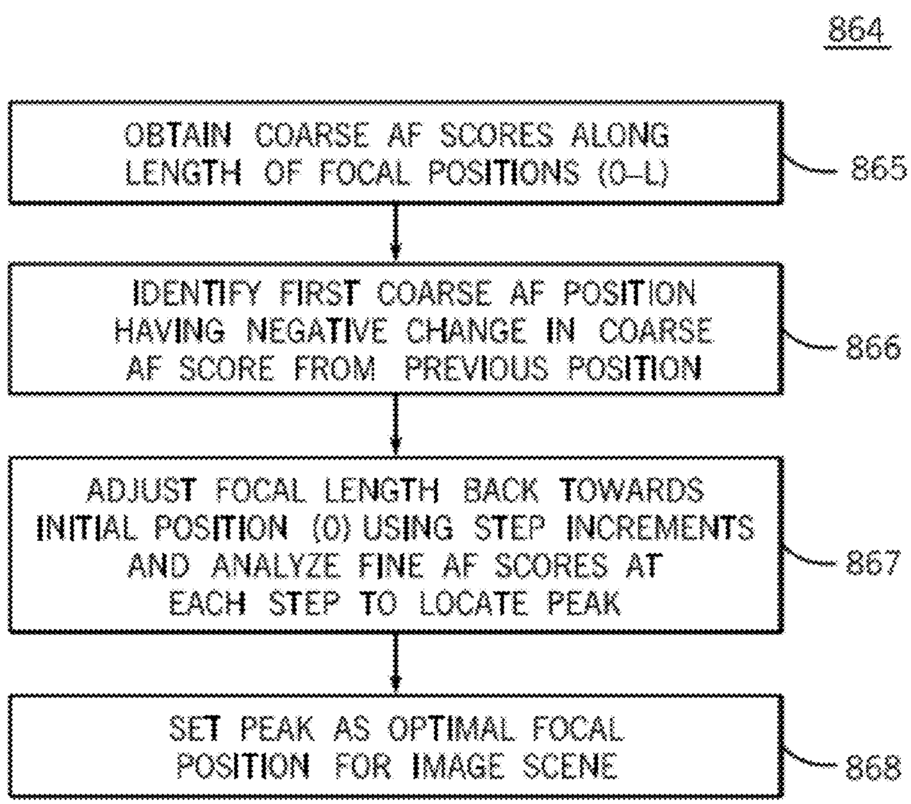
FIG. 93 is a flow chart depicting a process for performing auto-focus using coarse and fine auto-focus scoring values, in accordance with one embodiment.

A method 864 depicting this process is illustrated in FIG. 93. Beginning at block 865, a coarse AF score is determined for image data at various steps along the focal length, from position 0 to position L (FIG. 92). Thereafter, at block 866, the coarse AF scores are analyzed and the coarse position exhibiting the first negative change in the coarse AF score is identified as a starting point for fine AF scoring analysis. For instance, subsequently, at block 867, the focal position is stepped back towards the initial position 0 at smaller steps, with the fine AF score at each step being analyzed until a peak in the AF score curve (e.g., curve 860 of FIG. 92) is located. At block 868, the focal position corresponding to the peak is set as the optimal focal position for the current image scene.

As discussed above, due to mechanical coil settling times, the embodiment of the technique shown in FIG. 93 may be adapted to acquire coarse AF scores along the entire focal length initially, rather than analyzing each coarse position one by one and searching for an optimal focus area. Other embodiments, however, in which coil settling times are less of a concern, may analyze coarse AF scores one by one at each step, instead of searching the entire focal length.

Figure 94:
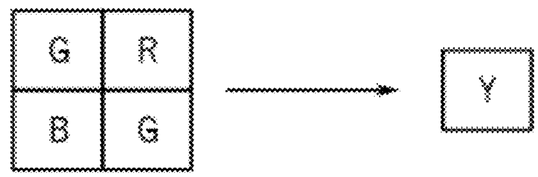
FIGS. 94 and 95 show the decimation of raw Bayer data to obtain a white balanced luma value.
Figure 95:
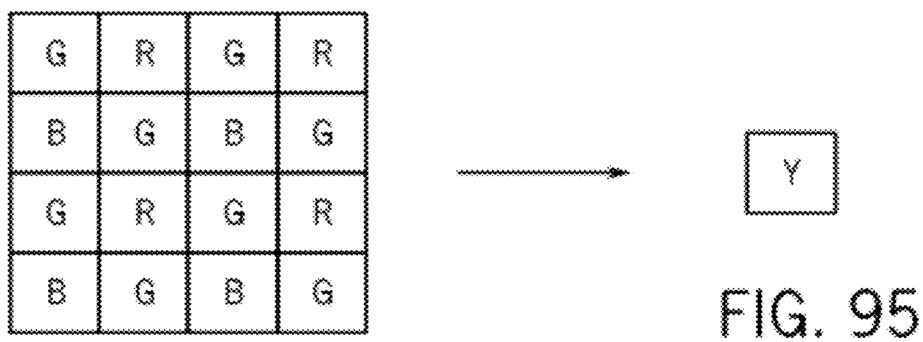

In certain embodiments, the AF scores may be determined using white balanced luma values derived from Bayer RGB data. For instance, the luma value, Y, may be derived by decimating a 2×2 Bayer quad by a factor of 2, as shown in FIG. 94, or by decimating a 4×4 pixel block consisting of four 2×2 Bayer quads by a factor of 4, as shown in FIG. 95. In one embodiment, AF scores may be determined using gradients. In another embodiment, AF scores may be determined by applying a 3×3 transform using a Scharr operator, which provides rotational symmetry while minimizing weighted mean squared angular errors in the Fourier domain. By way of example, the calculation of a coarse AF score on camY using a common Scharr operator (discussed above) is shown below:

$$AFScore_{coarse} = f\left(\begin{bmatrix} -3 & 0 & 3 \\ -10 & 0 & 10 \\ -3 & 0 & 3 \end{bmatrix} \times \text{in}\right) + f\left(\begin{bmatrix} -3 & -10 & -3 \\ 0 & 0 & 0 \\ 3 & 10 & 3 \end{bmatrix} \times \text{in}\right),$$

where in represents the decimated luma Y value. In other embodiments, the AF score for both coarse and fine statistics may be calculated using other 3×3 transforms.

Figure 96:
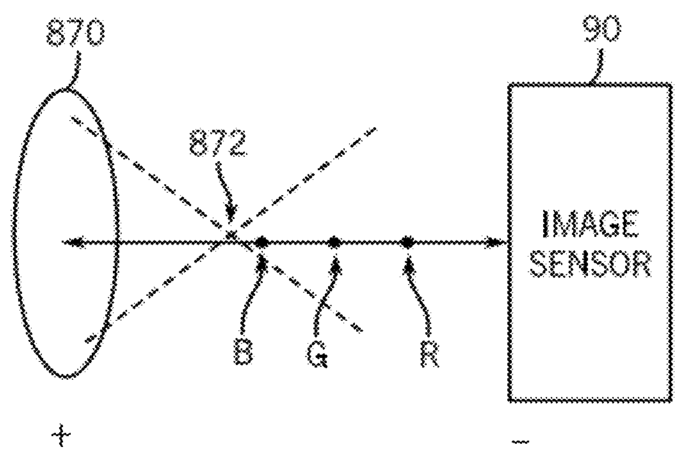
FIG. 96 shows a technique for performing auto-focus using relative auto-focus scoring values for each color component, in accordance with one embodiment.
Figure 97:
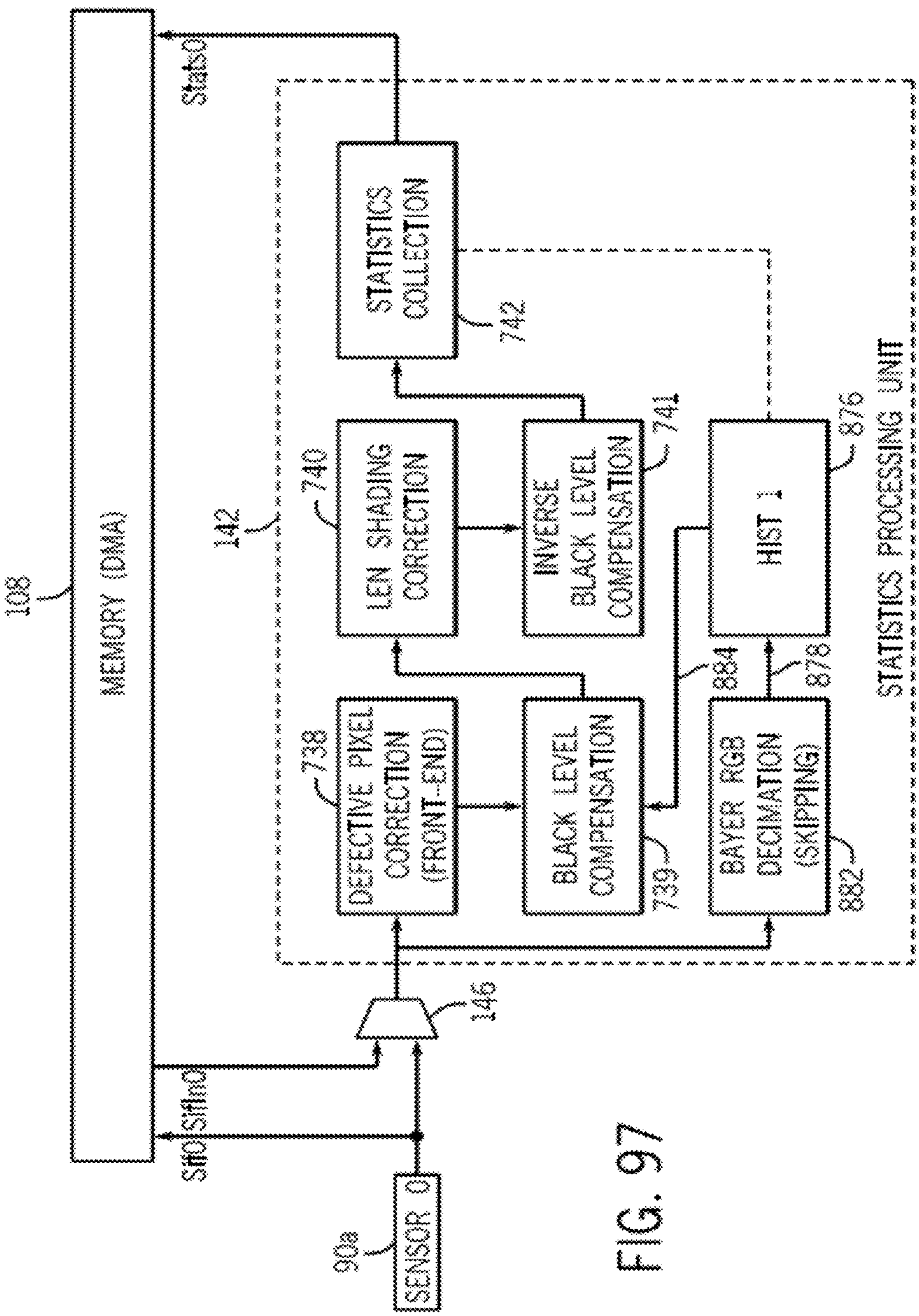
FIG. 97 is a more detailed view of the statistics processing unit of FIG. 68, showing how Bayer RGB histogram data may be used to assist black level compensation, in accordance with one embodiment.

Auto focus adjustments may also be performed differently depending on the color components, since different wavelengths of light may be affected differently by the lens, which is one reason the horizontal filter 843 is applied to each color component independently. Thus, auto-focus may still be performed even in the present of chromatic aberration in the lens. For instance, because red and blue typically focuses at a different position or distance with respect to green when chromatic aberrations are present, relative AF scores for each color may be used to determine the direction to focus. This is better illustrated in FIG. 96, which shows the optimal focal position for blue, red, and green color channels for a lens 870. As shown, the optimal focal positions for red, green, and blue are depicted by reference letters R, G, and B respectively, each corresponding to an AF score, with a current focal position 872. Generally, in such a configuration, it may be desirable to select the optimal focus position as the position corresponding to the optimal focal position for green components (e.g., since Bayer RGB has twice as many green as red or blue components), here position G. Thus, it may be expected that for an optimal focal position, the green channel should exhibit the highest auto-focus score. Thus, based on the positions of the optimal focal positions for each color (with those closer to the lens having higher AF scores), the AF logic 841 and associated control logic 84 may determine which direction to focus based on the relative AF scores for blue, green, and red. For instance, if the blue channel has a higher AF score relative to the green channel (as shown in FIG. 96), then the focal position is adjusted in the negative direction (towards the image sensor) without having to first analyze in the positive direction from the current position 872. In some embodiments, illuminant detection or analysis using color correlated temperatures (CCT) may be performed.

Further, as mentioned above, variance scores may also be used. For instance, pixel sums and pixel squared sum values may be accumulated for block sizes (e.g., 8×8-32×32 pixels), and may be used to derive variance scores (e.g., avg_pixel$^2$)−(avg_pixel)^2). The variances may be summed to get a total variance score for each window. Smaller block sizes may be used to obtain fine variance scores, and larger block sizes may be used to obtain coarser variance scores.

Referring to the 3A statistics logic 742 of FIG. 82, the logic 742 may also be configured to collect component histograms 874 and 876. As will be appreciated, histograms may be used to analyze the pixel level distribution in an image. This may be useful for implementing certain functions, such as histogram equalization, where the histogram data is used to determine the histogram specification (histogram matching). By way of example, luma histograms may be used for AE (e.g., for adjusting/setting sensor integration times), and color histograms may be used for AWB. In the present embodiment, histograms may be 256, 128, 64 or 32 bins (where the top 8, 7, 6, and 5 bits of the pixel is used to determine the bin, respectively) for each color component, as specified by a bin size (BinSize). For instance, when pixel data is 14-bits, an additional scale factor between 0-6 and an offset may be specified to determine what range (e.g., which 8 bits) of the pixel data is collected for statistics purposes. The bin number may be obtained as follows:

*idx*=((pixel−hist_offset)>>(6−hist_scale)

In one embodiment, the color histogram bins are incremented only if the bin indices are in the range [0, 2^(8−BinSize)]:

if (*idx*>=0&&*idx*<2^(8−BinSize))

StatsHist[*idx*]+=Count;

In the present embodiment, the statistics processing unit 142 may include two histogram units. This first histogram 874 (Hist0) may be configured to collect pixel data as part of the statistics collection after the 4×4 decimation. For Hist0, the components may be selected to be RGB, $sRGB_{linear}$, sRGB or YC1C2 using selection circuit 880. The second histogram 876 (Hist1) may be configured to collect pixel data before the statistics pipeline (before defective pixel correction logic 738), as shown in more detail in FIG. 96. For instance, the raw Bayer RGB data (output from 146) may be decimated (to produce signal 878) using logic 882 by skipping pixels, as discussed further below. For the green channel, the color may be selected between Gr, Gb or both Gr and Gb (both Gr and Gb counts are accumulated in the Green bins).

In order to keep the histogram bin width the same between the two histograms, Hist1 may be configured to collect pixel data every 4 pixels (every other Bayer quad). The start of the histogram window determines the first Bayer quad location where the histogram starts accumulating. Starting at this location, every other Bayer quad is skipped horizontally and vertically for Hist1. The window start location can be any pixel position for Hist1 and, therefore pixels being skipped by the histogram calculation can be selected by changing the start window location. Hist1 can be used to collect data, represented by 884 in FIG. 97, close to the black level to assist in dynamic black level compensation at block 739. Thus, while shown in FIG. 97 as being separate from the 3A statistics logic 742 for illustrative purposes, it should be understood that the histogram 876 may actually be part of the statistics written to memory, and may be actually be physically located within the statistics processing unit 142.

In the present embodiment, the red (R) and blue (B) bins may be 20-bits, with the green (G) bin is 21-bits (Green is larger to accommodate the Gr and Gb accumulation in Hist1). This allows for a maximum picture size of 4160 by 3120 pixels (12 MP). The internal memory size required is 3×256×20(1) bits (3 color components, 256 bins).

With regard to memory format, statistics for AWB/AE windows, AF windows, 2D color histogram, and component histograms may be mapped to registers to allow early access by firmware. In one embodiment, two memory pointers may be used to write statistics to memory, one for tile statistics 863, and one for luma row sums 859, followed by all other collected statistics. All statistics are written to external memory, which may be DMA memory. The memory address registers may be double-buffered so that a new location in memory can be specified on every frame.

Before proceeding with a detailed discussion of the ISP pipe logic 82 downstream from the ISP front-end logic 80, it should understood that the arrangement of various functional logic blocks in the statistics processing units 142 and 144 (e.g., logic blocks 738, 739, 740, 741, and 742) and the ISP front-end pixel processing unit 150 (e.g., logic blocks 650 and 652) are intended to illustrate only one embodiment of the present technique. Indeed, in other embodiments, the logic blocks illustrated herein may be arranged in different ordering, or may include additional logic blocks that may perform additional image processing functions not specifically described herein. Further, it should be understood that the image processing operations performed in the statistics processing units (e.g., 142 and 144), such as lens shading correction, defective pixel detection/correction, and black level compensation, are performed within the statistics processing units for the purposes of collecting statistical data. Thus, processing operations performed upon the image data received by the statistical processing units are not actually reflected in the image signal 109 (FEProcOut) that is output from the ISP front-end pixel processing logic 150 and forwarded to the ISP pipe processing logic 82.

Before continuing, it should also be noted, that given sufficient processing time and the similarity between many of the processing requirements of the various operations described herein, it is possible to reconfigure the functional blocks shown herein to perform image processing in a sequential manner, rather than a pipe-lined nature. As will be understood, this may further reduce the overall hardware implementation costs, but may also increase bandwidth to external memory (e.g., to cache/store intermediate results/data).

The ISP Pipeline ("Pipe") Processing Logic

Having described the ISP front-end logic 80 in detail above, the present discussion will now shift focus to the ISP pipe processing logic 82. Generally, the function of the ISP pipe logic 82 is to receive raw image data, which may be provided from the ISP front-end logic 80 or retrieved from memory 108, and to perform additional image processing operations, i.e., prior to outputting the image data to the display device 28.

Figure 98:
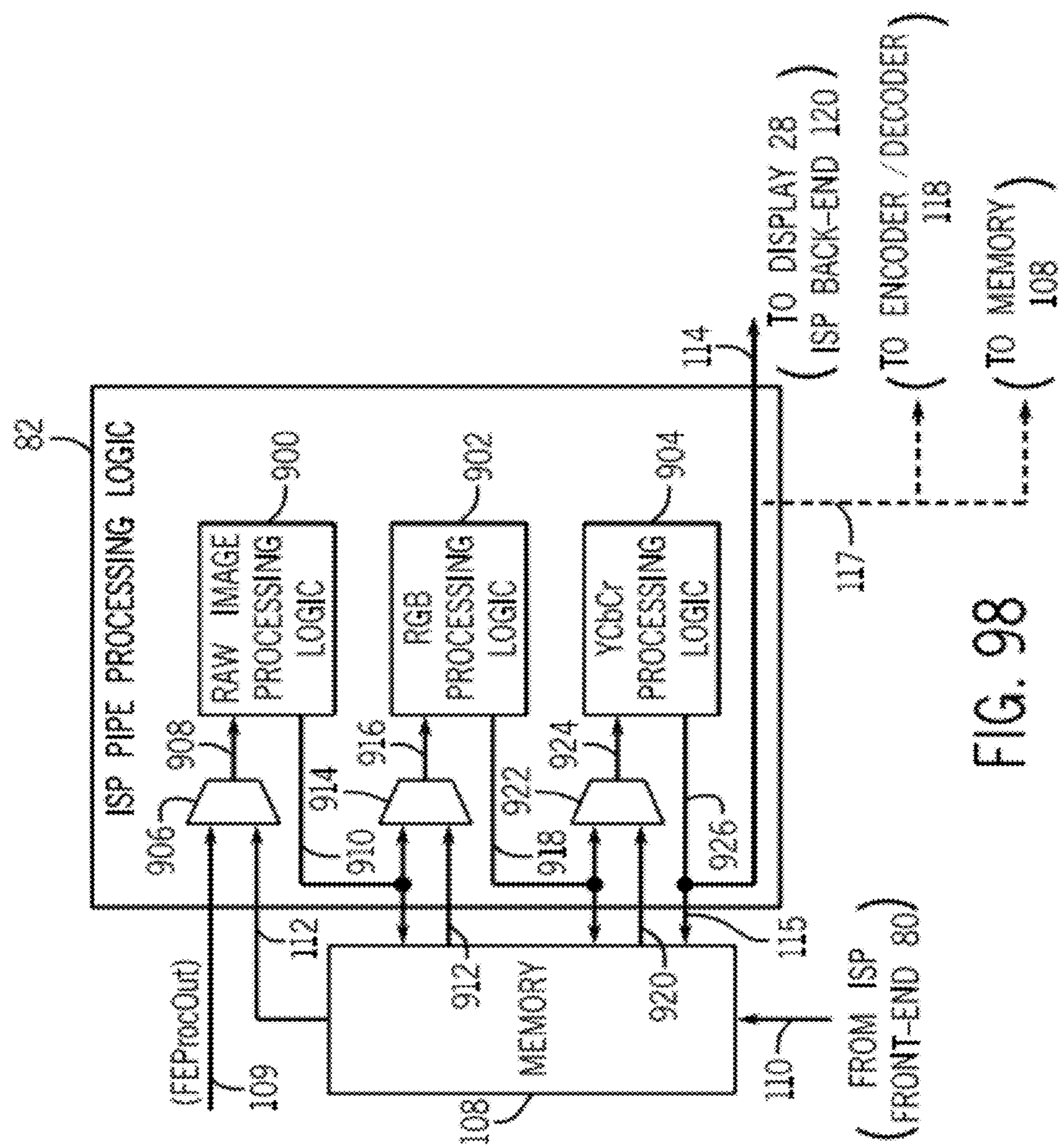
FIG. 98 is a block diagram showing an embodiment of the ISP pipe processing logic of FIG. 7, in accordance with aspects of the present disclosure.

A block diagram showing an embodiment of the ISP pipe logic 82 is depicted in FIG. 98. As illustrated, the ISP pipe logic 82 may include raw processing logic 900, RGB processing logic 902, and YCbCr processing logic 904. The raw processing logic 900 may perform various image processing operations, such as defective pixel detection and correction, lens shading correction, demosaicing, as well as applying gains for auto-white balance and/or setting a black level, as will be discussed further below. As shown in the present embodiment, the input signal 908 to the raw processing logic 900 may be the raw pixel output 109 (signal FEProcOut) from the ISP front-end logic 80 or the raw pixel data 112 from the memory 108, depending on the present configuration of the selection logic 906.

As a result of demosaicing operations performed within the raw processing logic 900, the image signal output 910 may be in the RGB domain, and may be subsequently forwarded to the RGB processing logic 902. For instance, as shown in FIG. 98, the RGB processing logic 902 receives the signal 916, which may be the output signal 910 or an RGB image signal 912 from the memory 108, depending on the present configuration of the selection logic 914. The RGB processing logic 902 may provide for various RGB color adjustment operations, including color correction (e.g., using a color correction matrix), the application of color gains for auto-white balancing, as well as global tone mapping, as will be discussed further below. The RGB processing logic 904 may also provide for the color space conversion of RGB image data to the YCbCr (luma/chroma) color space. Thus, the image signal output 918 may be in the YCbCr domain, and may be subsequently forwarded to the YCbCr processing logic 904.

For instance, as shown in FIG. 98, the YCbCr processing logic 904 receives the signal 924, which may be the output signal 918 from the RGB processing logic 902 or a YCbCr signal 920 from the memory 108, depending on the present configuration of the selection logic 922. As will be discussed in further detail below, the YCbCr processing logic 904 may provide for image processing operations in the YCbCr color space, including scaling, chroma suppression, luma sharpening, brightness, contrast, and color (BCC) adjustments, YCbCr gamma mapping, chroma decimation, and so forth. The image signal output 926 of the YCbCr processing logic 904 may be sent to the memory 108, or may be output from the ISP pipe processing logic 82 as the image signal 114 (FIG. 7). Next, in accordance with the embodiment of the image processing circuitry 32 depicted in FIG. 7, the image signal 114 may be sent to the display device 28 (either directly or via memory 108) for viewing by the user, or may be further processed using a compression engine (e.g., encoder 118), a CPU/GPU, a graphics engine, or the like. Additionally, in an embodiment where an ISP back-end unit 120 is included in the image processing circuitry 32 (e.g., FIG. 8), the image signal 114 may be sent to the ISP back-end processing logic 120 for additional down-stream post-processing.

In accordance with embodiments of the present techniques, the ISP pipe logic 82 may support the processing of raw pixel data in 8-bit, 10-bit, 12-bit, or 14-bit formats. For instance, in one embodiment, 8-bit, 10-bit, or 12-bit input data may be converted to 14-bit at the input of the raw processing logic 900, and raw processing and RGB processing operations may be performed with 14-bit precision. In the latter embodiment, the 14-bit image data may be down-sampled to 10 bits prior to the conversion of the RGB data to the YCbCr color space, and the YCbCr processing (logic 904) may be performed with 10-bit precision.

In order to provide a comprehensive description of the various functions provided by the ISP pipe processing logic 82, each of the raw processing logic 900, RGB processing logic 902, and YCbCr processing logic 904, as well as internal logic for performing various image processing operations that may be implemented in each respective unit of logic 900, 902, and 904, will be discussed sequentially below, beginning with the raw processing logic 900. For instance, referring now to FIG. 99, a block diagram showing a more detailed view of an embodiment of the raw processing logic 900 is illustrated, in accordance with an embodiment of the present technique. As shown, the raw processing logic 900 includes the gain, offset, and clamping (GOC) logic 930, defective pixel detection/correction (DPDC) logic 932, the noise reduction logic 934, lens shading correction logic 936, GOC logic 938, and demosaicing logic 940. Further, while the examples discussed below assume the use of a Bayer color filter array with the image sensor(s) 90, it should be understood that other embodiments of the present technique may utilize different types of color filters as well.

The input signal 908, which may be a raw image signal, is first received by the gain, offset, and clamping (GOC) logic 930. The GOC logic 930 may provide similar functions and may be implemented in a similar manner with respect to the BLC logic 739 of the statistics processing unit 142 of the ISP front-end logic 80, as discussed above in FIG. 68. For instance, the GOC logic 930 may provide digital gain, offsets and clamping (clipping) independently for each color component R, B, Gr, and Gb of a Bayer image sensor. Particularly, the GOC logic 930 may perform auto-white balance or set the black level of the raw image data. Further, in some embodiments, the GOC logic 930 may also be used correct or compensate for an offset between the Gr and Gb color components.

In operation, the input value for the current pixel is first offset by a signed value and multiplied by a gain. This operation may be performed using the formula shown in Equation 11 above, wherein X represents the input pixel value for a given color component R, B, Gr, or Gb, O[c] represents a signed 16-bit offset for the current color component c, and G[c] represents a gain value for the color component c. The values for G[c] may be previously determined during statistics processing (e.g., in the ISP front-end block 80). In one embodiment, the gain G[c] may be a 16-bit unsigned number with 2 integer bits and 14 fraction bits (e.g., 2.14 floating point representation), and the gain G[c] may be applied with rounding. By way of example only, the gain G[c] may have a range of between 0 to 4×.

The computed pixel value Y (which includes the gain G[c] and offset O[c]) from Equation 11 is then be clipped to a minimum and a maximum range in accordance with Equation 12. As discussed above, the variables min[c] and max[c] may represent signed 16-bit "clipping values" for the minimum and maximum output values, respectively. In one embodiment, the GOC logic 930 may also be configured to maintain a count of the number of pixels that were clipped above and below maximum and minimum ranges, respectively, for each color component.

Subsequently, the output of the GOC logic 930 is forwarded to the defective pixel detection and correction logic 932. As discussed above with reference to FIG. 68 (DPDC logic 738), defective pixels may attributable to a number of factors, and may include "hot" (or leaky) pixels, "stuck" pixels, and "dead pixels, wherein hot pixels exhibit a higher than normal charge leakage relative to non-defective pixels, and thus may appear brighter than non-defective pixel, and wherein a stuck pixel appears as always being on (e.g., fully charged) and thus appears brighter, whereas a dead pixel appears as always being off. As such, it may be desirable to have a pixel detection scheme that is robust enough to identify and address different types of failure scenarios. Particularly, when compared to the front-end DPDC logic 738, which may provide only dynamic defect detection/correction, the pipe DPDC logic 932 may provide for fixed or static defect detection/correction, dynamic defect detection/correction, as well as speckle removal.

In accordance with embodiments of the presently disclosed techniques, defective pixel correction/detection performed by the DPDC logic 932 may occur independently for each color component (e.g., R, B, Gr, and Gb), and may include various operations for detecting defective pixels, as well as for correcting the detected defective pixels. For instance, in one embodiment, the defective pixel detection operations may provide for the detection of static defects, dynamics defects, as well as the detection of speckle, which may refer to the electrical interferences or noise (e.g., photon noise) that may be present in the imaging sensor. By analogy, speckle may appear on an image as seemingly random noise artifacts, similar to the manner in which static may appear on a display, such as a television display. Further, as noted above, dynamic defection correction is regarded as being dynamic in the sense that the characterization of a pixel as being defective at a given time may depend on the image data in the neighboring pixels. For example, a stuck pixel that is always on maximum brightness may not be regarded as a defective pixel if the location of the stuck pixel is in an area of the current image that is dominate by bright white colors. Conversely, if the stuck pixel is in a region of the current image that is dominated by black or darker colors, then the stuck pixel may be identified as a defective pixel during processing by the DPDC logic 932 and corrected accordingly.

With regard to static defect detection, the location of each pixel is compared to a static defect table, which may store data corresponding to the location of pixels that are known to be defective. For instance, in one embodiment, the DPDC logic 932 may monitor the detection of defective pixels (e.g., using a counter mechanism or register) and, if a particular pixel is observed as repeatedly failing, the location of that pixel is stored into the static defect table. Thus, during static defect detection, if it is determined that the location of the current pixel is in the static defect table, then the current pixel is identified as being a defective pixel, and a replacement value is determined and temporarily stored. In one embodiment, the replacement value may be the value of the previous pixel (based on scan order) of the same color component. The replacement value may be used to correct the static defect during dynamic/speckle defect detection and correction, as will be discussed below. Additionally, if the previous pixel is outside of the raw frame 310 (FIG. 23), then its value is not used, and the static defect may be corrected during the dynamic defect correction process. Further, due to memory considerations, the static defect table may store a finite number of location entries. For instance, in one embodiment, the static defect table may be implemented as a FIFO queue configured to store a total of 16 locations for every two lines of image data. The locations in defined in the static defect table will, nonetheless, be corrected using a previous pixel replacement value (rather than via the dynamic defect detection process discussed below). As mentioned above, embodiments of the present technique may also provide for updating the static defect table intermittently over time.

Embodiments may provide for the static defect table to be implemented in on-chip memory or off-chip memory. As will be appreciated, using an on-chip implementation may increase overall chip area/size, while using an off-chip implementation may reduce chip area/size, but increase memory bandwidth requirements. Thus, it should be understood that the static defect table may be implemented either on-chip or off-chip depending on specific implementation requirements, i.e., the total number of pixels that are to be stored within the static defect table.

The dynamic defect and speckle detection processes may be time-shifted with respect to the static defect detection process discussed above. For instance, in one embodiment, the dynamic defect and speckle detection process may begin after the static defect detection process has analyzed two scan lines (e.g., rows) of pixels. As can be appreciated, this allows for the identification of static defects and their respective replacement values to be determined before dynamic/speckle detection occurs. For example, during the dynamic/speckle detection process, if the current pixel was previously marked as being a static defect, rather than applying dynamic/speckle detection operations, the static defect is simply corrected using the previously assessed replacement value.

With regard to dynamic defect and speckle detection, these processes may occur sequentially or in parallel. The dynamic defect and speckle detection and correction that is performed by the DPDC logic 932 may rely on adaptive edge detection using pixel-to-pixel direction gradients. In one embodiment, the DPDC logic 932 may select the eight immediate neighbors of the current pixel having the same color component that are within the raw frame 310 (FIG. 23) are used. In other words, the current pixels and its eight immediate neighbors P0, P1, P2, P3, P4, P5, P6, and P7 may form a 3×3 area, as shown below in FIG. 100.

It should be noted, however, that depending on the location of the current pixel P, pixels outside the raw frame 310 are not considered when calculating pixel-to-pixel gradients. For example, with regard to the "top-left" case 942 shown in FIG. 100, the current pixel P is at the top-left corner of the raw frame 310 and, thus, the neighboring pixels P0, P1, P2, P3, and P5 outside of the raw frame 310 are not considered, leaving only the pixels P4, P6, and P7 (N=3). In the "top" case 944, the current pixel P is at the top-most edge of the raw frame 310 and, thus, the neighboring pixels P0, P1, and P2 outside of the raw frame 310 are not considered, leaving only the pixels P3, P4, P5, P6, and P7 (N=5). Next, in the "top-right" case 946, the current pixel P is at the top-right corner of the raw frame 310 and, thus, the neighboring pixels P0, P1, P2, P4, and P7 outside of the raw frame 310 are not considered, leaving only the pixels P3, P5, and P6 (N=3). In the "left" case 948, the current pixel P is at the left-most edge of the raw frame 310 and, thus, the neighboring pixels P0, P3, and P5 outside of the raw frame 310 are not considered, leaving only the pixels P1, P2, P4, P6, and P7 (N=5).

In the "center" case 950, all pixels P0-P7 lie within the raw frame 310 and are thus used in determining the pixel-to-pixel gradients (N=8). In the "right" case 952, the current pixel P is at the right-most edge of the raw frame 310 and, thus, the neighboring pixels P2, P4, and P7 outside of the raw frame 310 are not considered, leaving only the pixels P0, P1, P3, P5, and P6 (N=5). Additionally, in the "bottom-left" case 954, the current pixel P is at the bottom-left corner of the raw frame 310 and, thus, the neighboring pixels P0, P3, P5, P6, and P7 outside of the raw frame 310 are not considered, leaving only the pixels P1, P2, and P4 (N=3). In the "bottom" case 956, the current pixel P is at the bottom-most edge of the raw frame 310 and, thus, the neighboring pixels P5, P6, and P7 outside of the raw frame 310 are not considered, leaving only the pixels P0, P1, P2, P3, and P4 (N=5). Finally, in the "bottom-right" case 958, the current pixel P is at the bottom-right corner of the raw frame 310 and, thus, the neighboring pixels P2, P4, P5, P6, and P7 outside of the raw frame 310 are not considered, leaving only the pixels P0, P1, and P3 (N=3).

Thus, depending upon the position of the current pixel P, the number of pixels used in determining the pixel-to-pixel gradients may be 3, 5, or 8. In the illustrated embodiment, for each neighboring pixel (k=0 to 7) within the picture boundary (e.g., raw frame 310), the pixel-to-pixel gradients may be calculated as follows:

$$G_k = \text{abs}(P - P_k), \text{ for } 0 \le k \le 7 \text{ (only for } k \text{ within the raw frame)} \quad (51)$$

Additionally, an average gradient, $G_{av}$, may be calculated as the difference between the current pixel and the average, $P_{av}$, of its surrounding pixels, as shown by the equations below:

$$P_{av} = \frac{\left(\sum_k^N P_k\right)}{N}, \text{ wherein } N = 3, 5, \text{ or } 8 \text{ (depending on pixel position)} \quad (52a)$$

$$G_{av} = \text{abs}(P - P_{av}) \quad (52b)$$

The pixel-to-pixel gradient values (Equation 51) may be used in determining a dynamic defect case, and the average of the neighboring pixels (Equations 52a and 52b) may be used in identifying speckle cases, as discussed further below.

In one embodiment, dynamic defect detection may be performed by the DPDC logic 932 as follows. First, it is assumed that a pixel is defective if a certain number of the gradients $G_k$ are at or below a particular threshold, denoted by the variable dynTh (dynamic defect threshold). Thus, for each pixel, a count (C) of the number of gradients for neighboring pixels inside the picture boundaries that are at or below the threshold dynTh is accumulated. The threshold dynTh may be a combination of a fixed threshold component and a dynamic threshold component that may depend on the "activity" present the surrounding pixels. For instance, in one embodiment, the dynamic threshold component for dynTh may be determined by calculating a high frequency component value $P_{hf}$ based upon summing the absolute difference between the average pixel values $P_{av}$ (Equation 52a) and each neighboring pixel, as illustrated below:

$$P_{hf} = \frac{8}{N}\sum_k^N \text{abs}(P_{av} - P_k) \text{ wherein } N = 3, 5, \text{ or } 8 \quad (52c)$$

In instances where the pixel is located at an image corner (N=3) or at an image edge (N=5), the $P_{hf}$ may be multiplied by the 8/3 or 8/5, respectively. As can be appreciated, this ensures that the high frequency component $P_{hf}$ is normalized based on eight neighboring pixels (N=8).

Once $P_{hf}$ is determined, the dynamic defect detection threshold dynTh may be computed as shown below:

$$\text{dynTh} = \text{dynTh}_1 + (\text{dynTh}_2 \times P_{hf}), \quad (53)$$

wherein $\text{dynTh}_1$ represents the fixed threshold component, and wherein $\text{dynTh}_2$ represents the dynamic threshold component, and is a multiplier for $P_{hf}$ in Equation 53. A different fixed threshold component $\text{dynTh}_1$ may be provided for each color component, but for each pixel of the same color, $\text{dynTh}_1$ is the same. By way of example only, $\text{dynTh}_1$ may be set so that it is at least above the variance of noise in the image.

The dynamic threshold component $\text{dynTh}_2$ may be determined based on some characteristic of the image. For instance, in one embodiment, $\text{dynTh}_2$ may be determined using stored empirical data regarding exposure and/or sensor integration time. The empirical data may be determined during calibration of the image sensor (e.g., 90), and may associate dynamic threshold component values that may be selected for $\text{dynTh}_2$ with each of a number of data points. Thus, based upon the current exposure and/or sensor integration time value, which may be determined during statistics processing in the ISP front-end logic 80, $\text{dynTh}_2$ may be determined by selecting the dynamic threshold component value from the stored empirical data that corresponds to the current exposure and/or sensor integration time value. Additionally, if the current exposure and/or sensor integration time value does not correspond directly to one of the empirical data points, then $\text{dynTh}_2$ may be determined by interpolating the dynamic threshold component values associated with the data points between which the current exposure and/or sensor integration time value falls. Further, like the fixed threshold component $\text{dynTh}_1$, the dynamic threshold component $\text{dynTh}_2$ may have different values for each color component. Thus, composite threshold value dynTh may vary for each color component (e.g., R, B, Gr, Gb).

As mentioned above, for each pixel, a count C of the number of gradients for neighboring pixels inside the picture boundaries that are at or below the threshold dynTh is determined. For instance, for each neighboring pixel within the raw frame 310, the accumulated count C of the gradients $G_k$ that are at or below the threshold dynTh may be computed as follows:

$$C = \sum_k^N (G_k \le dynTh), \quad (54)$$
$$\text{for } 0 \le k \le 7 \text{ (only for } k \text{ within the raw frame)}$$

Next, if the accumulated count C is determined to be less than or equal to a maximum count, denoted by the variable dynMaxC, then the pixel may be considered as a dynamic defect. In one embodiment, different values for dynMaxC may be provided for N=3 (corner), N=5 (edge), and N=8 conditions. This logic is expressed below:

$$\text{if } (C \le \text{dynMax}C), \text{ then the current pixel } P \text{ is defective.} \quad (55)$$

As mentioned above, the location of defective pixels may be stored into the static defect table. In some embodiments, the minimum gradient value ($\min(G_k)$) calculated during dynamic defect detection for the current pixel may be stored and may be used to sort the defective pixels, such that a greater minimum gradient value indicates a greater "severity" of a defect and should be corrected during pixel correction before less severe defects are corrected. In one embodiment, a pixel may need to be processed over multiple imaging frames before being stored into the static defect table, such as by filtering the locations of defective pixels over time. In the latter embodiment, the location of the defective pixel may be stored into the static defect table only if the defect appears in a particular number of consecutive images at the same location. Further, in some embodiments, the static defect table may be configured to sort the stored defective pixel locations based upon the minimum gradient values. For instance, the highest minimum gradient value may indicate a defect of greater "severity." By ordering the locations in this manner, the priority of static defect correction may be set, such that the most severe or important defects are corrected first. Additionally, the static defect table may be updated over time to include newly detected static defects, and ordering them accordingly based on their respective minimum gradient values.

Speckle detection, which may occur in parallel with the dynamic defect detection process described above, may be performed by determining if the value $G_{av}$ (Equation 52b) is above a speckle detection threshold spkTh. Like the dynamic defect threshold dynTh, the speckle threshold spkTh may also include fixed and dynamic components, referred to by $spkTh_1$ and $spkTh_2$, respectively. In general, the fixed and dynamic components $spkTh_1$ and $spkTh_2$ may be set more "aggressively" compared to the $dynTh_1$ and $dynTh_2$ values, in order to avoid falsely detecting speckle in areas of the image that may be more heavily textured and others, such as text, foliage, certain fabric patterns, etc. Accordingly, in one embodiment, the dynamic speckle threshold component $spkTh_2$ may be increased for high-texture areas of the image, and decreased for "flatter" or more uniform areas. The speckle detection threshold spkTh may be computed as shown below:

$$spkTh=spkTh_1+(spkTh_2\times P_{hf}), \quad (56)$$

wherein $spkTh_1$ represents the fixed threshold component, and wherein $spkTh_2$ represents the dynamic threshold component. The detection of speckle may then be determined in accordance with the following expression:

$$\text{if } (G_{av}>spkTh)\text{, then the current pixel } P \text{ is speckled.} \quad (57)$$

Once defective pixels have been identified, the DPDC logic 932 may apply pixel correction operations depending on the type of defect detected. For instance, if the defective pixel was identified as a static defect, the pixel is replaced with the stored replacement value, as discussed above (e.g., the value of the previous pixel of the same color component). If the pixel was identified as either a dynamic defect or as speckle, then pixel correction may be performed as follows. First, gradients are computed as the sum of the absolute difference between the center pixel and a first and second neighbor pixels (e.g., computation of $G_k$ of Equation 51) for four directions, a horizontal (h) direction, a vertical (v) direction, a diagonal-positive direction (dp), and a diagonal-negative direction (dn), as shown below:

$$G_h=G_3+G_4 \quad (58)$$

$$G_v=G_1+G_6 \quad (59)$$

$$G_{dp}=G_2+G_5 \quad (60)$$

$$G_{dn}=G_0+G_7 \quad (61)$$

Next, the corrective pixel value $P_C$ may be determined via linear interpolation of the two neighboring pixels associated with the directional gradient $G_h$, $G_v$, $G_{dp}$, and $G_{dn}$ that has the smallest value. For instance, in one embodiment, the logic statement below may express the calculation of $P_C$:

$$\text{if } (\min == G_h) \quad (62)$$

$$P_C=\frac{P_3+P_4}{2};$$

$$\text{else if } (\min == G_v)$$

-continued $$P_C=\frac{P_1+P_6}{2};$$

$$\text{else if } (\min == G_{dp})$$

$$P_C=\frac{P_2+P_5}{2};$$

$$\text{else if } (\min == G_{dn})$$

$$P_C=\frac{P_0+P_7}{2};$$

The pixel correction techniques implemented by the DPDC logic 932 may also provide for exceptions at boundary conditions. For instance, if one of the two neighboring pixels associated with the selected interpolation direction is outside of the raw frame, then the value of the neighbor pixel that is within the raw frame is substituted instead. Thus, using this technique, the corrective pixel value will be equivalent to the value of the neighbor pixel within the raw frame.

It should be noted that the defective pixel detection/correction techniques applied by the DPDC logic 932 during the ISP pipe processing is more robust compared to the DPDC logic 738 in the ISP front-end logic 80. As discussed in the embodiment above, the DPDC logic 738 performs only dynamic defect detection and correction using neighboring pixels in only the horizontal direction, whereas the DPDC logic 932 provides for the detection and correction of static defects, dynamic defects, as well as speckle, using neighboring pixels in both horizontal and vertical directions.

As will be appreciated, the storage of the location of the defective pixels using a static defect table may provide for temporal filtering of defective pixels with lower memory requirements. For instance, compared to many conventional techniques which store entire images and apply temporal filtering to identify static defects over time, embodiments of the present technique only store the locations of defective pixels, which may typically be done using only a fraction of the memory required to store an entire image frame. Further, as discussed above, the storing of a minimum gradient value ($\min(G_k)$), allows for an efficient use of the static defect table prioritizing the order of the locations at which defective pixels are corrected (e.g., beginning with those that will be most visible).

Additionally, the use of thresholds that include a dynamic component (e.g., $dynTh_2$ and $spkTh_2$) may help to reduce false defect detections, a problem often encountered in conventional image processing systems when processing high texture areas of an image (e.g., text, foliage, certain fabric patterns, etc.). Further, the use of directional gradients (e.g., h, v, dp, dn) for pixel correction may reduce the appearance of visual artifacts if a false defect detection occurs. For instance, filtering in the minimum gradient direction may result in a correction that still yields acceptable results under most cases, even in cases of false detection. Additionally, the inclusion of the current pixel P in the gradient calculation may improve the accuracy of the gradient detection, particularly in the case of hot pixels.

Figure 101:
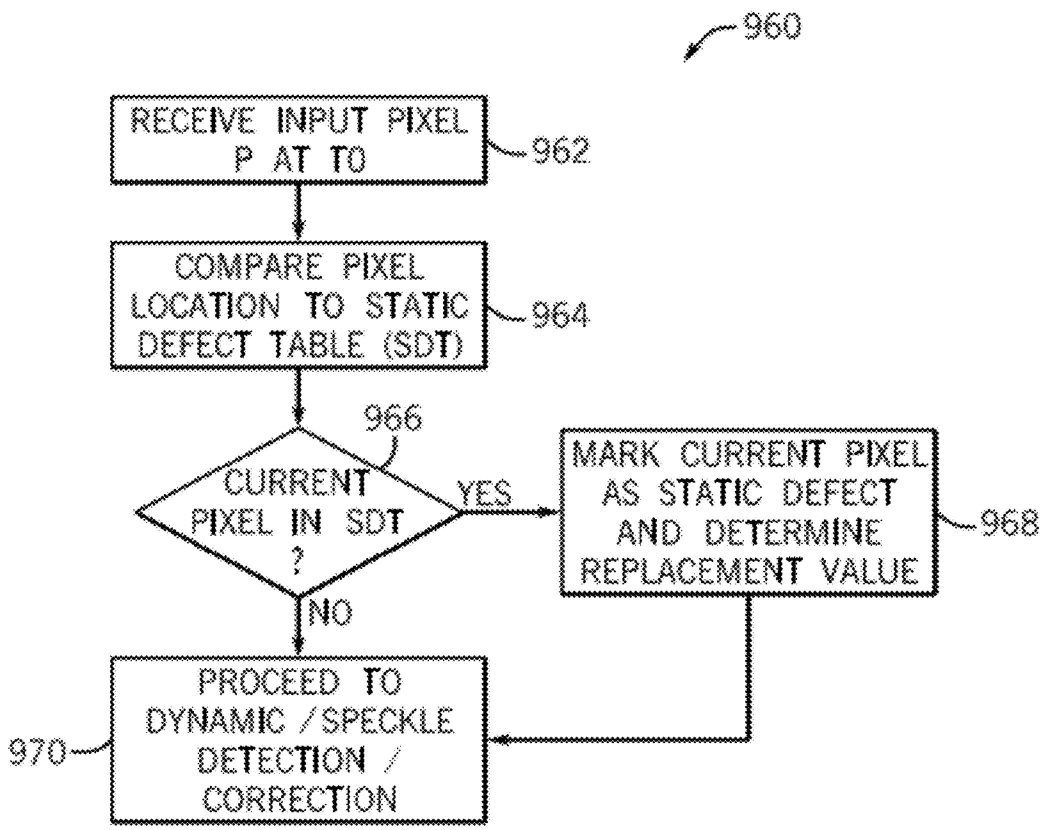
FIGS. 101-103 are flowcharts that depict various processes for detecting and correcting defective pixels that may be performed in the raw pixel processing block of FIG. 99, in accordance with one embodiment.
Figure 102:
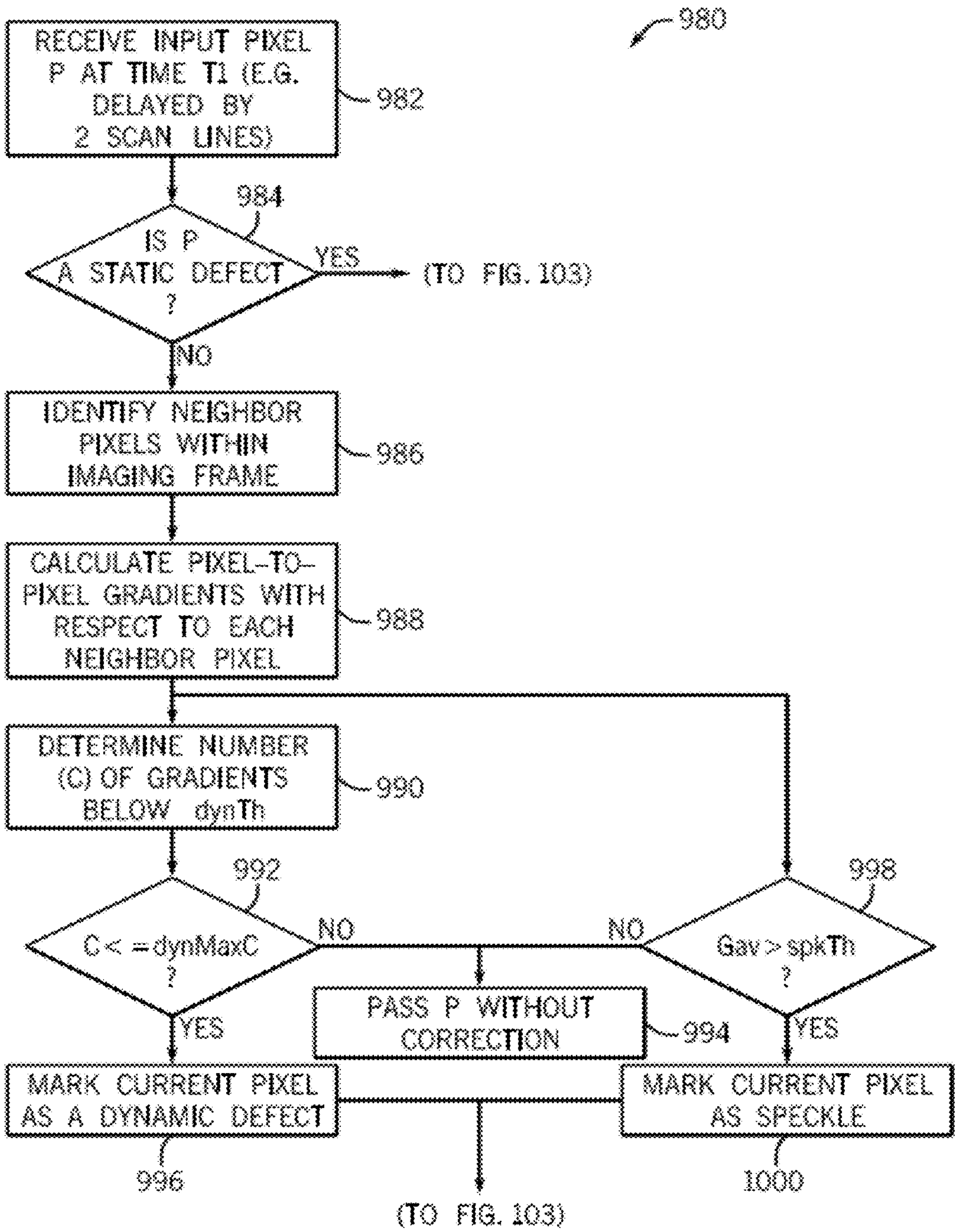
Figure 103:
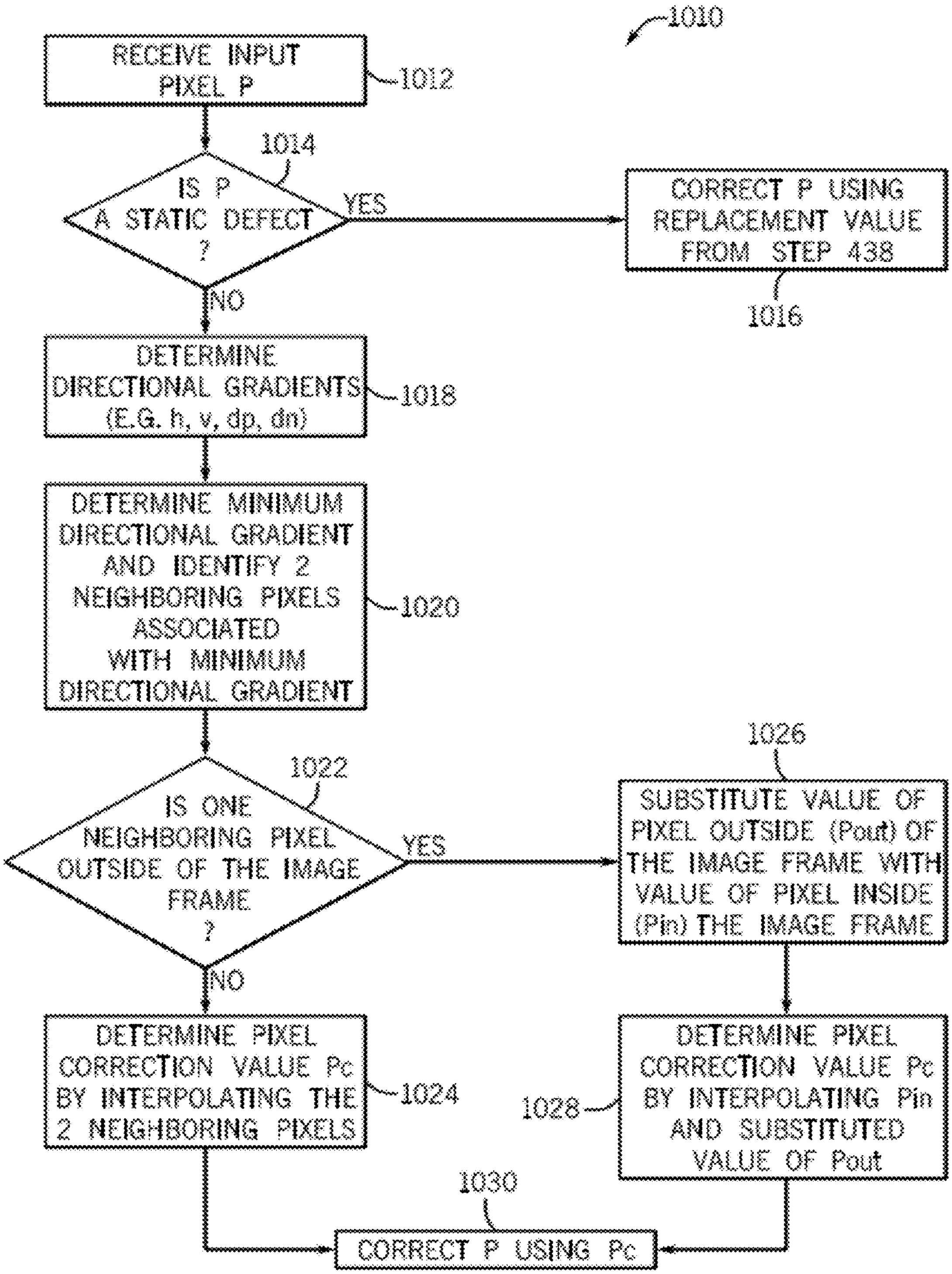

The above-discussed defective pixel detection and correction techniques implemented by the DPDC logic 932 may be summarized by a series of flow charts provided in FIGS. 101-103. For instance, referring first to FIG. 101, a process 960 for detecting static defects is illustrated. Beginning initially at step 962, an input pixel P is received at a first time, $T_0$. Next, at step 964, the location of the pixel P is compared to the values stored in a static defect table. Decision logic 966 determines whether the location of the pixel P is found in the static defect table. If the location of P is in the static defect table, then the process 960 continues to step 968, wherein the pixel P is marked as a static defect and a replacement value is determined. As discussed above, the replacement value may be determined based upon the value of the previous pixel (in scan order) of the same color component. The process 960 then continues to step 970, at which the process 960 proceeds to the dynamic and speckle detection process 980, illustrated in FIG. 102. Additionally, if at decision logic 966, the location of the pixel P is determined not to be in the static defect table, then the process 960 proceeds to step 970 without performing step 968.

Continuing to FIG. 102, the input pixel P is received at time T1, as shown by step 982, for processing to determine whether a dynamic defect or speckle is present. Time T1 may represent a time-shift with respect to the static defect detection process 960 of FIG. 101. As discussed above, the dynamic defect and speckle detection process may begin after the static defect detection process has analyzed two scan lines (e.g., rows) of pixels, thus allowing time for the identification of static defects and their respective replacement values to be determined before dynamic/speckle detection occurs.

The decision logic 984 determines if the input pixel P was previously marked as a static defect (e.g., by step 968 of process 960). If P is marked as a static defect, then the process 980 may continue to the pixel correction process shown in FIG. 103 and may bypass the rest of the steps shown in FIG. 102. If the decision logic 984 determines that the input pixel P is not a static defect, then the process continues to step 986, and neighboring pixels are identified that may be used in the dynamic defect and speckle process. For instance, in accordance with the embodiment discussed above and illustrated in FIG. 100, the neighboring pixels may include the immediate 8 neighbors of the pixel P (e.g., P0-P7), thus forming a 3×3 pixel area. Next, at step 988, pixel-to-pixel gradients are calculated with respect to each neighboring pixel within the raw frame 310, as described in Equation 51 above. Additionally, an average gradient ($G_{av}$) may be calculated as the difference between the current pixel and the average of its surrounding pixels, as shown in Equations 52a and 52b.

The process 980 then branches to step 990 for dynamic defect detection and to decision logic 998 for speckle detection. As noted above, dynamic defect detection and speckle detection may, in some embodiments, occur in parallel. At step 990, a count C of the number of gradients that are less than or equal to the threshold dynTh is determined. As described above, the threshold dynTh may include fixed and dynamic components and, in one embodiment, may be determined in accordance with Equation 53 above. If C is less than or equal to a maximum count, dynMaxC, then the process 980 continues to step 996, and the current pixel is marked as being a dynamic defect. Thereafter, the process 980 may continue to the pixel correction process shown in FIG. 103, which will be discussed below.

Returning back the branch after step 988, for speckle detection, the decision logic 998 determines whether the average gradient $G_{av}$ is greater than a speckle detection threshold spkTh, which may also include a fixed and dynamic component. If $G_{av}$ is greater than the threshold spkTh, then the pixel P is marked as containing speckle at step 1000 and, thereafter, the process 980 continues to FIG. 103 for the correction of the speckled pixel. Further, if the output of both of the decision logic blocks 992 and 998 are "NO," then this indicates that the pixel P does not contain dynamic defects, speckle, or even static defects (decision logic 984). Thus, when the outputs of decision logic 992 and 998 are both "NO," the process 980 may conclude at step 994, whereby the pixel P is passed unchanged, as no defects (e.g., static, dynamic, or speckle) were detected.

Continuing to FIG. 103, a pixel correction process 1010 in accordance with the techniques described above is provided. At step 1012, the input pixel P is received from process 980 of FIG. 102. It should be noted that the pixel P may be received by process 1010 from step 984 (static defect) or from steps 996 (dynamic defect) and 1000 (speckle defect). The decision logic 1014 then determines whether the pixel P is marked as a static defect. If the pixel P is a static defect, then the process 1010 continues and ends at step 1016, whereby the static defect is corrected using the replacement value determined at step 968 (FIG. 101).

If the pixel P is not identified as a static defect, then the process 1010 continues from decision logic 1014 to step 1018, and directional gradients are calculated. For instance, as discussed above with reference to Equations 58-61, the gradients may be computed as the sum of the absolute difference between the center pixel and first and second neighboring pixels for four directions (h, v, dp, and dn). Next, at step 1020, the directional gradient having the smallest value is identified and, thereafter, decision logic 1022 assesses whether one of the two neighboring pixels associated with the minimum gradient is located outside of the image frame (e.g., raw frame 310). If both neighboring pixels are within the image frame, then the process 1010 continues to step 1024, and a pixel correction value ($P_C$) is determined by applying linear interpolation to the values of the two neighboring pixels, as illustrated by Equation 62. Thereafter, the input pixel P may be corrected using the interpolated pixel correction value $P_C$, as shown at step 1030.

Returning to the decision logic 1022, if it is determined that one of the two neighboring pixels are located outside of the image frame (e.g., raw frame 165), then instead of using the value of the outside pixel (Pout), the DPDC logic 932 may substitute the value of Pout with the value of the other neighboring pixel that is inside the image frame (Pin), as shown at step 1026. Thereafter, at step 1028, the pixel correction value $P_C$ is determined by interpolating the values of Pin and the substituted value of Pout. In other words, in this case, $P_C$ may be equivalent to the value of Pin. Concluding at step 1030, the pixel P is corrected using the value $P_C$. Before continuing, it should be understood that the particular defective pixel detection and correction processes discussed herein with reference to the DPDC logic 932 are intended to reflect only one possible embodiment of the present technique. Indeed, depending on design and/or cost constraints, a number of variations are possible, and features may be added or removed such that the overall complexity and robustness of the defect detection/correction logic is between the simpler detection/correction logic 738 implemented in the ISP front-end block 80 and the defect detection/correction logic discussed here with reference to the DPDC logic 932.

Referring back to FIG. 99, the corrected pixel data is output from the DPDC logic 932 and then received by the noise reduction logic 934 for further processing. In one embodiment, the noise reduction logic 934 may be configured to implements two-dimensional edge-adaptive low pass filtering to reduce noise in the image data while maintaining details and textures. The edge-adaptive thresholds may be set (e.g., by the control logic 84) based upon the present lighting levels, such that filtering may be strengthened under low light conditions. Further, as briefly mentioned above with regard to the determination of the dynTh and spkTh values, noise variance may be determined ahead of time for a given sensor so that the noise reduction thresholds can be set just above noise variance, such that during the noise reduction processing, noise is reduced without significantly affecting textures and details of the scene (e.g., avoid/reduce false detections). Assuming a Bayer color filter implementation, the noise reduction logic 934 may process each color component Gr, R, B, and Gb independently using a separable 7-tap horizontal filter and a 5-tap vertical filter. In one embodiment, the noise reduction process may be carried out by correcting for non-uniformity on the green color components (Gb and Gr), and then performing horizontal filtering and vertical filtering.

Figure 104:
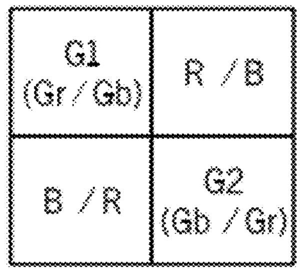
FIG. 104 shows the location of two green pixels in a 2×2 pixel block of a Bayer image sensor that may be interpolated when applying green non-uniformity correction techniques during processing by the raw pixel processing logic of FIG. 99, in accordance with aspects of the present disclosure.

Green non-uniformity (GNU) is generally characterized by a slight brightness difference between the Gr and Gb pixels given a uniformly illuminated flat surface. Without correcting or compensating for this non-uniformity, certain artifacts, such as a "maze" artifact, may appear in the full color image after demosaicing. During the green non-uniformity process may include determining, for each green pixel in the raw Bayer image data, if the absolute difference between a current green pixel (G1) and the green pixel to the right and below (G2) the current pixel is less than a GNU correction threshold (gnuTh). FIG. 104 illustrates the location of the G1 and G2 pixels in a 2×2 area of the Bayer pattern. As shown, the color of the pixels bordering G1 may be depending upon whether the current green pixel is a Gb or Gr pixel. For instance, if G1 is Gr, then G2 is Gb, the pixel to the right of G1 is R (red), and the pixel below G1 is B (blue). Alternatively, if G1 is Gb, then G2 is Gr, and the pixel to the right of G1 is B, whereas the pixel below G1 is R. If the absolute difference between G1 and G2 is less than the GNU correction threshold value, then current green pixel G1 is replaced by the average of G1 and G2, as shown by the logic below:

$$\text{if } (\text{abs}(G1 - G2) \le gnuTh);\ G1 = \frac{G1 + G2}{2} \tag{63}$$

As can be appreciated, the application of green non-uniformity correction in this manner may help to prevent the G1 and G2 pixels from being averaged across edges, thus improving and/or preserving sharpness.

Horizontal filtering is applied subsequent to green non-uniformity correction and may, in one embodiment, provide a 7-tap horizontal filter. Gradients across the edge of each filter tap are computed, and if it is above a horizontal edge threshold (horzTh), the filter tap is folded to the center pixel, as will be illustrated below. In certain embodiments, the noise filtering may be edge adaptive. For instance, the horizontal filter may be a finite impulse response (FIR) filter where the filter taps are used only if the difference between the center pixel and the pixel at the tap is smaller then a threshold that depends on noise variance. The horizontal filter may process the image data independently for each color component (R, B, Gr, Gb) and may use unfiltered values as inputs values.

Figure 105:
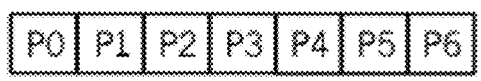
FIG. 105 illustrates a set of pixels that includes a center pixel and associated horizontal neighboring pixels that may be used as part of a horizontal filtering process for noise reduction, in accordance with aspects of the present disclosure.

By way of example, FIG. 105 shows a graphical depiction of a set of horizontal pixels P0 to P6, with a center tap positioned at P3. Based upon the pixels shown in FIG. 105, edge gradients for each filter tap may be calculated as follows:

$$Eh0=\text{abs}(P0-P1) \tag{64}$$

$$Eh1=\text{abs}(P1-P2) \tag{65}$$

$$Eh2=\text{abs}(P2-P3) \tag{66}$$

$$Eh3=\text{abs}(P3-P4) \tag{67}$$

$$Eh4=\text{abs}(P4-P5) \tag{68}$$

$$Eh5=\text{abs}(P5-P6) \tag{69}$$

The edge gradients Eh0-Eh5 may then be utilized by the horizontal filter component to determine a horizontal filtering output, $P_{horz}$, using the formula shown in Equation 70 below:

$$\begin{aligned} P_{horz}= & C0\times[(Eh2>\text{horzTh}[c])?P3:(Eh1>\text{horzTh}[c])?P2:(Eh0>\text{horzTh}[c])?P1:P0]+ \\ & C1\times[(Eh2>\text{horzTh}[c])?P3:(Eh1>\text{horzTh}[c])?P2:P1]+ \\ & C2\times[(Eh2>\text{horzTh}[c])?P3:P2]+ \\ & C3\times P3+ \\ & C4\times[(Eh3>\text{horzTh}[c])?P3:P4]+ \\ & C5\times[(Eh3>\text{horzTh}[c])?P3:(Eh4>\text{horzTh}[c])?P4:P5]+ \\ & C6\times[(Eh3>\text{horzTh}[c])?P3:(Eh4>\text{horzTh}[c])?P4:(Eh5>\text{horzTh}[c])?P5:P6], \end{aligned} \tag{70}$$

wherein horzTh[c] is the horizontal edge threshold for each color component c (e.g., R, B, Gr, and Gb), and wherein C0-C6 are the filter tap coefficients corresponding to pixels P0-P6, respectively. The horizontal filter output $P_{horz}$ may be applied at the center pixel P3 location. In one embodiment, the filter tap coefficients C0-C6 may be 16-bit two's complement values with 3 integer bits and 13 fractional bits (3.13 in floating point). Further, it should be noted that the filter tap coefficients C0-C6 need not necessarily be symmetrical with respect to the center pixel P3.

Figure 106:
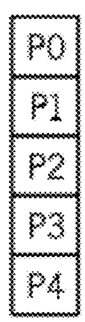
FIG. 106 illustrates a set of pixels that includes a center pixel and associated vertical neighboring pixels that may be used as part of a vertical filtering process for noise reduction, in accordance with aspects of the present disclosure.

Vertical filtering is also applied by the noise reduction logic 934 subsequent to green non-uniformity correction and horizontal filtering processes. In one embodiment, the vertical filter operation may provide a 5-tap filter, as shown in FIG. 106, with the center tap of the vertical filter located at P2. The vertical filtering process may occur in a similar manner as the horizontal filtering process described above. For instance, gradients across the edge of each filter tap are computed, and if it is above a vertical edge threshold (vertTh), the filter tap is folded to the center pixel P2. The vertical filter may process the image data independently for each color component (R, B, Gr, Gb) and may use unfiltered values as inputs values.

Based upon the pixels shown in FIG. 106, vertical edge gradients for each filter tap may be calculated as follows:

$$Ev0=\text{abs}(P0-P1) \tag{71}$$

$$Ev1=\text{abs}(P1-P2) \tag{72}$$

$$Ev2=\text{abs}(P2-P3) \tag{73}$$

$$Ev3=\text{abs}(P3-P4) \tag{74}$$

The edge gradients Ev0-Ev5 may then be utilized by the vertical filter to determine a vertical filtering output, $P_{vert}$, using the formula shown in Equation 75 below:

$$\begin{aligned} P_{vert}= & C0\times[(Ev1>\text{vertTh}[c])?P2:(Ev0>\text{vertTh}[c])?P1:P0]+ \\ & C1\times[(Ev1>\text{vertTh}[c])?P2:P1]+ \\ & C2\times P2+ \\ & C3\times[(Ev2>\text{vertTh}[c])?P2:P3]+ \\ & C4\times[(Ev2>\text{vertTh}[c])?P2:(Eh3>\text{vertTh}[c])?P3:P4], \end{aligned} \tag{75}$$

wherein vertTh[c] is the vertical edge threshold for each color component c (e.g., R, B, Gr, and Gb), and wherein C0-C4 are the filter tap coefficients corresponding to the pixels P0-P4 of FIG. 106, respectively. The vertical filter output $P_{vert}$ may be applied at the center pixel P2 location. In one embodiment, the filter tap coefficients C0-C4 may be 16-bit two's complement values with 3 integer bits and 13 fractional bits (3.13 in floating point). Further, it should be noted that the filter tap coefficients C0-C4 need not necessarily be symmetrical with respect to the center pixel P2.

Additionally, with regard to boundary conditions, when neighboring pixels are outside of the raw frame 310 (FIG. 23), the values of the out-of-bound pixels are replicated with the value of same color pixel at the edge of the raw frame. This convention may be implemented for both horizontal and vertical filtering operations. By way of example, referring again to FIG. 105, in the case of horizontal filtering, if the pixel P2 is an edge pixel at the left-most edge of the raw frame, and the pixels P0 and P1 are outside of the raw frame, then the values of the pixels P0 and P1 are substituted with the value of the pixel P2 for horizontal filtering.

Referring again back to the block diagram of the raw processing logic 900 shown in FIG. 99, the output of the noise reduction logic 934 is subsequently sent to the lens shading correction (LSC) logic 936 for processing. As discussed above, lens shading correction techniques may include applying an appropriate gain on a per-pixel basis to compensate for drop-offs in light intensity, which may be the result of the geometric optics of the lens, imperfections in manufacturing, misalignment of the microlens array and the color array filter, and so forth. Further, the infrared (IR) filter in some lenses may cause the drop-off to be illuminant-dependent and, thus, lens shading gains may be adapted depending upon the light source detected.

In the depicted embodiment, the LSC logic 936 of the ISP pipe 82 may be implemented in a similar manner, and thus provide generally the same functions, as the LSC logic 740 of the ISP front-end block 80, as discussed above with reference to FIGS. 71-79. Accordingly, in order to avoid redundancy, it should be understood that the LSC logic 936 of the presently illustrated embodiment is configured to operate in generally the same manner as the LSC logic 740 and, as such, the description of the lens shading correction techniques provided above will not be repeated here. However, to generally summarize, it should be understood that the LSC logic 936 may process each color component of the raw pixel data stream independently to determine a gain to apply to the current pixel. In accordance with the above-discussed embodiments, the lens shading correction gain may be determined based upon a defined set of gain grid points distributed across the imaging frame, wherein the interval between each grid point is defined by a number of pixels (e.g., 8 pixels, 16 pixels etc.). If the location of the current pixel corresponds to a grid point, then the gain value associated with that grid point is applied to the current pixel. However, if the location of the current pixel is between grid points (e.g., G0, G1, G2, and G3 of FIG. 74), then the LSC gain value may be calculated by interpolation of the grid points between which the current pixel is located (Equations 13a and 13b). This process is depicted by the process 772 of FIG. 75. Further, as mentioned above with respect to FIG. 73, in some embodiments, the grid points may be distributed unevenly (e.g., logarithmically), such that the grid points are less concentrated in the center of the LSC region 760, but more concentrated towards the corners of the LSC region 760, typically where lens shading distortion is more noticeable.

Additionally, as discussed above with reference to FIGS. 78 and 79, the LSC logic 936 may also apply a radial gain component with the grid gain values. The radial gain component may be determined based upon distance of the current pixel from the center of the image (Equations 14-16). As mentioned, using a radial gain allows for the use of single common gain grid for all color components, which may greatly reduce the total storage space required for storing separate gain grids for each color component. This reduction in grid gain data may decrease implementation costs, as grid gain data tables may account for a significant portion of memory or chip area in image processing hardware.

Figure 99:
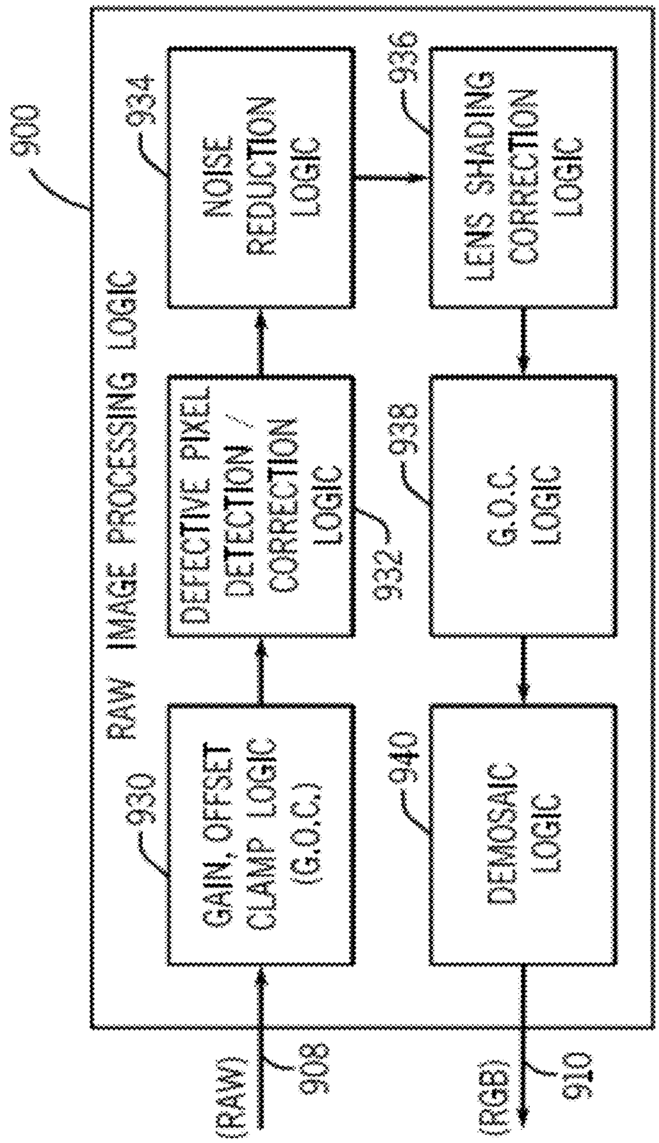
FIG. 99 is a more detailed view showing an embodiment of a raw pixel processing block that may be implemented in the ISP pipe processing logic of FIG. 98, in accordance with aspects of the present disclosure.
Figure 100:
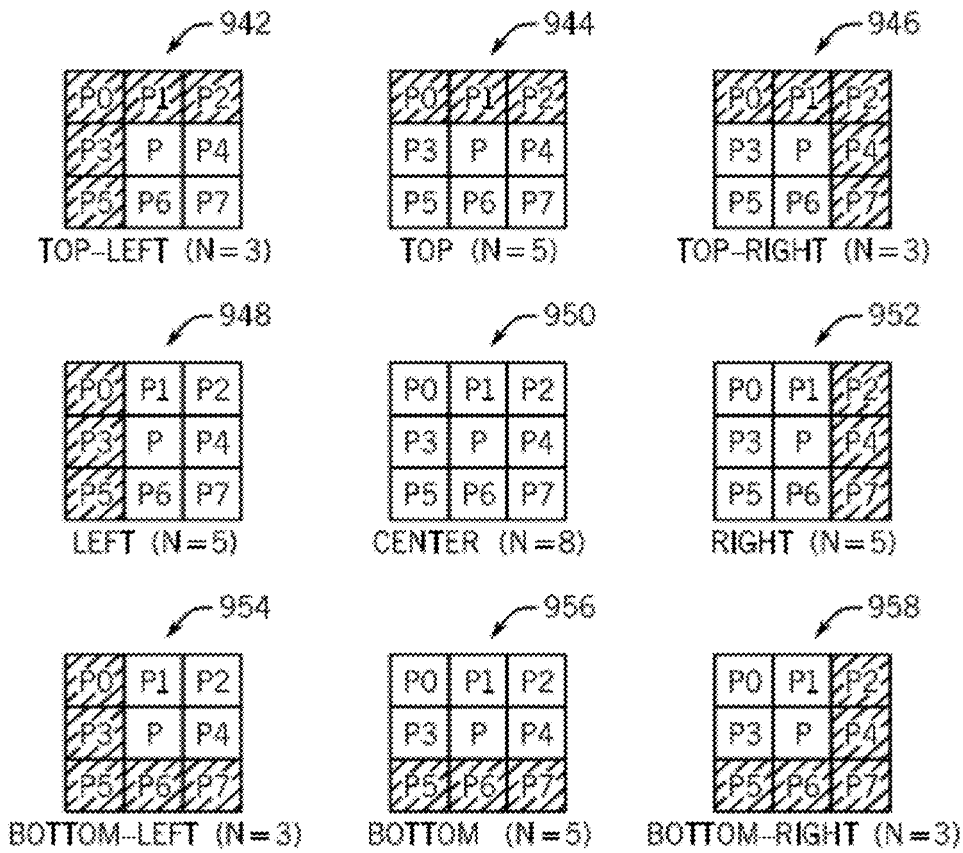
FIG. 100 shows various image frame boundary cases that may be considered when applying techniques for detecting and correcting defective pixels during processing by the raw pixel processing block shown in FIG. 99, in accordance with aspects of the present disclosure.

Next, referring again to the raw processing logic block diagram 900 of FIG. 99, the output of the LSC logic 936 is then passed to a second gain, offset, and clamping (GOC) block 938. The GOC logic 938 may be applied prior to demosaicing (by logic block 940) and may be used to perform auto-white balance on the output of the LSC logic 936. In the depicted embodiment, the GOC logic 938 may be implemented in the same manner as the GOC logic 930 (and the BLC logic 739). Thus, in accordance with the Equation 11 above, the input received by the GOC logic 938 is first offset by a signed value and then multiplied by a gain. The resulting value is then clipped to a minimum and a maximum range in accordance with Equation 12.

Thereafter, the output of the GOC logic 938 is forwarded to the demosaicing logic 940 for processing to produce a full color (RGB) image based upon the raw Bayer input data. As will be appreciated, the raw output of an image sensor using a color filter array, such as a Bayer filter is "incomplete" in the sense that each pixel is filtered to acquire only a single color component. Thus, the data collected for an individual pixel alone is insufficient to determine color. Accordingly, demosaicing techniques may be used to generate a full color image from the raw Bayer data by interpolating the missing color data for each pixel.

Figure 107:
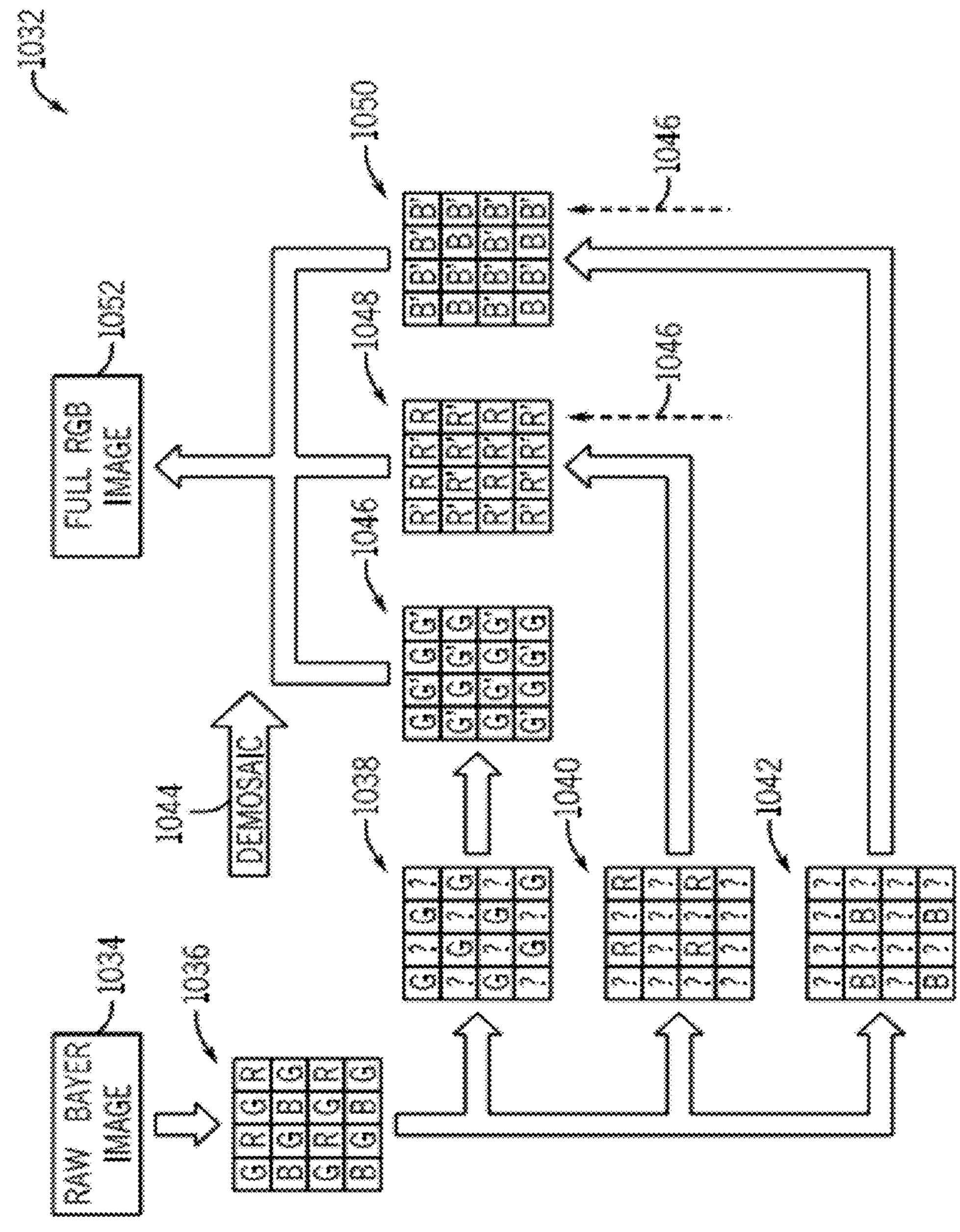
FIG. 107 is a simplified flow diagram that depicts how demosaicing may be applied to a raw Bayer image pattern to produce a full color RGB image.

Referring now to FIG. 107, a graphical process flow 692 that provides a general overview as to how demosaicing may be applied to a raw Bayer image pattern 1034 to produce a full color RGB is illustrated. As shown, a 4×4 portion 1036 of the raw Bayer image 1034 may include separate channels for each color component, including a green channel 1038, a red channel 1040, and a blue channel 1042. Because each imaging pixel in a Bayer sensor only acquires data for one color, the color data for each color channel 1038, 1040, and 1042 may be incomplete, as indicated by the "?" symbols. By applying a demosaicing technique 1044, the missing color samples from each channel may be interpolated. For instance, as shown by reference number 1046, interpolated data G' may be used to fill the missing samples on the green color channel Similarly, interpolated data R' may (in combination with the interpolated data G' 1046) be used to fill the missing samples on the red color channel 1048, and interpolated data B' may (in combination with the interpolated data G' 1046) be used to fill the missing samples on the blue color channel 1050. Thus, as a result of the demosaicing process, each color channel (R, G, B) will have a full set of color data, which may then be used to reconstruct a full color RGB image 1052.

A demosaicing technique that may be implemented by the demosaicing logic 940 will now be described in accordance with one embodiment. On the green color channel, missing color samples may be interpolated using a low pass directional filter on known green samples and a high pass (or gradient) filter on the adjacent color channels (e.g., red and blue). For the red and blue color channels, the missing color samples may be interpolated in a similar manner, but by using low pass filtering on known red or blue values and high pass filtering on co-located interpolated green values. Further, in one embodiment, demosaicing on the green color channel may utilize a 5×5 pixel block edge-adaptive filter based on the original Bayer color data. As will be discussed further below, the use of an edge-adaptive filter may provide for the continuous weighting based on gradients of horizontal and vertical filtered values, which reduce the appearance of certain artifacts, such as aliasing, "checkerboard," or "rainbow" artifacts, commonly seen in conventional demosaicing techniques.

During demosaicing on the green channel, the original values for the green pixels (Gr and Gb pixels) of the Bayer image pattern are used. However, in order to obtain a full set of data for the green channel, green pixel values may be interpolated at the red and blue pixels of the Bayer image pattern. In accordance with the present technique, horizontal and vertical energy components, respectively referred to as Eh and Ev, are first calculated at red and blue pixels based on the above-mentioned 5×5 pixel block. The values of Eh and Ev may be used to obtain an edge-weighted filtered value from the horizontal and vertical filtering steps, as discussed further below.

Figure 108:
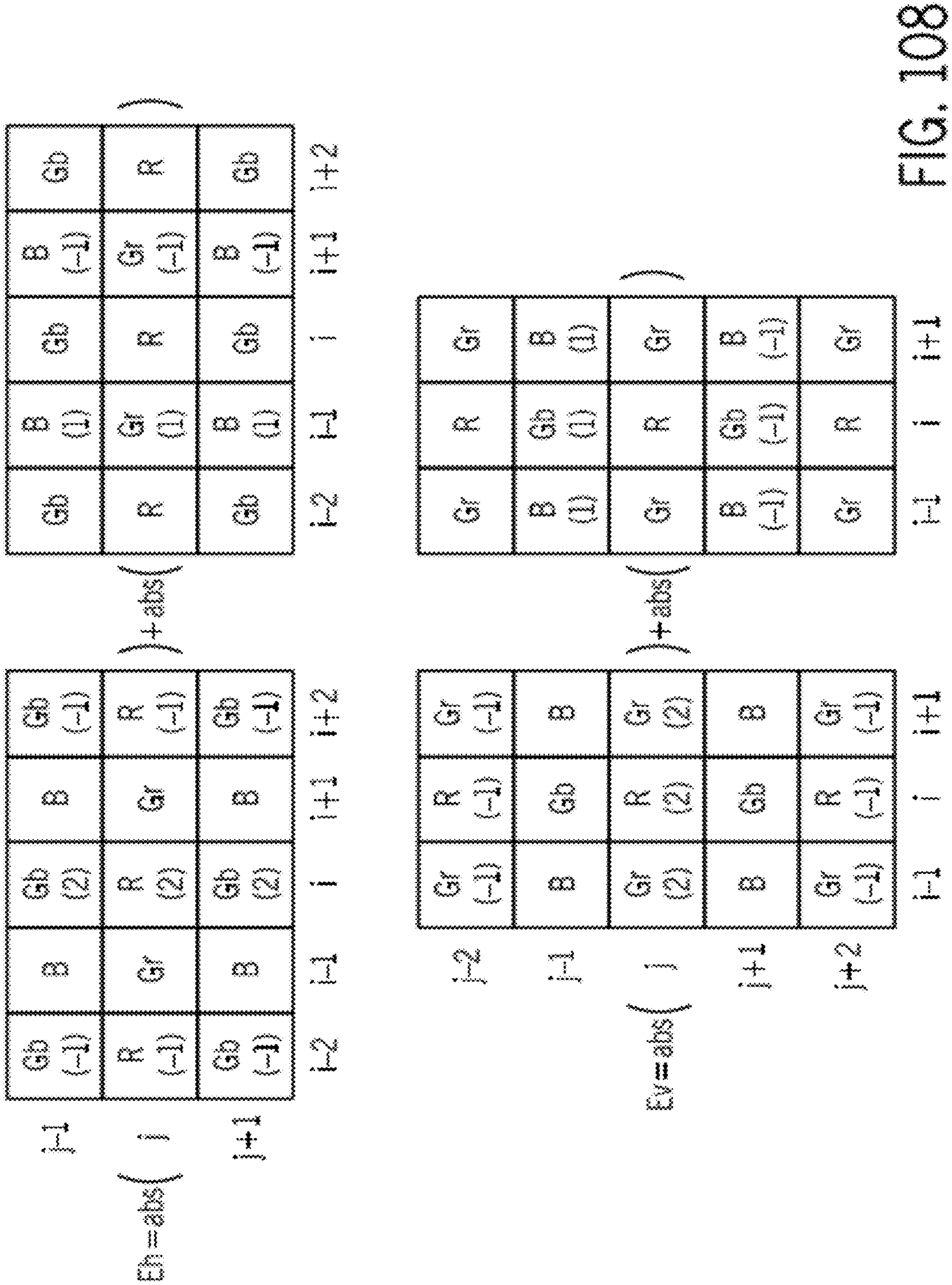
FIG. 108 depicts a set of pixels of a Bayer image pattern from which horizontal and vertical energy components may be derived for interpolating green color values during demosaicing of the Bayer image pattern, in accordance with one embodiment.

By way of example, FIG. 108 illustrates the computation of the Eh and Ev values for a red pixel centered in the 5×5 pixel block at location (j, i), wherein j corresponds to a row and i corresponds to a column. As shown, the calculation of Eh considers the middle three rows (j−1, j, j+1) of the 5×5 pixel block, and the calculation of Ev considers the middle three columns (i−1, i, i+1) of the 5×5 pixel block. To compute Eh, the absolute value of the sum of each of the pixels in the red columns (i−2, i, i+2) multiplied by a corresponding coefficient (e.g., −1 for columns i−2 and i+2; 2 for column i) is summed with the absolute value of the sum of each of the pixels in the blue columns (i−1, i+1) multiplied by a corresponding coefficient (e.g., 1 for column i−1; −1 for column i+1). To compute Ev, the absolute value of the sum of each of the pixels in the red rows (j−2, j, j+2) multiplied by a corresponding coefficient (e.g., −1 for rows j−2 and j+2; 2 for row j) is summed with the absolute value of the sum of each of the pixels in the blue rows (j−1, j+1) multiplied by a corresponding coefficient (e.g., 1 for row j−1; −1 for row j+1). These computations are illustrated by Equations 76 and 77 below:

$$Eh=\text{abs}[2((P(j-1,i)+P(j,i)+P(j+1,i))-(P(j-1,i-2)+P(j,i-2)+P(j+1,i-2))-(P(j-1,i+2)+P(j,i+2)+P(j+1,i+2)]+\text{abs}[(P(j-1,i-1)+P(j,i-1)+P(j+1,i-1))-(P(j-1,i+1)+P(j,i+1)+P(j+1,i+1)] \quad (76)$$

$$Ev=\text{abs}[2(P(j,i-1)+P(j,i)+P(j,i+1))-(P(j-2,i-1)+P(j-2,i)+P(j-2,i+1))-(P(j+2,i-1)+P(j+2,i)+P(j+2,i+1]+\text{abs}[(P(j-1,i-1)+P(j-1,i)+P(j-1,i+1))-(P(j+1,i-1)+P(j+1,i)+P(j+1,i+1)] \quad (77)$$

Thus, the total energy sum may be expressed as: Eh+Ev. Further, while the example shown in FIG. 108 illustrates the computation of Eh and Ev for a red center pixel at (j, i), it should be understood that the Eh and Ev values may be determined in a similar manner for blue center pixels.

Next, horizontal and vertical filtering may be applied to the Bayer pattern to obtain the vertical and horizontal filtered values Gh and Gv, which may represent interpolated green values in the horizontal and vertical directions, respectively. The filtered values Gh and Gv may be determined using a low pass filter on known neighboring green samples in addition to using directional gradients of the adjacent color (R or B) to obtain a high frequency signal at the locations of the missing green samples. For instance, with reference to FIG. 109, an example of horizontal interpolation for determining Gh will now be illustrated.

Figure 109:
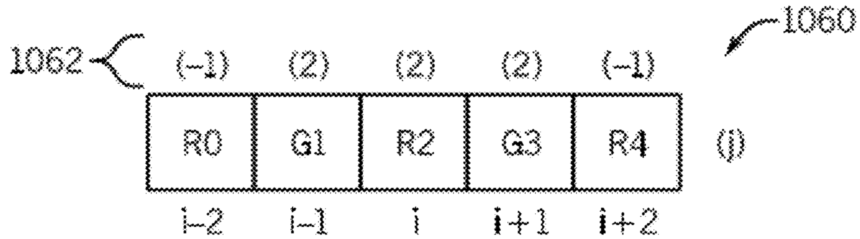
FIG. 109 shows a set of horizontal pixels to which filtering may be applied to determine a horizontal component of an interpolated green color value during demosaicing of a Bayer image pattern, in accordance with aspects of the present technique.
Figure 110:
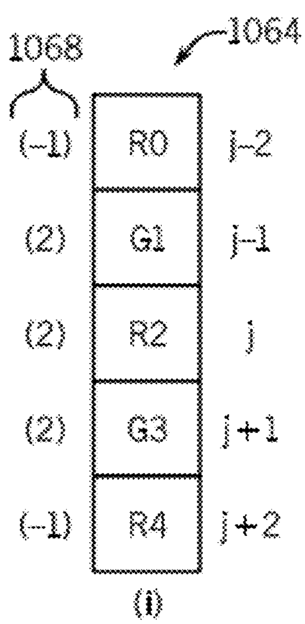
FIG. 110 shows a set of vertical pixels to which filtering may be applied to determine a vertical component of an interpolated green color value during demosaicing of a Bayer image pattern, in accordance with aspects of the present technique.

As shown in FIG. 109, five horizontal pixels (R0, G1, R2, G3, and R4) of a red line 1060 of the Bayer image, wherein R2 is assumed to be the center pixel at (j, i), may be considered in determining Gh. Filtering coefficients associated with each of these five pixels are indicated by reference numeral 1062. Accordingly, the interpolation of a green value, referred to as G2', for the center pixel R2, may be determined as follows:

$$G2' = \frac{G1+G3}{2} + \frac{2R2 - \left(\frac{R0+R2}{2}\right) - \left(\frac{R2+R4}{2}\right)}{2} \quad (78)$$

Various mathematical operations may then be utilized to produce the expression for G2' shown in Equations 79 and 80 below:

$$G2' = \frac{2G1+2G3}{4} + \frac{4R2-R0-R2-R2-R4}{4} \quad (79)$$

$$G2' = \frac{2G1+2G3+2R2-R0-R4}{4} \quad (80)$$

Thus, with reference to FIG. 109 and the Equations 78-80 above, the general expression for the horizontal interpolation for the green value at (j, i) may be derived as:

$$Gh = \frac{(2P(j,i-1)+2P(j,i+1)+2P(j,i)-P(j,i-2)-P(j,i+2))}{4} \quad (81)$$

The vertical filtering component Gv may be determined in a similar manner as Gh. For example, referring to FIG. 110, five vertical pixels (R0, G1, R2, G3, and R4) of a red column 1064 of the Bayer image and their respective filtering coefficients 1068, wherein R2 is assumed to be the center pixel at (j, i), may be considered in determining Gv. Using low pass filtering on the known green samples and high pass filtering on the red channel in the vertical direction, the following expression may be derived for Gv:

$$Gv = \frac{(2P(j-1,i)+2P(j+1,i)+2P(j,i)-P(j-2,i)-P(j+2,i))}{4} \quad (82)$$

While the examples discussed herein have shown the interpolation of green values on a red pixel, it should be understood that the expressions set forth in Equations 81 and 82 may also be used in the horizontal and vertical interpolation of green values for blue pixels.

The final interpolated green value G' for the center pixel (j, i) may be determined by weighting the horizontal and vertical filter outputs (Gh and Gv) by the energy components (Eh and Ev) discussed above to yield the following equation:

$$G'(j,i)=\left(\frac{Ev}{Eh+Ev}\right)Gh+\left(\frac{Eh}{Eh+Ev}\right)Gv \quad (83)$$

As discussed above, the energy components Eh and Ev may provide for edge-adaptive weighting of the horizontal and vertical filter outputs Gh and Gv, which may help to reduce image artifacts, such as rainbow, aliasing, or checkerboard artifacts, in the reconstructed RGB image. Additionally, the demosaicing logic 940 may provide an option to bypass the edge-adaptive weighting feature by setting the Eh and Ev values each to 1, such that Gh and Gv are equally weighted.

In one embodiment, the horizontal and vertical weighting coefficients, shown in Equation 51 above, may be quantized to reduce the precision of the weighting coefficients to a set of "coarse" values. For instance, in one embodiment, the weighting coefficients may be quantized to eight possible weight ratios: 1/8, 2/8, 3/8, 4/8, 5/8, 6/8, 7/8, and 8/8. Other embodiments may quantize the weighting coefficients into 16 values (e.g., 1/16 to 16/16), 32 values (1/32 to 32/32), and so forth. As can be appreciated, when compared to using full precision values (e.g., 32-bit floating point values), the quantization of the weight coefficients may reduce the implementation complexity when determining and applying the weighting coefficients to horizontal and vertical filter outputs.

In further embodiments, the presently disclosed techniques, in addition to determining and using horizontal and vertical energy components to apply weighting coefficients to the horizontal (Gh) and vertical (Gv) filtered values, may also determine and utilize energy components in the diagonal-positive and diagonal-negative directions. For instance, in such embodiments, filtering may also be applied in the diagonal-positive and diagonal-negative directions. Weighting of the filter outputs may include selecting the two highest energy components, and using the selected energy components to weight their respective filter outputs. For example, assuming that the two highest energy components correspond to the vertical and diagonal-positive directions, the vertical and diagonal-positive energy components are used to weight the vertical and diagonal-positive filter outputs to determine the interpolated green value (e.g., at a red or blue pixel location in the Bayer pattern).

Next, demosaicing on the red and blue color channels may be performed by interpolating red and blue values at the green pixels of the Bayer image pattern, interpolating red values at the blue pixels of the Bayer image pattern, and interpolating blue values at the red pixels of the Bayer image pattern. In accordance with the present discussed techniques, missing red and blue pixel values may be interpolated using low pass filtering based upon known neighboring red and blue pixels and high pass filtering based upon co-located green pixel values, which may be original or interpolated values (from the green channel demosaicing process discussed above) depending on the location of the current pixel. Thus, with regard to such embodiments, it should be understood that interpolation of missing green values may be performed first, such that a complete set of green values (both original and interpolated values) is available when interpolating the missing red and blue samples.

Figure 111:
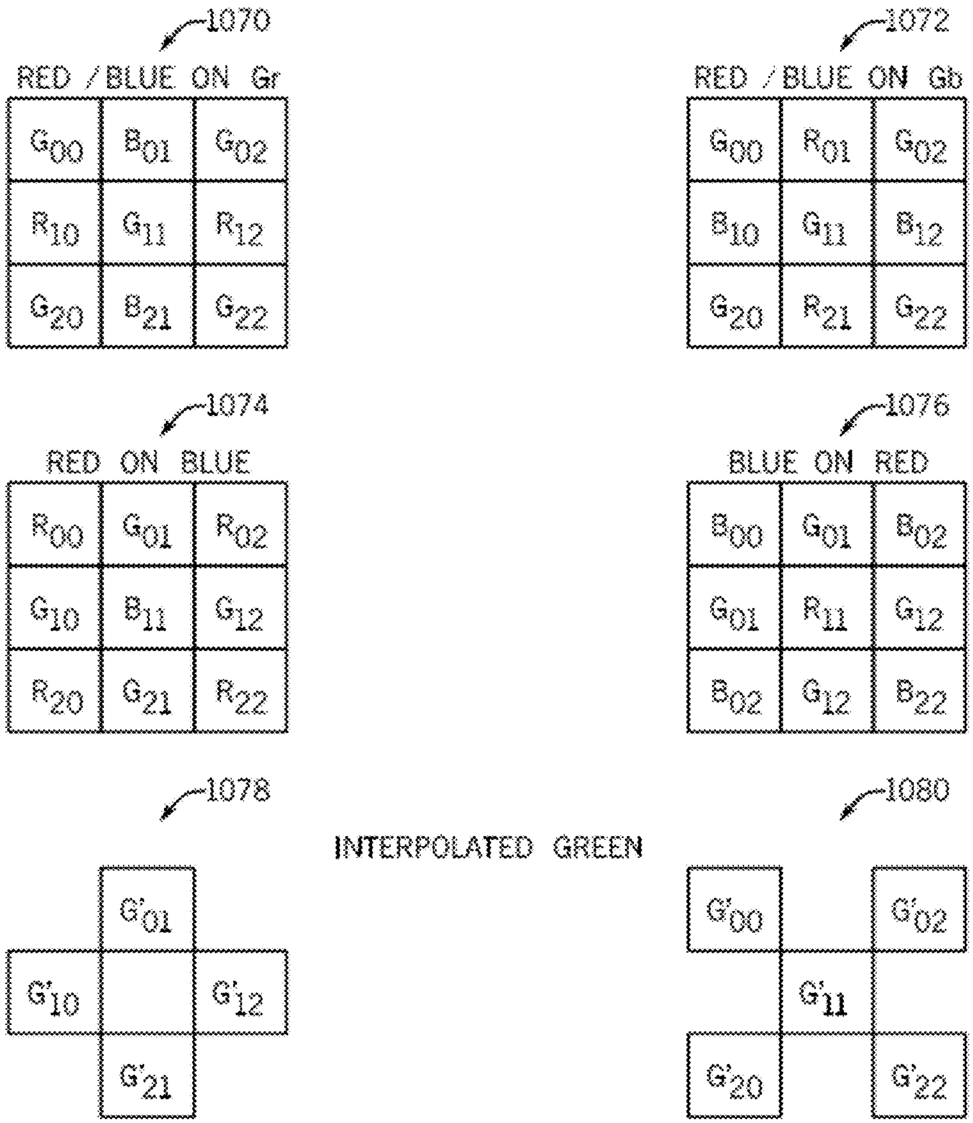
FIG. 111 shows various 3×3 pixel blocks to which filtering may be applied to determine interpolated red and blue values during demosaicing of a Bayer image pattern, in accordance with aspects of the present technique.

The interpolation of red and blue pixel values may be described with reference to FIG. 111, which illustrates various 3×3 blocks of the Bayer image pattern to which red and blue demosaicing may be applied, as well as interpolated green values (designated by G') that may have been obtained during demosaicing on the green channel. Referring first to block 1070, the interpolated red value, $R'_{11}$, for the Gr pixel ($G_{11}$) may be determined as follows:

$$R'_{11}=\frac{(R_{10}+R_{12})}{2}+\frac{(2G_{11}-G'_{10}-G'_{12})}{2}, \quad (84)$$

where $G'_{10}$ and $G'_{12}$ represent interpolated green values, as shown by reference number 1078. Similarly, the interpolated blue value, $B'_{11}$, for the Gr pixel ($G_{11}$) may be determined as follows:

$$B'_{11}=\frac{(B_{01}+B_{21})}{2}+\frac{(2G_{11}-G'_{01}-G'_{21})}{2}, \quad (85)$$

wherein $G'_{01}$ and $G'_{21}$ represent interpolated green values (1078).

Next, referring to the pixel block 1072, in which the center pixel is a Gb pixel ($G_{11}$), the interpolated red value, $R'_{11}$, and blue value $B'_{11}$, may be determined as shown in Equations 86 and 87 below:

$$R'_{11}=\frac{(R_{01}+R_{21})}{2}+\frac{(2G_{11}-G'_{01}-G'_{21})}{2} \quad (86)$$

$$B'_{11}=\frac{(B_{10}+B_{12})}{2}+\frac{(2G_{11}-G'_{10}-G'_{12})}{2} \quad (87)$$

Further, referring to pixel block 1074, the interpolation of a red value on a blue pixel, $B_{11}$, may be determined as follows:

$$R'_{11}=\frac{(R_{00}+R_{02}+R_{20}+R_{22})}{4}+\frac{(4G'_{11}-G'_{00}-G'_{02}-G'_{20}-G'_{22})}{4}, \quad (88)$$

wherein $G'_{00}$, $G'_{02}$, $G'_{11}$, $G'_{20}$, and $G'_{22}$ represent interpolated green values, as shown by reference number 1080. Finally, the interpolation of a blue value on a red pixel, as shown by pixel block 1076, may be calculated as follows:

$$B'_{11}=\frac{(B_{00}+B_{02}+B_{20}+B_{22})}{4}+\frac{(4G'_{11}-G'_{00}-G'_{02}-G'_{20}-G'_{22})}{4}. \quad (89)$$

While the embodiment discussed above relied on color differences (e.g., gradients) for determining red and blue interpolated values, another embodiment may provide for interpolated red and blue values using color ratios. For instance, interpolated green values (blocks 1078 and 1080) may be used to obtain a color ratio at red and blue pixel locations of the Bayer image pattern, and linear interpolation of the ratios may be used to determine an interpolated color ratio for the missing color sample. The green value, which may be an interpolated or an original value, may be multiplied by the interpolated color ratio to obtain a final interpolated color value. For instance, interpolation of red and blue pixel values using color ratios may be performed in accordance with the formulas below, wherein Equations 90 and 91 show the interpolation of red and blue values for a Gr pixel, Equations 92 and 93 show the interpolation of red and blue values for a Gb pixel, Equation 94 shows the interpolation of a red value on a blue pixel, and Equation 95 shows the interpolation of a blue value on a red pixel:

$$R'_{11} = G_{11}\frac{\left(\frac{R_{10}}{G'_{10}}\right)+\left(\frac{R_{12}}{G'_{12}}\right)}{2} \tag{90}$$

($R'_{11}$ interpolated when $G_{11}$ is a $Gr$ pixel)

$$B'_{11} = G_{11}\frac{\left(\frac{B_{01}}{G'_{01}}\right)+\left(\frac{B_{21}}{G'_{21}}\right)}{2} \tag{91}$$

($B'_{11}$ interpolated when $G_{11}$ is a $Gr$ pixel)

$$R'_{11} = G_{11}\frac{\left(\frac{R_{01}}{G'_{01}}\right)+\left(\frac{R_{21}}{G'_{21}}\right)}{2} \tag{92}$$

($R'_{11}$ interpolated when $G_{11}$ is a $Gb$ pixel)

$$B'_{11} = G_{11}\frac{\left(\frac{B_{10}}{G'_{10}}\right)+\left(\frac{B_{12}}{G'_{12}}\right)}{2} \tag{93}$$

($B'_{11}$ interpolated when $G_{11}$ is a $Gb$ pixel)

$$R'_{11} = G'_{11}\frac{\left(\frac{R_{00}}{G'_{00}}\right)+\left(\frac{R_{02}}{G'_{02}}\right)+\left(\frac{R_{20}}{G'_{20}}\right)+\left(\frac{R_{22}}{G'_{22}}\right)}{4} \tag{94}$$

($R'_{11}$ interpolated on a blue pixel $B_{11}$)

$$R'_{11} = G'_{11}\frac{\left(\frac{R_{00}}{G'_{00}}\right)+\left(\frac{R_{02}}{G'_{02}}\right)+\left(\frac{R_{20}}{G'_{20}}\right)+\left(\frac{R_{22}}{G'_{22}}\right)}{4} \tag{95}$$

($R'_{11}$ interpolated on a red pixel $B_{11}$)

Once the missing color samples have been interpolated for each image pixel from the Bayer image pattern, a complete sample of color values for each of the red, blue, and green color channels (e.g., 1046, 1048, and 1050 of FIG. 107) may be combined to produce a full color RGB image. For instance, referring back FIGS. 98 and 99, the output 910 of the raw pixel processing logic 900 may be an RGB image signal in 8, 10, 12 or 14-bit formats.

Figure 112:
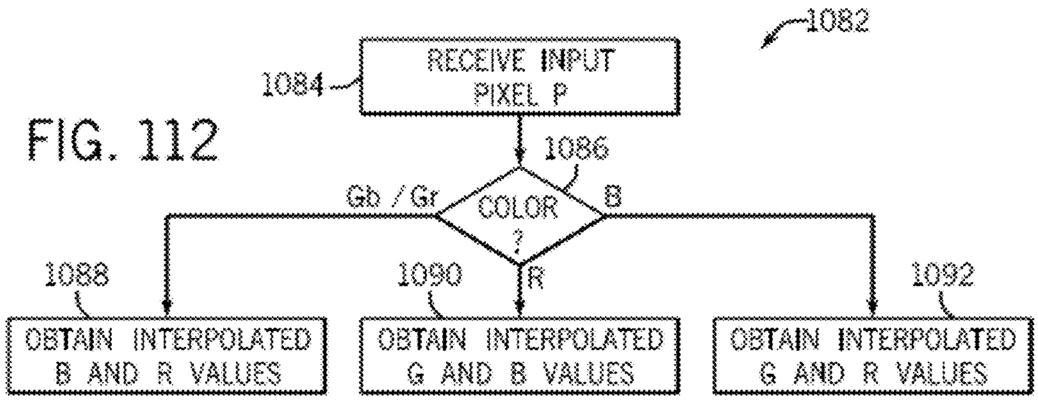
FIGS. 112-115 provide flowcharts that depict various processes for interpolating green, red, and blue color values during demosaicing of a Bayer image pattern, in accordance with one embodiment.

Referring now to FIGS. 112-115, various flow charts illustrating processes for demosaicing a raw Bayer image pattern in accordance with disclosed embodiments are illustrated. Specifically, the process 1082 of FIG. 112 depicts the determination of which color components are to be interpolated for a given input pixel P. Based on the determination by process 1082, one or more of the process 1100 (FIG. 113) for interpolating a green value, the process 1112 (FIG. 114) for interpolating a red value, or the process 1124 (FIG. 115) for interpolating a blue value may be performed (e.g., by the demosaicing logic 940).

Beginning with FIG. 112, the process 1082 begins at step 1084 when an input pixel P is received. Decision logic 1086 determines the color of the input pixel. For instance, this may depend on the location of the pixel within the Bayer image pattern. Accordingly, if P is identified as being a green pixel (e.g., Gr or Gb), the process 1082 proceeds to step 1088 to obtain interpolated red and blue values for P. This may include, for example, continuing to the processes 1112 and 1124 of FIGS. 114 and 115, respectively. If P is identified as being a red pixel, then the process 1082 proceeds to step 1090 to obtain interpolated green and blue values for P. This may include further performing the processes 1100 and 1124 of FIGS. 113 and 115, respectively. Additionally, if P is identified as being a blue pixel, then the process 1082 proceeds to step 1092 to obtain interpolated green and red values for P. This may include further performing the processes 1100 and 1112 of FIGS. 113 and 114, respectively. Each of the processes 1100, 1112, and 1124 are described further below.

Figure 113:
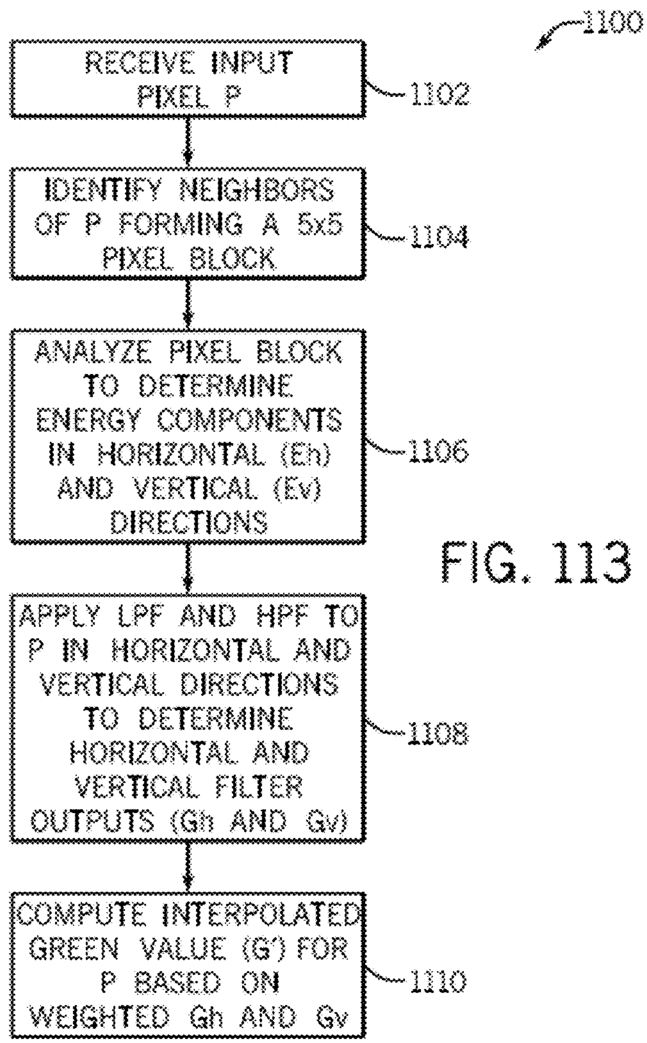

The process 1100 for determining an interpolated green value for the input pixel P is illustrated in FIG. 113 and includes steps 1102-1110. At step 1102, the input pixel P is received (e.g., from process 1082). Next, at step 1104, a set of neighboring pixels forming a 5×5 pixel block is identified, with P being the center of the 5×5 block. Thereafter, the pixel block is analyzed to determine horizontal and vertical energy components at step 1106. For instance, the horizontal and vertical energy components may be determined in accordance with Equations 76 and 77 for calculating Eh and Ev, respectively. As discussed, the energy components Eh and Ev may be used as weighting coefficients to provide edge-adaptive filtering and, therefore, reduce the appearance of certain demosaicing artifacts in the final image. At step 1108, low pass filtering and high pass filtering as applied in horizontal and vertical directions to determine horizontal and vertical filtering outputs. For example, the horizontal and vertical filtering outputs, Gh and Gv, may be calculated in accordance with Equations 81 and 82. Next the process 1082 continues to step 1110, at which the interpolated green value G' is interpolated based on the values of Gh and Gv weighted with the energy components Eh and Ev, as shown in Equation 83.

Figure 114:
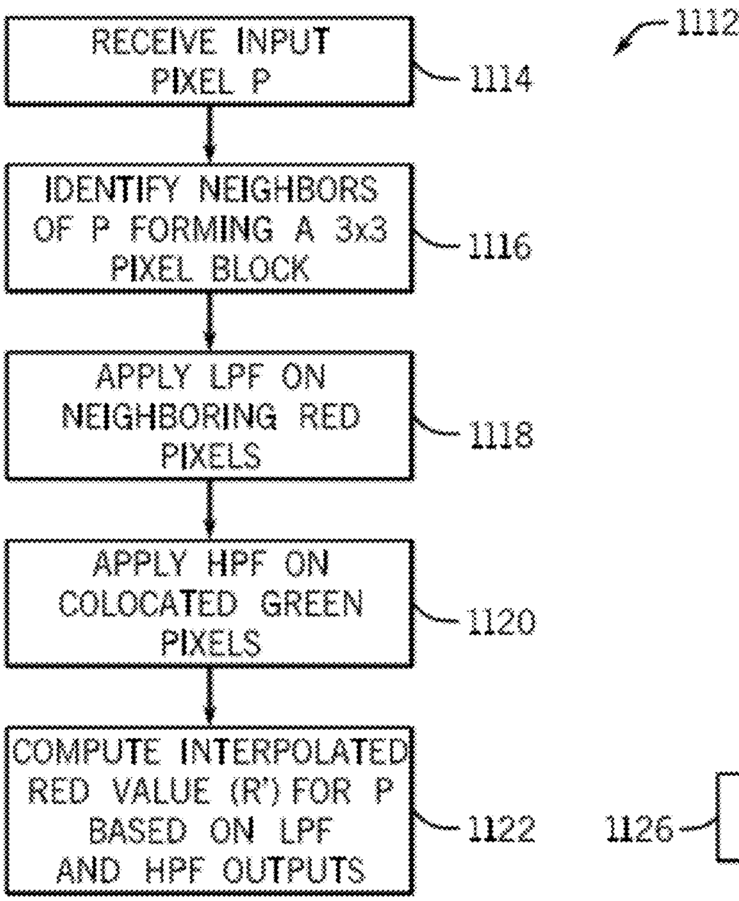

Next, with regard to the process 1112 of FIG. 114, the interpolation of red values may begin at step 1114, at which the input pixel P is received (e.g., from process 1082). At step 1116, a set of neighboring pixels forming a 3×3 pixel block is identified, with P being the center of the 3×3 block. Thereafter, low pass filtering is applied on neighboring red pixels within the 3×3 block at step 1118, and high pass filtering is applied (step 1120) on co-located green neighboring values, which may be original green values captured by the Bayer image sensor, or interpolated values (e.g., determined via process 1100 of FIG. 113). The interpolated red value R' for P may be determined based on the low pass and high pass filtering outputs, as shown at step 1122. Depending on the color of P, R' may be determined in accordance with one of the Equations 84, 86, or 88.

Figure 115:
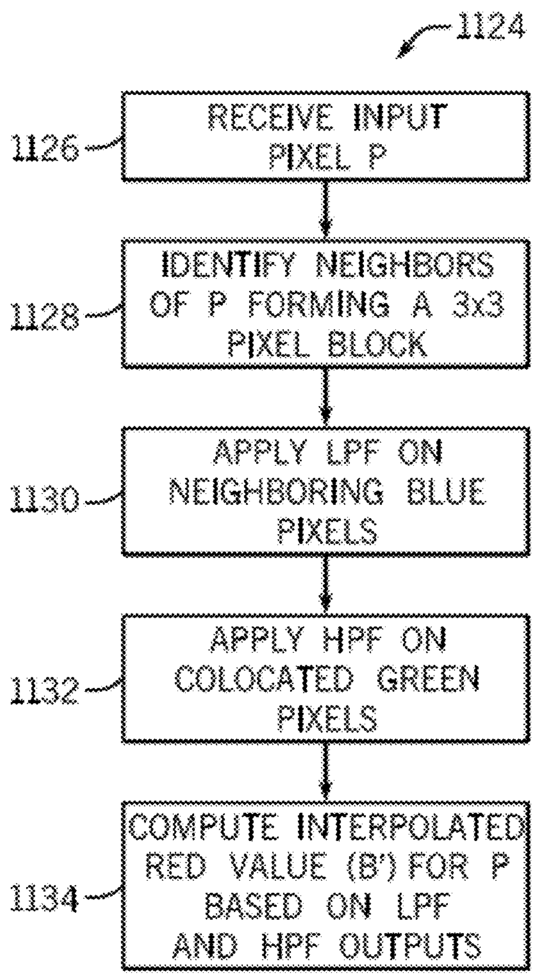

With regard to the interpolation of blue values, the process 1124 of FIG. 115 may be applied. The steps 1126 and 1128 are generally identical to the steps 1114 and 1116 of the process 1112 (FIG. 114). At step 1130, low pass filtering is applied on neighboring blue pixels within the 3×3, and, at step 1132, high pass filtering is applied on co-located green neighboring values, which may be original green values captured by the Bayer image sensor, or interpolated values (e.g., determined via process 1100 of FIG. 113). The interpolated blue value B' for P may be determined based on the low pass and high pass filtering outputs, as shown at step 1134. Depending on the color of P, B' may be determined in accordance with one of the Equations 85, 87, or 89. Further, as mentioned above, the interpolation of red and blue values may be determined using color differences (Equations 84-89) or color ratios (Equations 90-95). Again, it should be understood that interpolation of missing green values may be performed first, such that a complete set of green values (both original and interpolated values) is available when interpolating the missing red and blue samples. For example, the process 1100 of FIG. 113 may be applied to interpolate all missing green color samples before performing the processes 1112 and 1124 of FIGS. 114 and 115, respectively.

Figure 116:
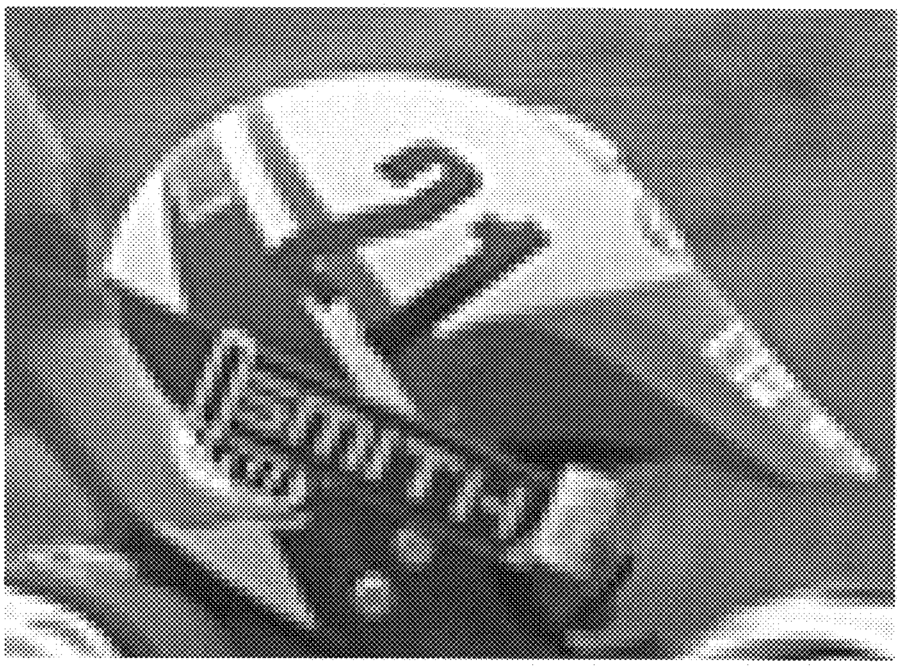
FIG. 116 shows a colored drawing of an original image scene that may be captured by an image sensor and processed in accordance with aspects of the demosaicing techniques disclosed herein.
Figure 117:
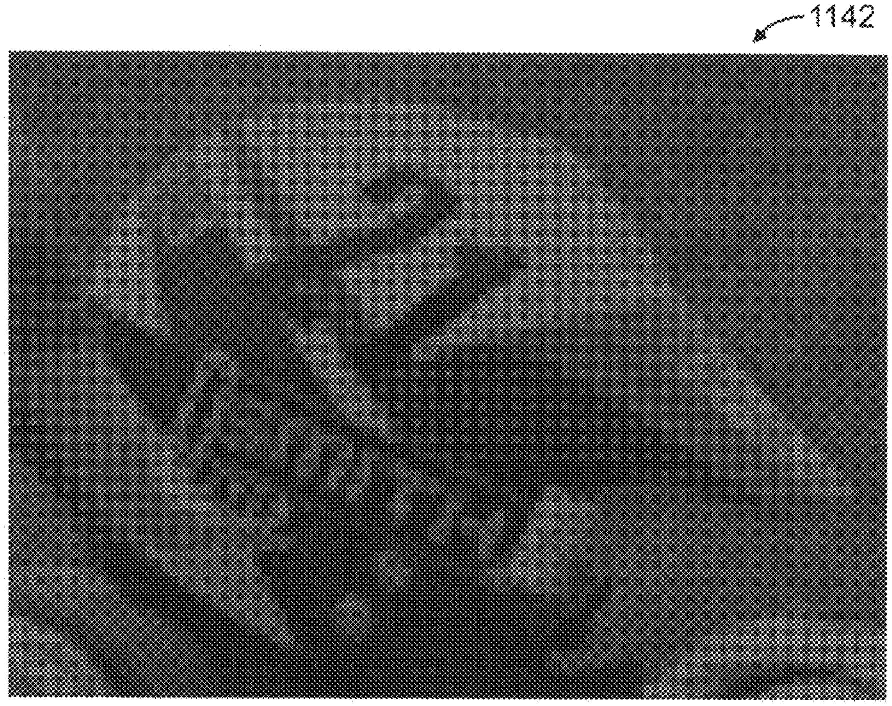
FIG. 117 shows a colored drawing of Bayer image pattern of the image scene shown in FIG. 116.
Figure 118:
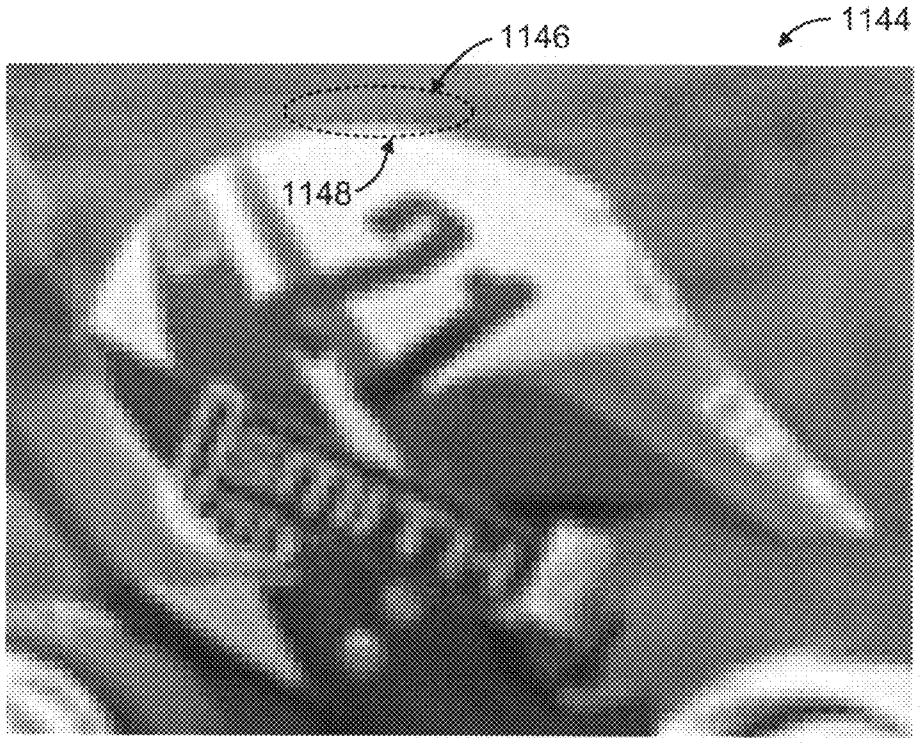
FIG. 118 shows a colored drawing of an RGB image reconstructed using a conventional demosaicing technique based upon the Bayer image pattern of FIG. 117.
Figure 119:
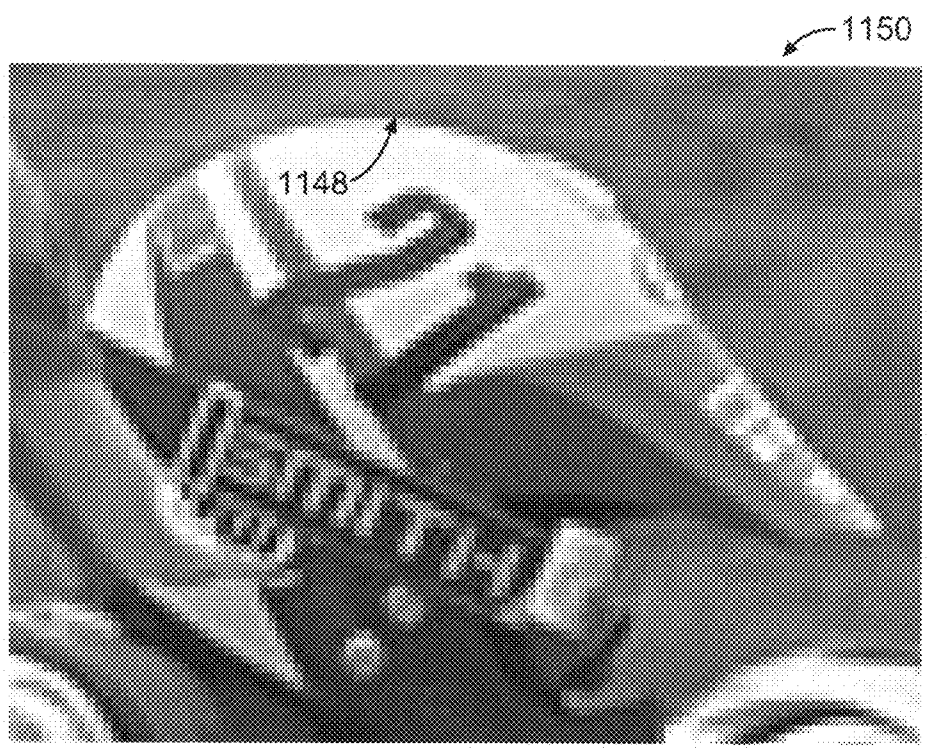
FIG. 119 shows a colored drawing of an RGB image reconstructed from the Bayer image pattern of FIG. 117 in accordance with aspects of the demosaicing techniques disclosed herein.

Referring to FIGS. 116-119, examples of colored drawings of images processed by the raw pixel processing logic 900 in the ISP pipe 82 are provided. FIG. 116 depicts an original image scene 1140, which may be captured by the image sensor 90 of the imaging device 30. FIG. 117 shows a raw Bayer image 1142 which may represent the raw pixel data captured by the image sensor 90. As mentioned above, conventional demosaicing techniques may not provide for adaptive filtering based on the detection of edges (e.g., borders between areas of two or more colors) in the image data, which may, undesirably, produce artifacts in the resulting reconstructed full color RGB image. For instance, FIG. 118 shows an RGB image 1144 reconstructed using conventional demosaicing techniques, and may include artifacts, such as "checkerboard" artifacts 1146 at the edge 1148. However, comparing the image 1144 to the RGB image 1150 of FIG. 119, which may be an example of an image reconstructed using the demosaicing techniques described above, it can be seen that the checkerboard artifacts 1146 present in FIG. 118 are not present, or at least their appearance is substantially reduced at the edge 1148. Thus, the images shown in FIGS. 116-119 are intended to illustrate at least one advantage that the demosaicing techniques disclosed herein have over conventional methods.

Figure 120:
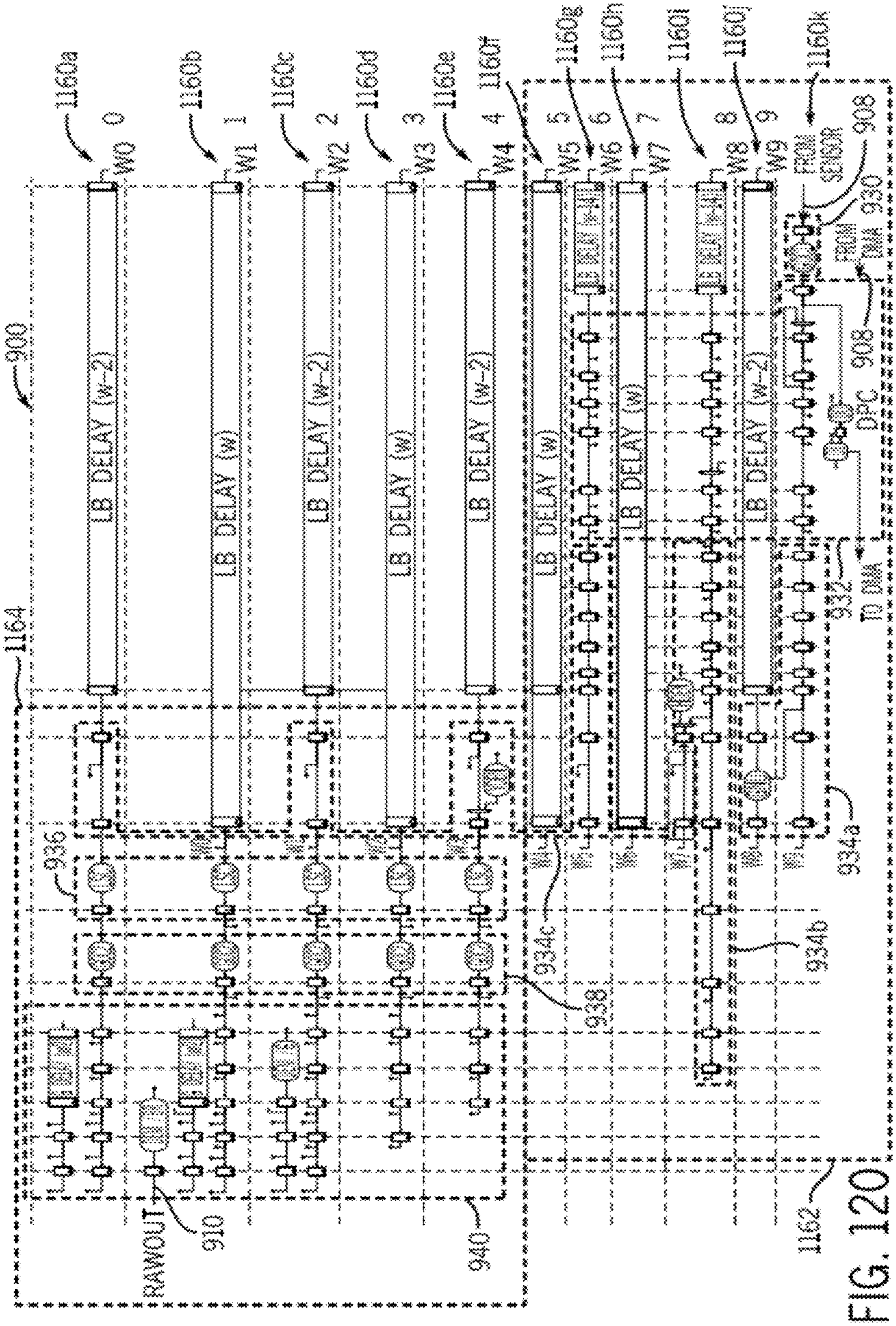
FIGS. 120-123 depict a configuration and arrangement of line buffers that may be used in implementing the raw pixel processing block of FIG. 99, in accordance with one embodiment.
Figure 121:
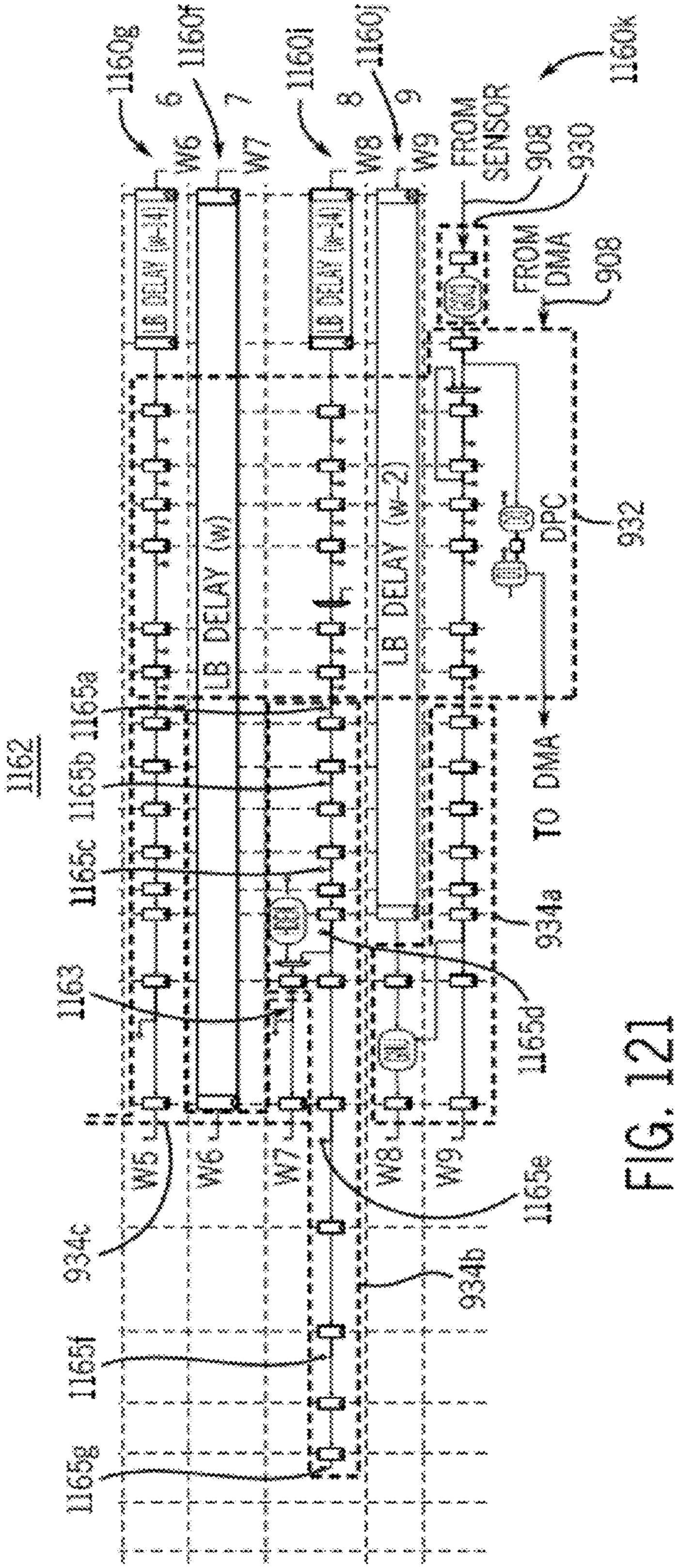
Figure 122:
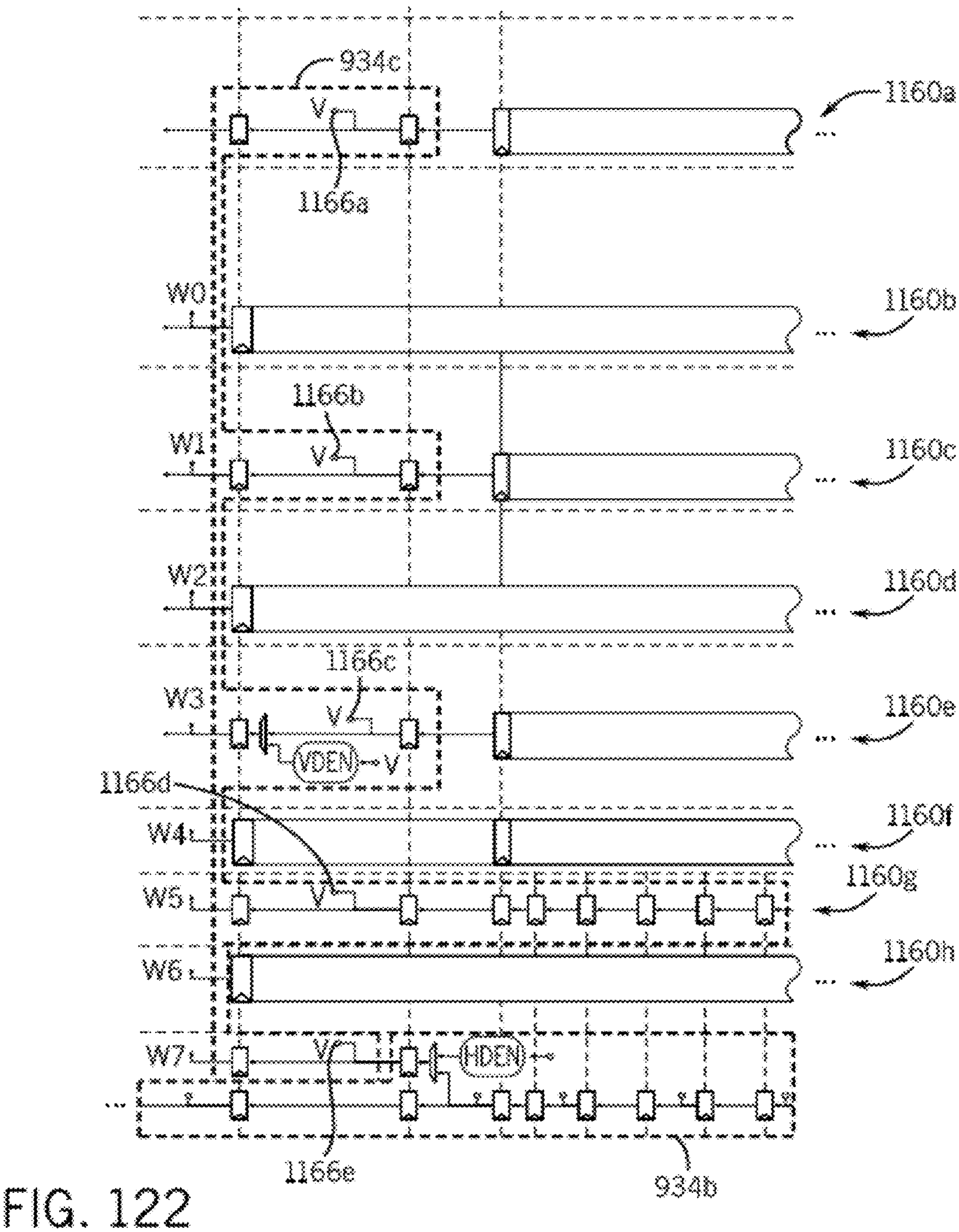
Figure 123:
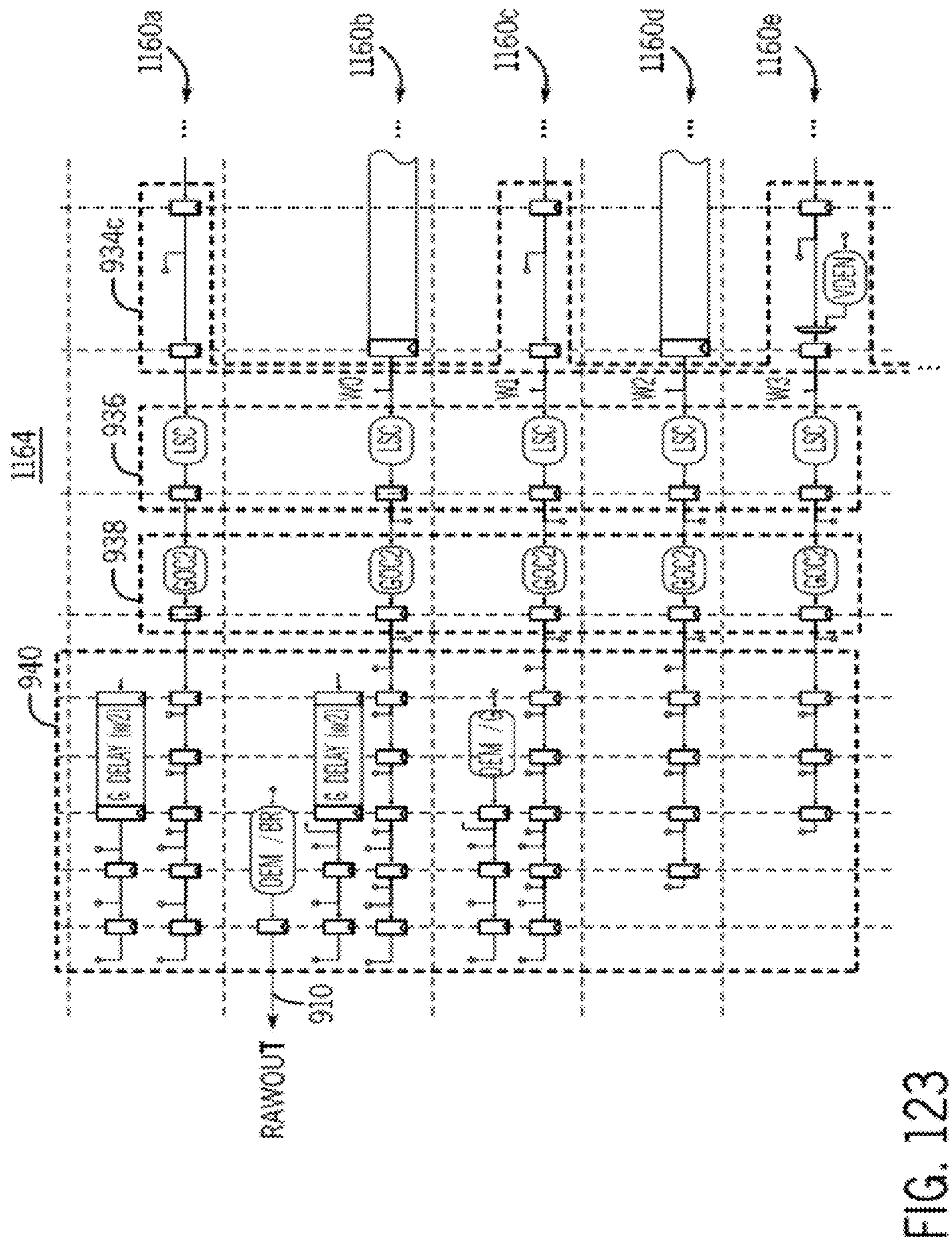

In accordance with certain aspect of the image processing techniques disclosed herein, the various processing logic blocks of the ISP sub-system 32 may be implemented using a set of line buffers, which may be configured to pass image data through the various blocks, as shown above. For example, in one embodiment, the raw pixel processing logic 900 discussed above in FIG. 99 may be implemented using a configuration of line buffers arranged as shown in FIGS. 120-123. Particularly, FIG. 120 depicts the entire line buffer arrangement that may be used to implement the raw pixel processing logic 900, while FIG. 121 depicts a closer view of a first subset of the line buffers, as shown within the enclosed region 1162 of FIG. 120, FIG. 122 depicts a closer view of a vertical filter that may be part of the noise reduction logic 934, and FIG. 123 depicts a closer view of a second subset of the line buffers, as shown within the enclosed region 1164 of FIG. 120.

As generally illustrated in FIG. 120, the raw pixel processing logic 900 may include a set of ten line buffers numbered 0-9 and labeled as reference numbers 1160*a*-1160*j*, respectively, as well as the row of logic 1160*k*, which includes the image data input 908 (which may be from the image sensor or from memory) to the raw processing logic 900. Thus, the logic shown in FIG. 120 may include 11 rows, of which 10 of the rows include line buffers (1160*a*-1160*j*). As discussed below, the line buffers may be utilized in a shared manner by the logic units of the raw pixel processing logic 900, including the gain, offset, clamping logic blocks 930 and 938 (referred to as GOC1 and GOC2, respectively, in FIG. 120), the defective pixel detection and correction (DPC) logic 932, the noise reduction logic 934 (shown in FIG. 120 as including the green non-uniformity (GNU) correction logic 934*a*, a 7-tap horizontal filter 934*b*, and a 5-tap vertical filter 934*c*), the lens shading correction (LSC) logic 936, and demosaic (DEM) logic 940. For example, in the embodiment shown in FIG. 120, the lower subset of line buffers represented by line buffers 6-9 (1160*g*-1160*j*) may be shared between the DPC logic 932 and portions of the noise reduction logic 934 (including GNU logic 934*a*, horizontal filter 934*b*, and part of the vertical filter 934*c*). The upper subset of line buffers represented by line buffers 0-5 (1160*a*-1160*f*) may be shared between a portion of the vertical filtering logic 934*c*, the lens shading correction logic 936, the gain, offset, and clamping logic 938, and the demosaic logic 940.

To generally describe the movement of image data through the line buffers, the raw image data 908, which may represent the output of the ISP front-end processing logic 80, is first received and processed by the GOC1 logic 930, where appropriate gains, offset, and clamping parameters are applied. The output of the GOC1 logic 930 is then provided to the DPC logic 932. As shown, defective pixel detection and correction processing may occur over line buffers 6-9. A first output of the DPC logic 932 is provided to the green non-uniformity correction logic 934*a* (of the noise reduction logic 934), which occurs at line buffer 9 (1160*j*). Thus, line buffer 9 (1160*j*), in the present embodiment, is shared between both the DPC logic 932 and the GNU correction logic 934*a*.

Next, the output of line buffer 9 (1160*j*), referred to in FIG. 121 as W8, is provided to the input of line buffer 8 (1160*i*). As shown, line buffer 8 is shared between the DPC logic 932, which provides additional defective pixel detection and correction processing, and the horizontal filtering logic (934*b*) of the noise reduction block 934. As shown in the present embodiment, the horizontal filter 934*b* may be a 7-tap filter, as indicated by the filter taps 1165*a*-1165*g* in FIG. 121, and may be configured as a finite impulse response (FIR) filter. As discussed above, in certain embodiments, the noise filtering may be edge adaptive. For instance, the horizontal filter may be an FIR filter, but where the filter taps are used only if the difference between the center pixel and the pixel at the tap is smaller then a threshold that depends at least partially upon noise variance.

The output 1163 (FIG. 121) of the horizontal filtering logic 934*b* may be provided to the vertical filtering logic 934*c* (illustrated in more detail in FIG. 122) and to the input of line buffer 7 (1160*h*). In the illustrated embodiment, line buffer 7 is configured to provide for a delay (w) before passing its input W7 to line buffer 6 (1160*g*) as input W6. As shown in FIG. 121, line buffer 6 is shared between the DPC logic 932 and the noise reduction vertical filter 934*c*.

Next, referring concurrently to FIGS. 120, 122, and 123, the upper subset of line buffers, namely line buffers 0-5 (1160*a*-1160*f*) are shared between the noise reduction vertical filter 934*c* (shown in FIG. 122), the lens shading correction logic 936, the GOC2 logic 938, and the demosaic logic 940. For instance, the output of line buffer 5 (1160*f*), which provides a delay (w), is fed to line buffer 4 (1160*e*). Vertical filtering is performed in line buffer 4, and the output W3 of the vertical filter 934*c* portion in line buffer 4 is fed to line buffer 3 (1160*d*), as well as downstream to the portions of the lens shading correction logic 936, GOC2 logic 938, and demosaic logic 940 shared by line buffer 4. In the present embodiment, the vertical filtering logic 934*c* may include five taps 1166*a*-1166*e* (FIG. 122), but may be configurable to operate in both partially recursive (infinite impulse response (IIR)) and non-recursive (FIR) modes. For instance, when all five taps are utilized such that tap 1166*c* is the center tap, the vertical filtering logic 934*c* operates in a partially IIR recursive mode. The present embodiment may also choose to utilize three of the five taps, namely taps 1166*c*-1166*e*, with tap 1166*d* being a center tap, to operate the vertical filtering logic 934*c* in a non-recursive (FIR) mode. The vertical filtering mode, in one embodiment, may be specified using a configuration register associated with the noise reduction logic 934.

Next, line buffer 3 receives the W3 input signal and provides a delay (w) before outputting W2 to line buffer 2 (1160*c*), as well as downstream to the portions of the lens shading correction logic 936, GOC2 logic 938, and demosaic logic 940 shared by line buffer 3. As shown, line buffer 2 is also shared between the vertical filter 934*c*, the lens shading correction logic 936, the GOC2 logic 938, and the demosaic logic 940, and provides output W1 to line buffer 1 (1160*b*). Similarly, line buffer 1 is also shared between the vertical filter 934*c*, the lens shading correction logic 936, the GOC2 logic 938, and the demosaic logic 940, and provides output W1 to line buffer 0 (1160*a*). The output 910 of the demosaic logic 940 may be provided downstream to the RGB processing logic 902 for additional processing, as will be discussed further below.

It should be understood that the illustrated embodiment depicting the arrangement of the line buffers in a shared manner such different processing units may utilize the shared line buffers concurrently may significantly reduce the number of line buffers needed to implement the raw processing logic 900. As can be appreciated, this may reduce the hardware real estate area required for implementing the image processing circuitry 32, and thus reduce overall design and manufacturing costs. By way of example, the presently illustrated technique for sharing line buffers between different processing components may, in certain embodiments, reduce the number of line buffers needed when compared to a conventional embodiment that does not share line buffers by as much as 40 to 50 percent or more. Further, while the presently illustrated embodiment of the raw pixel processing logic 900 shown in FIG. 120 utilizes 10 line buffers, it should be appreciated that fewer or more line buffers may be utilized in other embodiments. That is, the embodiment shown in FIG. 120 is merely intended to illustrate the concept by which line buffers are shared across multiple processing units, and should not be construed as limiting the present technique to only the raw pixel processing logic 900. Indeed, the aspects of the disclosure shown in FIG. 120 may be implemented in any of the logic blocks of the ISP sub-system 32.

Figure 124:
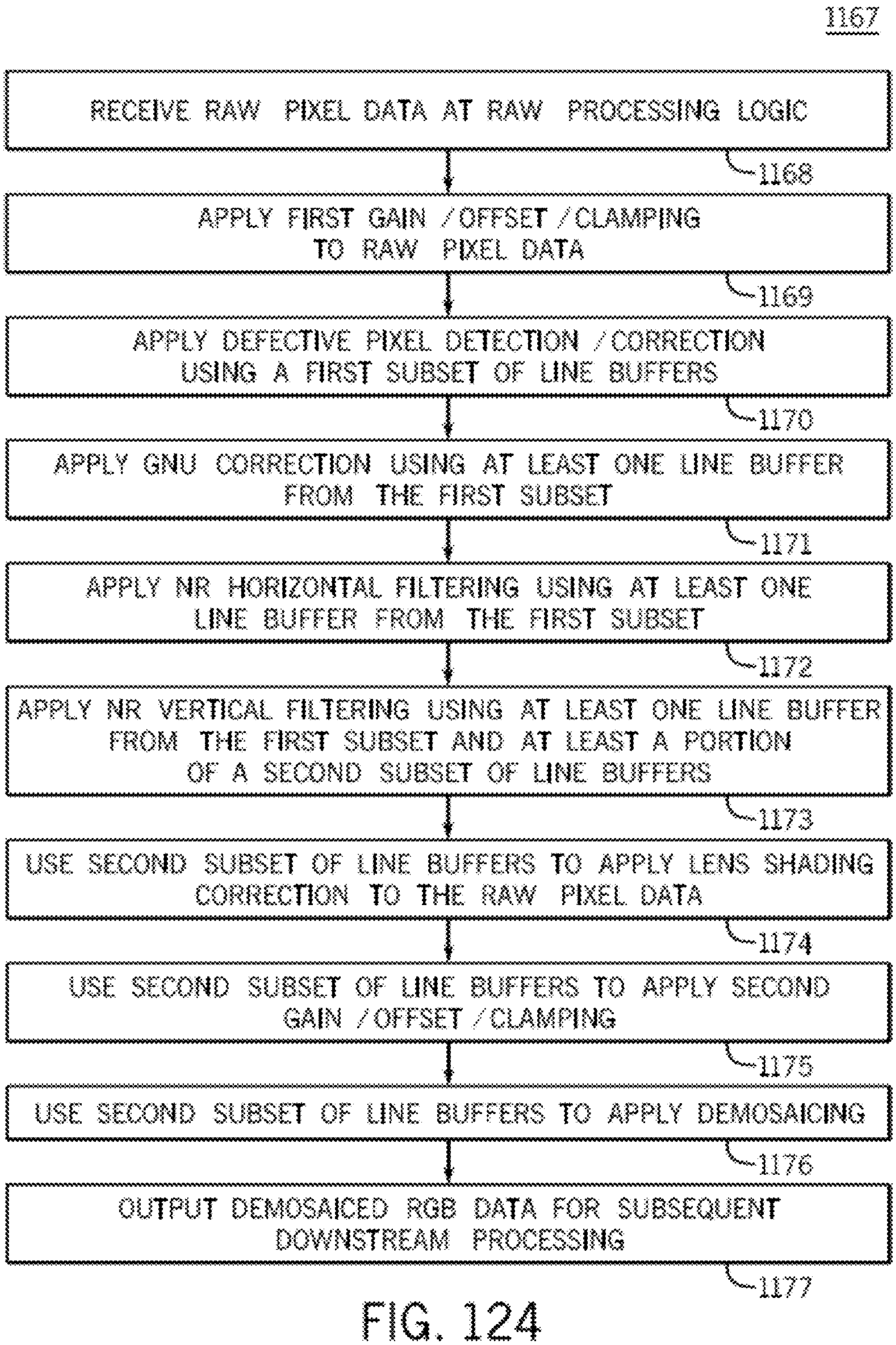
FIG. 124 is a flowchart showing a method for processing raw pixel data using the line buffer configuration shown in FIGS. 120-123, in accordance with one embodiment.

FIG. 124 is a flowchart showing a method 1167 for processing raw pixel data in accordance with the line buffer configuration shown in FIGS. 120-123. Beginning at step 1168, the line buffers of the raw pixel processing logic 900 may receive raw pixel data (e.g., from ISP front-end 80, memory 108, or both). At step 1169, a first set of gain, offset, and clamping (GOC1) parameters is applied to the raw pixel data. Next, at step 1170, defective pixel detection and correction is performed using a first subset of line buffers (e.g., line buffers 6-9 in FIG. 120). Thereafter, at step 1171, green non-uniformity (GNU) correction is applied using at least one line buffer (e.g., line buffer 9) from the first subset of line buffers. Next, as shown at step 1172, horizontal filtering for noise reduction is applied, also using at least one line buffer from the first subset. In the embodiment shown in FIG. 120, the line buffer(s) from the first subset that are used to perform GNU correction and horizontal filtering may be different.

The method 1167 then continues to step 1173, at which vertical filtering for noise reduction is applied using at least one line buffer from the first subset, as well as at least a portion of a second subset of the line buffers (e.g., line buffers 0-5) of the raw pixel processing logic 900. For instance, as discussed above, depending on the vertical filtering mode (e.g., recursive or non-recursive), either a portion or all of the second subset of line buffers may be used. Further, in one embodiment, the second subset may include the remaining line buffers not included in the first subset of line buffers from step 1170. At step 1174, the second subset of line buffers is used to apply lens shading correction to the raw pixel data. Next, at step 1175, the second subset of line buffers is used to apply a second set of gain, offset, and clamping (GOC2) parameters and, subsequently, the second set of line buffers is also used to demosaic the raw image data, as shown at step 1176. The demosaiced RGB color data may then be sent downstream at step 1177 for additional processing by the RGB processing logic 902, as discussed in more detail below.

Referring back to FIG. 98, having now thoroughly described the operation of the raw pixel processing logic 900, which may output an RGB image signal 910, the present discussion will now focus on describing the processing of the RGB image signal 910 by the RGB processing logic 902. As shown the RGB image signal 910 may be sent to the selection logic 914 and/or to the memory 108. The RGB processing logic 902 may receive the input signal 916, which may be RGB image data from the signal 910 or from the memory 108, as shown by signal 912, depending on the configuration of the selection logic 914. The RGB image data 916 may be processed by the RGB processing logic 902 to perform color adjustments operations, including color correction (e.g., using a color correction matrix), the application of color gains for auto-white balancing, as well as global tone mapping, and so forth.

Figure 125:
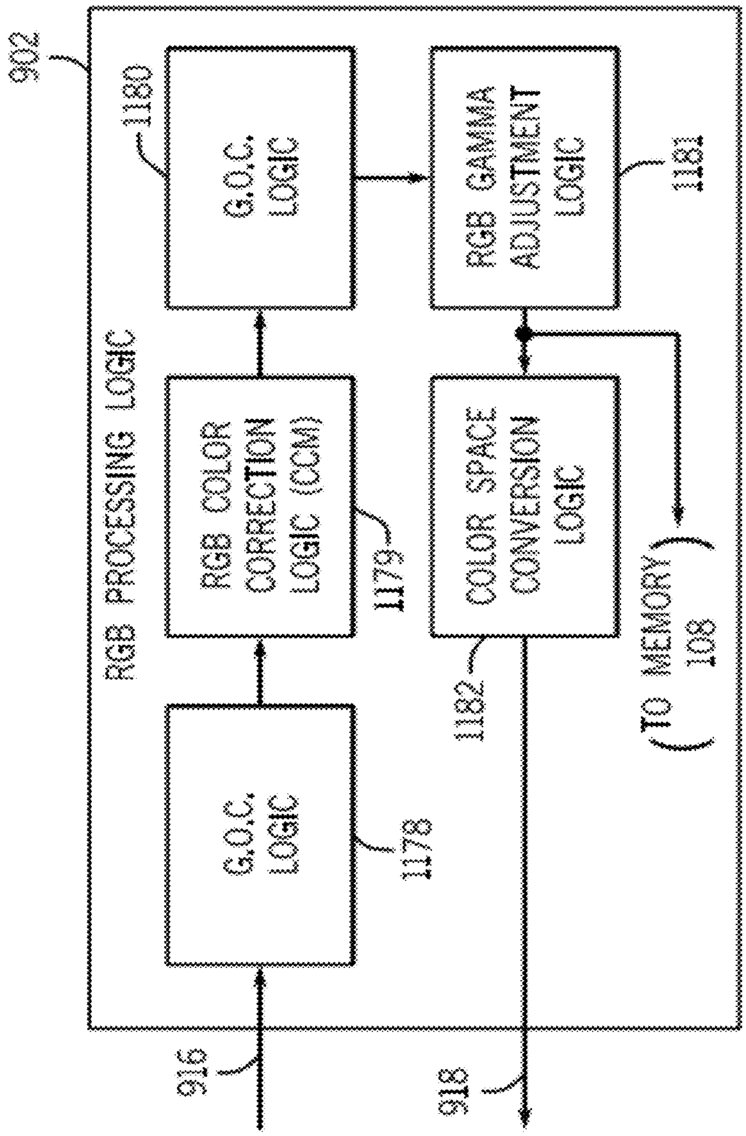
FIG. 125 is a more detailed view showing one embodiment of an RGB processing block that may be implemented in the ISP pipe processing logic of FIG. 98, in accordance with aspects of the present disclosure.

A block diagram depicting a more detailed view of an embodiment of the RGB processing logic 902 is illustrated in FIG. 125. As shown, the RGB processing logic 902 includes the gain, offset, and clamping (GOC) logic 1178, the RGB color correction logic 1179, the GOC logic 1180, the RGB gamma adjustment logic, and the color space conversion logic 1182. The input signal 916 is first received by the gain, offset, and clamping (GOC) logic 1178. In the illustrated embodiment, the GOC logic 1178 may apply gains to perform auto-white balancing on one or more of the R, G, or B color channels before processing by the color correction logic 1179.

The GOC logic 1178 may be similar to the GOC logic 930 of the raw pixel processing logic 900, except that the color components of the RGB domain are processed, rather the R, B, Gr, and Gb components of the Bayer image data. In operation, the input value for the current pixel is first offset by a signed value O[c] and multiplied by a gain G[c], as shown in Equation 11 above, wherein c represents the R, G, and B. As discussed above, the gain G[c] may be a 16-bit unsigned number with 2 integer bits and 14 fraction bits (e.g., 2.14 floating point representation), and the values for the gain G[c] may be previously determined during statistics processing (e.g., in the ISP front-end block 80). The computed pixel value Y (based on Equation 11) is then be clipped to a minimum and a maximum range in accordance with Equation 12. As discussed above, the variables min[c] and max[c] may represent signed 16-bit "clipping values" for the minimum and maximum output values, respectively. In one embodiment, the GOC logic 1178 may also be configured to maintain a count of the number of pixels that were clipped above and below maximum and minimum, respectively, for each color component R, G, and B.

The output of the GOC logic 1178 is then forwarded to the color correction logic 1179. In accordance with the presently disclosed techniques, the color correction logic 1179 may be configured to apply color correction to the RGB image data using a color correction matrix (CCM). In one embodiment, the CCM may be a 3×3 RGB transform matrix, although matrices of other dimensions may also be utilized in other embodiments (e.g., 4×3, etc.). Accordingly, the process of performing color correction on an input pixel having R, G, and B components may be expressed as follows:

$$[R' \quad G' \quad B'] = \begin{bmatrix} CCM00 & CCM01 & CCM02 \\ CCM10 & CCM11 & CCM12 \\ CCM20 & CCM21 & CCM22 \end{bmatrix} \times [R \quad G \quad B], \tag{96}$$

wherein R, G, and B represent the current red, green, and blue values for the input pixel, CCM00-CCM22 represent the coefficients of the color correction matrix, and R', G', and B' represent the corrected red, green, and blue values for the input pixel. Accordingly, the correct color values may be computed in accordance with Equations 97-99 below:

$$R'=(CCM00\times R)+(CCM01\times G)+(CCM02\times B) \quad (97)$$

$$G'=(CCM10\times R)+(CCM11\times G)+(CCM12\times B) \quad (98)$$

$$B'=(CCM20\times R)+(CCM21\times G)+(CCM22\times B) \quad (99)$$

The coefficients (CCM00-CCM22) of the CCM may be determined during statistics processing in the ISP front-end block 80, as discussed above. In one embodiment, the coefficients for a given color channel may be selected such that the sum of those coefficients (e.g., CCM00, CCM01, and CCM02 for red color correction) is equal to 1, which may help to maintain the brightness and color balance. Further, the coefficients are typically selected such that a positive gain is applied to the color being corrected. For instance, with red color correction, the coefficient CCM00 may be greater than 1, while one or both of the coefficients CCM01 and CCM02 may be less than 1. Setting the coefficients in this manner may enhance the red (R) component in the resulting corrected R' value while subtracting some of the blue (B) and green (G) component. As will be appreciated, this may address issues with color overlap that may occur during acquisition of the original Bayer image, as a portion of filtered light for a particular colored pixel may "bleed" into a neighboring pixel of a different color. In one embodiment, the coefficients of the CCM may be provided as 16-bit two's-complement numbers with 4 integer bits and 12 fraction bits (expressed in floating point as 4.12). Additionally, the color correction logic 1179 may provide for clipping of the computed corrected color values if the values exceed a maximum value or are below a minimum value.

The output of the RGB color correction logic 1179 is then passed to another GOC logic block 1180. The GOC logic 1180 may be implemented in an identical manner as the GOC logic 1178 and, thus, a detailed description of the gain, offset, and clamping functions provided will not be repeated here. In one embodiment, the application of the GOC logic 1180 subsequent to color correction may provide for auto-white balance of the image data based on the corrected color values, and may also adjust sensor variations of the red-to-green and blue-to-green ratios.

Next, the output of the GOC logic 1180 is sent to the RGB gamma adjustment logic 1181 for further processing. For instance, the RGB gamma adjustment logic 1181 may provide for gamma correction, tone mapping, histogram matching, and so forth. In accordance with disclosed embodiments, the gamma adjustment logic 1181 may provide for a mapping of the input RGB values to corresponding output RGB values. For instance, the gamma adjustment logic may provide for a set of three lookup tables, one table for each of the R, G, and B components. By way of example, each lookup table may be configured to store 256 entries of 10-bit values, each value representing an output level. The table entries may be evenly distributed in the range of the input pixel values, such that when the input value falls between two entries, the output value may be linearly interpolated. In one embodiment, each of the three lookup tables for R, G, and B may be duplicated, such that the lookup tables are "double buffered" in memory, thus allowing for one table to be used during processing, while its duplicate is being updated. Based on the 10-bit output values discussed above, it should be noted that the 14-bit RGB image signal is effectively down-sampled to 10 bits as a result of the gamma correction process in the present embodiment.

The output of the gamma adjustment logic 1181 may be sent to the memory 108 and/or to the color space conversion logic 1182. The color space conversion (CSC) logic 1182 may be configured to convert the RGB output from the gamma adjustment logic 1181 to the YCbCr format, in which Y represents a luma component, Cb represents a blue-difference chroma component, and Cr represents a red-difference chroma component, each of which may be in a 10-bit format as a result of bit-depth conversion of the RGB data from 14-bits to 10-bits during the gamma adjustment operation. As discussed above, in one embodiment, the RGB output of the gamma adjustment logic 1181 may be down-sampled to 10-bits and thus converted to 10-bit YCbCr values by the CSC logic 1182, which may then be forwarded to the YCbCr processing logic 904, which will be discussed further below.

The conversion from the RGB domain to the YCbCr color space may be performed using a color space conversion matrix (CSCM). For instance, in one embodiment, the CSCM may be a 3×3 transform matrix. The coefficients of the CSCM may be set in accordance with a known conversion equation, such as the BT.601 and BT.709 standards. Additionally, the CSCM coefficients may be flexible based on the desired range of input and outputs. Thus, in some embodiments, the CSCM coefficients may be determined and programmed based on data collected during statistics processing in the ISP front-end block 80.

The process of performing YCbCr color space conversion on an RGB input pixel may be expressed as follows:

$$[Y \quad Cb \quad Cr] = \begin{bmatrix} CSCM00 & CSCM01 & CSCM02 \\ CSCM10 & CSCM11 & CSCM12 \\ CSCM20 & CSCM21 & CSCM22 \end{bmatrix} \times [R \quad G \quad B], \quad (100)$$

wherein R, G, and B represent the current red, green, and blue values for the input pixel in 10-bit form (e.g., as processed by the gamma adjustment logic 1181), CSCM00-CSCM22 represent the coefficients of the color space conversion matrix, and Y, Cb, and Cr represent the resulting luma, and chroma components for the input pixel. Accordingly, the values for Y, Cb, and Cr may be computed in accordance with Equations 101-103 below:

$$Y=(CSCM00\times R)+(CSCM01\times G)+(CSCM02\times B) \quad (101)$$

$$Cb=(CSCM10\times R)+(CSCM11\times G)+(CSCM12\times B) \quad (102)$$

$$Cr=(CSCM20\times R)+(CSCM21\times G)+(CSCM22\times B) \quad (103)$$

Following the color space conversion operation, the resulting YCbCr values may be output from the CSC logic 1182 as the signal 918, which may be processed by the YCbCr processing logic 904, as will be discussed below.

In one embodiment, the coefficients of the CSCM may be 16-bit two's-complement numbers with 4 integer bits and 12 fraction bits (4.12). In another embodiment, the CSC logic 1182 may further be configured to apply an offset to each of the Y, Cb, and Cr values, and to clip the resulting values to a minimum and maximum value. By way of example only, assuming that the YCbCr values are in 10-bit form, the offset may be in a range of −512 to 512, and the minimum and maximum values may be 0 and 1023, respectively.

Referring again back to the block diagram of the ISP pipe logic 82 in FIG. 98, the YCbCr signal 918 may be sent to the selection logic 922 and/or to the memory 108. The YCbCr processing logic 904 may receive the input signal 924, which may be YCbCr image data from the signal 918 or from the memory 108, as shown by signal 920, depending on the configuration of the selection logic 922. The YCbCr image data 924 may then be processed by the YCbCr processing logic 904 for luma sharpening, chroma suppression, chromanoise reduction, chroma noise reduction, as well as brightness, contrast, and color adjustments, and so forth. Further, the YCbCr processing logic 904 may provide for gamma mapping and scaling of the processed image data in both horizontal and vertical directions.

Figure 126:
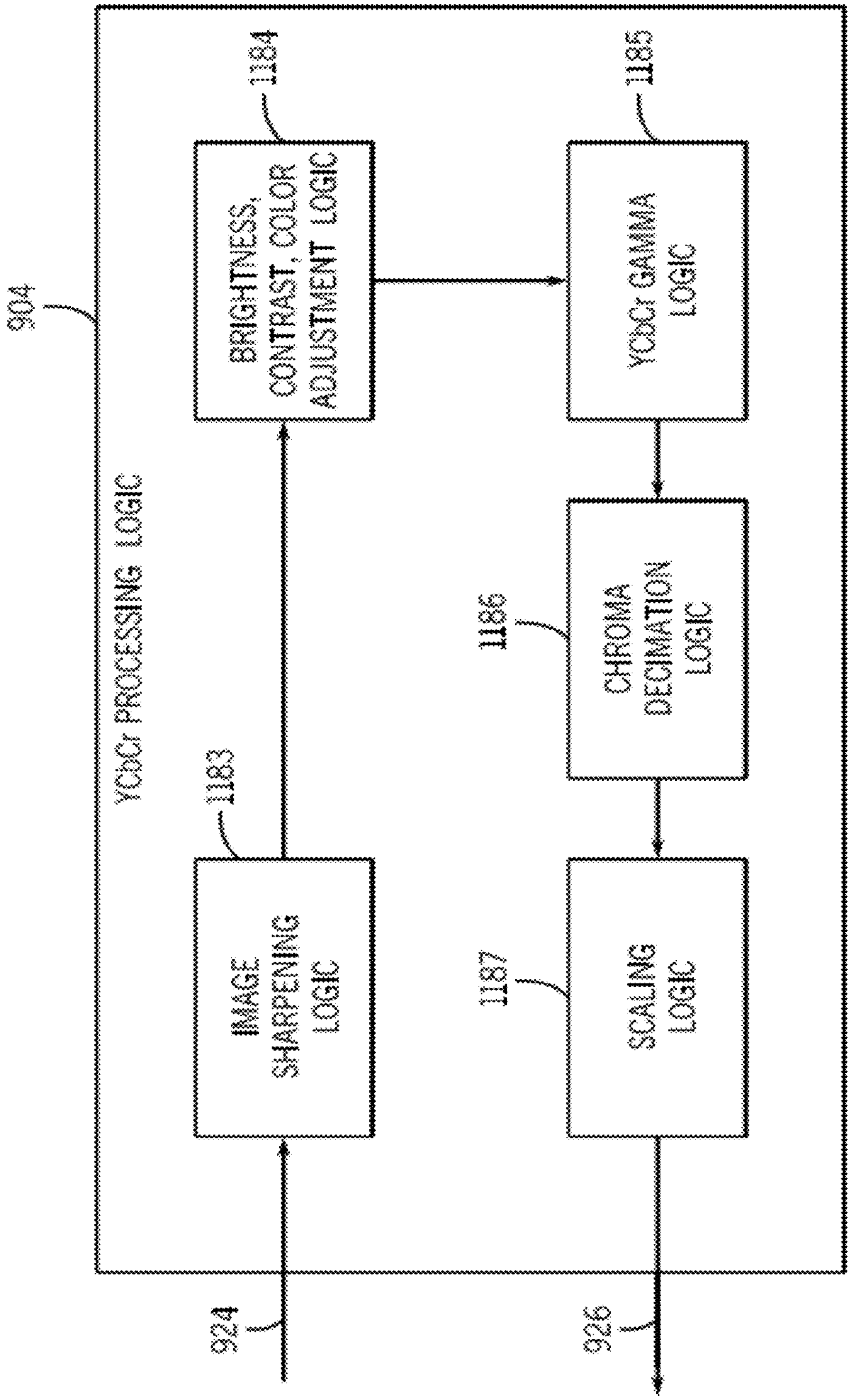
FIG. 126 is a more detailed view showing one embodiment of a YCbCr processing block that may be implemented in the ISP pipe processing logic of FIG. 98, in accordance with aspects of the present disclosure.
Figure 127:
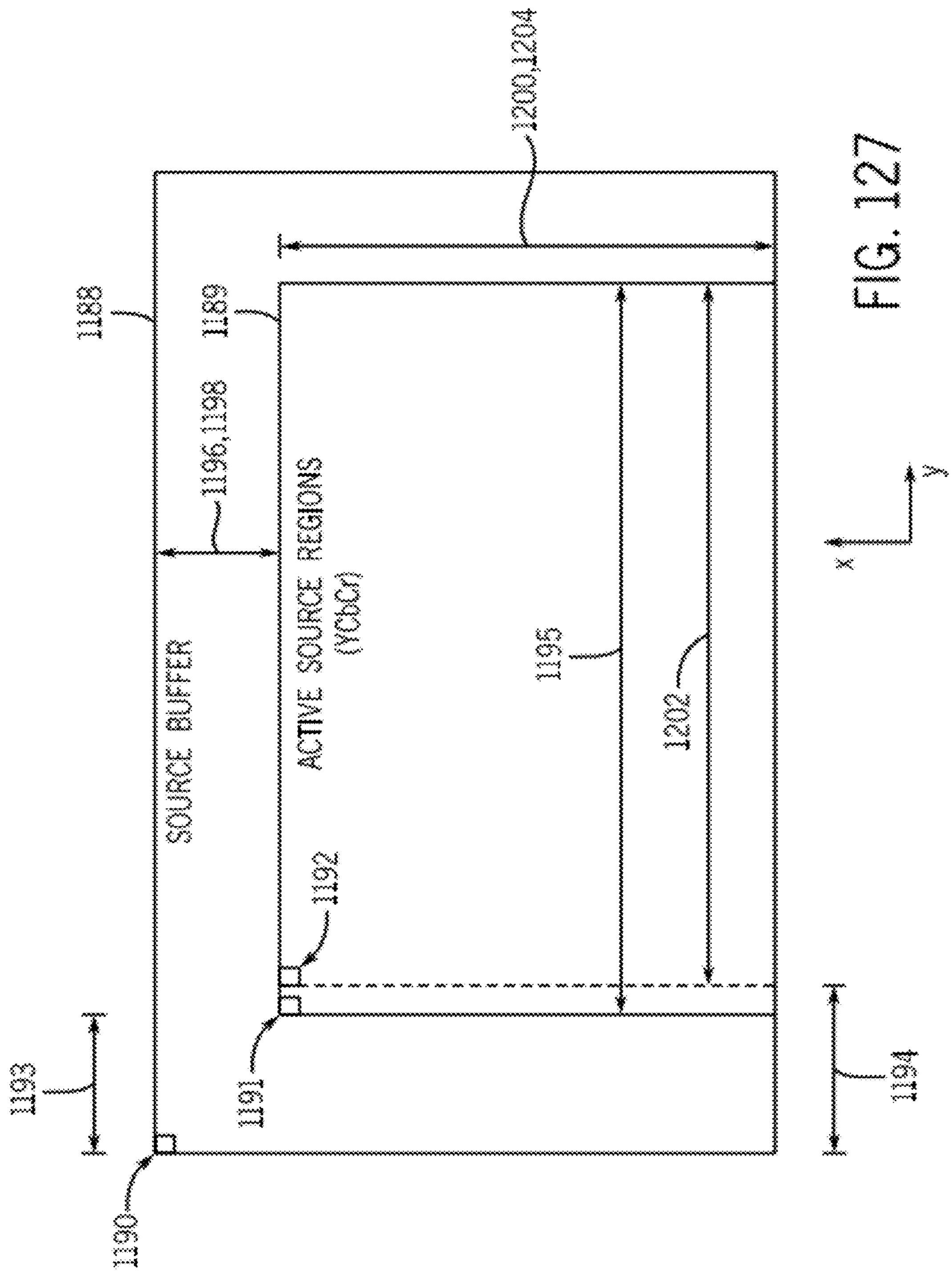
FIG. 127 is a graphical depiction of active source regions for luma and chroma, as defined within a source buffer using a 1-plane format, in accordance with aspects of the present disclosure.

A block diagram depicting a more detailed view of an embodiment of the YCbCr processing logic 904 is illustrated in FIG. 126. As shown, the YCbCr processing logic 904 includes the image sharpening logic 1183, the logic 1184 for adjusting brightness, contrast, and/or color, the YCbCr gamma adjustment logic 1185, the chroma decimation logic 1186, and the scaling logic 1187. The YCbCr processing logic 904 may be configured to process pixel data in 4:4:4, 4:2:2, or 4:2:0 formats using 1-plane, 2-plane, or 3-plane memory configurations. Further, in one embodiment, the YCbCr input signal 924 may provide luma and chroma information as 10-bit values.

As will be appreciated, the reference to 1-plane, 2-plane, or 3-plane refers to the number of imaging planes utilized in picture memory. For instance, in a 3-plane format, each of the Y, Cb, and Cr components may utilize separate respective memory planes. In a 2-plane format, a first plane may be provided for the luma component (Y), and a second plane that interleaves the Cb and Cr samples may be provided for the chroma components (Cb and Cr). In a 1-plane format, a single plane in memory is interleaved with the luma and chroma samples. Further, with regard to the 4:4:4, 4:2:2, and 4:2:0 formats, it may be appreciated that the 4:4:4 format refers to a sampling format in which each of the three YCbCr components are sampled at the same rate. In a 4:2:2 format, the chroma components Cb and Cr are sub-sampled at half the sampling rate of the luma component Y, thus reducing the resolution of chroma components Cb and Cr by half in the horizontal direction. Similarly the 4:2:0 format subs-samples the chroma components Cb and Cr in both the vertical and horizontal directions.

The processing of the YCbCr information may occur within an active source region defined within a source buffer, wherein the active source region contains "valid" pixel data. For example, referring to FIG. 127, a source buffer 1188 having defined therein an active source region 1189 is illustrated. In the illustrated example, the source buffer may represent a 4:4:4 1-plane format providing source pixels of 10-bit values. The active source region 1189 may be specified individually for luma (Y) samples and chroma samples (Cb and Cr). Thus, it should be understood that the active source region 1189 may actually include multiple active source regions for the luma and chroma samples. The start of the active source regions 1189 for luma and chroma may be determined based on an offset from a base address (0,0) 1190 of the source buffer. For instance, a starting position (Lm_X, Lm_Y) 1191 for the luma active source region may be defined by an x-offset 1193 and a y-offset 1196 with respect to the base address 1190. Similarly, a starting position (Ch_X, Ch_Y) 1192 for the chroma active source region may be defined by an x-offset 1194 and a y-offset 1198 with respect to the base address 1190. It should be noted that in the present example, the y-offsets 1196 and 1198 for luma and chroma, respectively, may be equal. Based on the starting position 1191, the luma active source region may be defined by a width 1195 and a height 1200, each of which may represent the number of luma samples in the x and y directions, respectively. Additionally, based on the starting position 1192, the chroma active source region may be defined by a width 1202 and a height 1204, each of which may represent the number of chroma samples in the x and y directions, respectively.

Figure 128:
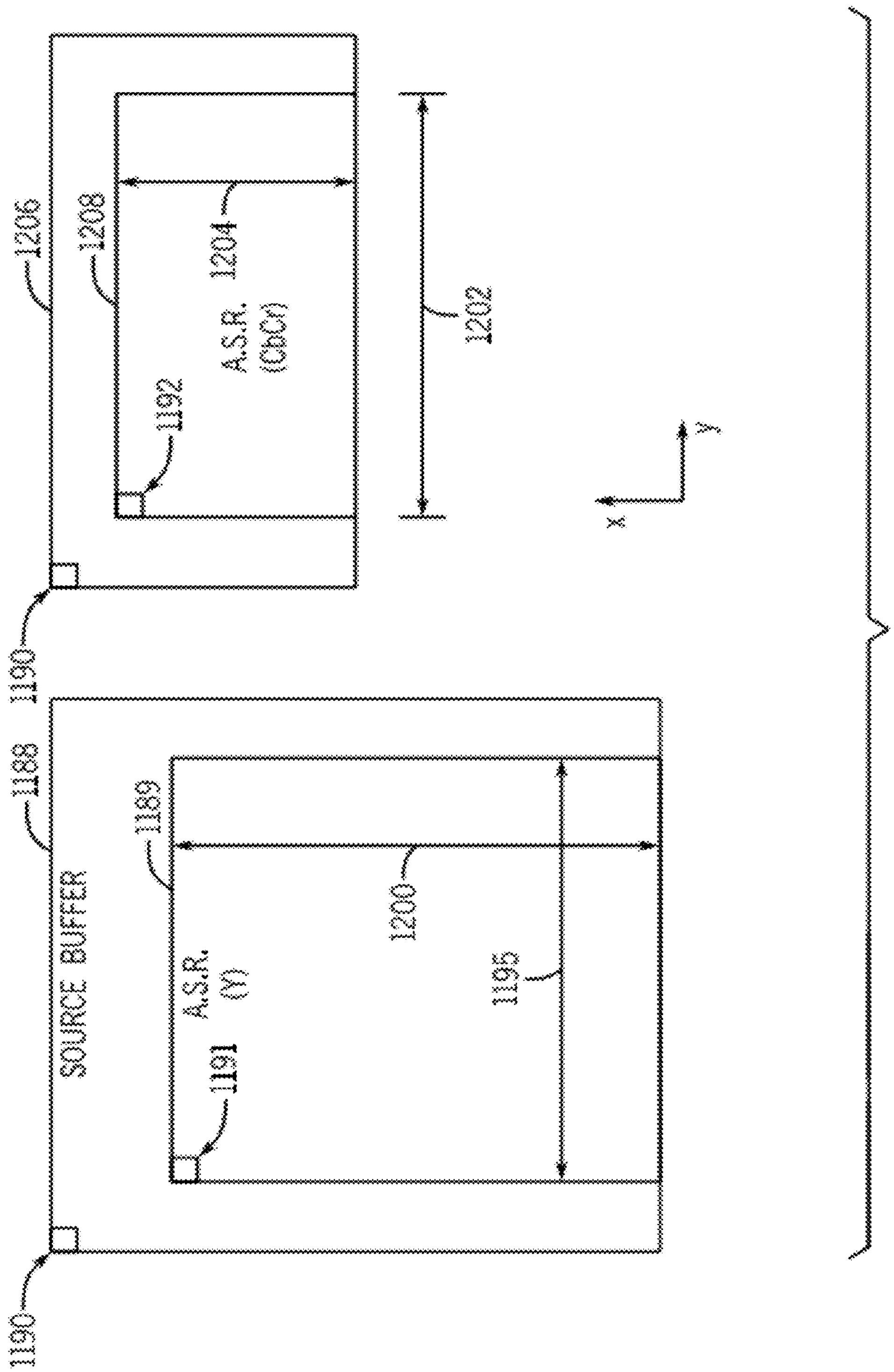
FIG. 128 is a graphical depiction of active source regions for luma and chroma, as defined within a source buffer using a 2-plane format, in accordance with aspects of the present disclosure.

FIG. 128 further provides an example showing how active source regions for luma and chroma samples may be determined in a two-plane format. For instance, as shown, the luma active source region 1189 may be defined in a first source buffer 1188 (having the base address 1190) by the area specified by the width 1195 and height 1200 with respect to the starting position 1191. A chroma active source region 1208 may be defined in a second source buffer 1206 (having the base address 1190) as the area specified by the width 1202 and height 1204 relative to the starting position 1192.

With the above points in mind and referring back to FIG. 126, the YCbCr signal 924 is first received by the image sharpening logic 1183. The image sharpening logic 1183 may be configured to perform picture sharpening and edge enhancement processing to increase texture and edge details in the image. As will be appreciated, image sharpening may improve the perceived image resolution. However, it is generally desirable that existing noise in the image is not detected as texture and/or edges, and thus not amplified during the sharpening process.

In accordance with the present technique, the image sharpening logic 1183 may perform picture sharpening using a multi-scale unsharp mask filter on the luma (Y) component of the YCbCr signal. In one embodiment, two or more low pass Gaussian filters of difference scale sizes may be provided. For example, in an embodiment that provides two Gaussian filters, the output (e.g., Gaussian blurring) of a first Gaussian filter having a first radius (x) is subtracted from the output of a second Gaussian filter having a second radius (y), wherein x is greater than y, to generate an unsharp mask. Additional unsharp masks may also be obtained by subtracting the outputs of the Gaussian filters from the Y input. In certain embodiments, the technique may also provide adaptive coring threshold comparison operations that may be performed using the unsharp masks such that, based upon the results of the comparison(s), gain amounts may be added to a base image, which may be selected as the original Y input image or the output of one of the Gaussian filters, to generate a final output.

Figure 129:
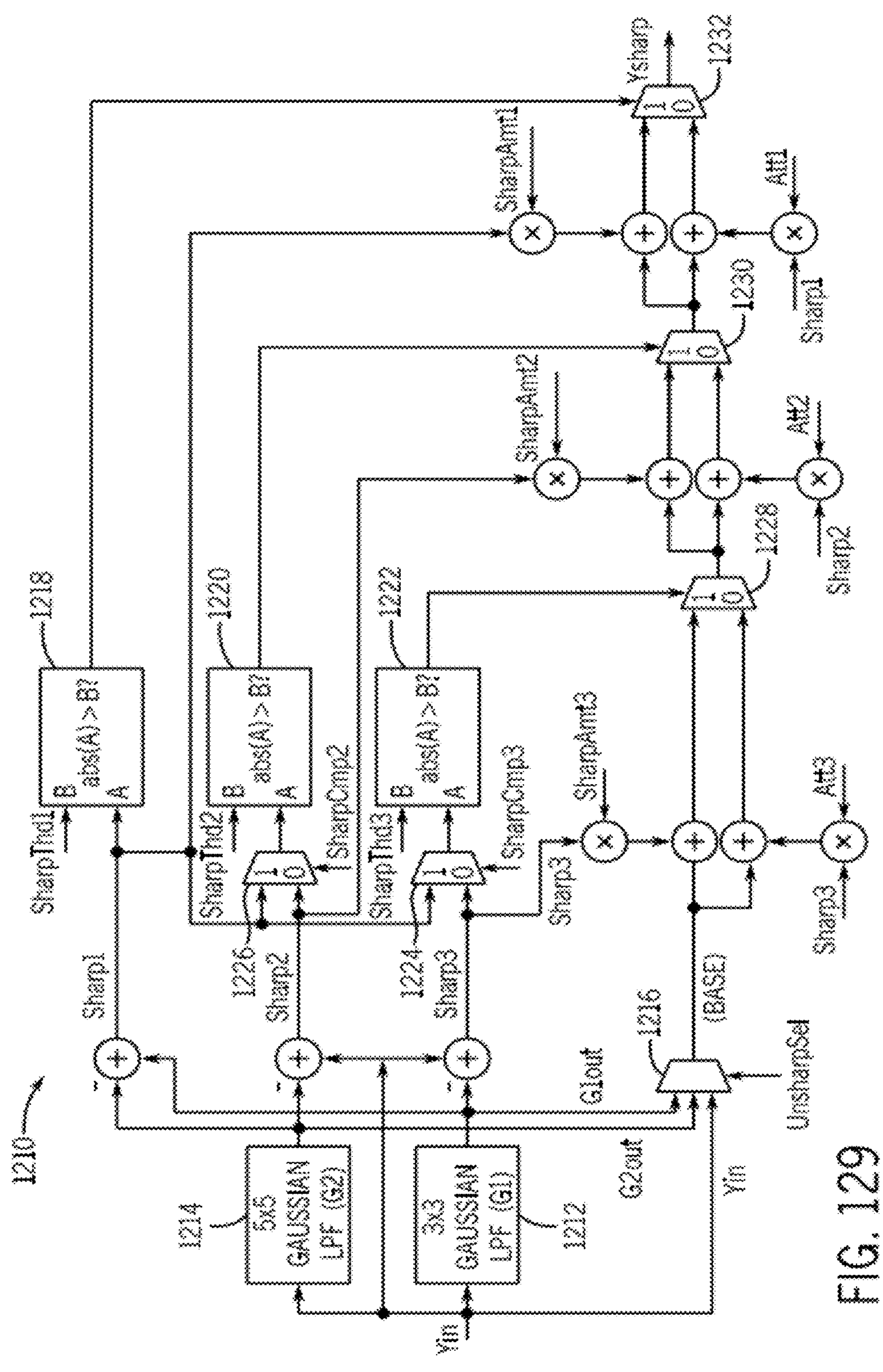
FIG. 129 is a block diagram illustrating image sharpening logic that may be implemented in the YCbCr processing block, as shown in FIG. 126, in accordance with one embodiment.

Referring to FIG. 129, block diagram depicting exemplary logic 1210 for performing image sharpening in accordance with embodiments of the presently disclosed techniques is illustrated. The logic 1210 represents a multi-scale unsharp filtering mask that may be applied to an input luma image Yin. For instance, as shown, Yin is received and processed by two low pass Gaussian filters 1212 (G1) and 1214 (G2). In the present example, the filter 1212 may be a 3×3 filter and the filter 1214 may be a 5×5 filter. It should be appreciated, however, that in additional embodiments, more than two Gaussian filters, including filters of different scales may also be used (e.g., 7×7, 9×9, etc.). As will be appreciated, due to the low pass filtering process, the high frequency components, which generally correspond to noise, may be removed from the outputs of the G1 and G2 to produce "unsharp" images (G1out and G2out). As will be discussed below, using an unsharp input image as a base image allows for noise reduction as part of the sharpening filter.

The 3×3 Gaussian filter 1212 and the 5×5 Gaussian filter 1214 may be defined as shown below:

$$G1 = \frac{\begin{bmatrix} G1_1 & G1_1 & G1_1 \\ G1_1 & G1_0 & G1_1 \\ G1_1 & G1_1 & G1_1 \end{bmatrix}}{256} \quad G2 = \frac{\begin{bmatrix} G2_2 & G2_2 & G2_2 & G2_2 & G2_2 \\ G2_2 & G2_1 & G2_1 & G2_1 & G2_2 \\ G2_2 & G2_1 & G2_0 & G2_1 & G2_2 \\ G2_2 & G2_1 & G2_1 & G2_1 & G2_2 \\ G2_2 & G2_2 & G2_2 & G2_2 & G2_2 \end{bmatrix}}{256}$$

By way of example only, the values of the Gaussian filters G1 and G2 may be selected in one embodiment as follows:

$$G1 = \frac{\begin{bmatrix} 28 & 28 & 28 \\ 28 & 32 & 28 \\ 28 & 28 & 28 \end{bmatrix}}{256} \quad G2 = \frac{\begin{bmatrix} 9 & 9 & 9 & 9 & 9 \\ 9 & 12 & 12 & 12 & 9 \\ 9 & 12 & 16 & 12 & 9 \\ 9 & 12 & 12 & 12 & 9 \\ 9 & 9 & 9 & 9 & 9 \end{bmatrix}}{256}$$

Based on Yin, G1out, and G2out, three unsharp masks, Sharp1, Sharp2, and Sharp3, may be generated. Sharp1 may be determined as the unsharp image G2out of the Gaussian filter 1214 subtracted from the unsharp image G1out of the Gaussian filter 1212. Because Sharp1 is essentially the difference between two low pass filters, it may be referred to as a "mid band" mask, since the higher frequency noise components are already filtered out in the G1out and G2out unsharp images. Additionally, Sharp2 may be calculated by subtracting G2out from the input luma image Yin, and Sharp3 may be calculated by subtracting G1out from the input luma image Yin. As will be discussed below, an adaptive threshold coring scheme may be applied using the unsharp masks Sharp1, Sharp2, and Sharp3.

Referring to the selection logic 1216, a base image may be selected based upon a control signal UnsharpSel. In the illustrated embodiment, the base image may be either the input image Yin, or the filtered outputs G1out or G2out. As will be appreciated, when an original images has a high noise variance (e.g., almost as high as the signal variance), using the original image Yin as the base image in sharpening may not sufficiently provide for reduction of the noise components during sharpening. Accordingly, when a particular threshold of noise content is detected in the input image, the selection logic 1216 may be adapted to select one of the low pass filtered outputs G1out or G2out from which high frequency content, which may include noise, has been reduced. In one embodiment, the value of the control signal UnsharpSel may be determined by analyzing statistical data acquired during statistics processing in the ISP front-end block 80 to determine the noise content of the image. By way of example, if the input image Yin has a low noise content, such that the appearance noise will likely not increase as a result of the sharpening process, the input image Yin may be selected as the base image (e.g., UnsharpSel=0). If the input image Yin is determined to contain a noticeable level of noise, such that the sharpening process may amplify the noise, one of the filtered images G1out or G2out may be selected (e.g., UnsharpSel=1 or 2, respectively). Thus, by applying an adaptive technique for selecting a base image, the logic 1210 essentially provides a noise reduction function.

Next, gains may be applied to one or more of the Sharp1, Sharp2, and Sharp3 masks in accordance with an adaptive coring threshold scheme, as described below. Next, the unsharp values Sharp1, Sharp2, and Sharp3 may be compared to various thresholds SharpThd1, SharpThd2, and SharpThd3 (not necessarily respectively) by way of the comparator blocks 1218, 1220, and 1222. For instance, Sharp1 value is always compared to SharpThd1 at the comparator block 1218. With respective to the comparator block 1220, the threshold SharpThd2 may be compared against either Sharp1 or Sharp2, depending upon the selection logic 1226. For instance, the selection logic 1226 may select Sharp1 or Sharp2 depending on the state of a control signal SharpCmp2 (e.g., SharpCmp2=1 selects Sharp1; SharpCmp2=0 selects Sharp2). For example, in one embodiment, the state of SharpCmp2 may be determined depending on the noise variance/content of the input image (Yin).

In the illustrated embodiment, it is generally preferable to set the SharpCmp2 and SharpCmp3 values to select Sharp1, unless it is detected that the image data has relatively low amounts of noise. This is because Sharp1, being the difference between the outputs of the Gaussian low pass filters G1 and G2, is generally less sensitive to noise, and thus may help reduce the amount to which SharpAmt1, SharpAmt2, and SharpAmt3 values vary due to noise level fluctuations in "noisy" image data. For instance, if the original image has a high noise variance, some of the high frequency components may not be caught when using fixed thresholds and, thus, may be amplified during the sharpening process. Accordingly, if the noise content of the input image is high, then some of the noise content may be present in Sharp2. In such instances, SharpCmp2 may be set to 1 to select the mid-band mask Sharp1 which, as discussed above, has reduced high frequency content due to being the difference of two low pass filter outputs and is thus less sensitive to noise.

As will be appreciated, a similar process may be applied to the selection of either Sharp1 or Sharp3 by the selection logic 1224 under the control of SharpCmp3. In one embodiment, SharpCmp2 and SharpCmp3 may be set to 1 by default (e.g., use Sharp1), and set to 0 only for those input images that are identified as having generally low noise variances. This essentially provides an adaptive coring threshold scheme in which the selection of the comparison value (Sharp1, Sharp2, or Sharp3) is adaptive based upon the noise variance of an input image.

Based on the outputs of the comparator blocks 1218, 1220, and 1222, the sharpened output image Ysharp may be determined by applying gained unsharp masks to the base image (e.g., selected via logic 1216). For instance, referring first to the comparator block 1222, SharpThd3 is compared to the B-input provided by selection logic 1224, which shall be referred to herein as "SharpAbs," and may be equal to either Sharp1 or Sharp3 depending on the state of SharpCmp3. If SharpAbs is greater than the threshold SharpThd3, then a gain SharpAmt3 is applied to Sharp3, and the resulting value is added to the base image. If SharpAbs is less than the threshold SharpThd3, then an attenuated gain Att3 may be applied. In one embodiment, the attenuated gain Att3 may be determined as follows:

$$Att3 = \frac{SharpAmt3 \times SharpAbs}{SharpThd3} \tag{104}$$

wherein, SharpAbs is either Sharp1 or Sharp3, as determined by the selection logic 1224. The selection of the based image summed with either the full gain (SharpAmt3) or the attenuated gain (Att3) is performed by the selection logic 1228 based upon the output of the comparator block 1222. As will be appreciated, the use of an attenuated gain may address situations in which SharpAbs is not greater than the threshold (e.g., SharpThd3), but the noise variance of the image is nonetheless close to the given threshold. This may help to reduce noticeable transitions between a sharp and an unsharp pixel. For instance, if the image data is passed without the attenuated gain in such circumstance, the resulting pixel may appear as a defective pixel (e.g., a stuck pixel).

Next, a similar process may be applied with respect to the comparator block 1220. For instance, depending on the state of SharpCmp2, the selection logic 1226 may provide either Sharp1 or Sharp2 as the input to the comparator block 1220 that is compared against the threshold SharpThd2. Depending on the output of the comparator block 1220, either the gain SharpAmt2 or an attenuated gain based upon SharpAmt2, Att2, is applied to Sharp2 and added to the output of the selection logic 1228 discussed above. As will be appreciated, the attenuated gain Att2 may be computed in a manner similar to Equation 104 above, except that the gain SharpAmt2 and the threshold SharpThd2 are applied with respect to SharpAbs, which may be selected as Sharp1 or Sharp2.

Thereafter, a gain SharpAmt1 or an attenuated gain Att1 is applied to Sharp1, and the resulting value is summed with output of the selection logic 1230 to produce the sharpened pixel output Ysharp (from selection logic 1232). The selection of applying either the gain SharpAmt1 or attenuated gain Att1 may be determined based upon the output of the comparator block 1218, which compares Sharp1 against the threshold SharpThd1. Again, the attenuated gain Att1 may be determined in a manner similar to Equation 104 above, except that the gain SharpAmt1 and threshold SharpThd1 are applied with respect to Sharp1. The resulting sharpened pixel values scaled using each of the three masks is added to the input pixel Yin to generate the sharpened output Ysharp which, in one embodiment, may be clipped to 10 bits (assuming YCbCr processing occurs at 10-bit precision).

As will be appreciated, when compared to conventional unsharp masking techniques, the image sharpening techniques set forth in this disclosure may provide for improving the enhancement of textures and edges while also reducing noise in the output image. In particular, the present techniques may be well-suited in applications in which images captured using, for example, CMOS image sensors, exhibit poor signal-to-noise ratio, such as images acquired under low lighting conditions using lower resolution cameras integrated into portable devices (e.g., mobile phones). For instance, when the noise variance and signal variance are comparable, it is difficult to use a fixed threshold for sharpening, as some of the noise components would be sharpened along with texture and edges. Accordingly, the techniques provided herein, as discussed above, may filter the noise from the input image using multi-scale Gaussian filters to extract features from the unsharp images (e.g., G1out and G2out) in order to provide a sharpened image that also exhibits reduced noise content.

Before continuing, it should be understood that the illustrated logic 1210 is intended to provide only one exemplary embodiment of the present technique. In other embodiments, additional or fewer features may be provided by the image sharpening logic 1183. For instance, in some embodiments, rather than applying an attenuated gain, the logic 1210 may simply pass the base value. Additionally, some embodiments may not include the selection logic blocks 1224, 1226, or 1216. For instance, the comparator blocks 1220 and 1222 may simply receive the Sharp2 and Sharp3 values, respectively, rather than a selection output from the selection logic blocks 1224 and 1226, respectively. While such embodiments may not provide for sharpening and/or noise reduction features that are as robust as the implementation shown in FIG. 129, it should be appreciated that such design choices may be the result of cost and/or business related constraints.

Figure 130:
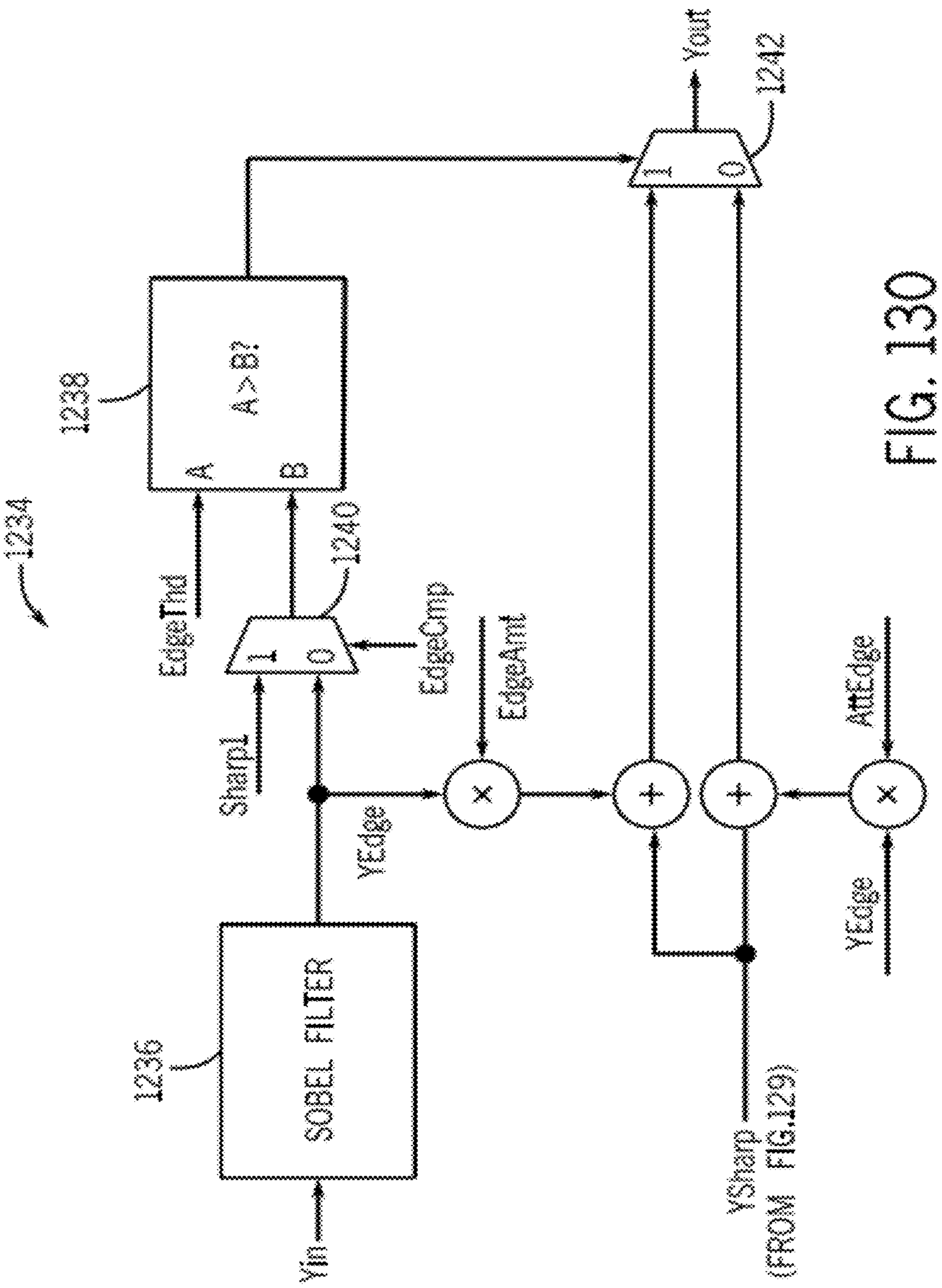
FIG. 130 is a block diagram illustrating edge enhancement logic that may be implemented in the YCbCr processing block, as shown in FIG. 126, in accordance with one embodiment.

In the present embodiment, the image sharpening logic 1183 may also provide for edge enhancement and chroma suppression features once the sharpened image output YSharp is obtained. Each of these additional features will now be discussed below. Referring first to FIG. 130, exemplary logic 1234 for performing edge enhancement that may be implemented downstream from the sharpening logic 1210 of FIG. 129 is illustrated in accordance with one embodiment. As shown, the original input value Yin is processed by a Sobel filter 1236 for edge detection. The Sobel filter 1236 may determine a gradient value YEdge based upon a 3×3 pixel block (referred to as "A" below) of the original image, with Yin being the center pixel of the 3×3 block. In one embodiment, the Sobel filter 1236 may calculate YEdge by convolving the original image data to detect changes in horizontal and vertical directions. This process is shown below in Equations 105-107.

$$S_x = \begin{bmatrix} 1 & 0 & -1 \\ 2 & 0 & -2 \\ 1 & 0 & -1 \end{bmatrix} S_y = \begin{bmatrix} 1 & 2 & 1 \\ 0 & 0 & 0 \\ -1 & -2 & -1 \end{bmatrix} G_x = S_x \times A, \tag{105}$$

$$G_y = S_y \times A, \tag{106}$$

$$YEdge = G_x \times G_y, \tag{107}$$

wherein $S_x$ and $S_y$, are represent matrix operators for gradient edge-strength detection in the horizontal and vertical directions, respectively, and wherein $G_x$ and $G_y$ represent gradient images that contain horizontal and vertical change derivatives, respectively. Accordingly, the output YEdge is determined as the product of $G_x$ and $G_y$.

YEdge is then received by selection logic 1240 along with the mid-band Sharp1 mask, as discussed above in FIG. 129. Based on the control signal EdgeCmp, either Sharp1 or YEdge is compared to a threshold, EdgeThd, at the comparator block 1238. The state of EdgeCmp may be determined, for example, based upon the noise content of an image, thus providing an adaptive coring threshold scheme for edge detection and enhancement. Next, the output of the comparator block 1238 may be provided to the selection logic 1242 and either a full gain or an attenuated gain may be applied. For instance, when the selected B-input to the comparator block 1238 (Sharp1 or YEdge) is above EdgeThd, YEdge is multiplied by an edge gain, EdgeAmt, to determine the amount of edge enhancement that is to be applied. If the B-input at the comparator block 1238 is less than EdgeThd, then an attenuated edge gain, AttEdge, may be applied to avoid noticeable transitions between the edge enhanced and original pixel. As will be appreciated, AttEdge may be calculated in a similar manner as shown in Equation 104 above, but wherein EdgeAmt and EdgeThd are applied to "SharpAbs," which may be Sharp1 or YEdge, depending on the output of the selection logic 1240. Thus, the edge pixel, enhanced using either the gain (EdgeAmt) or the attenuated gain (AttEdge) may be added to YSharp (output of logic 1210 of FIG. 129) to obtain the edge-enhanced output pixel Yout which, in one embodiment, may be clipped to 10 bits (assuming YCbCr processing occurs at 10-bit precision).

Figure 131:
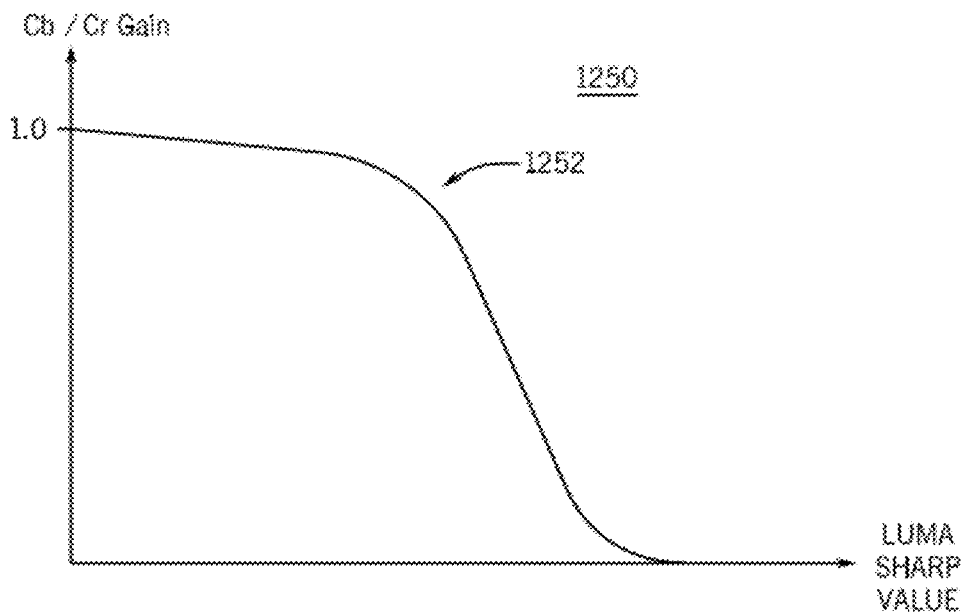
FIG. 131 is a graph showing the relationship of chroma attenuation factors to sharpened luma values, in accordance with aspects of the present disclosure.

With regard to chroma suppression features provided by the image sharpening logic 1183, such features may attenuate chroma at luma edges. Generally, chroma suppression may be performed by applying a chroma gain (attenuation factor) of less than 1 depending on the value (YSharp, Yout) obtained from the luma sharpening and/or edge enhancement steps discussed above. By way of example, FIG. 131 shows a graph 1250 that includes a curve 1252 representing chroma gains that may be selected for corresponding sharpened luma values (YSharp). The data represented by the graph 1250 may be implemented as a lookup table of YSharp values and corresponding chroma gains between 0 and 1 (an attenuation factor). The lookup tables are used to approximate the curve 1252. For YSharp values that are co-located between two attenuation factors in the lookup table, linear interpolation may be applied to the two attenuation factors corresponding to YSharp values above and below the current YSharp value. Further, in other embodiments, the input luma value may also be selected as one of the Sharp1, Sharp2, or Sharp3 values determined by the logic 1210, as discussed above in FIG. 129, or the YEdge value determined by the logic 1234, as discussed in FIG. 130.

Figure 132:
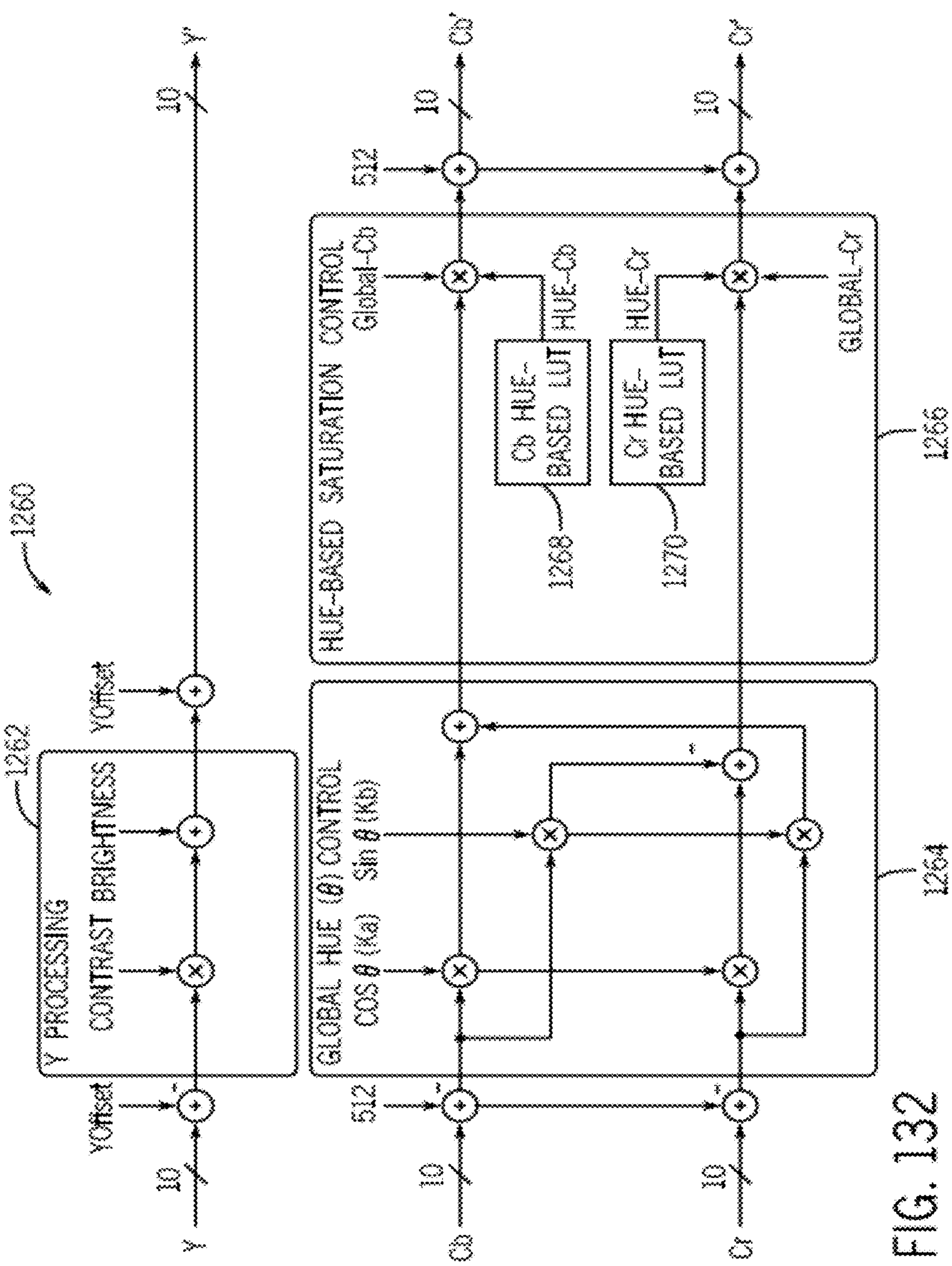
FIG. 132 is a block diagram illustrating image brightness, contrast, and color (BCC) adjustment logic that may be implemented in the YCbCr processing block, as shown in FIG. 126, in accordance with one embodiment.
Figure 133:
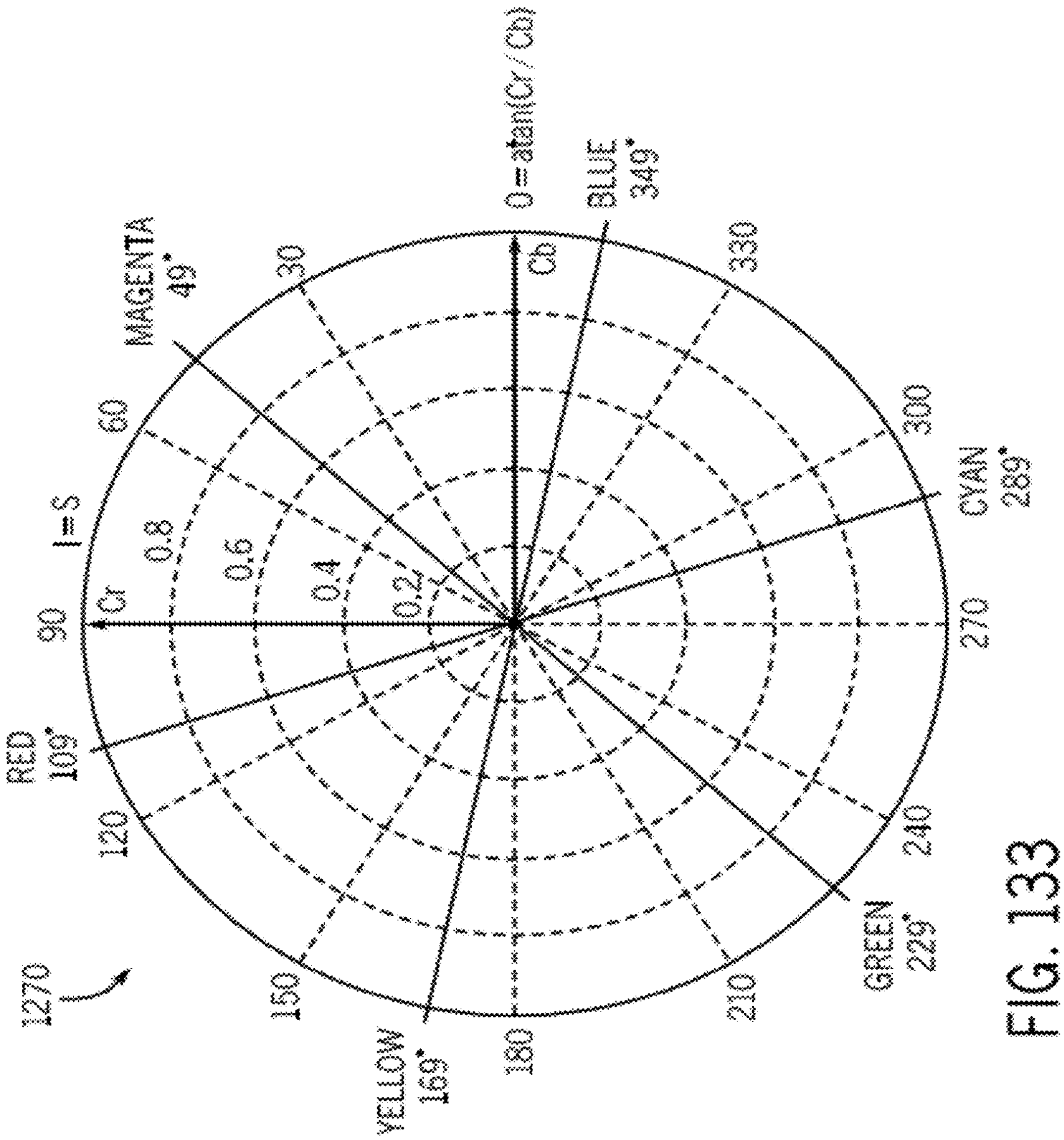
FIG. 133 shows a hue and saturation color wheel in the YCbCr color space defining various hue angles and saturation values that may be applied during color adjustment in the BCC adjustment logic shown in FIG. 132.

Next, the output of the image sharpening logic 1183 (FIG. 126) is processed by the brightness, contrast, and color (BCC) adjustment logic 1184. A functional block diagram depicting an embodiment of the BCC adjustment logic 1184 is illustrated in FIG. 132. As shown the logic 1184 includes a brightness and contrast processing block 1262, global hue control block 1264, and a saturation control block 1266. The presently illustrated embodiment provides for processing of the YCbCr data in 10-bit precision, although other embodiments may utilize different bit-depths. The functions of each of blocks 1262, 1264, and 1266 are discussed below.

Referring first to the brightness and contrast processing block 1262, an offset, YOffset, is first subtracted from the luma (Y) data to set the black level to zero. This is done to ensure that the contrast adjustment does not alter the black levels. Next, the luma value is multiplied by a contrast gain value to apply contrast control. By way of example, the contrast gain value may be a 12-bit unsigned with 2 integer bits and 10 fractional bits, thus providing for a contrast gain range of up to 4 times the pixel value. Thereafter, brightness adjustment may be implemented by adding (or subtracting) a brightness offset value from the luma data. By way of example, the brightness offset in the present embodiment may be a 10-bit two's complement value having a range of between −512 to +512. Further, it should be noted that brightness adjustment is performed subsequent to contrast adjustment in order to avoid varying the DC offset when changing contrast. Thereafter, the initial YOffset is added back to the adjusted luma data to re-position the black level.

Blocks 1264 and 1266 provide for color adjustment based upon hue characteristics of the Cb and Cr data. As shown, an offset of 512 (assuming 10-bit processing) is first subtracted from the Cb and Cr data to position the range to approximately zero. The hue is then adjusted in accordance with the following equations:

$$Cb_{adj}=Cb\cos(\theta)+Cr\sin(\theta), \quad (108)$$

$$Cr_{adj}=Cr\cos(\theta)-Cb\sin(\theta), \quad (109)$$

wherein $Cb_{adj}$ and $Cr_{adj}$ represent adjusted Cb and Cr values, and wherein θ represents a hue angle, which may be calculated as follows:

$$\theta=\arctan\left(\frac{Cr}{Cb}\right) \quad (110)$$

The above operations are depicted by the logic within the global hue control block 1264, and may be represented by the following matrix operation:

$$\begin{bmatrix} Cb_{adj} \\ Cr_{adj} \end{bmatrix} = \begin{bmatrix} Ka & Kb \\ -Kb & Ka \end{bmatrix} \begin{bmatrix} Cb \\ Cr \end{bmatrix}, \quad (111)$$

wherein, Ka=cos(θ), Kb=sin(θ), and θ is defined above in Equation 110.

Next, saturation control may be applied to the $Cb_{adj}$ and $Cr_{adj}$ values, as shown by the saturation control block 1266. In the illustrated embodiment, saturation control is performed by applying a global saturation multiplier and a hue-based saturation multiplier for each of the Cb and Cr values. Hue-based saturation control may improve the reproduction of colors. The hue of the color may be represented in the YCbCr color space, as shown by the color wheel graph 1270 in FIG. 133. As will be appreciated, the YCbCr hue and saturation color wheel 1270 may be derived by shifting the identical color wheel in the HSV color space (hue, saturation, and intensity) by approximately 109 degrees. As shown, the graph 1270 includes circumferential values representing the saturation multiplier (S) within a range of 0 to 1, as well as angular values representing θ, as defined above, within a range of between 0 to 360°. Each θ may represent a different color (e.g., 49°=magenta, 109°=red, 229°=green, etc.). The hue of the color at a particular hue angle θ may be adjusted by selecting an appropriate saturation multiplier S.

Referring back to FIG. 132, the hue angle θ (calculated in the global hue control block 1264) may be used as an index for a Cb saturation lookup table 1268 and a Cr saturation lookup table 1269. In one embodiment, the saturation lookup tables 1268 and 1269 may contain 256 saturation values distributed evenly in the hue range from 0-360° (e.g., the first lookup table entry is at 0° and the last entry is at 360°) and the saturation value S at a given pixel may be determined via linear interpolation of saturation values in the lookup table just below and above the current hue angle θ. A final saturation value for each of the Cb and Cr components is obtained by multiplying a global saturation value (which may be a global constant for each of Cb and Cr) with the determined hue-based saturation value. Thus, the final corrected Cb' and Cr' values may be determined by multiplying $Cb_{adj}$ and $Cr_{adj}$ with their respective final saturation values, as shown in the hue-based saturation control block 1266.

Thereafter, the output of the BCC logic 1184 is passed to the YCbCr gamma adjustment logic 1185, as shown in FIG. 126. In one embodiment, the gamma adjustment logic 1185 may provide non-linear mapping functions for the Y, Cb and Cr channels. For instance, the input Y, Cb, and Cr values are mapped to corresponding output values. Again, assuming that the YCbCr data is processed in 10-bits, an interpolated 10-bit 256 entry lookup table may be utilized. Three such lookup tables may be provided with one for each of the Y, Cb, and Cr channels. Each of the 256 input entries may be evenly distributed and, an output may be determined by linear interpolation of the output values mapped to the indices just above and below the current input index. In some embodiments, a non-interpolated lookup table having 1024 entries (for 10-bit data) may also be used, but may have significantly greater memory requirements. As will be appreciated, by adjusting the output values of the lookup tables, the YCbCr gamma adjustment function may be also be used to perform certain image filter effects, such as black and white, sepia tone, negative images, solarization, and so forth.

Next, chroma decimation may be applied by the chroma decimation logic 1186 to the output of the gamma adjustment logic 1185. In one embodiment, the chroma decimation logic 1186 may be configured to perform horizontal decimation to convert the YCbCr data from a 4:4:4 format to a 4:2:2 format, in which the chroma (Cr and Cr) information is sub-sampled at half rate of the luma data. By way of example only, decimation may be performed by applying a 7-tap low pass filter, such as a half-band lanczos filter, to a set of 7 horizontal pixels, as shown below:

$$Out=C0\times in(i-3)+C1\times in(i-2)+C2\times in(i-1)+C3\times in(i)+C4\times in(i+1)+C5\times in(i+2)+C6\times in(i+3)/512, \quad (112)$$

wherein in(i) represents the input pixel (Cb or Cr), and C0-C6 represent the filtering coefficients of the 7-tap filter. Each input pixel has an independent filter coefficient (C0-C6) to allow flexible phase offset for the chroma filtered samples.

Further, chroma decimation may, in some instances, also be performed without filtering. This may be useful when the source image was originally received in 4:2:2 format, but was up-sampled to 4:4:4 format for YCbCr processing. In this case, the resulting decimated 4:2:2 image is identical to the original image.

Subsequently, the YCbCr data output from the chroma decimation logic 1186 may be scaled using the scaling logic 1187 prior to being output from the YCbCr processing block 904. The function of the scaling logic 1187 may be similar to the functionality of the scaling logic 709, 710 in the binning compensation filter 652 of the front-end pixel processing unit 150, as discussed above with reference to FIG. 59. For instance, the scaling logic 1187 may perform horizontal and vertical scaling as two steps. In one embodiment, a 5-tap polyphase filter may be used for vertical scaling, and a 9-tap polyphase filter may be used for horizontal scaling. The multi-tap polyphase filters may multiply pixels selected from the source image by a weighting factor (e.g., filter coefficient), and then sum the outputs to form the destination pixel. The selected pixels may be chosen depending on the current pixel position and the number of filters taps. For instance, with a vertical 5-tap filter, two neighboring pixels on each vertical side of a current pixel may be selected and, with a horizontal 9-tap filter, four neighboring pixels on each horizontal side of the current pixel may be selected. The filtering coefficients may be provided from a lookup table, and may be determined by the current between-pixel fractional position. The output 926 of the scaling logic 1187 is then output from the YCbCr processing block 904.

Returning back to FIG. 98, the processed output signal 926 may be sent to the memory 108, or, in accordance with the embodiment of the image processing circuitry 32 shown in FIG. 7, may be output from the ISP pipe processing logic 82 as the image signal 114 to display hardware (e.g., display 28) for viewing by a user, or to a compression engine (e.g., encoder 118). In some embodiments, the image signal 114 may be further processed by a graphics processing unit and/or a compression engine and stored before being decompressed and provided to a display. Additionally, one or more frame buffers may also be provided to control the buffering of the image data being output to a display, particularly with respect to video image data. Further, in an embodiment where the ISP back-end processing logic 120 is provided (e.g., FIG. 8), the image signal 114 may be sent downstream for additional post-processing steps, as will be discussed in the following section.

The ISP Back-End Processing Logic

Having described the ISP front-end logic 80 and ISP pipeline 82 in detail above, the present discussion will now shift focus to the ISP back-end processing logic 120, which is depicted above in FIG. 8. As discussed above, the ISP back-end logic 120 generally functions to receive processed image data provided by the ISP pipeline 82 or from memory 108 (signal 124), and to perform additional image post-processing operations, i.e., prior to outputting the image data to the display device 28.

A block diagram showing an embodiment of the ISP back-end logic 120 is depicted in FIG. 134. As illustrated, the ISP back-end processing logic 120 may include feature detection logic 2200, local tone mapping logic (LTM) 2202, brightness, contrast, and color adjustment logic 2204, scaling logic 2206, and a back-end statistics unit 2208. The feature detection logic 2200 may include face detection logic in one embodiment, and may be configured to identify the location(s) of faces/facial features in an image frame, shown here by reference number 2201. In other embodiments, the feature detection logic 2200 may also be configured to detect the locations of other types of features, such as corners of objects in the image frame. For example, this data may be used to identify the location of features in consecutive image frames in order to determine an estimation of global motion between frames, which may then be used to perform certain image processing operations, such as image registration. In one embodiment, the identification of corner features and the like may be particularly useful for algorithms that combine multiple image frames, such as in certain high dynamic range (HDR) imaging algorithms, as well as certain panoramic stitching algorithms.

For simplicity, the feature detection logic 2200 will be referred to in the description below as being face detection logic. It should be understood, however, that the logic 2200 is not intended limited to just face detection logic, and may be configured to detect other types of features instead of or in addition to facial features. For instance, in one embodiment, the logic 2200 may detect corner features, as discussed above, and the output 2201 of the feature detection logic 2200 may include corner features.

The face detection logic 2200 may be configured to receive YCC image data 114 provided by the ISP pipeline 82 or may receive a reduced resolution image (represented by signal 2207) from the scaling logic 2206, and to detect the location and positions of faces and/or facial features within the image frame corresponding to the selected image data. As shown in FIG. 134, the input to the face detection logic 2200 may include a selection circuit 2196 that receives the YCC image data 114 from the ISP pipeline 82 and the reduced resolution image 2207 from the scaling logic 2206. A control signal, which may be provided by the ISP control logic 84 (e.g., a processor executing firmware), may determine which input is provided to the face detection logic 2200.

The detected location of faces/facial features, represented here by signal 2201, may be provided as feedback data to one or more upstream processing units, as well as one or more downstream units. By way of example, the data 2201 may represent locations in which faces or facial features appear within the present image frame. In some embodiments, the data 2201 may include a reduced resolution transform image, which may provide additional information for face detection. Further, the face detection logic 2200, in some embodiments, may utilize a facial detection algorithm, such as the Viola-Jones facial/object detection algorithm, or may utilize any other algorithm, transform, or pattern detection/matching techniques suitable for the detection of facial features in an image.

In the illustrated embodiment, the face detection data 2201 may be fed back to control logic 84, which may represent a processor executing firmware for controlling the image processing circuitry 32. The control logic 84, in one embodiment, may provide the data 2201 to the front-end statistics control loop (e.g., including the front-end statistics processing units (142 and 144) of the ISP front-end 80 logic of FIG. 10), whereby the statistics processing units 142 or 144 may utilize the feedback data 2201 to position the appropriate window(s) and/or select particular tiles for auto-white balance, auto-exposure, and auto-focus processing. As will be appreciated, improving the color and/or tone accuracy for areas of an image that contain facial features may result in an image that appears more aesthetically pleasing to a viewer. As will be discussed further below, the data 2201 may also be provided to the LTM logic 2202, the back-end statistics unit 2208, as well as to the encoder/decoder block 118.

The LTM logic 2202 may also receive the YCC image data 114 from the ISP pipeline 82. As discussed above, the LTM logic 2202 may be configured to apply tone mapping to the image data 114. As will be appreciated, tone mapping techniques may be utilized in image processing applications to map one set of pixel values to another. In instances where the input and output images have the same bit precision, tone mapping may not be necessary, although some embodiments may apply tone mapping without compression in order to improve contrast characteristics in the output image (e.g., to make bright areas appear darker and dark areas appear brighter). However, when the input and output images have different bit precisions, tone mapping may be applied to map the input image values to corresponding values of the output range of the input image. For instance, scenes may have a dynamic range of 25,000:1 or more, while compression standards may allow for a much lower range (e.g., 256:1) for display purposes, and sometimes an even lower range (e.g., 100:1) for printing.

Thus, by way of example only, tone mapping may be useful in a situation, such as when image data expressed as to a precision of 10-bits or more is to be output in a lower precision format, such as an 8-bit JPEG image. Additionally, tone mapping may be particularly useful when applied to high dynamic range (HDR) images. In digital image processing, HDR images may be generated by acquiring multiple images of a scene at different exposure levels and combining or compositing the images to generate an image that has a dynamic range which is higher than can be achieved using a single exposure. Further, in some imaging systems, an image sensor (e.g., sensor 90*a*, 90*b*) may be configured to acquire HDR images without the need for combining multiple images to generate a composite HDR image.

The LTM logic 2202 of the illustrated embodiment may utilize local tone mapping operators (e.g., spatially varying), which may be determined based on local features within the image frame. For instance, local tone mapping operators may be region-based, and may change locally based on the content within a particular region of the image frame. By way of example only, local tone mapping operators may be based on gradient domain HDR compression, photographic tone reproduction, or Retinex® image processing.

Figure 135:
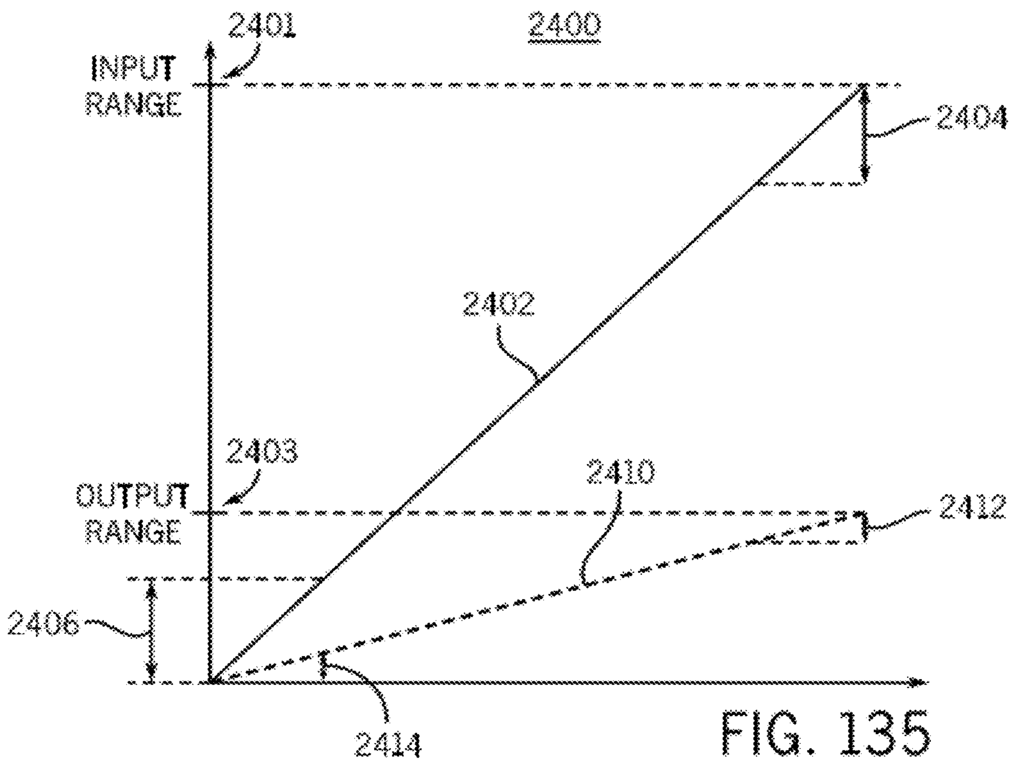
FIG. 135 is a graphical illustration showing a conventional global tone mapping technique.
Figure 136:
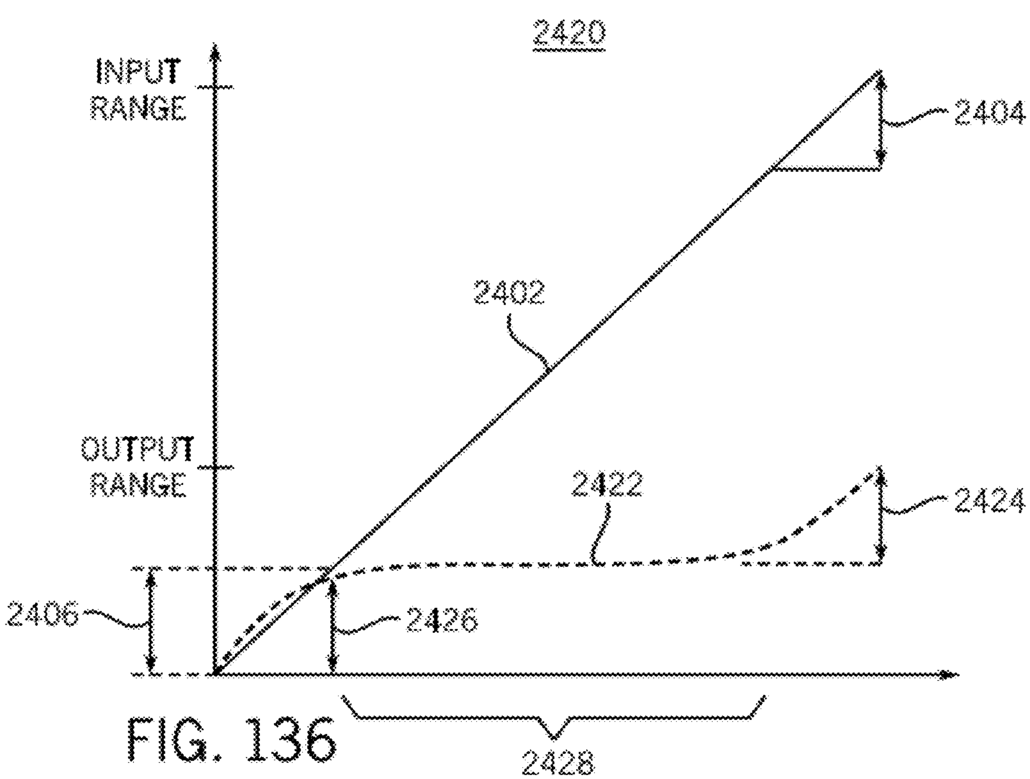
FIG. 136 is a graphical illustration showing another conventional global tone mapping technique.

As can be appreciated, local tone mapping techniques, when applied to images, may generally produce output images having improved contrast characteristics and may appear more aesthetically pleasing to a viewer relative to images processed using global tone mapping. FIGS. 135 and 136 illustrate some of the drawbacks associated with global tone mapping. For instance, referring to FIG. 135, the graph 2400 represents the tone mapping of input image having an input range 2401 to an output range 2403. The range of tone in the input image is represented by the curve 2402, wherein the values 2404 represent bright areas of the image and the values 2406 represent dark areas of the image.

By way of example, in one embodiment, the range 2401 of the input image may have 12-bit precision (0-4095), and may be mapped to an output range 2403 having 8-bit precision (0-255, e.g., a JPEG image). FIG. 135 shows a linear tone mapping process, in which the curve 2402 is linearly mapped to the curve 2410. As illustrated, the result of the tone mapping process shown in FIG. 135 results in the range 2404 corresponding to bright areas of the input image being compressed to a smaller range 2412, and also results in the range 2406 corresponding to dark areas of the input image being compressed to a smaller range 2414. The reduction in the tone range for dark areas (e.g., shadows) and bright areas may negatively impact contrast properties, and may appear aesthetically unpleasing to a viewer.

Referring to FIG. 136, one method to address the problems associated with the compression of the "bright" range 2404 (compressed to range 2412) and the "dark" range 2406 (compressed to range 2414), as shown in FIG. 176A, is to use a non-linear tone mapping technique. For instance, in FIG. 136, the tone curve 2402 representing the input image is mapped using a non-linear "S"-shaped curve (or S-curve) 2422. As a result of the non-linear mapping, the bright portion of the input range 2404 is mapped to the bright portion of the output range 2424 and, similarly, the dark portion of the input range 2406 is mapped to the dark portion of the output range 2426. As shown, the bright and dark ranges 2424 and 2426 of the output image of FIG. 136 are greater than the bright and dark ranges 2412 and 2414 of the output image of FIG. 135, and thus preserve more of the bright and dark content of the input image. However, due to the non-linear (e.g., S-curve) aspect of the mapping technique of FIG. 136, the mid-range values 2428 of the output image may appear flatter, which may also be aesthetically unpleasing to a viewer.

Figure 137:
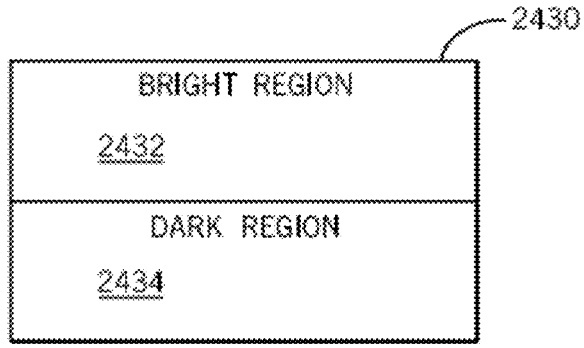
FIG. 137 depicts how regions of an image may be segmented for application of local tone application techniques, in accordance with aspects of the present disclosure.

Accordingly, embodiments of the present disclosure may implement local tone mapping techniques using local tone mapping operators to process discrete sections of the current image frame, which may be divided into regions based local features within the image, such as brightness characteristics. For instance, as shown in FIG. 137, a portion 2430 of the image frame received by the ISP back-end logic 120 may include a bright region 2432 and a dark region 2434. By way of example, the bright region 2432 may represent a light area of the image, such as a sky or horizon, whereas the dark area may represent a relatively darker area of the image, such as a foreground or landscape. Local tone mapping may be applied separately for each of the regions 2432 and 2434 to produce an output image that preserves more of the dynamic range of the input image relative to the above-discussed global tone mapping techniques, thus improving local contrast and providing an output image that is more aesthetically pleasing to a viewer.

Figure 138:
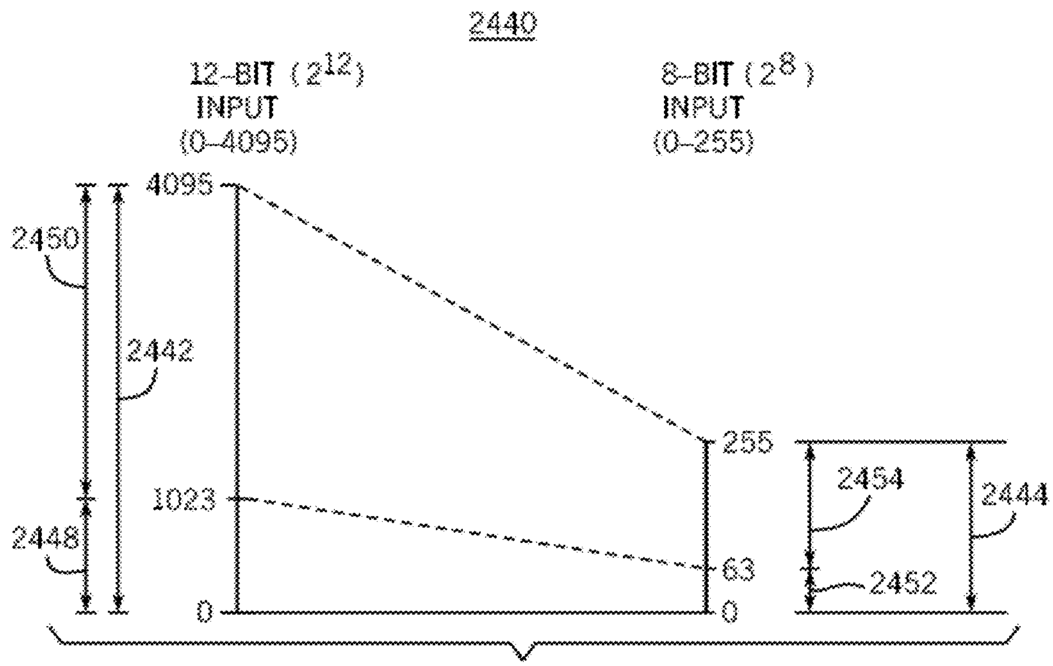
FIG. 138 graphically illustrates how conventional local tone mapping may result in limited utilization of an output tone range.

An example of how local tone mapping may be implemented in the present embodiment is shown by way of example in FIGS. 138 and 139. Particularly, FIG. 138 depicts a conventional local tone mapping technique which may in some instances result in a limited output range, and FIG. 139 depicts an adaptive local tone mapping process that may be implemented by the LTM logic 2202 that may make use of the full output range, even if a portion of input range is not used by the image frame.

Referring first to FIG. 138, the graph 2440 represents the application of local tone mapping to a higher bit-precision input image to produce a lower bit-precision output image. For instance, in the illustrated example, the higher bit-precision input image data may be 12-bit image data (with 4096 input values (e.g., values 0-4095)), as represented by range 2442, that is tone mapped to produce an 8-bit output (with 256 output values (e.g., 0-255)), represented here by range 2444. It should be understood that the bit-depths are simply meant to provide examples, and should not be construed as limiting in any way. For instance, in other embodiments, the input image may be 8-bit, 10-bit, 14-bit, or 16 bit, etc., and the output image may have a bit-depth that is greater than or less than 8-bit precision.

Here, it may be assumed that the region of the image on which local tone mapping is applied only utilizes a portion of the full input dynamic range, such as the range 2448 represented by values 0-1023. For example, these input values may correspond to the values of the dark region 2434 shown in FIG. 137. FIG. 138 shows a linear mapping of the 4096 (12-bit) input values to the 256 (8-bit) output values. Thus, while the values ranging from 0-4095 are mapped to the values 0-255 of the output dynamic range 2444, the unused portion 2450 (values 1024-4095) of the full input range 2442 is mapped to the portion 2454 (values 64-255) of the output range 2444, thereby leaving only the output values 0-63 (portion 2452 of the output range 2444) available for representing the utilized portion 2448 (values 0-1023) of the input range. In other words, this linear local tone mapping technique does not take into account whether unused values or ranges of values are mapped. This results in a portion (e.g., 2454) of the output values (e.g., 2444) being allocated for representing input values that are not actually present in the region (e.g., 2434) of the image frame on which the present local tone mapping operation (e.g., graph 2440) is being applied, thereby reducing the available output values (e.g., 2452) that may be used to express the input values (e.g., range 2448) present in the current region being processed.

With the foregoing in mind, FIG. 139 illustrates a local tone mapping technique that may be implemented in accordance with embodiments of the present disclosure. Here, prior to performing mapping of the input range 2442 (e.g., 12-bit) to the output range 2444 (e.g., 8-bit), the LTM logic 2202 may be configured to first determine a utilized range of the input range 2442. For instance, assuming the region is a generally dark region, the input values corresponding to color within that region may only utilize a sub-range, such as 2448 (e.g., values 0-1023), of the full range 2442. That is, the sub-range 2448 represents the actual dynamic range present in the particular region of the image frame being processed. Thus, since the values 1024-4095 (unused sub-range 2450) are not being utilized in this region, the utilized range 2448 may first be mapped and expanded to utilize the full range 2442, as shown by the expansion process 2472. That is, because the values 1024-4095 are not being utilized within the current region of the image being processed, they may be used to express the utilized portion (e.g., 0-1023). As a result, the utilized portion 2448 of the input range may be expressed using additional values, here approximately three times more additional input values.

Next, as shown by the process 2474, the expanded utilized input range (expanded to values 0-4095) may be subsequently mapped to the output values 0-255 (output range 2444). Thus, as depicted in FIG. 139, as a result of first expanding the utilized range 2448 of input values to make use of the full input range (0-4095), the utilized range 2448 of input values may be expressed using the full output range 2444 (values 0-255), rather than only a portion of the output range, as shown in FIG. 138.

Before continuing, it should be noted that although referred to as a local tone mapping block, the LTM logic 2202 may also be configured to implement global tone mapping in some instances. For example, where the image frame includes an image scene with generally uniform characteristics (e.g., a scene of the sky), the region on which tone mapping is applied may include the entire frame. That is, the same tone mapping operator may be applied to all pixels of the frame. Returning to FIG. 134, the LTM logic 2202 may also receive the data 2201 from the face detection logic 2200 and, in some instances, may utilize this data to identify one or more local areas within the current image frame to which tone mapping is applied. Thus, the end result from applying one or more of the above-described local tone mapping techniques may be an image that is more aesthetically pleasing to a viewer.

The output of the LTM logic 2202 may be provided to the brightness, contrast, and color adjustment (BCC) logic 2204. In the depicted embodiment, the BCC logic 2204 may be implemented generally identically to the BCC logic 1184 of the YCbCr processing logic 904 of the ISP pipeline, as shown in FIG. 132, and may offer generally similar functionality to provide for brightness, contrast, hue, and/or saturation control. Thus, to avoid redundancy, the BCC logic 2204 of the present embodiment has not been re-described here, but should be understood to be identical to the previously described BCC logic 1184 of FIG. 132.

Next, the scaling logic 2206 may receive the output of the BCC logic 2204 and may be configured to scale the image data representing the current image frame. For instance, when the actual size or resolution of the image frame (e.g., in pixels) is different from an expected or desired output size, the scaling logic 2206 may scale the digital image accordingly to achieve an output image of the desired size or resolution. As shown, the output 126 of the scaling logic 2206 may be sent to the display device 28 for viewing by a user or to memory 108. Additionally, the output 126 may also be provided to a compression/decompression engine 118 for encoding/decoding the image data. The encoded image data may be stored in a compressed format and then later decompressed prior to being displayed on the display 28 device.

Further, in some embodiments, the scaling logic 2206 may scale the image data using multiple resolutions. By way of example, when the desired output image resolution is 720p (1280×720 pixels), the scaling logic may scale the image frame accordingly to provide a 720p output image, and may also provide a lower resolution image that may function as a preview or thumbnail image. For instance, an application running on the device, such as the "Photos" application available on models of the iPhone® or the iPhoto® and iMovie® applications, available on certain models of the iPhone®, MacBook®, and iMac® computers, all available from Apple Inc., may allow users to view a listing of preview-versions of video or still images stored on the electronic device 10. Upon selecting a stored image or video, the electronic device may display and/or play back the selected image or video at full resolution.

In the illustrated embodiment, the scaling logic 2206 may also provide information 2203 to the back-end statistics block 2208, which may utilize the scaling logic 2206 for back-end statistics processing. For instance, in one embodiment, the back-end statistics logic 2208 may process the scaled image information 2203 to determine one or more parameters for modulating quantization parameters associated with the encoder 118 (e.g., quantization parameters per macroblock), which may be an H.264/JPEG encoder/decoder in one embodiment. For instance, in one embodiment, the back-end statistics logic 2208 may analyze the image by macroblocks to determine a frequency content parameter or score for each macroblock. For instance, in some embodiments, the back-end statistics logic 2206 may determine a frequency score for each macroblock using techniques such as wavelet compression, fast Fourier transforms, or discrete cosine transforms (DCTs). Using the frequency scores, the encoder 118 may be able to modulate quantization parameters to achieve, for example, a generally even image quality across the macroblocks constituting the image frame. For instance, if a high variance in the frequency content is present in a particular macroblock, compression may be applied to that macroblock more aggressively. As shown in FIG. 134, the scaling logic 2206 may also provide a reduced resolution image, represented here by reference number 2207, to the face detection logic 2200 by way of an input to the selection circuitry 2196, which may be a multiplexer or some other suitable type of selection logic. Thus, the output 2198 of the selection circuitry 2196 may be either the YCC input 114 from the ISP pipeline 82 or the down-scaled YCC image 2207 from the scaling logic 2206.

In some embodiments, the back-end statistics data and/or the encoder 118 may be configured to predict and detect scene changes. For instance, the back-end statistics logic 2208 may be configured to acquire motion statistics. The encoder 118 may attempt to predict scene changes by comparing motion statistics provided by the back-end statistics logic 2208, which may include certain metrics (e.g., brightness), of a current frame to a previous frame. When the difference in the metric is greater than a particular threshold, a scene change is predicted, the back-end statistics logic 2208 may signal a scene change. In some embodiments, weighted predictions may be used, as a fixed threshold may not always be ideal due to the diversity of images that may be captured and processed by the device 10. Additionally, multiple threshold values may also be used depending on certain characteristics of the image data being processed.

As discussed above, the facial detection data 2201 may also be also provided to the back-end statistics logic 2208 and the encoder 118, as shown in FIG. 134. Here, the back-end statistics data and/or the encoder 118 may utilize the facial detection data 2201 along with macroblock frequency information during back-end processing. For instance, quantization may be reduced for macroblocks that correspond to the location of faces within the image frame, as determined using the facial detection data 2201, thus improving the visual appearance and overall quality of encoded faces and facial features present in an image displayed using the display device 28.

Referring now to FIG. 140, a block diagram showing a more detailed view of the LTM logic 2202 is illustrated in accordance with one embodiment. As shown, tone mapping is applied after first converting the YC1C2 image data 114 from the ISP pipeline 82 into a gamma corrected RGB linear color space. For instance, as shown in FIG. 140, logic 2208 may first convert the YC (e.g., YCbCr) data to a non-linear sRGB color space. In the present embodiment, the LTM logic 2202 may be configured to receive YCC image data having different sub-sampling characteristics. For instance, as shown by the inputs 114 to a selection logic 2205 (e.g., a multiplexer), the LTM logic 2202 may be configured to receive YCC 4:4:4 full data, YCC 4:2:2 chroma sub-sampled data), or YCC 4:2:0 chroma sub-sampled data. For sub-sampled YCC image data formats, up-converting logic 2209 may be applied to convert the sub-sampled YCC image data to YCC 4:4:4 format before conversion by logic 2208 to the sRGB color space.

The converted sRGB image data, represented here by reference number 2210, may then be converted into the $RGB_{linear}$ color space, which is a gamma corrected linear space, by the logic 2212. Thereafter, the converted $RGB_{linear}$ image data 2214 is provided to the LTM logic 2216, which may be configured to identify regions (e.g., 2432 and 2434 of FIG. 137) in the image frame that share similar brightnesses and to apply local tone mapping to those regions. As shown in the present embodiment, the LTM logic 2216 may also receive parameters 2201 from the face detection logic 2200 (FIG. 134) which may indicate the location and positions within the current image frame where faces and/or facial features are present.

After local tone mapping is applied to the $RGB_{linear}$ data 2214, the processed image data 2220 is then converted back into the YC1C2 color space by first using the logic 2222 to convert the processed $RGB_{linear}$ image data 2220 back to the sRGB color space, and then using the logic 2226 to convert the sRGB image data 2224 back into the YC1C2 color space. Thus, the converted YC1C2 data 2228 (with tone mapping applied) may be output from the LTM logic 2202 and provided to the BCC logic 2204, as discussed above in FIG. 134. As will be appreciated the conversion of the image data 114 into the various color spaces utilized within the ISP back-end LTM logic block 2202 may be implemented using techniques similar to the conversion of the demosaiced RGB image data into the YC1C2 color space in the RGB processing logic 902 of the ISP pipeline 82, as discussed above in FIG. 125. Further, in embodiments where the YCC is up-converted (e.g., using logic 2209), the YC1C2 data may be down-converted (sub-sampled) by the logic 2226. Additionally, in other embodiments, this sub-sampling/down-conversion may also be performed by the scaling logic 2206 instead of the logic 2226.

While the present embodiment shows a conversion process that converts from the YCC color space to the sRGB color space and then to the $sRGB_{linear}$ color space, other embodiments may utilize difference color space conversions or may apply an approximated transform using a power function. That is, in some embodiments, conversion to an approximately linear color space may be sufficient for local tone mapping purposes. Thus, using an approximated transform function, the conversion logic of such embodiments may be at least partially simplified (e.g., by removing the need for color space conversion look-up tables). In a further embodiment, local tone mapping may also be performed in a color space that is perceptually better to the human eye, such as a Lab color space.

FIGS. 141 and 142 show flow charts that depict methods for processing image data using the ISP back-end processing logic 120, in accordance with disclosed embodiment. Referring first to FIG. 141, a method 2230 generally illustrating the processing of image data by the ISP back-end processing logic 120 is depicted. Beginning at step 2232, the method 2230 receives YCC image data from the ISP pipeline 82. For instance, as discussed above, the received YCC image data may be in the YCbCr luma and chroma color space. Next, the method 2232 may branch to each of steps 2234 and 2238. At step 2234, the received YCC image data may be processed to detect positions/locations of faces and/or facial features within a current image frame. For instance, with reference to FIG. 134, this step may be performed using the face detection logic 2200, which may be configured to implement a facial detection algorithm, such as Viola-Jones. Thereafter, at step 2236, the face detection data (e.g., data 2201) may be provided to the ISP control logic 84 as feedback to the ISP front-end statistics processing units 142 or 144), as well as to the LTM logic block 2202, the back-end statistics logic 2208, and the encoder/decoder logic 118, as shown in FIG. 134.

At, step 2238, which may occur at least partially concurrently with step 2234, the YCC image data received from the ISP pipeline 82 is processed to apply tone mapping. Thereafter, the method 2230 continues to step 2240, whereby the YCC image data (e.g., 2228) is further processed for brightness, contrast, and color adjustments (e.g., using BCC logic 2204). Subsequently, at step 2242, scaling is applied to the image data from step 2240 in order to scale the image data to one or more desired size or resolution. Additionally, as mentioned above, in some embodiments, color space conversion or sub-sampling may also be applied (e.g., in embodiments where YCC data is up-sampled for local tone mapping) to produce an output image having the desired sampling. Finally, at step 2244, the scaled YCC image data may be displayed for viewing (e.g., using display device 28) or may be stored in memory 108 for later viewing.

FIG. 142 illustrates the tone mapping step 2238 of FIG. 141 in more detail. For instance, the step 2238 may begin with sub-step 2248, in which the YCC image data received at step 2232 is first converted to the sRGB color space. As discussed above and shown in FIG. 140, some embodiments may provide for up-conversion of sub-sampled YCC image data before conversion to the sRGB space. Thereafter, the sRGB image data is converted to a gamma-corrected linear color space, $RGB_{linear}$, at sub-step 2250. Next, at sub-step 2252, tone mapping is applied to the $RGB_{linear}$ data by the tone mapping logic 2216 of ISP back-end LTM logic block 2202. The tone mapped image data from sub-step 2252 may then be converted from the $RGB_{linear}$ color space back to the sRGB color space, as shown at sub-step 2254. Thereafter, at sub-step 2256, the sRGB image data may be converted back to the YCC color space, and step 2238 of the method 2230 may continue to step 2240, as discussed in FIG. 141. As mentioned above, the process 2238 shown in FIG. 142 is merely intended to be one process for applying color space conversion in a manner suitable for local tone mapping. In other embodiments, approximated linear conversions may also be applied in place of the illustrated conversion steps.

As will be understood, the various image processing techniques described above and relating to defective pixel detection and correction, lens shading correction, demosaicing, and image sharpening, among others, are provided herein by way of example only. Accordingly, it should be understood that the present disclosure should not be construed as being limited to only the examples provided above. Indeed, the exemplary logic depicted herein may be subject to a number of variations and/or additional features in other embodiments. Further, it should be appreciated that the above-discussed techniques may be implemented in any suitable manner. For instance, the components of the image processing circuitry 32, and particularly the ISP front-end block 80 and the ISP pipe block 82 may be implemented using hardware (e.g., suitably configured circuitry), software (e.g., via a computer program including executable code stored on one or more tangible computer readable medium), or via using a combination of both hardware and software elements.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A method comprising:

using image signal processing (ISP) logic to receive incoming pixels corresponding to a plurality of image frames captured using a digital image sensor;

sending the incoming pixels to an input buffer associated with the digital image sensor;

providing a first pixel of a first image frame from the input buffer to a destination unit downstream from the input buffer, the destination unit being associated with the ISP logic;

determining if an overflow condition is present in the ISP logic and, if and while the overflow condition is present, stopping the sending of the incoming pixels to the input buffer by dropping the incoming pixels, determining after each dropped incoming pixel whether the overflow condition is still present, and counting each dropped incoming pixel that corresponds to the first image frame while the overflow condition is still present;

determining whether the overflow condition is no longer present; and if the overflow condition is no longer present, providing a second pixel of the first image frame to the destination unit and resuming the sending of incoming pixels to the input buffer.

2. The method of claim 1, wherein counting each dropped incoming pixel that corresponds to the first image frame while the overflow condition is present comprises incrementing a counter configured to store a value indicating to the number of incoming pixels corresponding to the first image frame that are dropped while the overflow condition is present.

3. The method of claim 1, comprising, if the overflow condition becomes no longer present before the end of the first image frame, replacing each of the dropped incoming pixels corresponding to the first image frame with a respective replacement pixel value.

4. The method of claim 3, wherein the replacement pixel values have a value equal to the value of the last incoming pixel sent to the input buffer before the overflow condition became present.

5. The method of claim 3, wherein the replacement pixel values are read from a programmable data register configured to store a desired replacement pixel value.

6. The method of claim 3, wherein providing the replacement pixel values allows the destination unit receiving the first image frame to process or store a number of pixels equal to an expected number of pixels for the first image frame.

7. The method of claim 1, wherein determining if an overflow condition comprises determining whether back-pressure applied by at least one downstream processing unit has propagated to the input buffer.

8. The method of claim 1, comprising, if the overflow condition continues into at least one image frame subsequent to the first image frame, dropping the entire at least one subsequent image frame.

9. The method of claim 8, wherein when the overflow condition is no longer present, the number of counted dropped incoming pixels corresponding to the first image frame are replaced with replacement pixel values.

10. An image signal processing system comprising:

an input queue configured to receive incoming pixels corresponding to frames of image data acquired by an image sensor, wherein the incoming pixels received by the input queue are sent to a target destination unit of a plurality of destination units of the image signal processing system;

a interrupt request (IRQ) status register configured to indicate the occurrence of an overflow condition by at least one of the plurality of destination units; and control logic configured to control the receiving of incoming pixels from the image sensor to the input queue by:

detecting for the occurrence of an overflow based at least partially upon the value of the IRQ register;

identifying a current frame that is being acquired by the digital image sensor when the overflow occurs;

while the overflow is occurring, dropping incoming pixels acquired by the digital image sensor and corresponding to the current image frame;

detecting a recovery from the overflow; and if the overflow recovery occurs before the end of the current image frame, receiving the incoming pixels corresponding to the remainder of the current image frame and acquired by the digital image sensor after the overflow recovery, sending the incoming pixels acquired after the overflow recovery to the destination unit, and for each incoming pixel that was dropped while the overflow was occurring, sending a replacement pixel value to the target destination unit.

11. The image signal processing system of claim 10, comprising a dropped pixel counter configured to maintain a count of the number of incoming pixels corresponding to the current image frame that are dropped while the overflow is occurring by incrementing its value by one for each incoming pixel that is dropped.

12. The image signal processing system of claim 11, wherein the number of replacement pixel values provided to the target destination unit is determined based upon the count stored by the dropped pixel counter.

13. The image signal processing system of claim 10, wherein the control logic is configured to identify whether an image frame includes replacement pixel values and to determine whether to output an image frame identified as including replacement pixel values based at least partially upon the number of replacement pixel values present in the identified image frame.

14. The image signal processing system of claim 13, wherein the control logic is configured to determine whether to output the identified image frame by:

comparing the number of replacement pixel values to a threshold value;

not outputting the identified image frame if the number of replacement pixel values exceeds the threshold value; and outputting the identified image frame if the number of replacement pixels is less than the threshold value.

15. The image signal processing system of claim 10, wherein, if the overflow does not recover before the end of the current image frame, the control logic is configured to drop all incoming pixels from the digital image sensor until the recovery of the overflow occurs, and wherein upon recovery of the overflow, the control logic is configured to:

send the pixels in the input queue that correspond to the current image frame to the target destination unit;

replace each pixel of the current image frame that was dropped during the overflow with a replacement pixel value and provide the replacement pixel values to the target destination unit;

detect the start of the first frame acquired by the digital image sensor after the overflow recovery; and receive incoming pixels corresponding to the first frame using the input queue.

16. The image signal processing system of claim 10, wherein the control logic is configured to determine if the overflow recovery occurs before the end of the current image frame based upon a vertical synchronization signal.

17. A method for processing pixel data using an image signal processing system comprising:

providing image pixels corresponding to a plurality of image frames acquired using an image sensor to a sensor input buffer, wherein the plurality of image frames corresponds to a set of video data;

sending the image pixels stored in the sensor input buffer to a selected destination logic of the image signal processing system;

if an overflow condition occurs during a first image frame, dropping the image pixels corresponding to the first image frame that are acquired by the image sensor after the occurrence of the overflow condition;

using an overflow counter to maintain a count of the number of dropped image pixels corresponding to the first current image frame;

determining if the overflow condition recovers during the first image frame;

if the overflow condition recovers during the first image frame, sending image pixels that were stored in the sensor input buffer prior to the occurrence of the overflow condition to the selected destination logic, sending a number of replacement pixel values equal to the count of dropped image pixels to the selected destination logic, and providing additional image pixels corresponding to the first image frame to the sensor input buffer; and if the overflow condition is still occurring after the end of the first image frame and at the start of a second image frame subsequent to the first image frame, clearing the sensor input buffer, receiving image pixels corresponding to the second image frame, resetting the overflow counter, and signaling control logic of the image signal processing system to drop the image pixels corresponding to the first image frame when outputting the video data from the image processing system to a display device.

18. The method of claim 17, comprising, if the overflow is still occurring after the end of the second image frame and at the start of a third image frame subsequent to the second image frame:

clearing the sensor input buffer, receiving image pixels corresponding to the third image frame;

clearing the overflow counter; and signaling the control logic to drop the image pixels corresponding to the second image frame when outputting the video data from the image processing system to the display device.

19. The method of claim 17, comprising incrementing a dropped frame counter when the first image frame is dropped, wherein the dropped frame counter is configured to indicate a number of frames dropped during the overflow condition.

20. The method of claim 19, comprising using audio-video synchronization logic to adjust at least one audio-video synchronization parameter based upon the number of dropped frames indicated by the dropped frame counter.

21. An electronic device comprising:

a first digital image sensor configured to acquire frames of a first set of image data;

a first sensor interface in communication with the first digital image sensor;

a first sensor input queue;

a display device configured to output image frames acquired by the first digital image sensor; and an image signal processing sub-system comprising overflow control logic and a plurality of destination units configured to receive image pixels corresponding to the image frames acquired by the first digital image sensor;

wherein the overflow control logic is configured to:
detect for an overflow condition while a first image frame of the first set of image data is being acquired by the first digital image sensor, received by the first sensor input queue, and routed to a target destination unit;
if the overflow condition is detected, drop image pixels corresponding to the first image frame of the first set of image data that are acquired by the first digital image sensor after the detection of the overflow condition and maintain a count of the number of dropped image pixels corresponding to the first image frame;
detect whether a recovery of the overflow condition occurs before the start of a second image frame of the first set of image data, the second image frame being subsequent to the first image frame;
if the overflow condition recovers before the start of the second image frame, route image pixels that were stored in the first sensor input queue prior to the occurrence of the overflow condition to the target destination unit, provide to the target destination unit a replacement pixel value for each of the image pixels corresponding to the first image frame of the first set of image data that was dropped during the overflow condition, and receive additional image pixels corresponding to the first image frame of the first set of image data in the first sensor input queue, and
if the overflow condition does not recover before the start of the second image frame, clear the first sensor input buffer, receive image pixels corresponding to the second image frame, reset the count of dropped image pixels, and identify the first image frame of the first set of image data as an image frame that may be excluded from being output to the display device.

22. The electronic device of claim 21, wherein the overflow logic comprises a dropped pixel counter, wherein the dropped pixel counter is incremented for each dropped image pixel corresponding to the first image frame, and wherein resetting the count of dropped image pixels comprises resetting the dropped pixel counter to zero.

23. The electronic device of claim 21, comprising:
a second digital image sensor configured to acquire frames of a second set of image data;
a second sensor interface in communication with the second digital image sensor; and
a second sensor input queue;
wherein the plurality of destination units are configured to receive image pixels corresponding to the image frames acquired by second first digital image sensor; and
wherein the overflow control logic is further configured to
detect for an overflow condition while a first image frame of the second set of image data is being acquired by the second digital image sensor, received by the second sensor input queue, and routed to the target destination unit;
if the overflow condition is detected, drop image pixels corresponding to the first image frame of the second set of image data that are acquired by the second digital image sensor after the detection of the overflow condition and maintain a count of the number of dropped image pixels corresponding to the first image frame of the second set of image data;
detect whether a recovery of the overflow condition occurs before the start of a second image frame of the second set of image data, the second image frame being subsequent to the first image frame;
if the overflow condition recovers before the start of the second image frame of the second set of image data, route image pixels that were stored in the second sensor input queue prior to the occurrence of the overflow condition to the target destination unit, provide to the target destination unit a replacement pixel value for each of the image pixels corresponding to the first image frame of the second set of image data that was dropped during the overflow condition, and receive additional image pixels corresponding to the first image frame of the second set of image data in the second sensor input queue, and
if the overflow condition does not recover before the start of the second image frame of the second set of image data, clear the second sensor input buffer, receive image pixels corresponding to the second image frame, reset the count of dropped image pixels, and identify the first image frame of the second set of image data as an image frame that may be excluded from being output to the display device.

24. The electronic device of claim 23, wherein the plurality of destination units comprises at least one of a memory, a front-end pixel processing unit, a pixel processing pipeline, or a back-end pixel processing unit, or some combination thereof, wherein the target destination unit is selected from one the plurality of destination units.

25. The electronic device of claim 23, comprising:
a first interrupt request register configured to indicate the presence of an overflow condition when image data is being acquired using the first digital image sensor; and
a second interrupt request register configured to indicate the present of an overflow condition when image data is being acquired using the second digital image sensor.

26. The electronic device of claim 23, wherein first and second digital image sensors comprise at least one of a digital camera integrated with the electronic device, an external digital camera coupled to the electronic device via the interface, or some combination thereof.

27. The electronic device of claim 23, wherein the first and second sensor interfaces comprise a Standard Mobile Imaging Architecture (SMIA) interface, a serial interface, a parallel interface, or some combination thereof.

28. The electronic device of claim 21, comprising at least one of a desktop computer, a laptop computer, a tablet computer, a mobile cellular telephone, a portable media player, or any combination thereof.

29. The electronic device of claim 21, wherein the overflow control logic detects the overflow condition by determining all queues and line buffers between the first sensor input queue a processing unit between the target destination unit and the first sensor input queue are full.

* * * * *